(12) United States Patent
Hayashi et al.

(10) Patent No.: US 6,655,810 B2
(45) Date of Patent: Dec. 2, 2003

(54) LIGHTING UNIT

(75) Inventors: Keiji Hayashi, Kawasaki (JP); Takeshi Gotoh, Kawasaki (JP); Toshihiro Suzuki, Kawasaki (JP); Hisashi Yamaguchi, Kawasaki (JP); Tetsuya Kobayashi, Kawasaki (JP); Tetsuya Hamada, Kawasaki (JP); Mari Sugawara, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/821,976

(22) Filed: Mar. 30, 2001

(65) Prior Publication Data

US 2002/0015297 A1 Feb. 7, 2002

(30) Foreign Application Priority Data

Jun. 21, 2000 (JP) .................................... 2000-187026
Dec. 13, 2000 (JP) .................................... 2000-378352

(51) Int. Cl.$^7$ ................................................ F21V 7/04
(52) U.S. Cl. .................... 362/31; 362/560; 362/561; 362/562; 362/318
(58) Field of Search .................... 362/31, 558, 560, 362/561, 562, 318; 349/62, 65, 67

(56) References Cited

U.S. PATENT DOCUMENTS

| | | | | |
|---|---|---|---|---|
| 5,128,781 A | * | 7/1992 | Ohno et al. | 359/48 |
| 5,377,083 A | * | 12/1994 | Tada | 362/31 |
| 5,521,797 A | * | 5/1996 | Kashima et al. | 362/31 |
| 5,845,035 A | * | 12/1998 | Wimberger-Friedl | 385/129 |

FOREIGN PATENT DOCUMENTS

| | | | | |
|---|---|---|---|---|
| GB | 2030751 A | * | 4/1980 | ........... G02F/1/133 |
| JP | 05-019258 | | 1/1993 | |
| JP | 05-028972 | | 2/1993 | |
| JP | 05-150235 | | 6/1993 | |
| JP | 05-59402 | | 8/1993 | |
| JP | 06-029001 | | 2/1994 | |
| JP | 07-248495 | | 9/1995 | |
| JP | 08-179318 | | 7/1996 | |
| JP | 08-262438 | | 10/1996 | |
| JP | 09-274185 | | 10/1997 | |
| JP | 10-091079 | | 4/1998 | |
| JP | 61-219980 | | 3/2003 | |

\* cited by examiner

*Primary Examiner*—Sandra O'Shea
*Assistant Examiner*—Sharon Payne
(74) *Attorney, Agent, or Firm*—Greer, Burns & Crain, Ltd.

(57) ABSTRACT

The invention relates to a backlight unit for liquid crystal displays, etc.; and its object is to provide a backlight unit not involving the problem that the emitted light leaks out of the optical waveguide, even when the space around the cold-cathode tubes in the light source unit for it is filled with a liquid of which the refractive index is nearly the same as that of the glass material that forms the outer wall of the cold-cathode tubes. The backlight unit comprises a housing 6 which houses cold-cathode tubes 2, 4 therein and of which the inner surface is coated with a light reflector 10; a transparent liquid filled in the housing 6; and an optical waveguide 1 made of a transparent substance and having a light-emitting surface S. The reflective surface of the light reflector 10 has a cross-section profile of X-T-U-V-W-Y, on which the light emitted by the cold-cathode tubes 2, 4 is reflected, and the thus-reflected light is led to the light-emitting surface S of the optical waveguide 1 at an incident angle not smaller than the critical angle to the surface S.

22 Claims, 61 Drawing Sheets

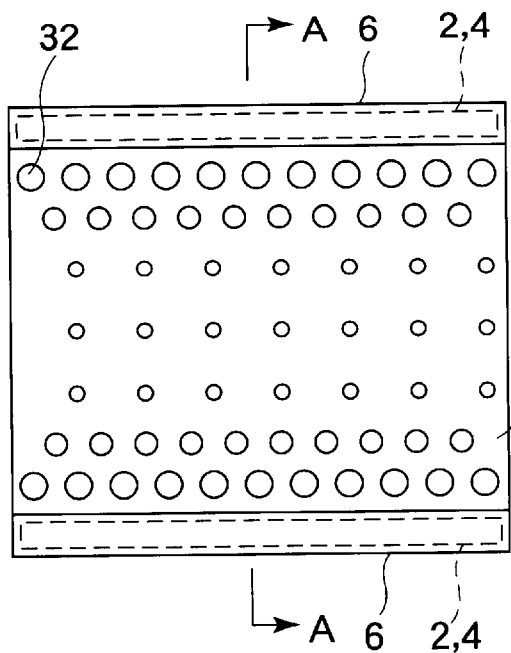
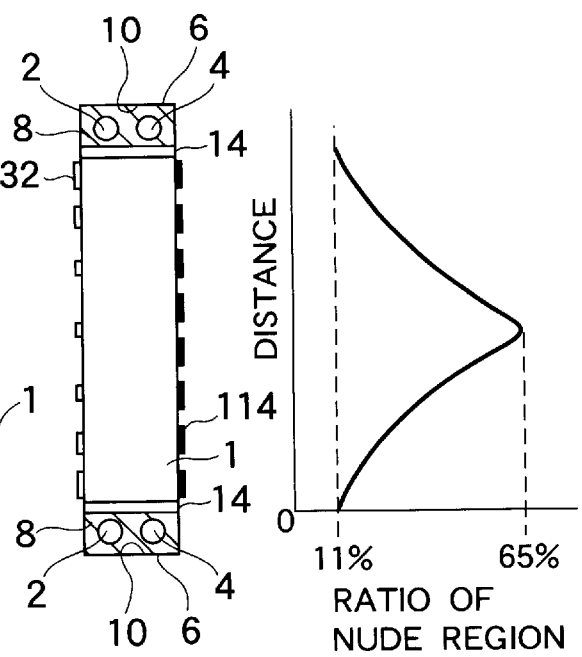
FIG.4A  FIG.4B  FIG.4C
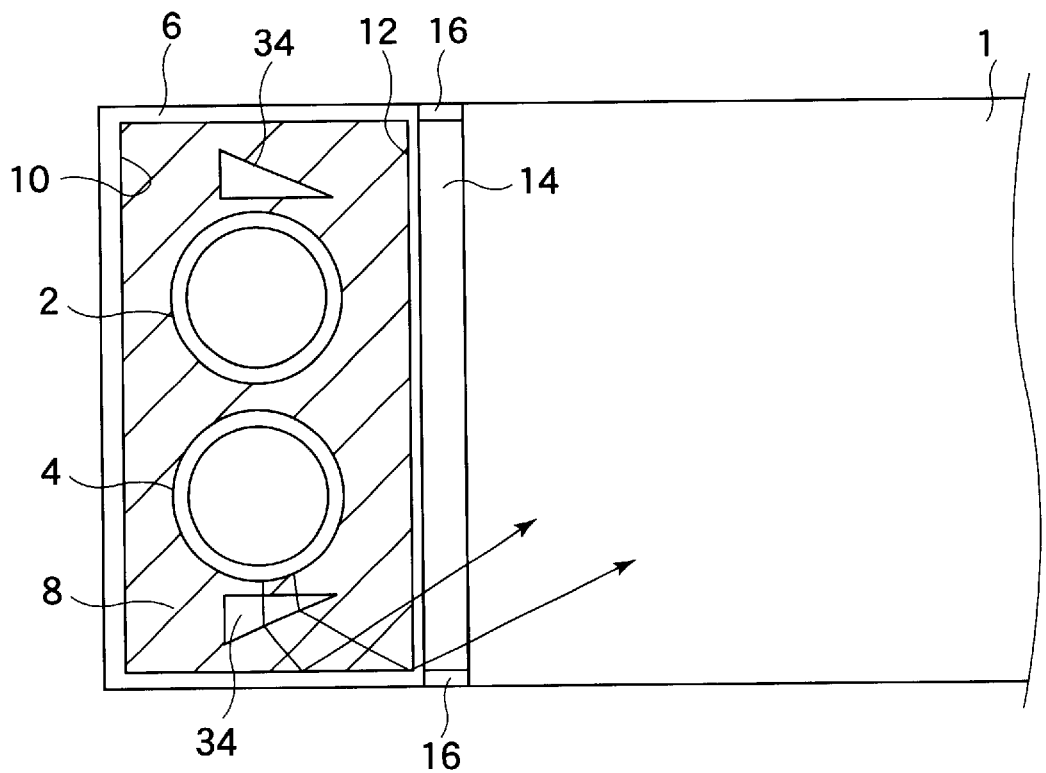
FIG.5

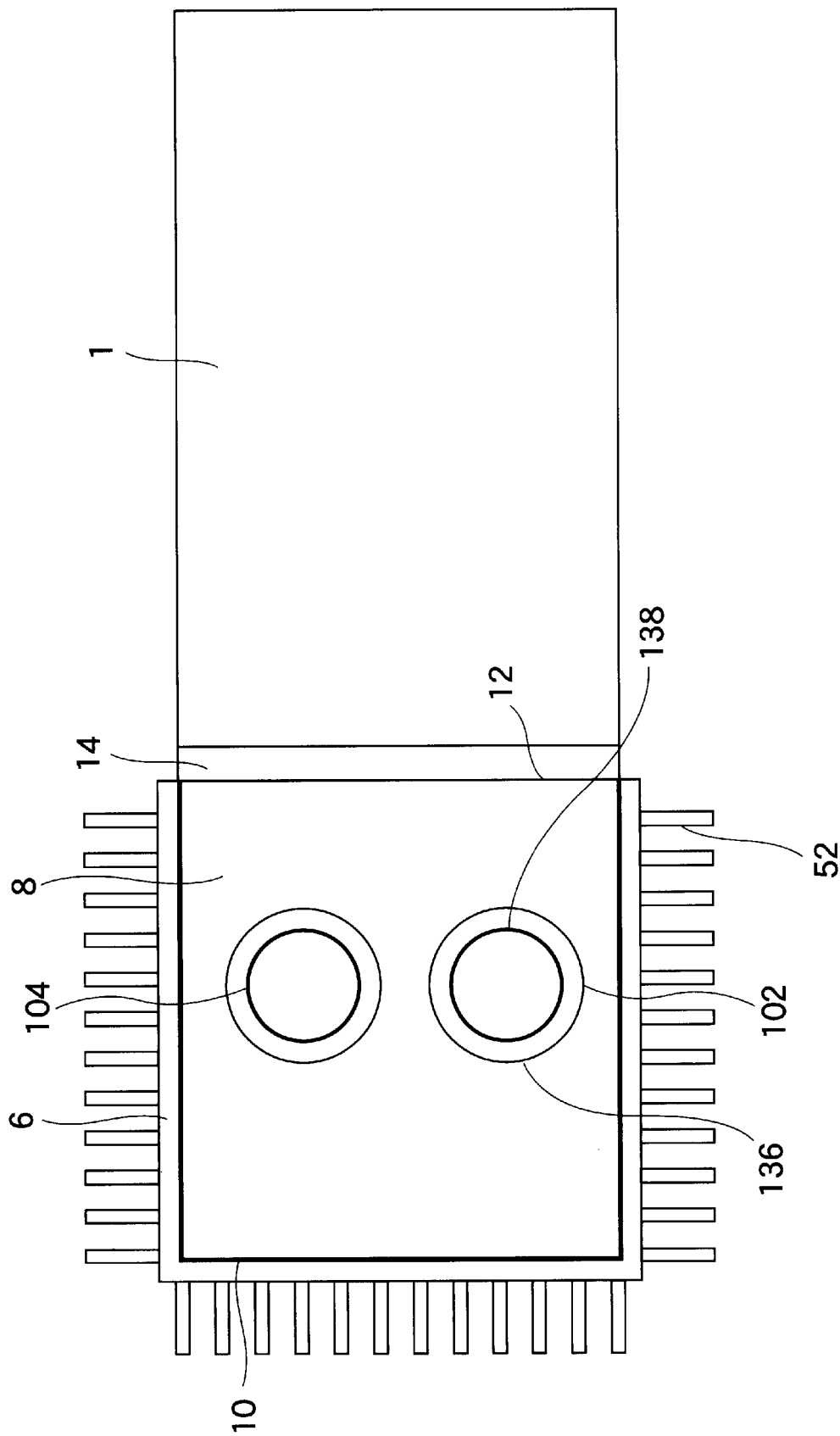

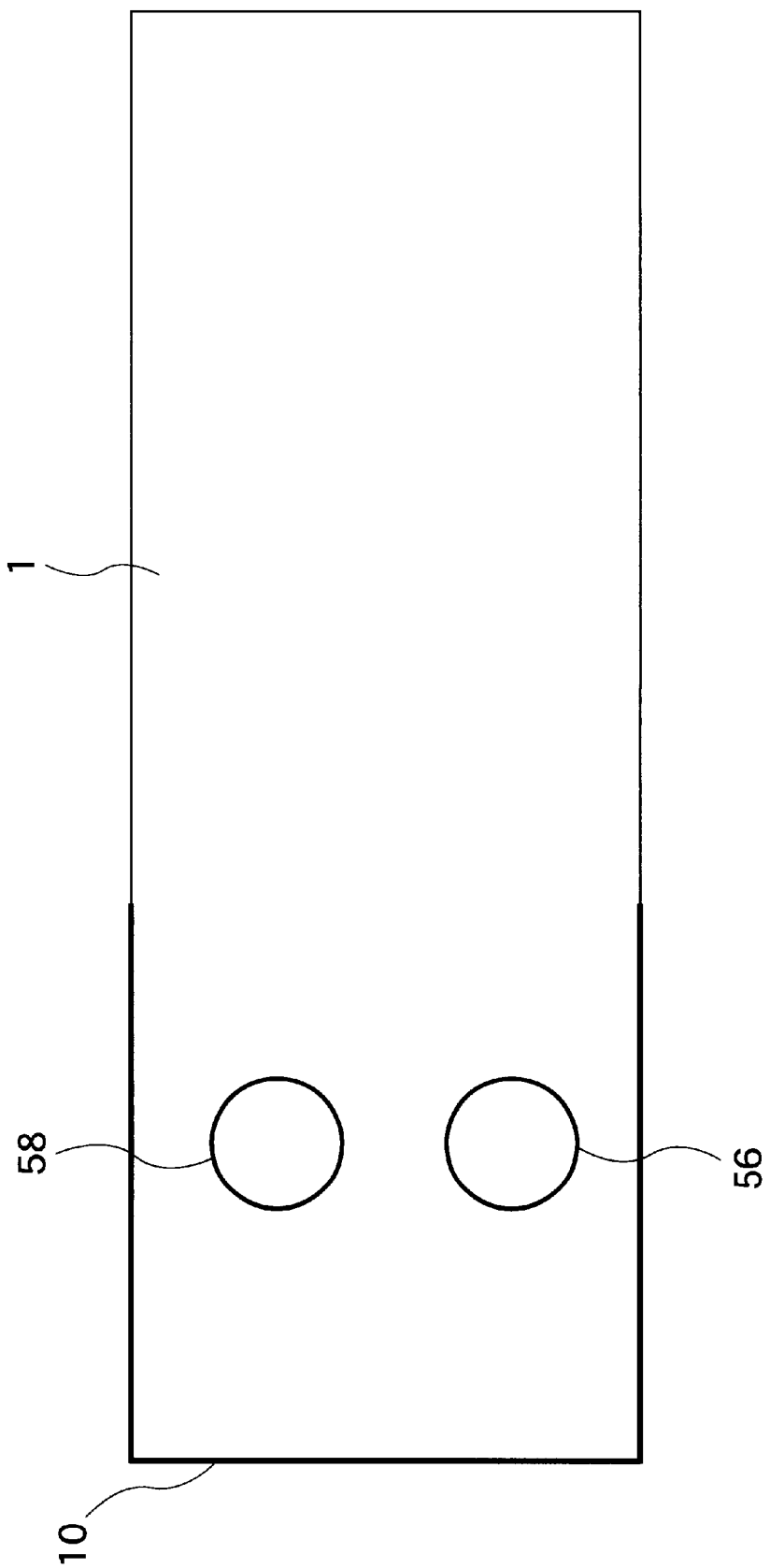

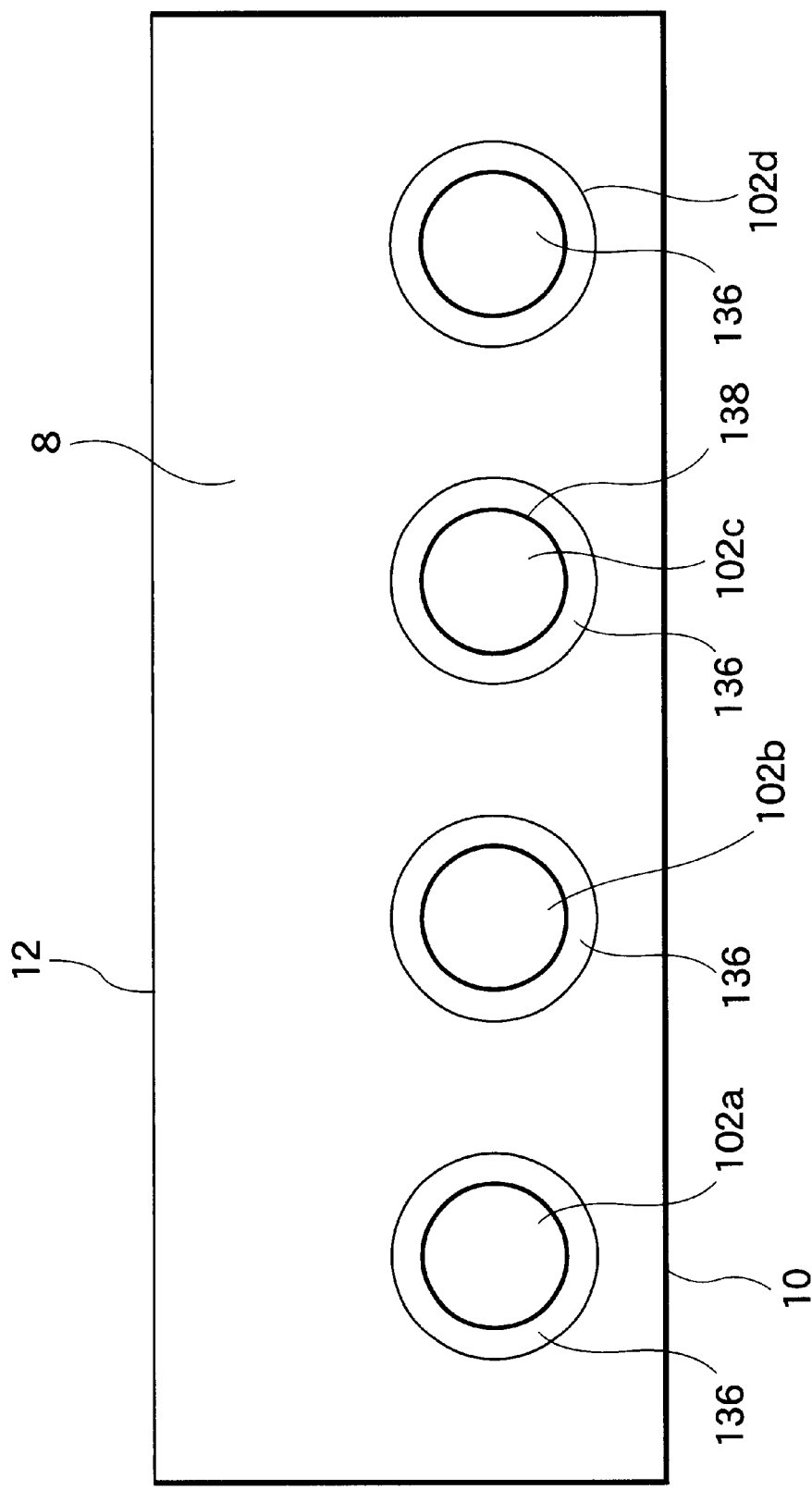

DIRECTION OF LIGHT EMISSION

END FOR LIGHT EMISSION

PRIOR ART

PRIOR ART

PRIOR ART

PRIOR ART

FIG.76A
FIG.76B
FIG.76C

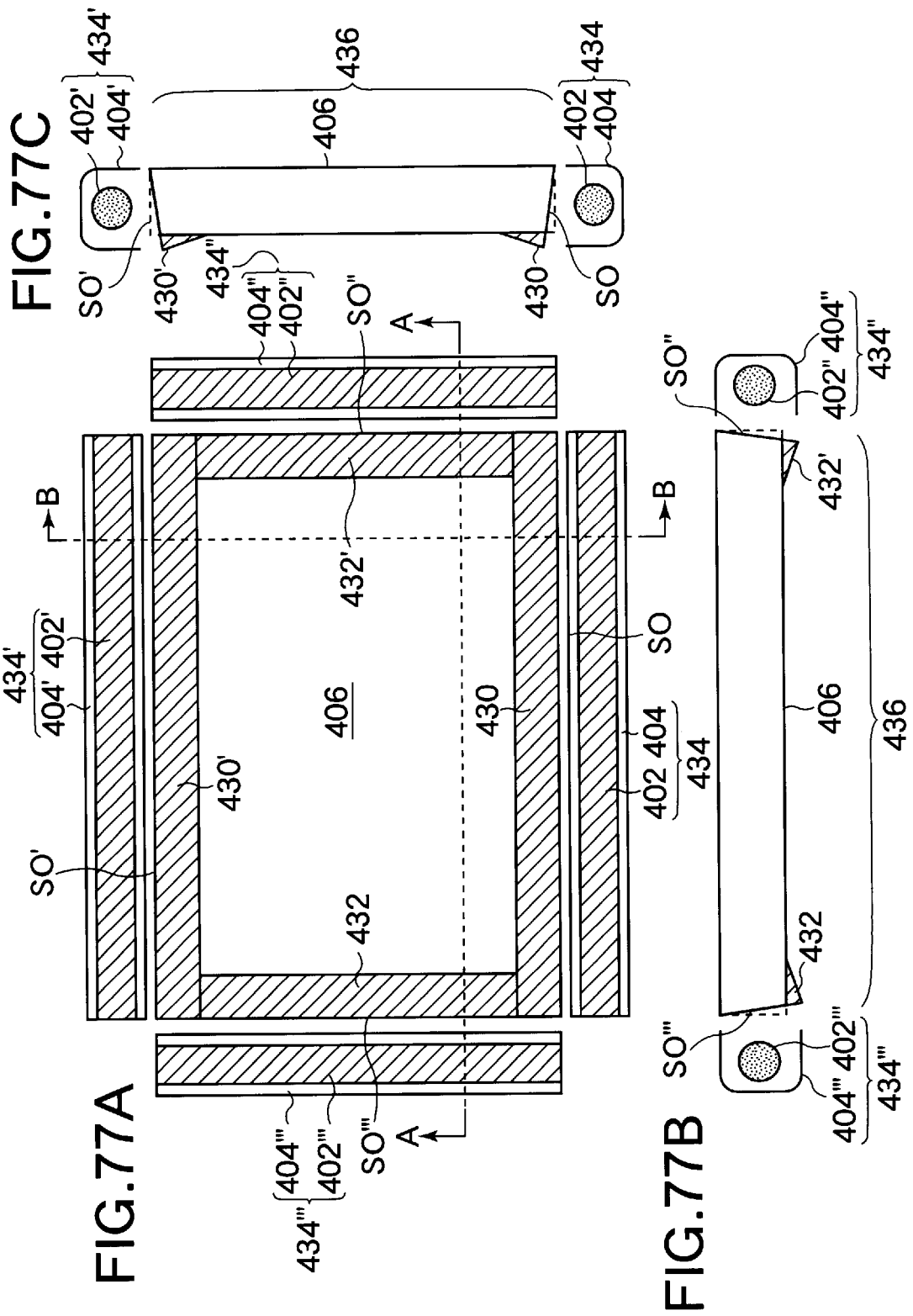

492 496 498
494

490
498 496
494

LIGHTING UNIT

BACKGROUND OF THE INVENTION

1. Field of the Invention

The present invention relates to a backlight unit to be used in liquid crystal displays, etc.

The invention also relates to a backlight unit in which the light source unit is filled with a transparent liquid.

The invention also relates to a reflector structure that realizes high-luminance and high-efficiency sidelight-type backlight units.

The invention also relates to a cold-cathode tube usable for a light source that receives essentially the fluorescence of the UV rays having been emitted through discharge emission of mercury or the like and emits visible light, especially for the light source of that type for liquid crystal displays.

2. Description of the Related Art

Recently, liquid crystal display panels have been rated highly in the market, as they save space upon installation and save power during operation, and their applications are expanding not only for displays of portable computers and monitors for portable televisions, but also for monitors of desk-top personal computers and flat televisions in domestic use. The backlight unit for lighting the liquid crystal display surface of such a liquid crystal display panel from the back surface of the panel includes two types; one being a direct-light-type unit that comprises a diffuser, a cold-cathode tube and a reflector all disposed just below the back surface of a liquid crystal display panel, and the other being a sidelight-type unit that comprises a diffuser, an optical waveguide and a reflector all disposed just below the back surface of a liquid crystal display panel, in which a cold-cathode tube and a reflector having a C-shaped or rectangularly U-shaped cross section are disposed on both sides of the optical waveguide.

For downsizing them and saving space upon installation, the latter is preferred to the former. However, the luminance of the former direct-light-type unit could be easily increased merely by increasing the number of the cold-cathode tubes in the unit, but it is difficult to increase the number of the cold-cathode tubes in the latter sidelight-type unit. It is therefore desired to increase the luminance of sidelight-type backlight units by increasing the emission efficiency of the units.

Prior Art 1

A sidelight-type backlight unit having a structure shown in FIG. 37A and FIG. 37B is generally used for liquid crystal display monitors. FIG. 37A is a view of a backlight unit of that type seen on its emission side. FIG. 37B is a cross-sectional view of FIG. 37A cut along the line A—A. As illustrated, the backlight unit comprises an acrylic plate 100 (this serves as an optical waveguide) with a light-scattering pattern 114 formed on its back surface, and two cold-cathode tubes 102, 104 disposed nearly in parallel with each other on and along one side of the acrylic plate 100. A reflector 110 (for this, an aluminum film is popularly used) is provided to surround the two cold-cathode tubes 102, 104, and its one side is opened to the optical waveguide 100 facing thereto. Also on and along the other side of the optical waveguide 100 having the two cold-cathode tubes 102, 104 disposed on its one side, other two cold-cathode tubes 106, 108 are disposed nearly in parallel with each other, and a reflector 112 is provided to surround the two cold-cathode tubes 106, 108 with its one side being opened to the optical waveguide 100 facing thereto.

In case where the number of the cold-cathode tubes in the sidelight-type backlight unit is increased for increasing the luminance of the unit, it produces some problems. One problem is the efficiency in light emission to the optical waveguide; and the other is the temperature of the cold-cathode tubes. Increasing the number of the cold-cathode tubes in the limited space in the unit inevitably makes the tubes more tightly adjacent to each other. As a result, in some region in the unit, the neighboring tubes will partly absorb the light emitted by them, thereby lowering the emission efficiency of the unit. In addition, in the area in which such an increased number of cold-cathode tubes are tightly aligned, the atmospheric temperature will increase, and if so, the tubes must be cooled so as to keep them at a temperature at which they ensure the maximum luminance.

In addition, the cold-cathode tubes in the unit involve by themselves a factor to lower the emission efficiency of the unit. As in FIG. 38, for example, the light emitted from one point of a cold-cathode tube 108 is partly reflected on the outer surface of the glass tube 136. In a cold-cathode tube having, for example, an outer diameter of 2.6 mm and an inner diameter of 2.0 mm, the reflected light accounts for at least 30% of the entire light emission from the tube. About 25% of the reflected light having reached the inner surface of the glass tube (for example, on the point c and the point d in FIG. 38) will be absorbed by the phosphor 138 coated on the inner surface of the glass tube or by the mercury gas filled in the glass tube. In addition, when the light from the cold-cathode tube 108 enters the glass tube of the neighboring cold-cathode tube 106, about 25% of the incident light that reaches the inner surface of the glass tube (for example, on the point a and the point b in FIG. 38) will be absorbed by the phosphor 138 coated on the inner surface of the glass tube or by the mercury gas filled in the glass tube.

To solve the prior art problems noted above, a method is proposed, which comprises filling the outer peripheral space of a cold-cathode tube with a liquid of which the refractive index is nearly the same as that of the glass material that forms the outer wall of the cold-cathode tube. According to this method, the reflection on the outer surface of the cold-cathode tube can be reduced, and, in addition, the incident light to the neighboring cold-cathode tube can be also reduced. Therefore, the method will be effective for increasing the emission efficiency of backlight units. In addition, since the liquid filled in the space around the cold-cathode tube will act also as a coolant, another advantage of the method is that the method does not involve the problem of temperature elevation even through a large number of cold-cathode tubes are packaged in the unit.

Prior Art 2

One conventional structure of a liquid crystal display with a sidelight-type backlight unit used therein is described, for which referred to is FIG. 41. As illustrated, a backlight unit is disposed adjacent to the emission side of a liquid crystal panel 134. The backlight unit is composed of a light source unit that comprises cold-cathode tubes (fluorescent tubes) 102 to 108 and reflectors 110, 112; and an optical waveguide unit that comprises a diffuser (optical sheet) 130, an optical waveguide 100 and a reflector 132. As the case may be, the diffuser 130 may have a multi-layered structure of plural sheets, depending on the mode of light diffusion through the optical waveguide unit.

For increasing the luminance of the backlight unit, two cold-cathode tubes of 102 to 108 are disposed for each of the reflectors 110, 112, and the optical waveguide 100 therefore has two pairs of cold-cathode tubes on both of its sides. The light emitted by the cold-cathode tubes 102 to 108 toward the optical waveguide 100 directly enters the optical waveguide 100 through its sides, and it is transmitted within the waveguide while being almost entirely reflected on and around it. The light emitted by the cold-cathode tubes 102 to 108 toward the reflectors 110, 112 is reflected by the reflectors 110, 112, and the thus-reflected light also enters the optical waveguide 100 through its sides and is transmitted within it like the direct light above.

Passing through the optical waveguide, a part of the light L1 goes out toward the reflector 132 or toward the diffuser 130, and the light that reaches the diffuser 130 passes through it while been diffused therethrough toward the liquid crystal panel 134. The light L2 that reaches the reflector 132 is reflected by it, and then passes through the optical waveguide 100 to reach the diffuser 130. This is also diffused toward the liquid crystal panel 134. In this manner, the liquid crystal panel 134 is illuminated by light diffused from two paths.

To meet the recent requirement for high-luminance backlight units, structures having a plurality of cold-cathode tubes disposed with one reflector are popular. In many cases, the shape of the reflector is determined depending on the external structure of the lighting unit and on the electric circuit and the wiring mode for the unit, for example, as in Japanese Patent Laid-Open No. 274185/1997.

Prior Art 3

An outline of the structure of the light source unit for conventional, direct-light-type backlight units is described with reference to FIG. 41 and FIG. 43. The structure of the direct-light-type backlight unit differs from that of the sidelight-type backlight unit shown in FIG. 41 in that, in the former, a plurality of straight light source tubes such as cold-cathode tubes 102a to 102d or the like are disposed below the diffuser 130 to be a surface light-emitting member and they are covered with a reflector 110 around them, as in FIG. 43; while in the latter, the optical waveguide 100 is disposed below the diffuser 130 and the light source units are on both sides of the optical waveguide 100, as in FIG. 41. The direct-light-type backlight unit is so constituted that the light emitted by the cold-cathode tubes 102a to 102d therein is, either directly or after having been reflected by the reflector 110, uniformly diffused through the diffuser 130, and then applied to the liquid crystal panel disposed adjacent to the unit.

For any of edge-light-type (sidelight-type) or direct-light-type backlight units, any of cold-cathode tubes 102, 102a to 102d, and 104 to 108 of the same type are used. The cold-cathode tube is made of a glass tube 136 with an electrode fixed on both of its sides, and the inner surface of the glass tube 136 is coated with a phosphor 138. Mercury, argon and neon are sealed in the glass tube 136. For the glass tube 136, generally used is hard glass having a refractive index of 1.5 or so.

When an electric current is applied between the two electrodes fixed on the glass tube 136, the mercury gas sealed in the glass tube 136 is excited, and radiates UV rays (essentially UV rays having a wavelength of 185 nm or 254 nm). The phosphor 138 coated on the inner surface of the glass tube 136 absorbs the UV rays, and emits visible light. The visible light is radiated outside the glass tube 136, and is utilized for illuminating liquid crystal panels.

Prior Art 4

A conventional cold-cathode tube serving as a light source that receives essentially the fluorescence of the UV rays having been emitted through discharge emission of mercury or the like and emits visible light, for example, that for a light source for liquid crystal displays and others is described with reference to FIG. 44A and FIG. 44B. For the light source for liquid crystal displays, cold-cathode tubes coated with phosphors capable of emitting light of three primary colors are used. For ordinary cold-cathode tubes, a phosphor mixture prepared by mixing $(SrCaBa)_5(PO_4)_3CL:Eu$, $LaPO_4:Ce,Tb$, $Y_2O_3:Eu$ and the like in a predetermined ratio is baked on the inner surface of the glass tube 136, as in FIG. 44A. The phosphors are white translucent powders, and they are fixed on the inner surface of the cold-cathode tube generally via a binder consisting essentially of water glass. Cold-cathode tubes of that type, reflectors (essentially made of aluminum) to surround them, and a tabular optical waveguide (acrylic plate) are assembled into a backlight unit such as that shown in FIG. 37A and FIG. 37B, and the unit is disposed behind a liquid crystal panel.

Prior Art 5

A surface light source unit having electric discharge tubes therein is grouped into two types, one being a direct-light-type unit and the other being a sidelight-type unit, as so mentioned hereinabove. However, the structures of these types illustrated in FIG. 37A through FIG. 41 and FIG. 43 are problematic in that they could hardly satisfy all the requirements for overall thickness reduction, uniform light diffusion and increased luminance. Specifically, the direct-light-type unit can realize increased luminance relatively with ease, but could hardly ensure uniform light diffusion owing to the luminance difference between the area around the discharge tubes and the area remote from the discharge tubes. In addition, since the discharge tubes are disposed below the light-emitting member therein, the overall thickness of the direct-light-type unit is difficult to reduce. Moreover, the positional relationship between the discharge tubes and the light curtain disposed between the diffuser and the discharge tubes is a matter of great importance to the direct-light-type unit, but it is difficult to appropriately align them in every unit. For these reasons, direct-light-type units actually produced on an industrial scale often involve the problem of luminance fluctuation among them.

On the other hand, the sidelight-type unit can be thinned with ease and can ensure uniform light diffusion also with ease, but its luminance is difficult to increase since the incident light utilization in the optical waveguide therein is low. To solve the problem, Japanese Patent Laid-Open No. 248495/1995 discloses a backlight unit of a different type as in FIG. 45. As illustrated in FIG. 45, the backlight unit has a UV lamp 300 partly covered with a reflective film 308, and has a dichroic mirror 304 disposed between the UV lamp 300 and an optical waveguide 302. In this, the mirror 304 faces the UV lamp 300; and a phosphor film 306 is laminated on the mirror 304, and this faces the optical waveguide 302. Owing to its wavelength selectivity, the dichroic mirror 304 disposed in this unit can pass substantially UV rays only through it, and it greatly improves the luminescent light utilization efficiency of the unit.

In the prior art 1, the method of filling the outer peripheral space of a cold-cathode tube with a liquid of which the refractive index is nearly the same as that of the glass material that forms the outer wall of the cold-cathode tube is problematic in that the light diffusion through the optical waveguide is not good. FIG. 39 shows a backlight unit in which the outer peripheral space of each cold-cathode tube is filled with a liquid, and this is seen in the same direction as that for the view of FIG. 37B. In FIG. 39, the same constituent members as those in FIGS. 37A and 37B are designated by the same numeral references as therein. The light source unit (composed of the cold-cathode tubes 102, 104 and the reflector 110) is filled with a transparent liquid 116 of which the refractive index is nearly the same as that of the glass tube for the cold-cathode tubes 102, 104, and is connected with the optical waveguide 100 via an optical adhesive 120 therebetween. The same shall apply to the light source unit (composed of the cold-cathode tubes 106, 108 and the reflector 112) on the opposite side.

In this structure however, the part extending from the cold-cathode tubes 102, 104 to the optical waveguide 100 form a substantially continuous body. In this part, therefore, the optical waveguide 100 will lose the waveguide condition for it (the condition is that, in principle, all the light from the cold-cathode tubes entirely enters the optical waveguide 100 on its side surface at an incident angle larger than the critical angle thereto). By way of example, a light source unit of FIG. 40 is referred to. In the case where the optical adhesive 122 and the transparent liquid 118 are not present in the unit, for example, the light from the cold-cathode tube 106 shall be refracted at one end of the optical waveguide 100 to run in the refracted direction of the dotted line P. With that, the thus-refracted light will run through the optical waveguide 100 while undergoing repeated total reflection therein. However, in case where the refractive index of the members that form the optical path is unified by the optical adhesive 122 and the transparent liquid 118, the light from the cold-cathode tube could not be refracted but shall go straight ahead as in the solid line Q, and it will be out of the optical waveguide 100.

Next discussed hereinunder are the problems with the prior art 2 and the prior art 3. The problem with the liquid crystal display panel equipped with a backlight unit of FIG. 41 is analyzed with reference to the view of FIG. 42. FIG. 42 shows the right-side light source unit of the structure of FIG. 41. Of the light having been emitted by the cold-cathode tube 102, the light m1 running toward the optical waveguide 100 directly enters the optical waveguide 100 through its end. The light m2 running toward the reflector 110 opposite to the optical waveguide 100 is reflected by the reflector 110, and then enters the optical waveguide 100 through its end.

However, the light 3 that is reflected by the reflector 110 and again enters the cold-cathode tube 102, and the light m4 that directly enters the neighboring cold-cathode tube 104 will be absorbed by the phosphors existing in the cold-cathode tubes 102, 104 or will be multi-reflected in different directions by the glass that forms the cold-cathode tubes, depending on the incident angle of these rays m3 and m4 entering the cold-cathode tubes 102, 104. As a result, some light emitted by the cold-cathode tubes could not enter the optical waveguide 100. Even if the light having entered the cold-cathode tubes 102, 104 could be again emitted from them, it will be again reflected by the reflector 110 and will further again enter the cold-cathode tubes 102, 104, and, after all, the light will be significantly attenuated. For these reasons, the light emitted by the cold-cathode tubes 102, 104 could not be efficiently utilized in the unit, thereby causing the problem of the reduction in light emission efficiency of the unit and the problem of the insufficiency of luminescent light quantity in the unit.

To increase the light quantity in the unit, increasing the number of cold-cathode tubes therein and increasing the electric power to be applied to the cold-cathode tubes may be taken into consideration, which, however, will produce still other problems. Increasing the number of cold-cathode tubes will inevitably enlarge the overall size of the lighting unit; and increasing the electric power to be applied to the cold-cathode tubes will increase the quantity of heat to be generated by the light source and will increase the light emission noise of the cold-cathode tubes.

Japanese Utility Model Laid-Open No. 59402/1993 and Japanese Patent No. 2,874,418 have proposed a technique of optimizing the shape of reflectors for direct-light-type backlight units. In direct-light-type backlight units, however, the reflector must produce uniformly reflected rays that are parallel with each other. Therefore, the proposed technique is problematic in that that the intended optimization is limited as it must satisfy the requirement as above and must increase the reflector efficiency. As opposed to the direct-light-type backlight units, sidelight-type backlight units could easily solve the problem since the light emitted by the cold-cathode tubes therein may be directly led into the optical waveguide. However, owing to the limitation on the thickness of the lighting unit, the diameter of each cold-cathode tube must be at most 3 mm, preferably 2.6 mm or so, relative to the aperture of the reflector (in general, it is at most 10 mm and is preferably 8 mm or so). Therefore, the method of increasing the number of cold-cathode tubes in sidelight-type backlight units is limited, and increasing the luminance of the units is therefore difficult.

In addition, the above-mentioned prior art techniques involve still another problem in that the luminous efficiency (light emission efficiency) of the cold-cathode tubes employed therein is only 30 lumens/W of the inputted power, and is extremely small.

Next discussed is the problem with the prior art 4. In the structure of FIG. 44A, the emission efficiency will lower when the visible light is emitted out of the cold-cathode tube. The reason is because a gaseous (or vacuum) space 202 is formed between the powdery phosphor particles 200 and the glass tube 136, as in FIG. 44B. When the visible rays emitted on the surfaces of the phosphor particles have reached the glass tube 136, some of them are reflected on the surface of the glass tube like X1, while some others pass through the glass tube like X2. Since the glass material to form the cold-cathode tube generally has a refractive index of 1.48 or so, the surface reflection X1 causes a reflection loss of around 10%.

In this connection, analyzed is a case where some external visible light enters the cold-cathode tube, with reference to FIG. 44B. When light (designated by solid lines in FIG. 44B) enters the glass tube 136 through its outer surface (this is on the lower side in FIG. 44B), the incident light is reflected on the surfaces of the phosphor particles 200 that are in contact with the space 202. In this case, however, since the surfaces of the particles are not smooth and since the diameter thereof is 3 $\mu$m or so and is small, the reflected light shall be macroscopically considered as scattered light. Therefore, the light passing through the cold-cathode tube or reflected by the phosphor particles will lose its running orientation, and will be thereby diffused and reflected as in the manner designated by the dotted lines in FIG. 44B. As a result, in the lighting unit with conventional cold-cathode tubes therein, the light having entered the cold-cathode tubes shall be lost. The light loss increases to a higher degree in more small-sized lighting units. In current backlight units, about 60% of the overall light emission will re-enter the cold-cathode tubes, and 30% of the light having re-entered them (this corresponds to about 18% of the overall light emission) will be scattered or absorbed by the phosphors and will be thereby lost.

Next discussed is the problem with the prior art 5. Even in the structure of FIG. 45, a part of UV rays having been emitted by the UV lamp 300 will be multi-reflected in different directions in the UV lamp 300 and will be absorbed by the gas existing therein. Therefore, the problem with the structure is that the quantity of UV rays to be emitted outside by the UV lamp decreases and the emission efficiency of the structure could not be increased. In addition, when the gas in the UV lamp absorbs too much light, the temperature of the UV lamp rises. Therefore, the size of the UV lamp could not be reduced. Another problem with the structure is that the light loss therein is great since the light emitted by the UV lamp is scattered in the UV lamp and is absorbed by the gas existing therein.

In the sidelight-type backlight unit, optical elements that may disorder the waveguide condition, such as the diffusive surface of the diffuser 130 and the refractive and reflective surface of the reflector 132, may be disposed in any desired density, whereby the quantity distribution of the light that passes through the optical waveguide 100 can be controlled, and the backlight unit ensures illumination of extremely high uniformity. In addition, the backlight unit of the type is characterized in that even when some of the light-emitting surfaces of the cold-cathode tubes 102 to 108 are aged so that the light emission through them is lowered, the unit could seemingly emit uniform light since the distance between the cold-cathode tubes and the panel surface to be illuminated by the unit is long. On the contrary, however, since the cold-cathode tubes 102 to 108 are disposed adjacent to the side edges of the optical waveguide 100 in the backlight unit of the type, the number of the cold-cathode tubes that may be in the unit is limited. Therefore, one problem with the unit of the type is that it is difficult to increase the luminance of the unit.

On the other hand, the direct-light-type sidelight unit is advantageous in that its luminance can be increased by increasing the number of the cold-cathode tubes 102a to 102d, but is problematic in that its luminance is often uneven since the distance between the cold-cathode tubes 102a to 102d and the panel surface to be illuminated by the unit is not long. It may be possible to optimize the distance between the cold-cathode tubes 102a to 102d, the characteristics of the diffuser 130 and the profile of the reflector 110 to thereby evade luminance fluctuation. However, when the conditions are varied, some of the light-emitting surfaces of the cold-cathode tubes 102a to 102d will be aged to lower the light emission through them, and one problem with the unit of the type is that its luminance will readily fluctuate.

SUMMARY OF THE INVENTION

The object of the present invention is to provide a backlight unit in which the light emitted by the cold-cathode tubes can be efficiently reflected toward the optical waveguide.

The object of the invention is to provide a long-life lighting unit capable of realizing high luminance of high uniformity.

The object can be attained by a lighting unit which comprises an emitter having a transparent body with a refractive index n0 and containing a light-emitting substance sealed in the empty region inside it, a housing that houses the emitter and has a reflector formed on its inner surface, a transparent filler with a refractive index n1 filled in the housing, and an optical waveguide made of a transparent substance with a refractive index n2 and having a light-emitting surface; wherein the profile of the light-reflecting surface of the reflector is so modified that the light having been emitted by the emitter and reflected by the reflector to run toward the light-emitting surface of the optical waveguide can reach the light-emitting surface at an incident angle not smaller than the critical angle to the light-emitting surface.

BRIEF DESCRIPTION OF THE DRAWINGS

FIG. 4A to FIG. 4C show an outline of the constitution of the backlight unit of Example 4 of the first embodiment of the invention;

FIG. 5 shows an outline of the constitution of the backlight unit of Example 6 of the first embodiment of the invention;

FIG. 19 shows an outline of the constitution of the backlight unit of Example 8 of the third embodiment of the invention;

FIG. 20 shows an outline of the constitution of the backlight unit of Example 9 of the third embodiment of the invention;

FIG. 21 shows an outline of the constitution of the backlight unit of Example 10 of the third embodiment of the invention;

FIG. 76A, FIG. 76B and FIG. 76C show an outline of the lighting unit of Example 7-5 of the seventh embodiment of the invention, illustrating the plan view and the cross-sectional views of the lighting unit disposed adjacent to the surface of the liquid crystal panel FP to be illuminated by it;

FIG. 77A, FIG. 77B and FIG. 77C show an outline of a modification of the lighting unit of Example 7-5 of the seventh embodiment of the invention, illustrating the plan view and the cross-sectional views of the modified lighting unit disposed adjacent to the surface of the liquid crystal panel FP to be illuminated by it;

DESCRIPTION OF THE PREFERRED EMBODIMENTS OF THE INVENTION

Figure 1A:
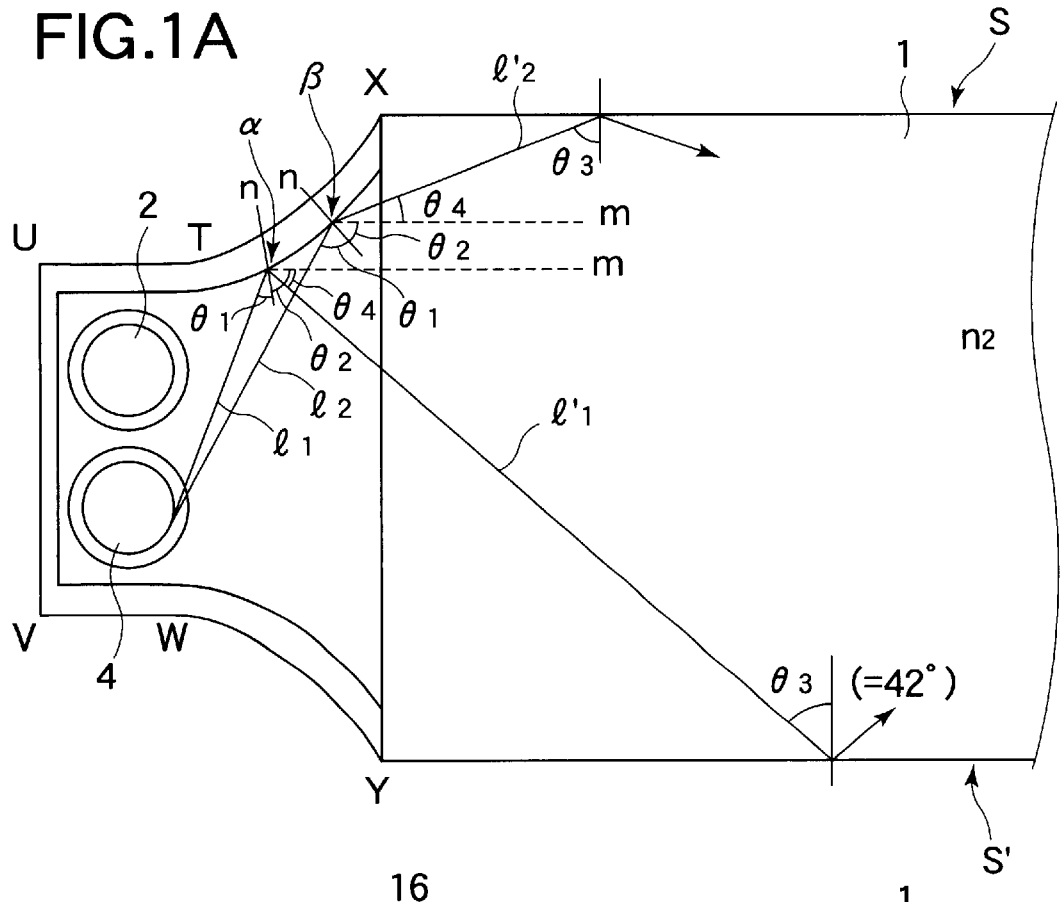
FIG. 1A and FIG. 1B show an outline of the constitution of the backlight unit of Example 1 of the first embodiment of the invention.

The backlight unit for liquid crystal displays and others of the first embodiment of the invention is described with reference to FIG. 1A through FIG. 5. This embodiment provides a backlight unit in which the emitted light is prevented from leaking out of the optical waveguide not undergoing total reflection, even when the light source unit therein is so constituted that the outer peripheral region of each cold-cathode tube therein is filled with a liquid of which the refractive index n1 is nearly the same as the refractive index n0 of the glass material that forms the outer wall of the cold-cathode tube.

In order that a majority of the emitted light can run through the optical waveguide, some methods mentioned below maybe employed. The first method comprises changing the angle of the emitted light in the previous stage before the light enters the optical waveguide so that the light is specifically oriented in the direction falling within the angle range that meets the optical waveguide condition. For example, the light-reflecting surface of the reflector adjacent to the optical waveguide in the light source unit is curved convexedly toward the cold-cathode tubes therein so that the incident angle of the ray component that reaches the side surface of the optical waveguide at a large incident angle is changed.

The second method comprises reducing the degree of light emission from the region of the light-emitting surface of the optical waveguide nearer to the cold-cathode tubes.

For example, a reflection pattern is provided on the surface of the optical waveguide, and the a real ratio of the openings of the pattern is distributed depending on the light quantity distribution on the pattern.

The other methods are as follows: For example, the dielectric loss tangent of the transparent liquid is made to decrease under the driving condition for the cold-cathode tubes. The dielectric constant of the transparent liquid is made to increase under the driving condition for the cold-cathode tubes. A cooling mechanism is provided in a part of the housing of the light source unit. A radiation fin is provided partly around the housing. The refractive index of the liquid to be filled in the light source unit is controlled to thereby prevent the reduction in the emission efficiency caused by reflection. The reflector existing in a part of the housing is made of metal. A means for heating the transparent liquid filled in the light source unit is provided. A mechanism is provided for heating the transparent liquid for a predetermined period of time after lighting.

The backlight unit of this embodiment is described with reference to its concrete examples. In the other embodiments of the invention and their examples to be mentioned hereinunder, the constituent elements having the same effect and the same function among them, and the constituent elements having the same effect and the same function as those in the prior art techniques mentioned above will be designated by the same numeral references, and repeatedly describing them is omitted hereinunder.

Example 1 of the First Embodiment

Figure 1B:
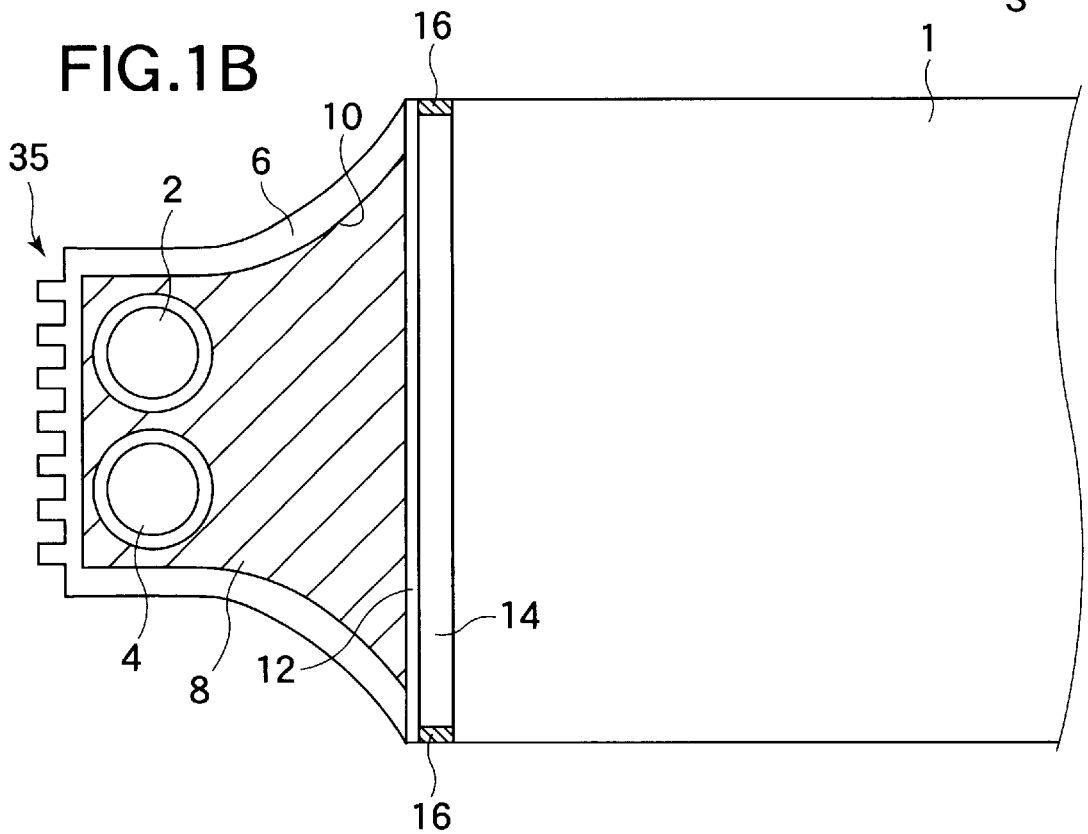
Figure 37A:
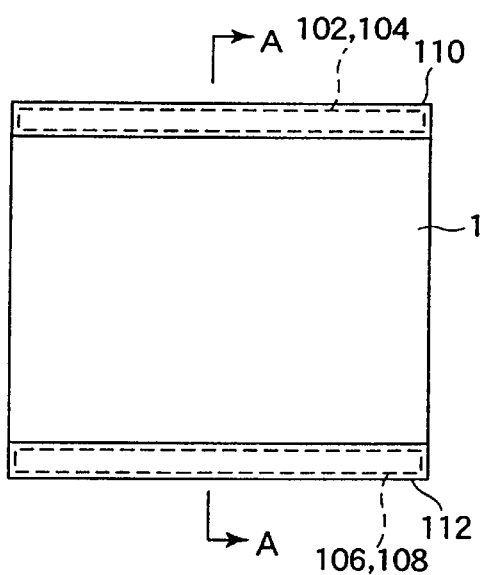
FIG. 37A and FIG. 37B show an outline of the constitution of a conventional backlight unit.
Figure 37B:
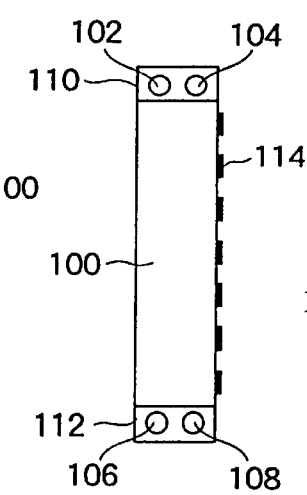

An outline of the constitution of the backlight unit of this Example is described with reference to FIG. 1A and FIG. 1B. Like FIG. 37B, FIG. 1A and FIG. 1B are cross-sectional views of a backlight unit, especially clarifying the region around the light source unit of the backlight unit. FIG. 1A shows the driving principle of the backlight unit; and FIG. 1B shows the constitution thereof. The backlight unit in liquid crystal monitors (televisions) is provided with a prism sheet, a diffuser and other members between the unit and the liquid crystal panel adjacent thereto. However, such members have no specific relation to this embodiment of the invention, and their description is omitted herein. In the backlight unit, especially the cold-cathode tubes, the reflector and the optical waveguide are specifically described.

In order that the emitted light from the light source unit that comprises at least the housing 6, the cold-cathode tubes 2, 4, and the transparent liquid 8 can be properly guided by the optical waveguide 1 to pass through it, the incident angle of the emitted light to the side surface S (or S') of the optical waveguide 1 must be at least the critical angle thereto, as in FIG. 1A and FIG. 1B. For this Example, the profile of the light-reflecting surface of the reflector 10 that forms the inner surface of the housing 6 of the light source unit is modified to thereby control the going-out angle of the emitted light from the light-reflecting surface. In this Example, two cold-cathode tubes 2, 4 each having an outer diameter of 2.6 mm are packaged in the light source unit. The reflector 10 has a nearly rectangular cross-sectional profile formed by connecting the edges T-U-V-W, and this covers the cold-cathode tubes 2,4 while being spaced by a minimum distance 1 mm from the tubes 2,4, as in FIG. 1A.

The profile of the reflector 10 that connects T-X shall be determined in the manner mentioned below. The profile of W-Y is symmetric to that of T-X. The optical path of the light that goes out of the inner surfaces of the two cold-cathode tubes 2, 4 (these surfaces are coated with a phosphor) and is reflected on the surface of T-X to reach the surface S (S') is discussed. First, a tangential line 11 is drawn. This starts from a position between T-X, for example, from the position a in FIG. 1A, and tangentially extends to the inner surface of the cold-cathode tube 4. Next, a virtual straight line 11' is drawn. This starts from the position α and reaches the surface S (or S'), and its incident angle to the surface is the critical angle thereto (for example, 42°). The degree of inclination of the surface of the reflector 10 at the position α is so determined that the bisector of the angle between the tangential line 11 and the virtual straight line 11' is a normal line. This operation is repeated in order from T to X to finally determine the profile of the curved surface T-X.

In the manner as above, the backlight unit of this Example comprises the cold-cathode tubes (emitters) 2, 4 both having a glass tube (transparent body with a refractive index n0) with a light-emitting substance being sealed in the empty region inside it; the housing 6 that houses the cold-cathode tubes 2, 4 and has the reflector 10 formed on its inner surface; the transparent liquid (filler) 8 with a refractive index n1 (≈n0) filled in the housing 6; and the optical waveguide 1 made of a transparent substance with a refractive index n2 and having a light-emitting surface, and this is characterized in that the profile of the light-reflecting surface of the reflector 10 is so modified that the light having been emitted by the emitter and reflected by the reflector 10 to run toward the light-emitting surface S of the optical waveguide 1 can reach the light-emitting surface S at an incident angle not smaller than the critical angle to the light-emitting surface S.

The profile of the light-reflecting surface of the reflector 10 is characterized in that it satisfies the requirement of $|\theta 1-\theta 2|<\cos^{-1}(1/n2)$, in which $\theta 1$ indicates the angle between the normal line n at a position α on the surface and the tangential line 1 that tangentially connects the point of the position α and the outline of the empty region, and $\theta 2$ indicates the angle between the line segment m that is parallel to the light-emitting surface S (S') and is in the plane formed by the normal line n and the tangential line 1, and the normal line n.

When the incident angle of the light that reaches the light-emitting surface S (S') is designated by $\theta 3$ and when the light undergoes total reflection on the surface, then $n2 \sin \theta 3 > 1$ according to the Snell's law. From FIG. 1A, $\theta 3 + \theta 4 = \pi/2$, $n2 \sin \theta 4 > 1$, and $\theta 4 = |\theta 1 - \theta 2|$. Therefore, $n2 \cos(|\theta 1 - \theta 2|) > 1$, and the above-mentioned formula is derived from this.

In the manner as above, when the bell-shaped reflector 10 of which the light-reflecting surface is curved convexedly toward the cold-cathode tubes cold-cathode tubes 2, 4 is disposed between X-T and Y-W, the light component that may pass through the surfaces S, S', not undergoing total reflection thereon, can be reduced.

As in FIG. 1B, the region between X-Y is sealed up with a transparent acrylic sheet 12, and the closed space formed by the reflector 10, X-T-U-V-W-Y, and the transparent acrylic sheet 12, X-Y, is filled with silicone oil 8. The optical and electric characteristics of the silicone oil 8 are shown in Table 1.

TABLE 1

| Characteristic of Silicone Oil | |
| --- | --- |
| Refractive Index | 1.486 |
| Dielectric Constant | $3 \times 10^{-4}$ ($10^2$ Hz), $3 \times 10^{-4}$ ($10^6$ Hz) |

TABLE 1-continued

Characteristic of Silicone Oil

| | |
|---|---|
| Dielectric Loss Tangent | $2.9 \times 10^{-3}$ ($10^2$ Hz), $2.8 \times 10^{-3}$ ($10^6$ Hz) |
| Volume Resistivity | $1 \times 10^{14}$ Ω · m |

As in Table 1, when the silicone oil 8 is so selected that its refractive index falls between the refractive index (1.48) of the acrylic resin that forms the optical waveguide 1 and the refractive index (1.49) of the glass material that forms the cold-cathode tubes 2, 4, then the interfacial reflectivity can be minimized. In addition, when the electric characteristics of the thus-selected silicone oil 8 are optimized, then the leak current to the reflector 10 (formed of aluminum) can be reduced. Regarding the direct current component, the electric energy loss in its leakage can be reduced when the dielectric loss tangent of the silicone oil 8 is controlled to be on the order of $10^{-3}$. Regarding the alternating current component, the capacitance between the cold-cathode tubes 2, 4 and the reflector 10 can be increased when the silicone oil 8 is so selected that its dielectric constant is the highest at a frequency of around 400 Hz, and therefore the leakage of the component can be reduced in that condition.

The housing 6, X-T-U-V-W-Y, is connected with the optical waveguide 1 via a support ring 16 with an optical adhesive 14 being applied therebetween. A radiation fin 35 is provided adjacent to the outer surface of the housing 6. The heat generated by the cold-cathode tubes 2, 4 is conducted by the housing 6 and then radiated outside by the radiation fin 35, and the light source unit is thereby cooled.

Example 2 of the First Embodiment

An outline of the constitution of the backlight unit of this Example is described with reference to FIG. 2. Additionally having a forced air-cooling mechanism, this Example is a modification of Example 1. Precisely, an axial fan 18 having a square size of 20 mm×20 mm is provided behind the reflector 10 of a metal plate (e.g., aluminum plate) that forms the housing 6, and this applies flowing air onto the outer surface of the reflector 10. The axial fan 18 is provided with a revolution speed control mechanism 22. Based on the temperature of the transparent liquid 8, the revolution speed control mechanism 22 controls the revolution speed of the axial fan 18. The temperature of the transparent liquid 8 is monitored, for example, on the basis of the thermoelectromotive force difference between the cromel 20 embedded in a part of the reflector 10 and the aluminum material that forms the reflector 10. With the mechanism, the liquid temperature can be lowered by 10° C. or so.

Example 3 of the First Embodiment

An outline of the constitution of the backlight unit of this Example is described with reference to FIG. 3. Additionally having a mechanism for heating the transparent liquid 8, this Example is another modification of Example 1. In case where the transparent liquid 8 is not heated, it will be about 15 minutes before the light source unit reaches thermal equilibrium. In addition, since the initial-stage temperature of the unit is lower by about 20° C. than the thermal equilibrium temperature thereof, the mercury vapor pressure inside the cold-cathode tubes 2, 4 could not well increase. In the initial stage, therefore, the luminance of the cold-cathode tubes 2, 4 will be about 60% of the ordinary luminance thereof driven for a while. To solve the problem of low luminance condition in rise time, the backlight unit of this Example is provided with a mechanism for heating the transparent liquid 8 for about 10 minutes or so after the cold-cathode tubes 2, 4 have been turned on.

Figure 3:
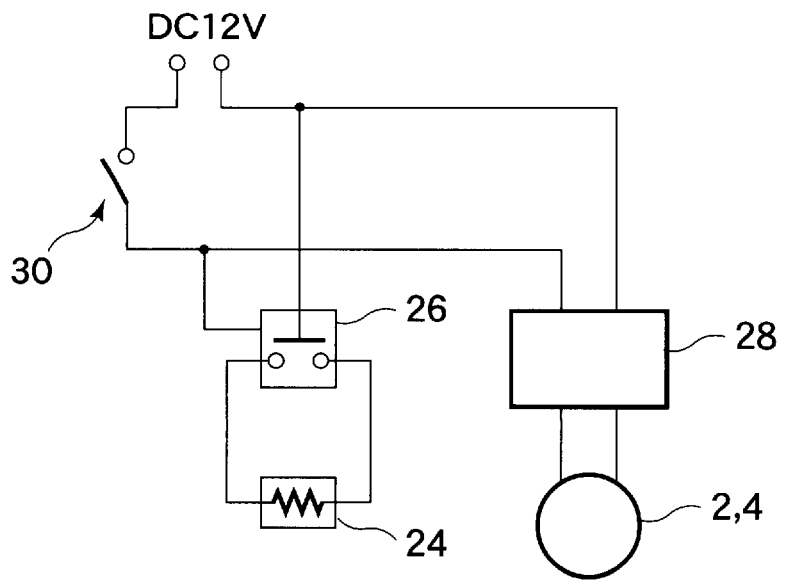
FIG. 3 shows a part of the constitution of the backlight unit of Example 3 of the first embodiment of the invention.

As in FIG. 3, the cold-cathode tubes 2, 4 are connected with an inverter power source 28 that powers them. When the switch 30 is turned on (on-switch), DC 12V is supplied to the inverter power source 28. In addition, when the switch 30 is turned on, the timer 26 is thereby driven. The timer 26 thus driven in the on-switch condition starts count-down, and the ribbon heater 24 is then switched on.

Figure 2:
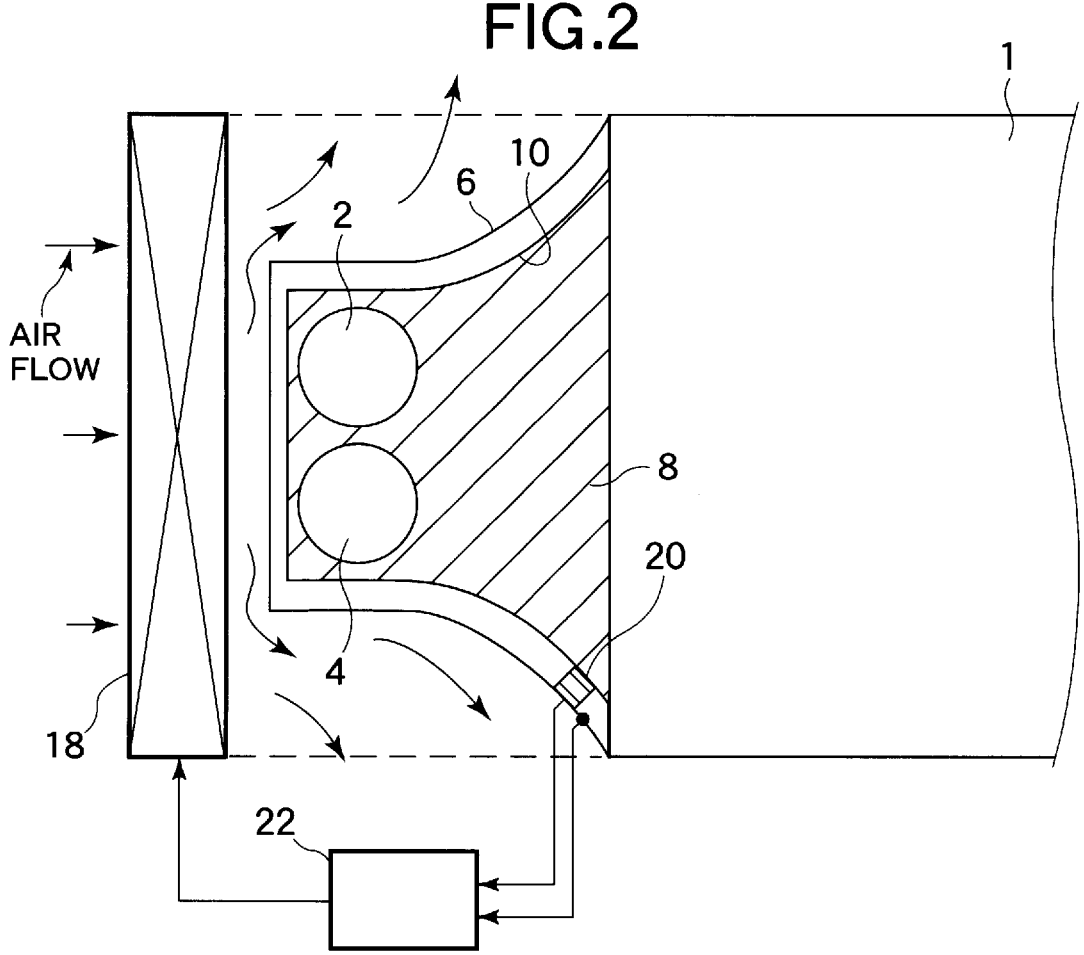
FIG. 2 shows a part of the constitution of the backlight unit of Example 2 of the first embodiment of the invention.

The ribbon heater 24 is disposed in contact with the transparent liquid 8 in the light source unit of FIG. 1A through FIG. 2, and after having been electrified, this generates heat to warm up the transparent liquid 8. The timer 26 controls the current supply to the ribbon heater 24 so that the ribbon heater 24 is switched off after a predetermined period of time, for example, after 10 minutes. With that, the light source unit can reach the thermal equilibrium condition as soon as possible, and its problem of low-luminance condition can be solved within a short period of time.

In the above-mentioned Examples, employed is the first method of making it possible to orient the emitted light so that the majority of the emitted light can be reflected on the light-emitting surface of the optical waveguide. In other words, the method employed in these examples comprises changing the angle of the emitted light in the previous stage before the light enters the optical waveguide so that the light is specifically oriented in the direction falling within the angle range that meets the optical waveguide condition. Being different from this, the second method is employed in the following Example 4, which is for reducing the degree of light emission from the region of the light-emitting surface of the optical waveguide nearer to the cold-cathode tubes.

An outline of the constitution of the backlight unit of this Example is described with reference to FIG. 4A to FIG. 4C. FIG. 4A is a view of the backlight unit of this Example seen on its emission side. FIG. 4B is a cross-sectional view of FIG. 4A cut along the line A—A. As illustrated, the backlight unit comprises an acrylic plate 1 (this serves as an optical waveguide) with a light-scattering pattern 114 formed on its back surface, and two cold-cathode tubes 2, 4 disposed nearly in parallel with each other on and along one side of the acrylic plate 1. A housing 6 having a reflector 10 (for this, an aluminum film is popularly used) on its inner surface is provided to surround the two cold-cathode tubes 2, 4, and its one side is opened to the optical waveguide 1 facing thereto.

Also on and along the other side of the optical waveguide 1 having the two cold-cathode tubes 2, 4 disposed on its one side, other two cold-cathode tubes 2, 4 are disposed nearly in parallel with each other, and a housing 6 having reflector 10 on its inner surface is provided to surround the two cold-cathode tubes 2, 4 with its one side being opened to the optical waveguide 1 facing thereto. The reflector 10 of the housing 6 in this Example is formed to have a rectangular cross-sectional profile, which is not convexedly curved and is different from that in Example 1. In this Example, the cold-cathode tubes 2,4 (these maybe the same as in Example 1) are so spaced from each other that the narrowest distance between them is 1 mm.

The open end of each housing 6 is sealed up with an acrylic sheet (not shown) by the use of a silicone sealant applied therebetween. The housings 6 are filled with a silicone-type transparent liquid 8, like in Example 1. The housings 6 are fixed to the optical waveguide with an optical adhesive 14 applied therebetween, with the acrylic sheet of each housing 6 facing the opposite sides of the optical waveguide 1.

The optical waveguide 1 is made of an acrylic plate having, for example, a size of 300 (mm)×400 (mm)×8 (mm) or so. Its surface seen on FIG. 4A is the light-emitting surface, and this is disposed adjacent to a liquid crystal panel. The light-scattering pattern 114 to be provided on the surface of the optical waveguide 1 opposite to the light-emitting surface thereof is formed by uniformly printing thereon dots of a white light-scattering substance having a diameter of 2 mm or so. The dot pattern acts to scatter the light that runs through the optical waveguide 1, and the thus-scattered light is emitted through the light-emitting surface of the optical waveguide 1.

On the light-emitting surface, provided are a plurality of reflective silver dots 32. The reflective dots 32 are provided so as to make the light that will directly pass through the light-emitting surface of the optical waveguide 1, which is not undergoing total reflection, go back into the optical waveguide 1. The ratio of the nude region not coated with the reflective dots 32 shall be determined in the manner mentioned below.

The angle distribution of the light that goes out through one point of the cold-cathode tubes 2, 4, is nearly constant. Therefore, the luminance on the light-emitting surface of the optical waveguide 1 is proportional to the perspective angle at which each of the cold-cathode tubes 2, 4 targets the unit area of the light-emitting surface. Accordingly, if the light-emitting surface undergoes no treatment, the luminance of its region nearer to the cold-cathode tubes will be extremely high. The perspective angle is represented by the following formula:

$$\delta/\delta l(\tan^{-1}((d/2)/l))=(d\times\tfrac{1}{2})/(1^2+d^2/4)$$

wherein d indicates the thickness of the optical waveguide 1; and l indicates the distance from the cold-cathode tubes 2, 4.

To correct the luminance distribution, the reflective dots 32 may be so provided that the ratio of the dot-free nude region is proportional to the reciprocal of the luminance distribution. Concretely, the pattern of the reflective dots 32 is so designed that the area of the region with no reflective dots 32 provided thereon is proportional to $(1^2+d^2/4)/(d\tfrac{1}{2})$.

The nude region distribution based on the reflective dots 32 formed in accordance with the above-mentioned formula may be as in FIG. 4C, in case where the thickness of the optical waveguide 1 is 8 mm and the length of the side not facing the cold-cathode tubes 2, 4 is 350 mm. In FIG. 4C, the horizontal axis indicates the ratio of the nude region (%); and the vertical axis indicates the distance from the lower end of the optical waveguide 1 shown in FIG. 4A. When the reflective dots 32 are so patterned that the ratio of the nude region in the center part of the light-emitting surface may be 65% or so and the ratio of the nude region at the both edges of the light-emitting surface may be 11% or so, as in FIG. 4C, then the luminance distribution of the so-designed optical waveguide may be unified as compared with the optical waveguide provided with only the light-scattering pattern 114, as in Table 2.

With the dot pattern of the reflective dots 32, the ratio of the nude region of the light-emitting surface of the optical waveguide 1 increases monotonously relative to the distance from the cold-cathode tubes 2, 4. Preferably, the ratio of the nude region around the center part of the optical waveguide 1 falls between 60 and 75% or so, and the ratio of the nude region around the ends thereof adjacent to the cold-cathode tubes 2, 4 falls between 10 and 20% or so.

TABLE 2

| | Luminance Distribution on Modified or Non-modified Optical Waveguide (unit: $Cd/m^2$) | |
|---|---|---|
| | Luminance (1 = 10 mm) | Luminance (in the center) part of optical waveguide; 1 = 150 mm) |
| Light-scattering pattern only | 4000 | 1200 |
| Reflective pattern added | 1800 | 1900 |

Example 5 of the First Embodiment

A modification of Example 4 is described. In the backlight unit shown in FIG. 4A through FIG. 4C, the light source unit is disposed adjacent to the both ends of the optical waveguide 1. In this, the distance between the two light source units, or that is, the length of the optical waveguide is represented by w; and the width of the open end of the housing 6 of each light source unit, or that is, the thickness of the optical waveguide 1 is represented by d.

In this, w and d are so controlled that they satisfy the requirement of 20×d<w<45×d.

This defines the relation between the length of the optical path of the optical waveguide 1 sandwiched between the two light source units and the width of the light-emitting surface thereof. The reason why the distance w between the two light source units must be larger than 20×d is for unifying as much as possible the angle characteristics of the emitted light. If the distance w is not larger than 20×d, the frequency of light reflection inside the optical waveguide 1 before the light having entered the optical waveguide 1 goes outside it decreases, whereby the optical path through the optical waveguide 1 will be locally shifted.

On the other hand, the reason why the distance w must be smaller than 45×d is for reducing as much as possible the energy loss owing to the light absorption by the light-scattering pattern 114 or the like provided on the light-emitting surface S' (this may be referred to as the back surface) of the optical waveguide 1. One reflection on the light-scattering pattern 114 or the like involves light absorption of at least 2%. Therefore, the optical waveguide 1 is so designed relative to the light source units combined with it that the energy loss owing to the light absorption in the optical path from one end to the other end of the optical waveguide 1 is at most about 25%. When the distance w is equal to 45×d, the frequency of light reflection inside the optical waveguide 1 from its one end to the other end may be 13 times on average. The energy E to be lost in 13 reflections is $E=(1-(0.98)^{13})=0.23$, and the energy loss can be lower than the set point.

Example 6 of the First Embodiment

An outline of the constitution of the backlight unit of this Example is described with reference to FIG. 5. FIG. 5 is a partly-cut cross-sectional view of a backlight unit seen in the same direction as that for FIG. 4B. In FIG. 5, the same structural members as those in FIGS. 4A through 4C are designated by the same numeral references, and their description is omitted herein.

The light that reaches the side surface of the optical waveguide 1 at a small incident angle thereto is one that has passed through the region near to the reflective surface of the reflector 10 adjacent to the light-emitting surface S (S') of the optical waveguide 1 and near to the cold-cathode tubes 2, 4. By the use of an optical path-changing device 34, the light passing through this region is refracted by about 10° toward the optical waveguide 1 so as to reduce the incident angle of the thus-refracted light to the optical waveguide 1, thereby improving the light emission distribution in the optical waveguide 1. For the optical path-changing device 34, usable is a hollow prism of acrylic resin. The optical path-changing device 34 may be disposed in the transparent liquid 8 at the position at which a part of the light emitted by the cold-cathode tubes 2, 4 will vertically reach the reflective surface of the reflector 10 that is on the extended line from the light-emitting surface S (S') of the optical waveguide 1.

In the Examples mentioned above, a liquid is filled in the space between the cold-cathode tubes 2, 4 and the reflector 10. The substance to be filled therein may also be putty, adhesive or the like. Needless-to-say, a majority of the space between the cold-cathode tubes 2, 4 and the reflector 10 may be filled with a transparent solid such as an acrylic plate or the like, and the space still remaining between the cold-cathode tubes 2, 4 and the acrylic plate may be filled up with an optical oil (or an optical adhesive). In short, the filling substance shall satisfy the two requirements that "it is transparent" and "its refractive index is nearly the same as that of the glass to form the cold-cathode tubes and that of the optical waveguide".

Figure 6:
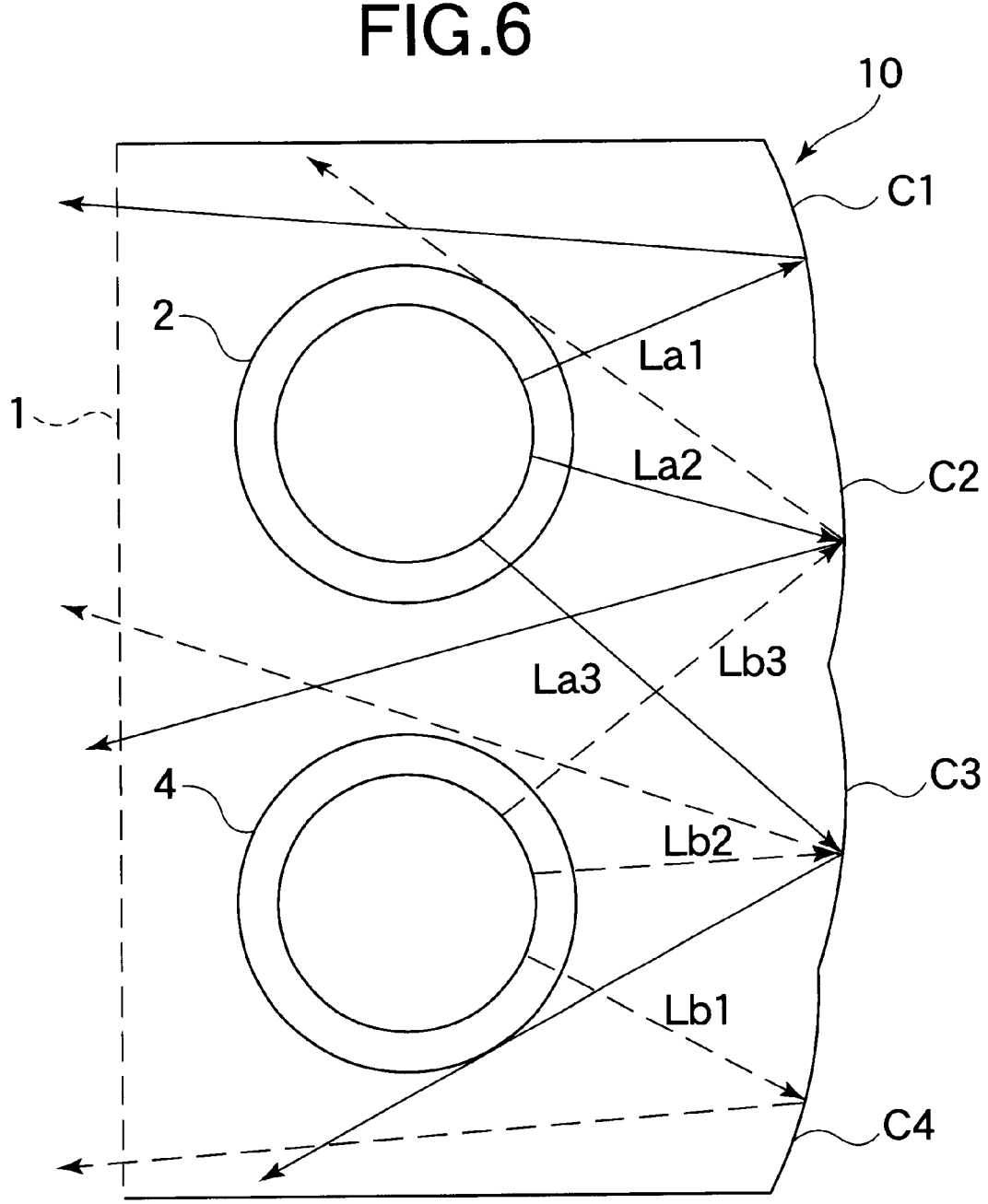
FIG. 6 shows an outline of the constitution of the backlight unit of Example 1 of the second embodiment of the invention.
Figure 7:
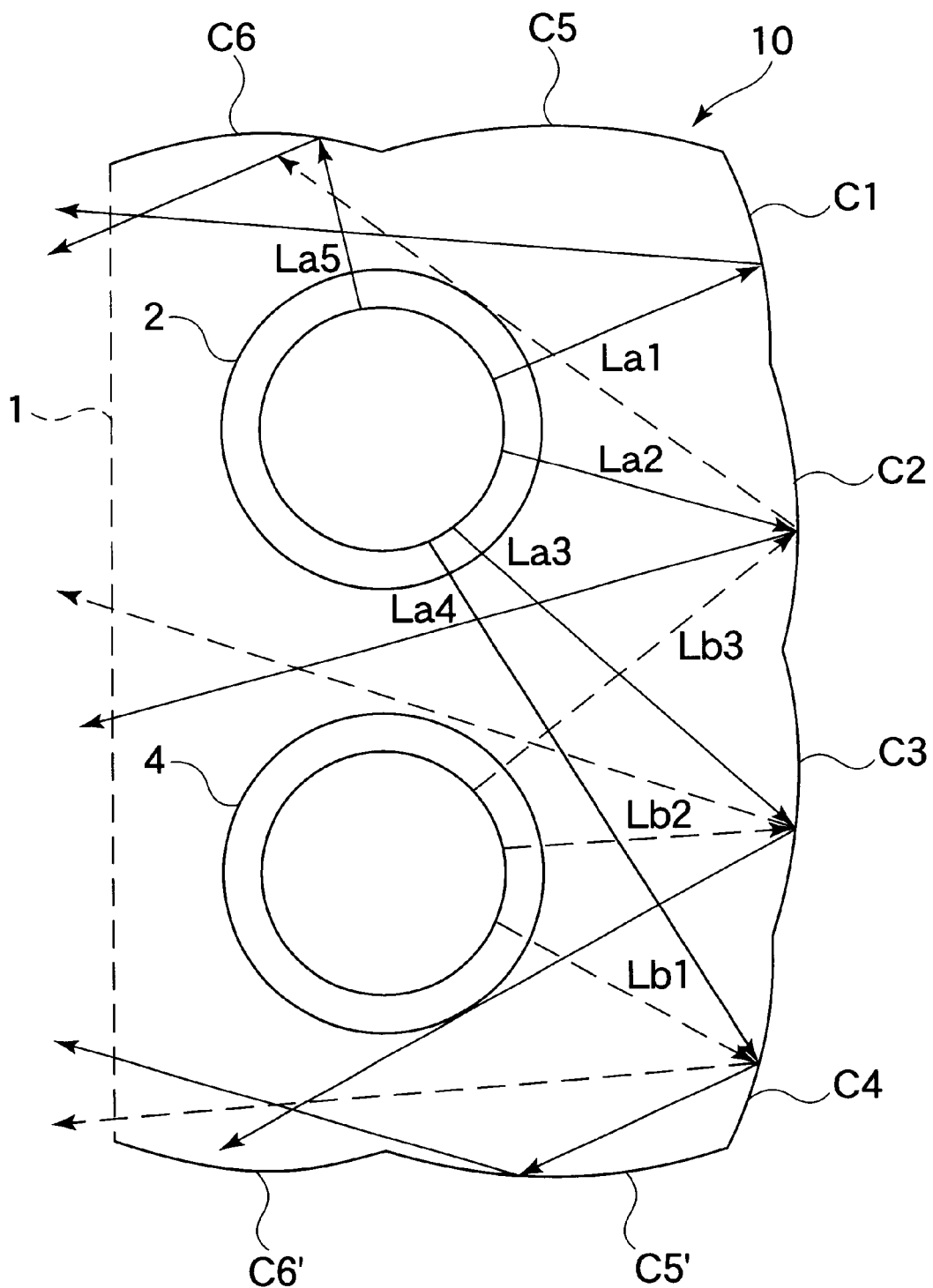
FIG. 7 shows an outline of the constitution of the backlight unit of Example 2 of the second embodiment of the invention.
Figure 8:
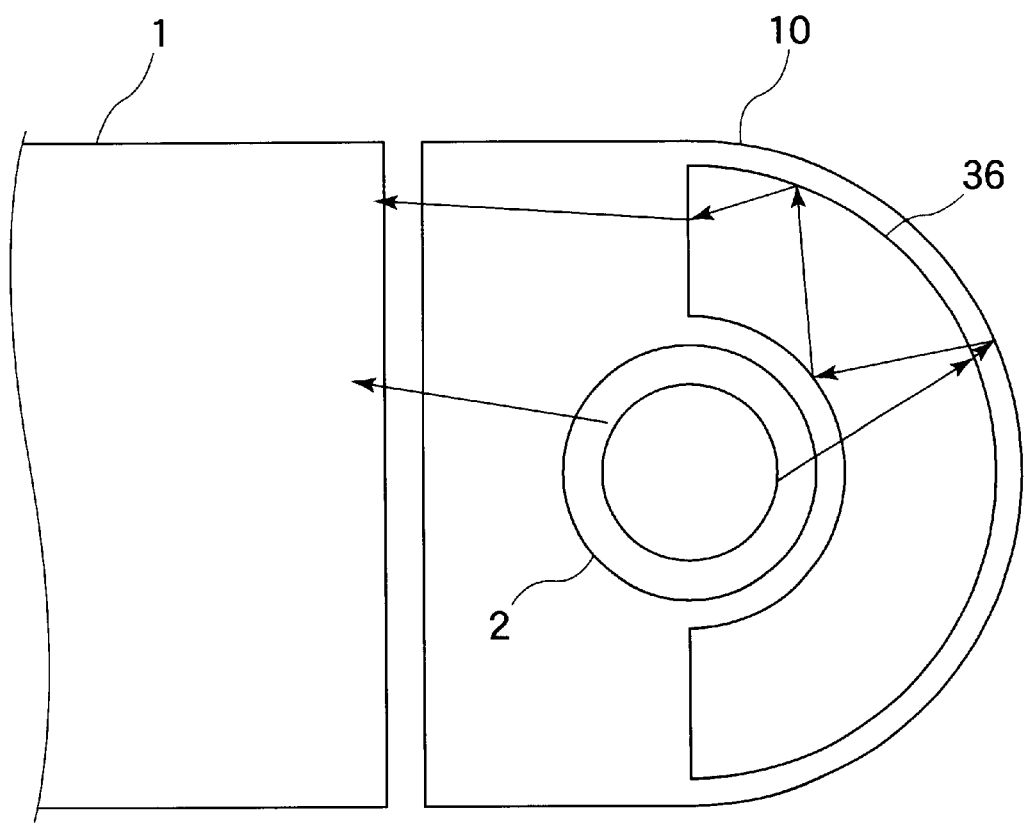
FIG. 8 shows an outline of the constitution of the backlight unit of Example 3 of the second embodiment of the invention.

Next described is the backlight unit for liquid crystal displays and others of the second embodiment of the invention with reference to FIG. 6 through FIG. 8. This embodiment is to provide a sidelight-type backlight unit in which the light from the cold-cathode tubes can be efficiently reflected toward the optical waveguide.

The backlight unit of this embodiment is characterized in that the reflective surface of the reflector which is disposed opposite to the optical waveguide relative to the cold-cathode tubes and which reflects the light having been emitted toward it from the cold-cathode tubes is so specifically designed that a majority of the light reflected thereon can run toward the space between the cold-cathode tubes adjacent to each other or toward the space between the cold-cathode tubes and the reflector.

Figure 42:
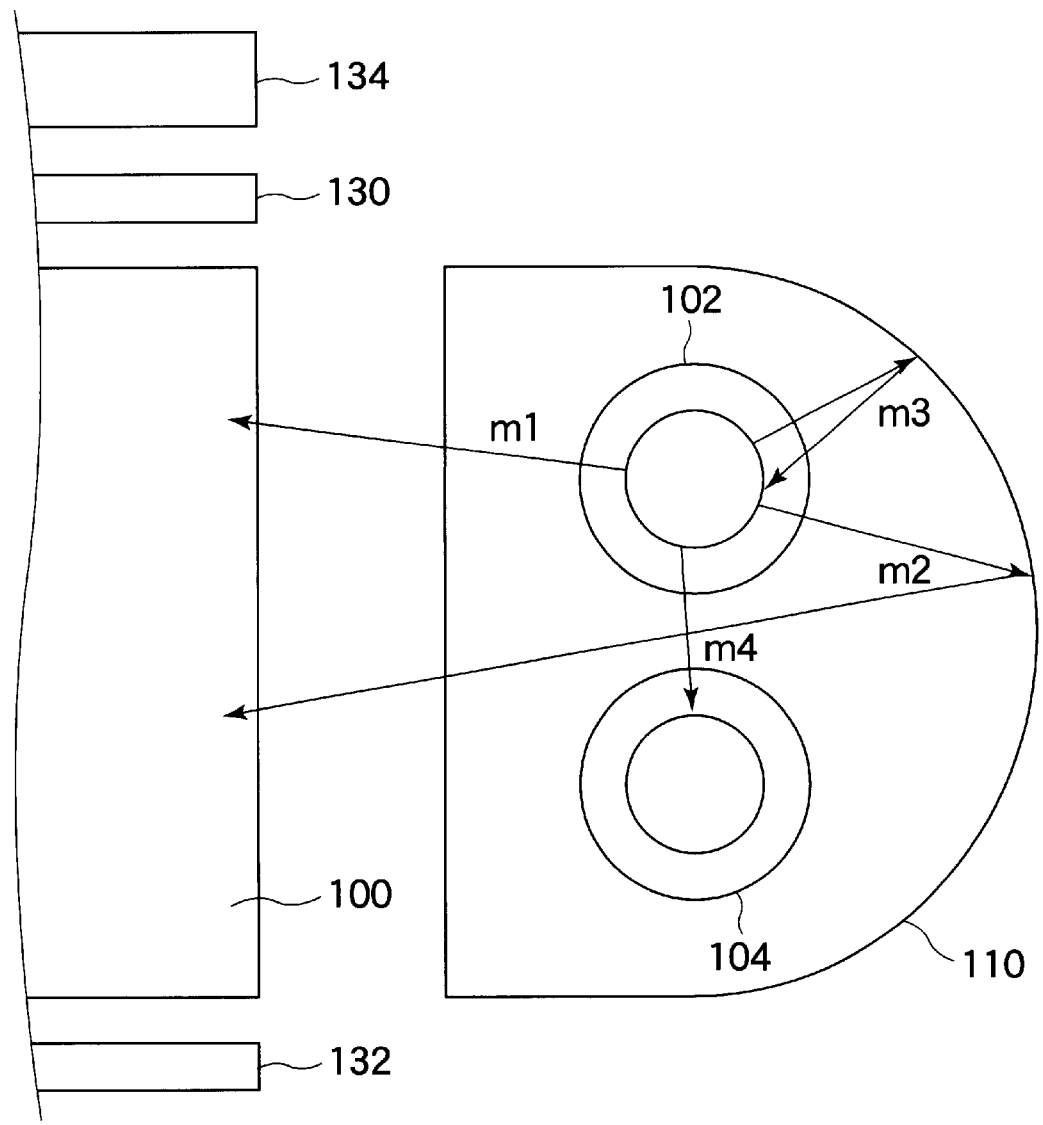
FIG. 42 is to explain the problem with the conventional backlight unit.

In this embodiment, the light emitted by the cold-cathode tubes toward the reflector is, after having been reflected by the reflector, prevented from re-entering the cold-cathode tubes but passes through the space between the cold-cathode tubes adjacent to each other or through the space between the cold-cathode tubes and the reflector to safely reach the optical waveguide, being different from the rays m3, m4 as in FIG. 42 showing a conventional example. Therefore, the backlight unit of this embodiment is free from light scattering and absorption owing to the re-entrance of the reflected light into the cold-cathode tubes and from multiple reflection in the cold-cathode tubes and also in their glass tubes, and, as a result, the emitted light from the cold-cathode tubes can be efficiently led into the optical waveguide to thereby increase the luminance of the backlight unit.

The backlight unit of this embodiment is described with reference to its concrete examples.

Example 1 of the Second Embodiment

An outline of the constitution of the backlight unit of this Example is described with reference to FIG. 6. FIG. 6 is a cross-sectional view seen in the same direction as that for FIG. 42. In this, however, only the region around the light source unit is shown. As in FIG. 6, the cold-cathode tubes 2, 4 are surrounded by the reflector 10 of which the inner surface is a reflective surface. Adjacent to the open end of the reflector 10, positioned is one end of the optical waveguide 1. Though not shown in FIG. 6, the same light source unit as that illustrated herein is also provided adjacent to the opposite end of the optical waveguide. The diameter of each cold-cathode tube 2, 4 is 2.6 mm; and the thickness of the optical waveguide 1 is 8 mm. The height of the open end of the reflector is 8.1 mm; and the end of the optical waveguide 1 is disposed to overlap with the open end of the reflector by 0.1 mm or so.

The cold-cathode tubes 2, 4 are disposed almost in the center between the reflector 10 and the end of the optical waveguide 1. More concretely, the cold-cathode tube 4 is so disposed that its center axis is spaced from the bottom of the reflector 10 by a height of 2.3 mm and from the open end of the reflector 10 by 2.2 mm; and the cold-cathode tube 2 is so positioned that its center is spaced from the open end of the reflector 10 to the same level as that of the cold-cathode tube 4 spaced from it, and is spaced by 3.6 mm from the center of the cold-cathode tube 4 directly above it. The cold-cathode tubes 2, 4 are disposed in parallel with each other along the end of the optical waveguide 1. The distance between the cold-cathode tube 2 and the cold-cathode tube 4 is 1 mm.

The back side of the reflector 10 that is opposite to the open end thereof connected with the end of the optical waveguide 1 is modified to have concaved curve segments C1, C2, C3, C4 seen from inside the reflector 10. Concretely, as in FIG. 6, the back side of the reflector 10 is worked to form a curve segment C1 (radius R=3.2 mm) and a curve segment C2 (radius R=4.0 mm) each having a curvature center, at predetermined positions along the direction from the upper side to the lower side of the reflector 10. The curve segment C3 is formed nearly in the center between the upper and lower sides of the reflector 10, symmetrically to the curve segment C2 relative to a virtual straight line drawn in parallel with the upper and lower sides of the reflector 10; and the curve segment C4 is formed similarly to the curve segment C3 but symmetrically to the curve segment C1.

In the optical source unit constructed in the manner as above, the essential ray La1 of the light emitted by the cold-cathode tube 2 in the radial direction of the cold-cathode tubes 2, 4 reaches the curve segment C1 and is reflected thereon to run back through the space between the cold-cathode tube 2 and the upper wall surface of the reflector 10. In this, the essential ray La2 of the light emitted by the cold-cathode tube 2 reaches the curve segment C2 and is reflected thereon to run back through the space between the cold-cathode tube 2 and the cold-cathode tube 4; and the essential ray La3 of the light emitted by the cold-cathode tube 2 reaches the curve segment C3 and is reflected thereon to run back through the space between the cold-cathode tube 4 and the lower wall surface of the reflector 10.

Similarly, the essential ray Lb1 of the light emitted by the cold-cathode tube 4 reaches the curve segment C4 and is reflected thereon to run back through the space between the cold-cathode tube 4 and the lower wall surface of the reflector 10; the essential ray Lb2 of the light emitted by the cold-cathode tube 4 reaches the curve segment C3 and is reflected thereon to run back through the space between the cold-cathode tube 2 and the cold-cathode tube 4; and the essential ray Lb3 of the light emitted by the cold-cathode tube 4 reaches the curve segment C2 and is reflected thereon to run back through the space between the cold-cathode tube 2 and the upper wall surface of the reflector 10.

Of the emitted light running toward the back side of the reflector 10 from the cold-cathode tubes 2, 4 in this Example, the rays toward the curve segments C1, C2, C3 from the cold-cathode tube 2 and those toward the curve segments C2, C3, C4 from the cold-cathode tube 4 can be all led into the optical waveguide 1, not going back into the cold-cathode tube 2 or 4.

Accordingly, since the light scattering and absorption to be caused by the re-entrance of the reflected light into the cold-cathode tubes 2, 4, as well as the multiple reflection in the cold-cathode tubes and also in their glass tubes can be minimized in the backlight unit of this embodiment, the emitted light from the cold-cathode tubes 2, 4 can be efficiently led into the optical waveguide therein to thereby increase the luminance of the backlight unit.

Example 2 of the Second Embodiment

An outline of the constitution of the backlight unit of this Example is described with reference to FIG. 7. Like in FIG. 6, the region around the light source unit to be in the backlight unit is shown in FIG. 7. In the light source unit shown in FIG. 7, the upper side of the reflector 10 is worked to have concaved curve segments C6, C5 in that order seen from inside the reflector 10, in the direction toward the back side of the reflector 10 from the end of the optical waveguide 1. Concretely, the curve segment C6 is formed at a predetermined position, having a curvature center and having a radius R=3.21 mm; and the curve segment C5 is formed also at a predetermined position, having a curvature center and having a radius R=4.46 mm.

In this, the lower side of the reflector 10 is worked to have concaved curve segments C6', C5' in that order seen from inside the reflector 10, in the direction toward the back side of the reflector 10 from the end of the optical waveguide 1. The curve segments C6', C5' are symmetric to the curve segments C6, C5, respectively, relative to a virtual straight line drawn in parallel with the upper and lower sides of the reflector 10 nearly in the center between the upper and lower sides thereof.

Except for its specific structure as above, the light source unit in this Example is the same as that in Example 1 shown in FIG. 6. As the light source unit is so constructed as herein, the light having reached the back side surface of the reflector 10 behaves like that in Example 1. In addition to this, the essential ray La4 of the light emitted by the cold-cathode tube 2 reaches the curve segment C4 and is reflected thereon to reach the curve segment C5'. Then, this is reflected on the curve segment C5' to run through the space between the cold-cathode tube 4 and the lower wall surface of the reflector 10. The essential ray La5 of the light emitted by the cold-cathode tube 2 reaches the curve segment C6 and is reflected thereon toward the optical waveguide 1. The same shall apply to the lower side surface of the reflector 10.

Since the light source unit in this Example is specifically constructed as above, not only the light analyzed and discussed in Example 1 but also the light running toward the upper and lower side surfaces of the reflector 10 therein can be all efficiently led to the optical waveguide 1. This Example realizes a backlight unit of higher efficiency than in Example 1.

Example 3 of the Second Embodiment

An outline of the constitution of the backlight unit of this Example is described with reference to FIG. 8. Like in FIG. 6, the region around the light source unit to be in the backlight unit is shown in FIG. 8. The light source unit shown in FIG. 8 comprises one cold-cathode tube 2 and a reflector 10, and is characterized in that a second optical waveguide 36 is disposed between the cold-cathode tube 2 and the reflector 10.

A space is formed between the cold-cathode tube 2 and the second optical waveguide 36 and between the second optical waveguide 36 and the reflector 10, and an air layer is formed in this space. The second optical waveguide 36 is made of a transparent resin including polycarbonates, acrylic resins, etc., or is made of glass, and its refractive index is around 1.5. Almost all the light emitted by the cold-cathode tube 2 toward the back side of the reflector 10 enters the second optical waveguide 36, after having passed through the air layer (refractive index n=1). Having thus entered, the light passes through the second optical waveguide 36 and reaches its interface on the back side of the reflector 10.

On or through the interface of the second optical waveguide 36 on the back side of the reflector 10, the light is reflected or refracted, and a majority of the reflected light runs back through the second optical waveguide 36. The refracted light reaches the back side surface of the reflector 10 and is reflected thereon to run back toward the second optical waveguide 36, and reaches it. The light running through the end of the second optical waveguide 36 that faces the end of the first optical waveguide 1 enters the first optical waveguide through its end.

In the light source unit having the specific constitution as above, the component of the light having entered the second optical waveguide 36 but running back into the cold-cathode tube 2 can be reduced. Accordingly, the light source unit is free from the problem of light scattering and absorption to be caused by the re-entrance of the reflected light into the cold-cathode tube 2, and from the problem of multiple reflection in the cold-cathode tube 2 and also in its glass tube; and the emitted light from the cold-cathode tube 2 can be efficiently led into the optical waveguide 1. With that, it is possible to increase the luminance of the backlight unit of this Example.

Example 4 of the Second Embodiment

This Example is a modification of Example 3 and is characterized in that the profile of the second optical waveguide 36 adjacent to the cold-cathode tube is modified to be analogous to the outer profile of the cold-cathode tube. In the thus-modified structure, the emitted light from the cold-cathode tube 2 enters the second optical waveguide 36 nearly vertically thereto, and its surface reflection is therefore minimized. Accordingly, the quantity of the light to enter the second optical waveguide 36 increases, and the light emission efficiency of the light source unit is higher than that in Example 3. With that, it is possible to further increase the luminance of the backlight unit of this Example.

Example 5 of the Second Embodiment

This Example is another modification of Example 3. In this, the profile of the second optical waveguide 36 adjacent to the reflector is so modified that the interface between the second optical waveguide 36 and the neighboring air layer ensures total light reflection thereon. That is, the interface between the second optical waveguide 36 (its refractive index is about 1.5) and the neighboring air layer (its refractive index is 1) enjoys total light reflection thereon when the incident angle thereto is at least 45°. Accordingly, not only the reflector 10 may be omitted in this unit but also 100% reflection can be realized therein even with the reflector 10 having a reflectance of 95% or so. Owing to such high reflection, the light emission efficiency of this unit can be increased.

To the same effect as above, a reflective film may be formed on the surface of the second optical waveguide 36 that faces the reflector 10, and the same result as herein is expected.

According to this embodiment of the invention described hereinabove, the light having been emitted by cold-cathode tubes toward a reflector can be led into an optical waveguide via the space between the cold-cathode tubes and the reflector and via the space between the cold-cathode tubes adjacent to each other. Accordingly, the light emitted by the cold-cathode tubes can be efficiently led into the optical waveguide, high-luminance backlight units can be realized.

Next described is the backlight unit for liquid crystal displays and others of the third embodiment of the invention with reference to FIG. 9 through FIG. 21. This embodiment is to provide a backlight unit enough for practical use even though the light emission efficiency of the cold-cathode tubes therein is low. For this, we, the present inventors have first analyzed the visible ray efficiency from optical viewpoints. As a result, we have found that, in the cold-cathode tubes described hereinabove for the prior art technique with reference to FIG. 43, about 30 to 50% of all the visible light emitted by the phosphor 138 enters the glass tube 136, and the quantity of light that runs outside the glass tube 136 is extremely small, only about 5 to 20% of all.

Specifically, we have found that the light having been reflected on the outer surface of the glass tube 136 (refractive index: 1.5 or so) to go back to the discharge region is almost entirely absorbed by mercury, mercury gas and the phosphor existing therein or by the metal around the electrodes therein, and this is one reason for light loss.

In addition, we have further found that the light having once gone outside the glass tube 136 is, when reflected by the reflector 110 or the like to go back to the outer surface of the glass tube 136, refracted to surely reach the phosphor 138 coated on the inner surface of the glass tube 136, and therefore nearly a half of the light is absorbed by the phosphor 138 to cause light loss, and that the reflected light is almost completely scattered to further increase the light loss.

It is not realistic to reduce the size of the cold-cathode tubes themselves so as to prevent them from interfering with the light that has been reflected by the reflector 110 or the like to again pass around the glass tube 136. The reason is because tubes having a smaller diameter are heated more to have a higher temperature and the mercury vapor concentration therein becomes higher, and therefore the increase in the UV rays to be absorbed becomes larger than the increase in the UV rays to be generated by mercury therein. As a result, with the decrease in the UV rays to be radiated to the phosphor, the amount of the visible light emission decreases, and the light source unit including the reflector becomes dark as a whole.

To reduce the loss as above and to increase the light utilization efficiency, a transparent liquid, amorphous or solid substance, or that is, such a transparent substance of which the refractive index is near to that of the glass tube is filled in the space around the glass tube to thereby optically seal up the outer surface of the glass tube with that substance. In addition, the transparent liquid to be filled in that space is utilized as a coolant liquid, and the diameter (both the inner diameter and the outer diameter) of the cold-cathode tubes is much reduced without reducing the quantity of heat to be generated by the cold-cathode tubes. In this constitution, there occurs no or little total reflection in the interface between the glass tube (its refractive index is nearly 1.5) and the neighboring air space (its refractive index is 1), and the constitution ensures the increase in light emission efficiency of 30 to 50%.

The light having been reflected by the reflector or the like is, even though having reached the outer surface of the glass tube, goes straight or nearly straight ahead so far as it does not reach the inner surface of the glass tube, and can be taken out as the effective light. In this connection, for the diameter of cold-cathode tubes that interfere with light passage, the outer diameter thereof must be taken into consideration in the prior art techniques. However, in this embodiment of the invention, the inner diameter of cold-cathode tubes that is smaller than the outer diameter thereof may be taken into consideration for it. Therefore, the cold-cathode tubes to be used in this embodiment of the invention may be substantially thinner. One example of ordinary cold-cathode tubes has an outer diameter of 2.6 mm and an inner diameter of 2.0 mm.

In case where two such ordinary cold-cathode tubes are aligned inside a rectangularly U-shaped reflector having a height of 6 mm, the light having been reflected on the back side of the reflector to run toward the end of the optical waveguide disposed in front of the reflector must pass through the space between the two cold-cathode tubes and through the space between the ceiling surface or the bottom surface of the reflector and the cold-cathode tube neighboring to the reflector, concretely through the overall space of only 0.8 mm, in order that it could be effective light. As opposed to this, however, in this embodiment of the invention, the inner diameter of the cold-cathode tubes may be taken into consideration for the diameter thereof. In this, therefore, the space for light passage is substantially 2.8 mm, and the light utilization efficiency of this embodiment is greatly increased.

In case where the space of the same level as in the example mentioned above is kept as it is, the overall thickness of the light source unit can be reduced by the wall thickness of the glass tubes of the two cold-cathode tubes, or that is, by 1.2 mm. Therefore, according to this embodiment of the invention, the overall thickness, 8 mm, of the conventional light source unit can be reduced to 6.8 mm.

In addition, the diameter of the cold-cathode tubes in this embodiment of the invention can be reduced as they enjoy the coolant effect imparted thereto. Therefore, the effective light emission from the light source unit that includes a reflector can be increased. Accordingly, this embodiment of the invention realizes thinner light source units not detracting from the brightness of the units.

The backlight unit of this embodiment is described hereinunder with reference to its concrete examples.

Example 1 of the Third Embodiment

Figure 9:
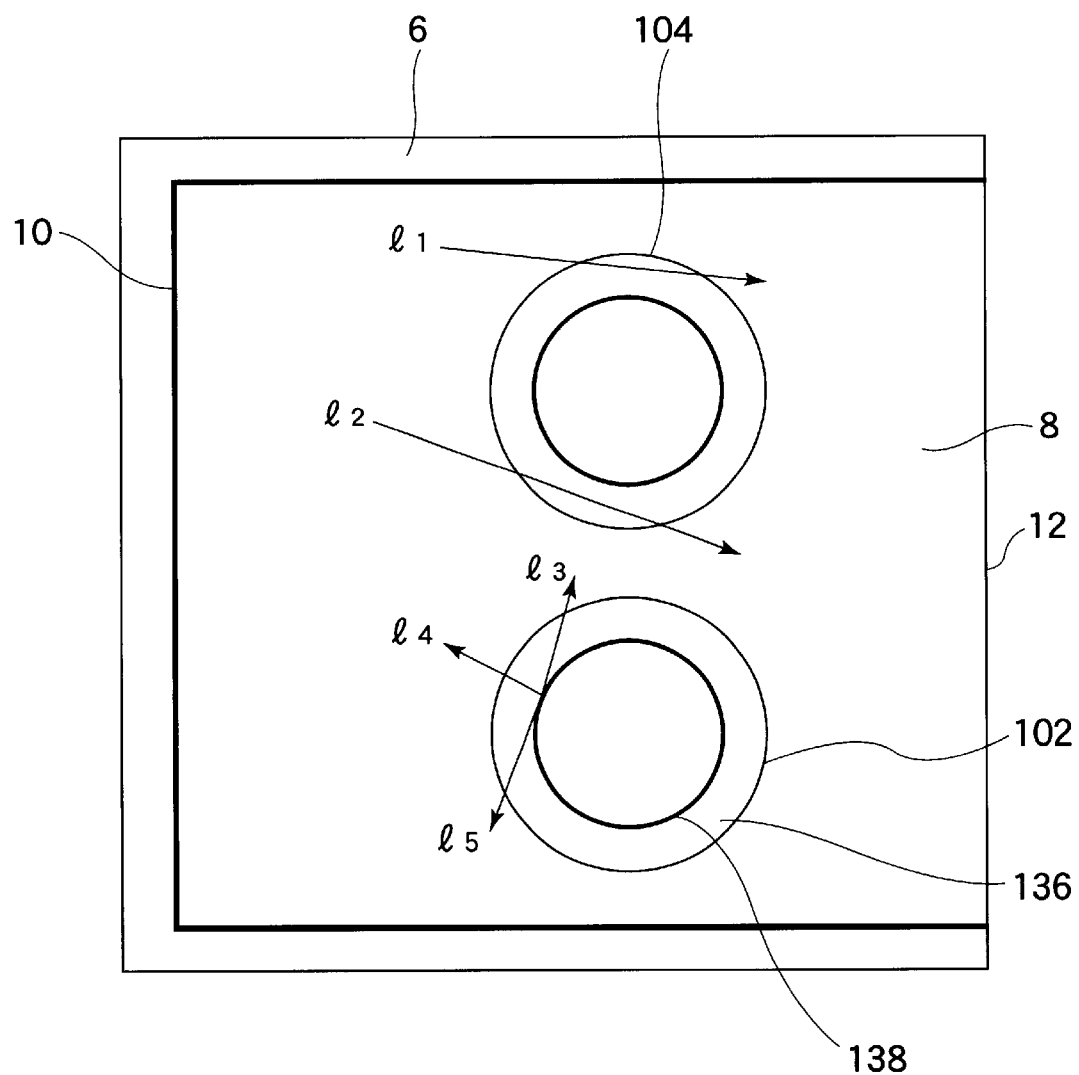
FIG. 9 shows an outline of the constitution of the backlight unit of Example 1 of the third embodiment of the invention.

An outline of the constitution of the backlight unit of this Example is described with reference to FIG. 9. FIG. 9 is a cross-sectional view of a light source unit of a sidelight-type backlight unit, cut in the light emission direction. In the light source unit of FIG. 9, cold-cathode tubes 102, 104 both having a conventional basic structure are disposed in a metallic housing 6, and the housing 6 is filled with a transparent liquid 8. The open end of the housing 6 is sealed up, for example, with an acrylic sheet 12. The inner surface of the housing 6 is coated with a reflector 10.

In this Example, used is the metallic housing 6. Needless-to-say, the housing 6 may also be made of transparent glass, plastics, etc. The quantity of light emission from one cold-cathode tube 102 is small, falling between a few W and 10 W or so. In addition, since the cold-cathode tube 102 is long and thin, its heat radiation area can be broad. Therefore, the member temperature can be lowered, concretely, 60° C. or lower.

For the transparent liquid 8, usable is any of water (refractive index: 1.333), ethylene glycol (refractive index: 1.4318), glycerin (refractive index: 1.473), silicone oil such as phenyl-type silicone oil (refractive index: 1.403), silicone gel (refractive index: 1.405), siloxane-type liquid, a mixture of glycerin 30% and ethylene glycol 70% (refractive index: 1.443), a mixture of water and ethylene glycol, mixtures of these liquids, etc.

Also usable are fluorine-type inert liquids and the like, for example, insulating liquids such as Sumitomo 3M's perfluforocarbon liquids, etc. Since image formation is not intended in the invention, the refractive index distribution, if any, in the liquid owing to its temperature distribution involves few problems. All optical oils (matching oils), coolant oils, and other all transparent liquids are usable herein. Needless-to-say, sol-gel substances and others that can be filled in empty spaces are all usable herein.

The cold-cathode tubes 102, 104 are prepared by coating the inner surface of glass tubes having an outer diameter of 2.6 mm and an inner diameter of 2.0 mm with a phosphor. The glass tubes are made of borosilicate glass. Any other hard or semi-hard glass such as silicon glass or the like is also usable for them. For the phosphor, usable is any three-band phosphor prepared, for example, by mixing $(SrCaBa)_5 (PO_4)_3CL$: Eu, $LaPO_4$:Ce,Tb, $Y_2O_3$: Eu and the like in a predetermined ratio. The glass tubes includes electrodes along with mercury, Ar and Ne.

For the reflector 10, used is a high-reflectance film (mirror film). Also usable are inorganic members of aluminum or the like, as well as interference reflectors such as multi-layered dielectric films, etc. In case where the reflective surface of the reflector varies with time as it interacts with the liquid kept in contact with it, for example, when the reflective surface thereof reacts with or dissolves in the liquid, it may be coated with a hard coat of silicon oxide or the like for protecting it. As the case may be, a reflective layer may be formed around the outer surface of a glass container to be the reflector for use herein.

The reflector 10 in this Example is formed to have a nearly rectangularly U-shaped profile that follows the outer profile of the housing 6, and the height of its open end is 6 mm and 8 mm for different two types. In one type of the reflector 10 of which the height of the open end is 6 mm, the space through which the light having been reflected on the back side surface of the reflector 10 behind the cold-cathode tubes 102, 104 to run toward the open end of the reflector 10 corresponds to the total of the space between the cold-cathode tube 102 and the cold-cathode tube 104 and the space between the cold-cathode tube 102 or 104 and the reflector 10, and this is 2.0 mm in this Example, but the space in the conventional structure (for example, as in FIG. 42) is 0.8 mm or so in total.

In the other type of the reflector 10 of which the height of the open end is 8 mm, the total of the space between the cold-cathode tube 102 and the cold-cathode tube 104 and the space between the cold-cathode tube 102 or 104 and the reflector 10 is 4.0 mm in this Example, but is 2.8 mm in the conventional structure (for example, as in FIG. 42).

Figure 38:
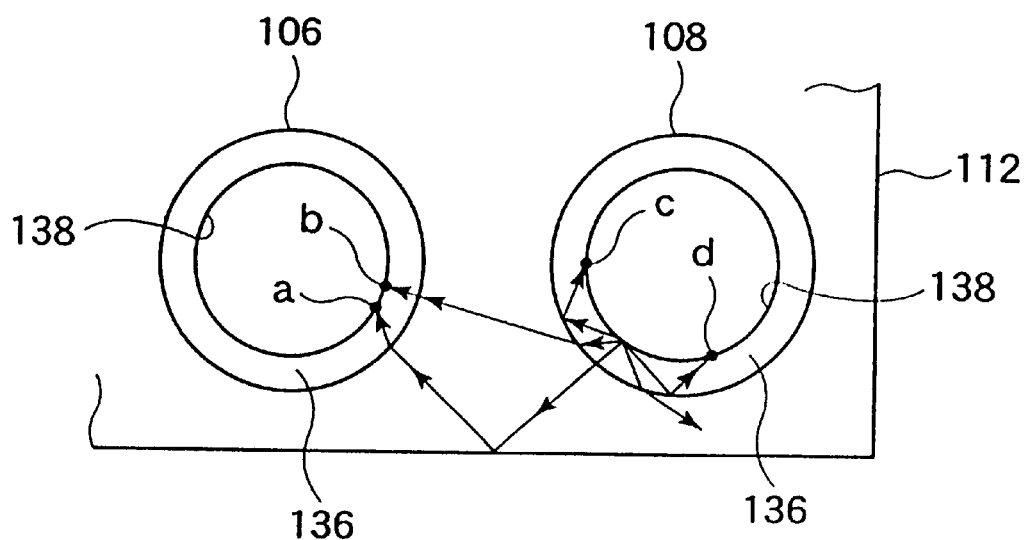
FIG. 38 is to explain the problem with the conventional backlight unit.
Figure 39:
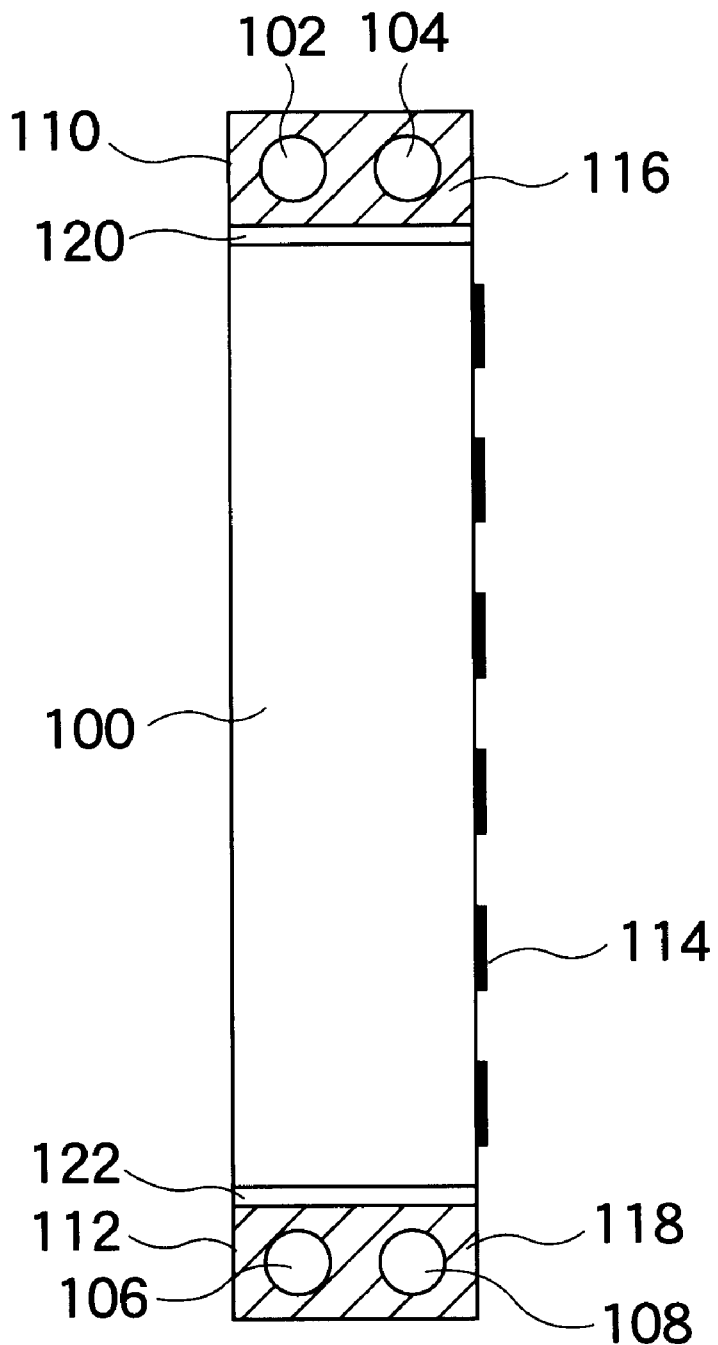
FIG. 39 shows an outline of the constitution of a conventional backlight unit.
Figure 40:
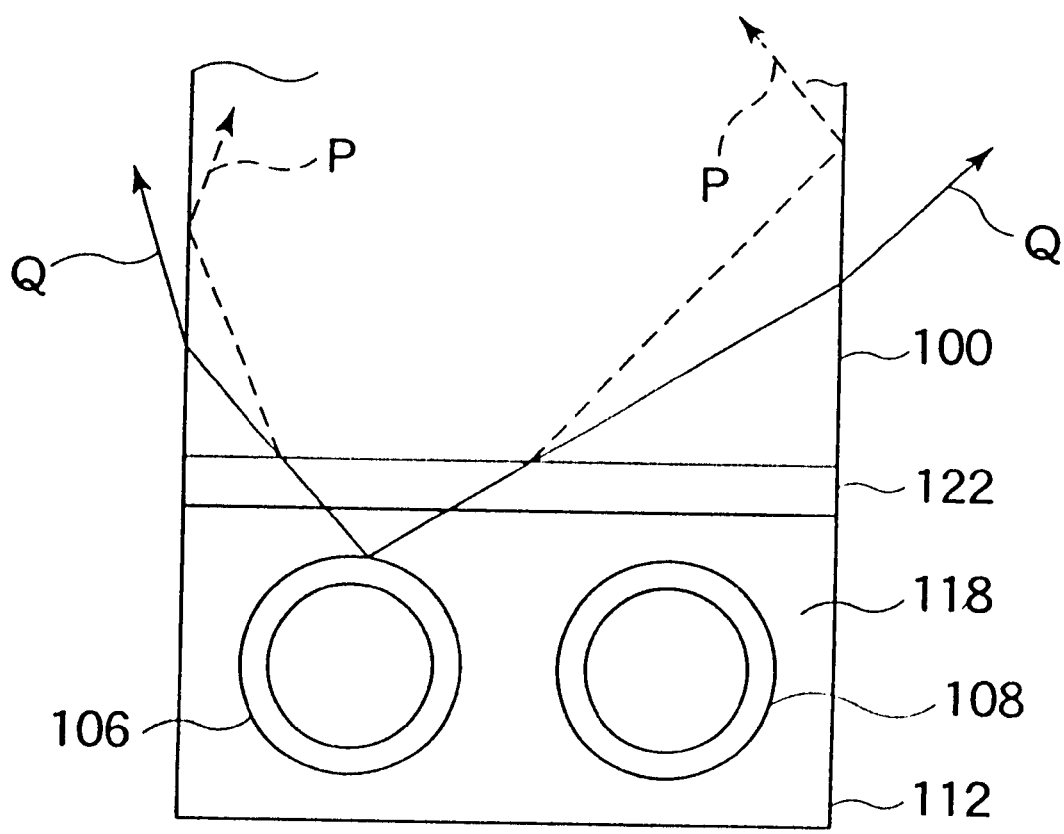
FIG. 40 is to explain the problem with the conventional backlight unit.
Figure 41:
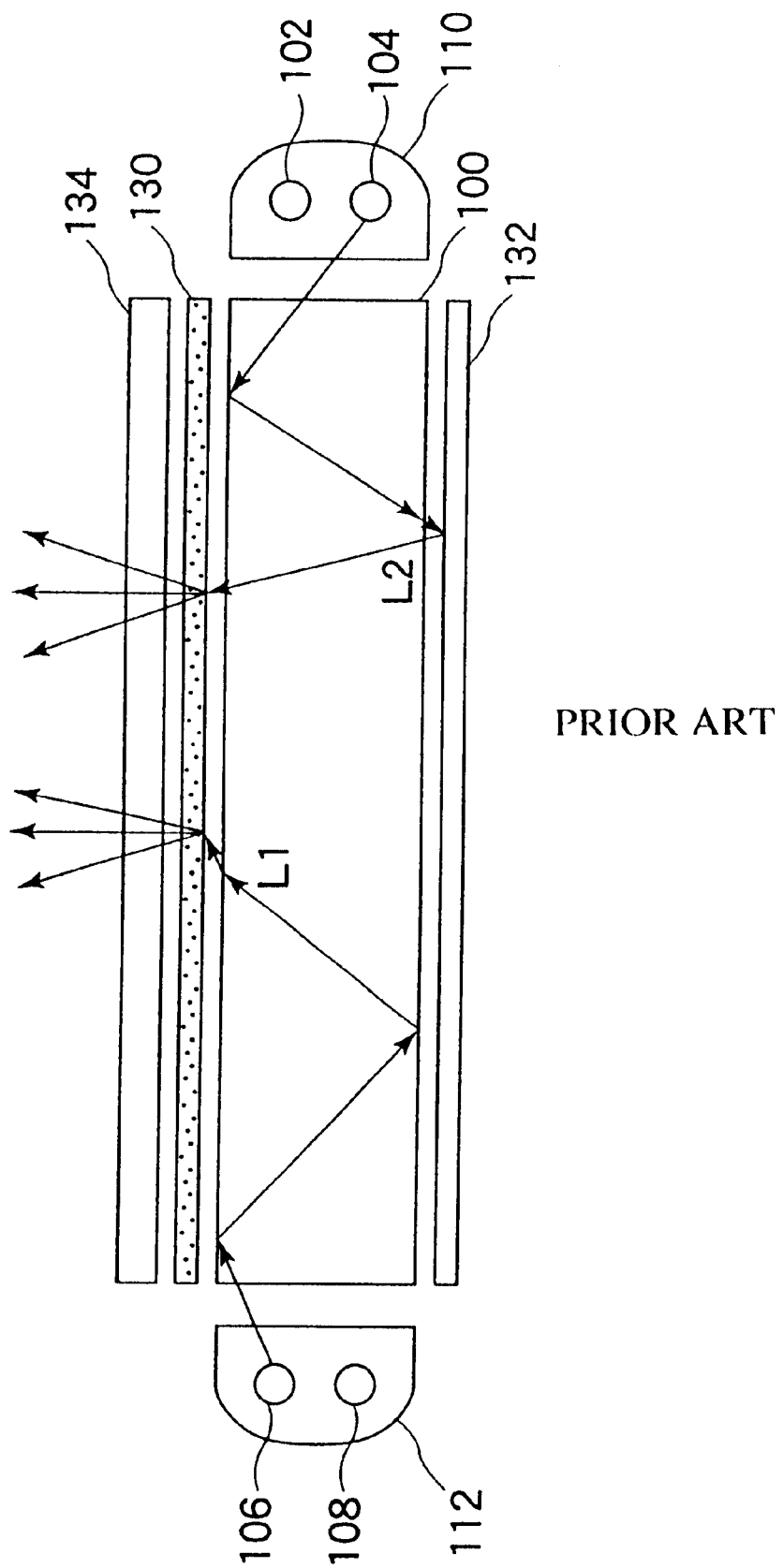
FIG. 41 shows an outline of the constitution of a conventional backlight unit.

As in FIG. 38, the light having been brought into contact with the cold-cathode tube 106 (108) is almost all reflected thereon to run toward the opposite cold-cathode tube 108 (106), or will pass through the glass tube 136 to reach the phosphor 138, and nearly a half of it is absorbed by the phosphor 138 or mercury in the glass tube 136 while the remaining half thereof is, after having been scattered, almost completely absorbed by the phosphor 138, etc., and disappears. As opposed to this, in this Example, the rays 11, 12, 13, 14, 15 all go straight ahead, not being refracted or reflected, as if the glass tube 136 would not be present therein, as in FIG. 9. Accordingly, these rays can go out directly through the open end of the reflector.

In addition, since the light from the phosphor 138 and the light scattered thereon are reflected on the outer surface of the glass tube (its refractive index is nearly 1.5, and the total reflection angle thereto is around 42 degrees) in the conventional structure (see FIG. 38), only about 20% of the light starting from the phosphor 138 could be go outside the glass tube. As opposed to this, almost 100% light can go outside the glass tube in this Example.

Example 2 of the Third Embodiment

Figure 10:
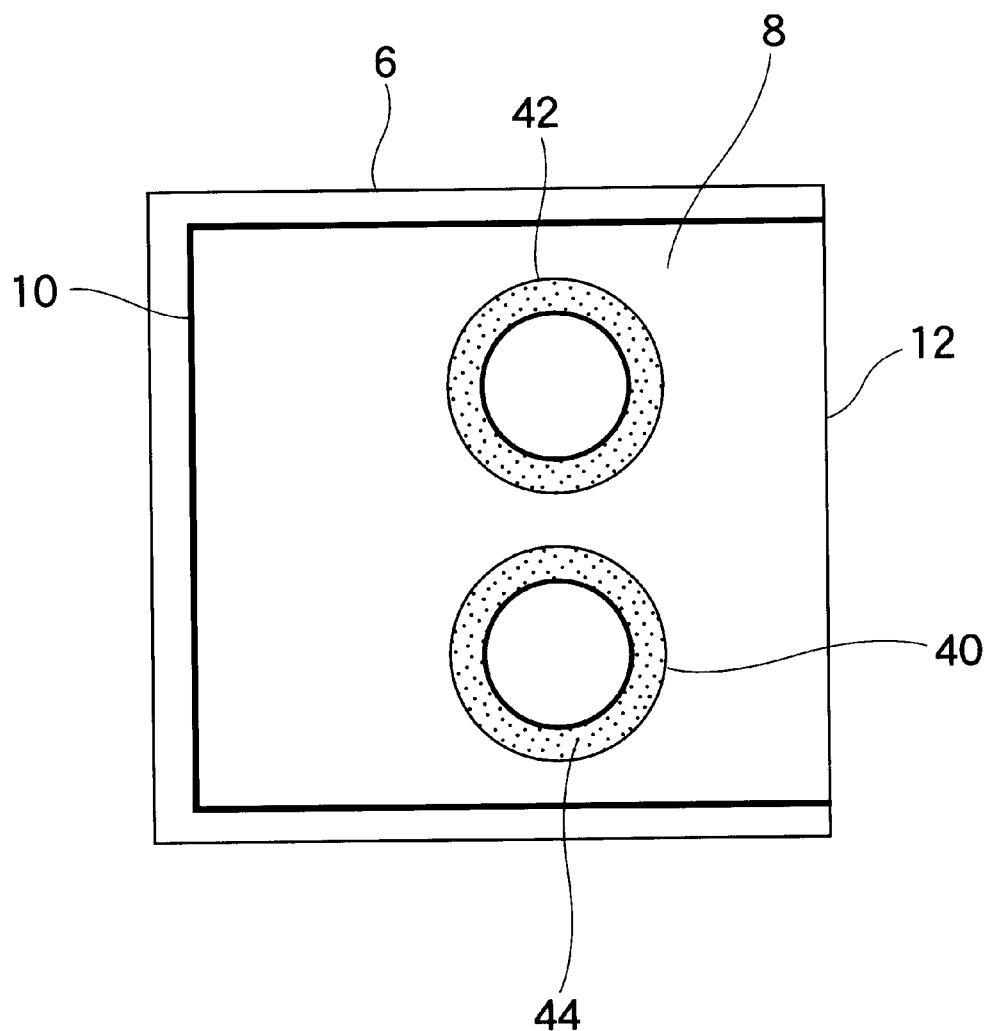
FIG. 10 shows an outline of the constitution of the backlight unit of Example 2 of the third embodiment of the invention.
Figure 11:
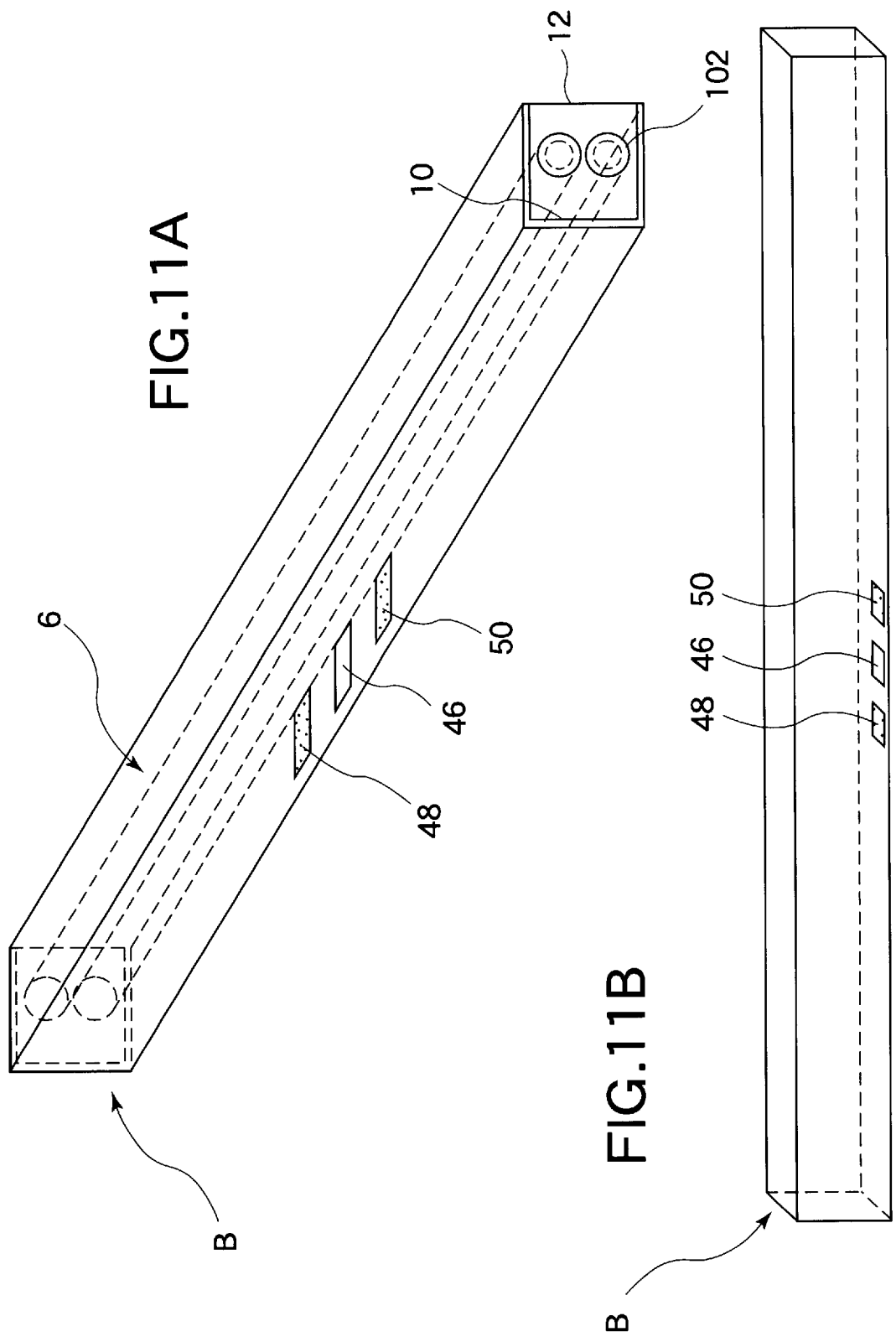
FIG. 11A and FIG. 11B show an outline of the constitution of the backlight unit of Example 3 of the third embodiment of the invention.

An outline of the constitution of the backlight unit of this Example is described with reference to FIG. 10. This Example differs from Example 1 in that glass tubes 44 with a phosphor dispersed in their wall are used herein for the cold-cathode tubes 40, 42. In this, the phosphor is dispersed in the wall of each glass tube as near as possible to the inner surface of the tube, whereby the substantial diameter of the cold-cathode tubes can be reduced. Even when the phosphor is dispersed uniformly throughout the wall of each glass tube, the local light-scattering ability of the glass tube is still low. In this case, therefore, the substantial diameter of the cold-cathode tubes can be smaller than the outer diameter of the glass tubes.

Example 3 of the Third Embodiment

An outline of the constitution of the backlight unit of this Example is described with reference to FIG. 11A and FIG. 11B. The light source unit in this Example is characterized in that the housing 6 filled with a transparent liquid 8 is provided with a temperature sensor 46, a heater 48 for heating, and a Peltier device 50 for cooling, all disposed inside it. While being monitored with the temperature sensor 46, the temperature inside the housing 6 is controlled to be on a predetermined level by means of the heater 48 and the Peltier device 50. The temperature sensor 46 is disposed near to the most cooled part of the cold-cathode tube 102. While being monitored with the temperature sensor 46, the most cooled part of the cold-cathode tube 102 is controlled to be all the time on a predetermined level, whereby the mercury gas in the cold-cathode tube 102 can have a predetermined vapor pressure to ensure the highest light emission.

Of the backlight units to be built in liquid crystal displays, some will be disposed near to the minor sides of the display panel, while some others will be near to the major sides thereof. In an ordinary mode of using displays, the display panel is inclined. In such a case, either one of the pair of minor sides and the pair of major sides is horizontal while the other one is inclined.

In this Example, when the cold-cathode tube 102 is disposed horizontally, the temperature sensor 46 is disposed near to a part of the outer surface of the glass tube that is to be the most cooled part, and directly behind the reflector. In this, when the cold-cathode tube 102 is disposed vertically (in FIG. 11A and FIG. 11B, the end B of the light source unit faces below), the heater 48 is disposed at a suitable position near the temperature sensor 46 and below it, and the Peltier device 50 is disposed at a suitable position above the temperature sensor 46.

When the housing 6 is made of a metal material, it is cooled well as its thermal conductivity is good. Therefore, the metallic housing 6 can be well controlled at a predetermined temperature even though it is not equipped with a Peltier device.

It is effective to intentionally form the most cooled part of the cold-cathode tube at a predetermined position to thereby attain the temperature control of the tube at that position. When the light source unit of this Example is built in a backlight unit and fitted to a liquid crystal display, the outer periphery of the housing 6 except the area around the temperature sensor 46, the heater 48 and the Peltier device 50 may be covered with a member having a low thermal conductivity, such as a plastic sheet or the like having a thickness of at most 1 mm, so that the housing 6 can be insulated from heat in some degree. Not limited to the structure of this Example, the housing 6 may be so constructed that it is covered with a closed vapor space capable of sealing a vapor therein, or may be so constructed that it is protected from air fluid flowing around it, and the housing 6 of such types also enjoys the same effect as herein. This applies to backlight units and liquid crystal displays equipped with a light source unit not having the above-mentioned Peltier device to attain the same effect as herein.

Example 4 of the Third Embodiment

Figure 12:
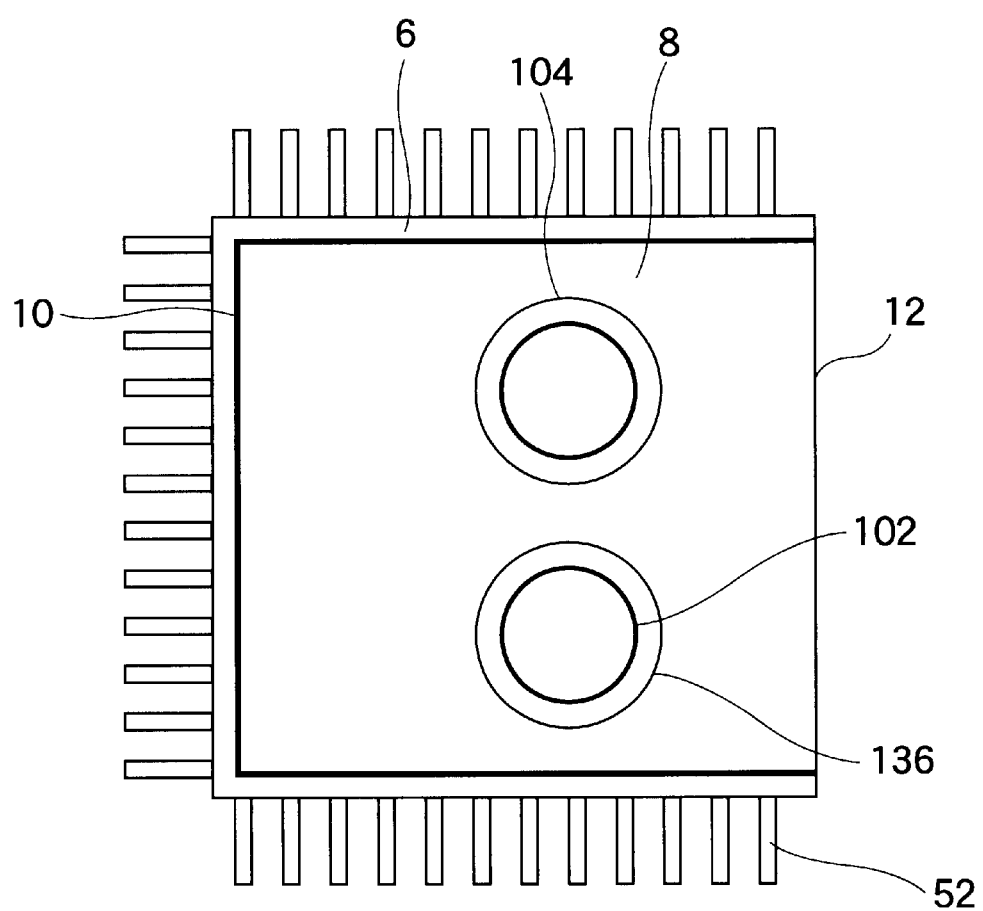
FIG. 12 shows an outline of the constitution of the backlight unit of Example 4 of the third embodiment of the invention.

An outline of the constitution of the backlight unit of this Example is described with reference to FIG. 12. This Example is characterized in that the housing 6 of Example 1 is provided with cooling fins 52 for heat radiation that run in the axial direction of the cold-cathode tube 102 everywhere on the outer surface of the housing 6. The heat radiation fins 52 are provided in order to increase the surface area of the structure, and may be of any type that meets the object. For example, they may be made of a material of good thermal conductivity to have a grooved surface, or may be made of a porous material of good thermal conductivity. The material of good thermal conductivity includes metals such as aluminum, copper, iron, etc.; carbon, graphite; resins with fine particles or powder of such metal, carbon or graphite dispersed therein; electroconductive polymers such as polypyrrole, etc.

The profile and the distribution of the heat radiation fins 52 are determined, depending on the structure of the backlight with the cold-cathode tube 102 built therein and on the structure of the liquid crystal display to be combined with the backlight. For example, the radiation fins 52 may be disposed only in the area around the center of the cold-cathode tube 102 in its axial direction, or only in the area around the temperature sensor 46 and the heater 48 and the Peltier device 50, or only in the area around the temperature sensor 46 and the heater 48. With the radiation fins 52 being so disposed, the site of the most cooled part of the cold-cathode tube 102 can be settled, and the temperature of the most cooled part can be kept all the time constant. Accordingly, the quantity of light emission of the cold-cathode tube 102 can be kept the largest.

Still alternatively, the number of the heat radiation fins 52 disposed in the area around the center of the cold-cathode tube 102 in its axial direction, or in the area around the temperature sensor 46 and the heater 48 and the Peltier device 50, or in the area around the temperature sensor 46 and the heater 48 may be increased; or the surface area of the fins in those areas is increased. With the radiation fins 52 being so shifted, the site of the most cooled part of the cold-cathode tube 102 can be settled, and the temperature of the most cooled part can be kept all the time constant. Accordingly, the quantity of light emission of the cold-cathode tube 102 can be kept the largest.

Modification 1 of Example 4 of the Third Embodiment

Figure 13:
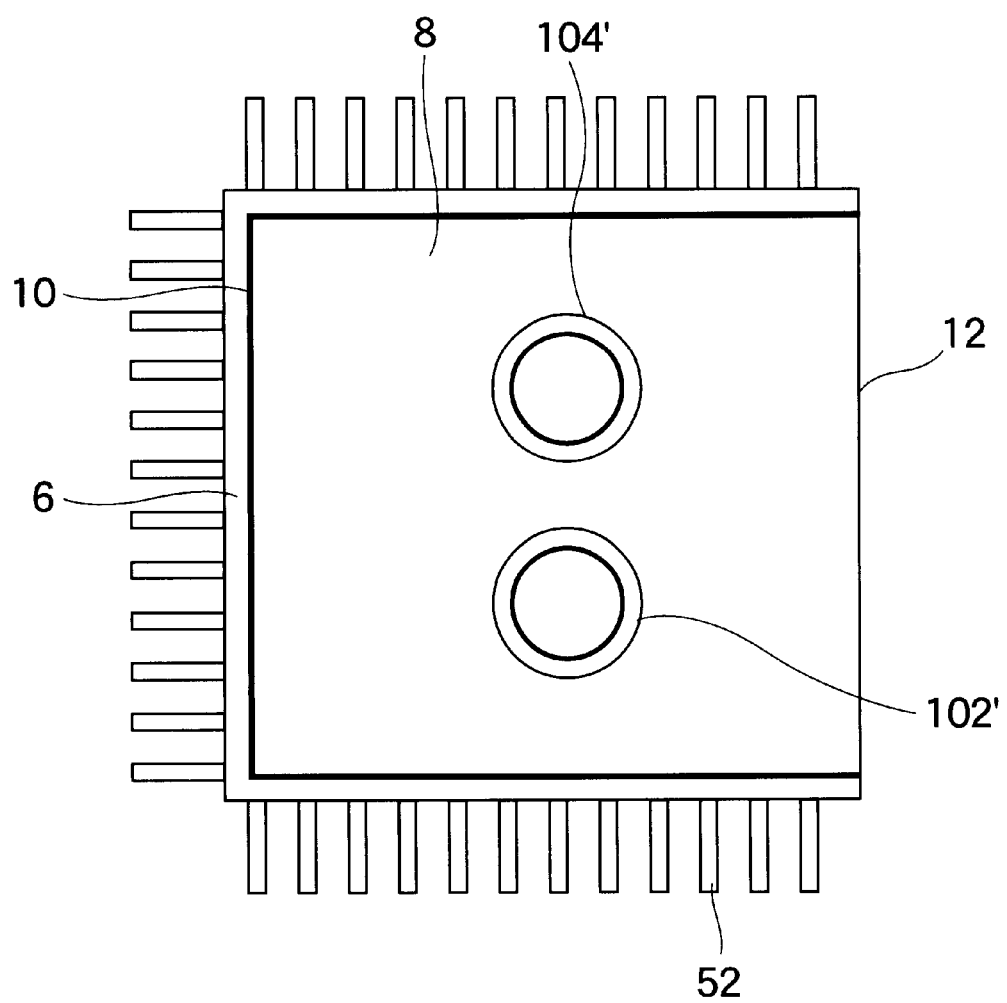
FIG. 13 shows an outline of the constitution of the backlight unit of Modification 1 of Example 4 of the third embodiment of the invention.

An outline of the constitution of the backlight unit of this Modification is described with reference to FIG. 13. This Modification is characterized in that cold-cathode tubes 102', 104' both having a smaller diameter than that of the cold-cathode tubes 102, 104 in FIG. 12 are used in place of the tubes 102, 104. In this Modification, even though the diameter of the cold-cathode tubes used is small, the temperature of the most cooled part of the tubes can be nearly on the same level as that of conventional cold-cathode tubes having a large diameter, and the mercury vapor pressure in the tubes can be also nearly on the same level as that of the conventional tubes. Therefore, the emission luminance of the cold-cathode tubes in this Modification may be on the same level as that of the conventional cold-cathode tubes.

In this Modification, the reflector 10 used has a rectangularly U-shaped profile and the height of its open end is 8 mm. In this, since the cold-cathode tubes 102', 104' can be efficiently cooled, the inner diameter of the tubes can be shortened to 1.5 mm, as compared with that of the conventional cold-cathode tubes of which the inner diameter is 2.0 mm, when the current to be applied to the tubes is from 5 to 8 mA like conventionally to attain the light emission efficiency of the same level as that of the conventional tubes. As a result, in this Modification, the total of the space between the cold-cathode tube 102' and the cold-cathode tube 104' and the space between the cold-cathode tube 102' or 104' and the reflector 10 may be 5.0 mm, though the total space is only 2.8 mm in the conventional structure as so mentioned hereinabove. Accordingly, the quantity of light emission from the open end of the reflector can be increased in this Modification, like in Example 1.

Modification 2 of Example 4 of the Third Embodiment

Figure 14:
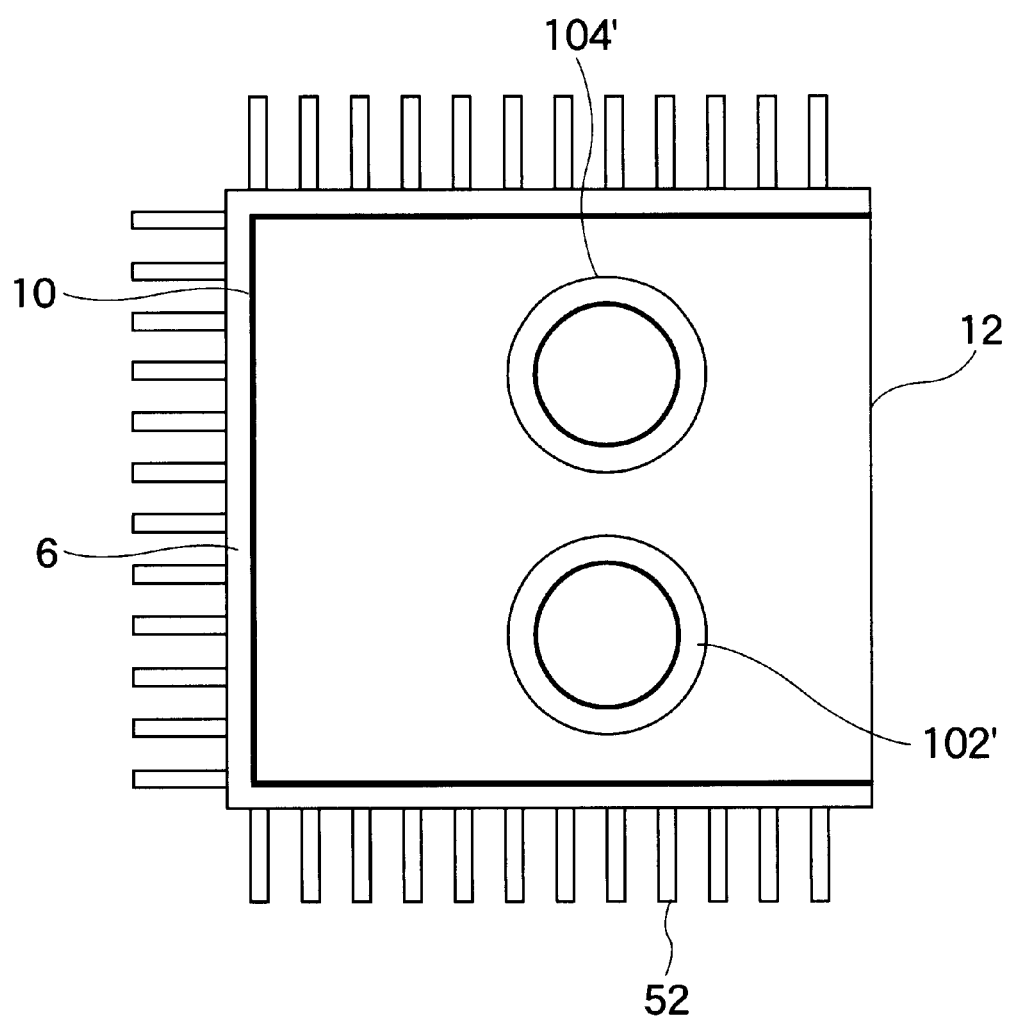
FIG. 14 shows an outline of the constitution of the backlight unit of Modification 2 of Example 4 of the third embodiment of the invention.

An outline of the constitution of the backlight unit of this Modification is described with reference to FIG. 14. In this Modification, the height of the housing 6 and the reflector 10 with the thin cold-cathode tubes 102',104' as in Modification 1 housed therein is so modified that the total of the space between the cold-cathode tube 102' and the cold-cathode tube 104' and the space between the cold-cathode tube 102' (104') and the reflector 10 is the same as that in the conventional structure with the conventional thick cold-cathode tubes 102, 104 housed therein.

As a result, the height of the reflector 10 is reduced to 5.8 mm in this Modification, though it is 8 mm in the conventional structure. Owing to this effect, thinner backlight units and thinner liquid crystal displays than conventionally can be realized by this Modification. In addition, since the optical waveguide to be in this Modification can also be thinned, this Modification can realize more lightweight backlight units and more lightweight liquid crystal displays than conventionally.

Example 5 of the Third Embodiment

Figure 15:
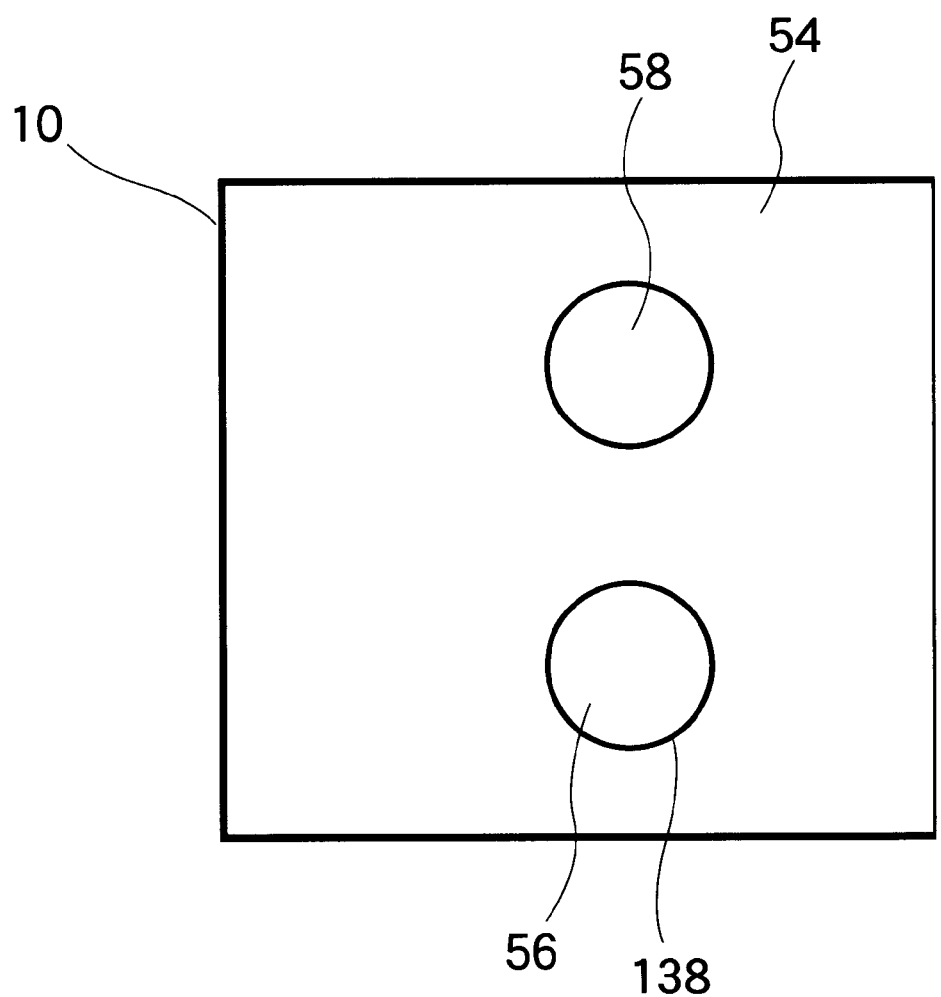
FIG. 15 shows an outline of the constitution of the backlight unit of Example 5 of the third embodiment of the invention.

An outline of the constitution of this Example is described with reference to FIG. 15. This Example is characterized in that a thin and long rectangular glass member 54 is used herein in place of the casing 6 and the transparent liquid 8. Two cylindrical through-holes are formed through the glass member 54 in predetermined positions in the lengthwise direction of the member; and a phosphor 138 is applied to the inner wall of each through-hole. The through-holes are filled with mercury, argon or the like and sealed up, and electrodes are inserted into the holes through their both sides and sealed up therein to construct the cold-cathode tubes 56, 58. The outer surface of the glass member 54 is covered with a reflector 10. For the glass member 54, usable is hard glass such as borosilicate glass or the like.

Example 6 of the Third Embodiment

Figure 16:
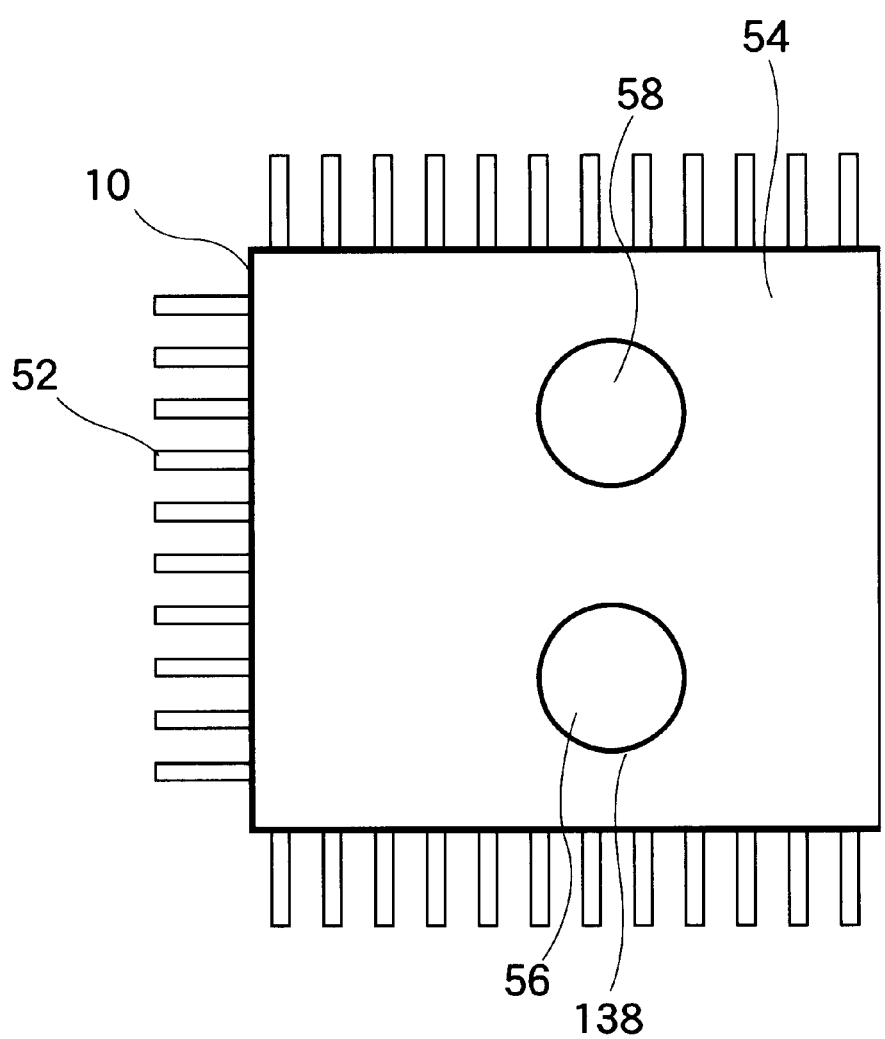
FIG. 16 shows an outline of the constitution of the backlight unit of Example 6 of the third embodiment of the invention.

An outline of the constitution of the backlight unit of this Example is described with reference to FIG. 16. This Example is characterized in that heat radiation fins 52 are provided on the outer surface of the reflector 10 in the structure of Example 5.

Like in Example 4, the heat radiation fins 52 are provided so as to increase the surface area of the structure, and they may be of any type that meets the object. For example, they may be made of a material of good thermal conductivity to have a grooved surface, or may be made of a porous material of good thermal conductivity. For the details of the material, referred to are the same as those in Example 4.

Like in Example 3, the temperature sensor 46, the heater 48 and the Peltier device 50; or the temperature sensor 46 and the heater 48 may be provided in the area around the center of the cold-cathode tubes 56, 58 in their lengthwise direction. For the profile and the distribution of the heat radiation fins 52, referred to are the same as in Example 3.

Example 7 of the Third Embodiment

Figure 17:
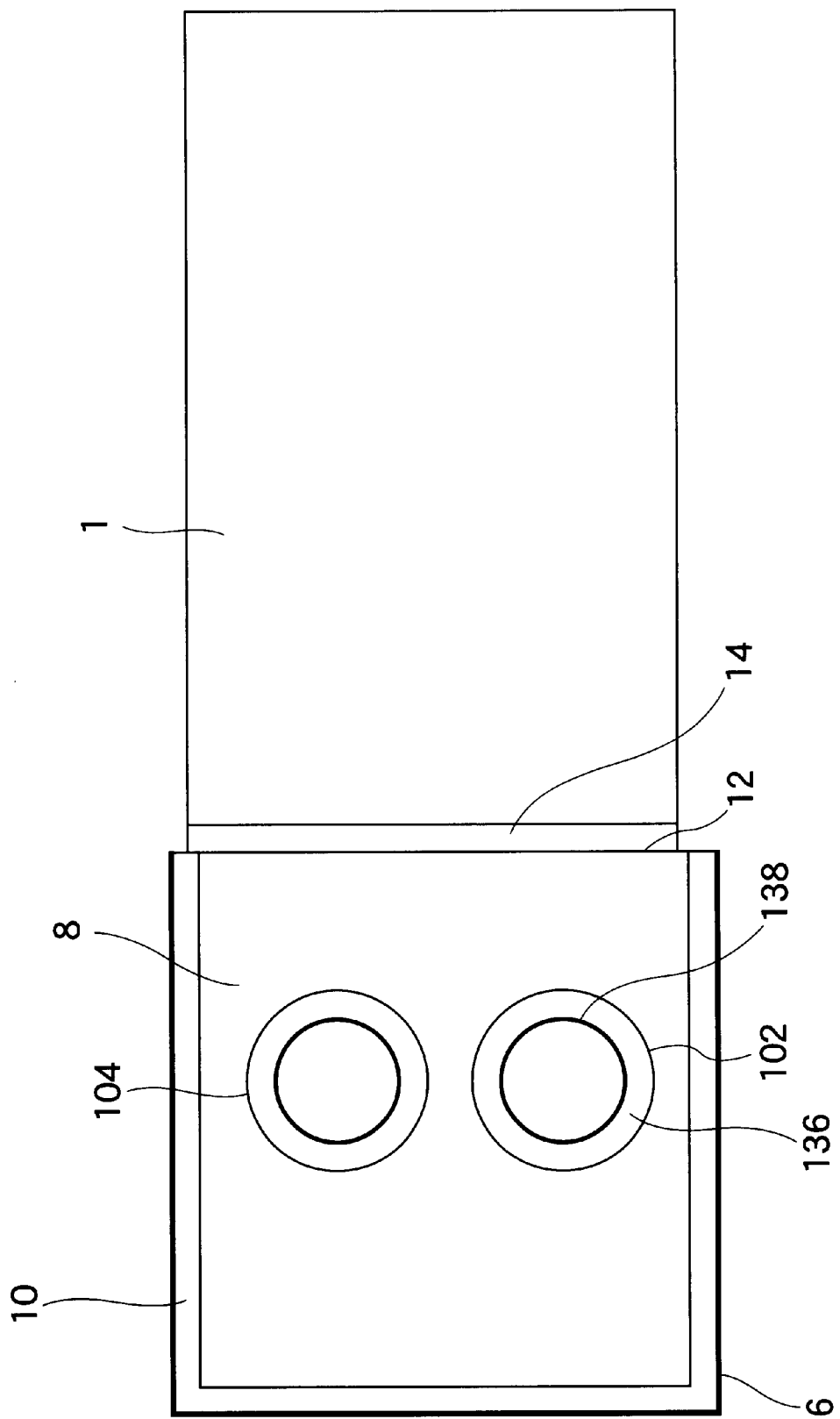
FIG. 17 shows an outline of the constitution of the backlight unit of Example 7 of the third embodiment of the invention.

An outline of the constitution of the backlight unit of this Example is described with reference to FIG. 17. In this Example, the light source unit of Example 1 is applied to a sidelight-type backlight, and a matching oil 14 is used to connect the light source unit to the optical waveguide 1.

The optical waveguide 1 may be made of any of polyacrylic acid, polycarbonate, glass, etc.

For the matching oil 14, usable is the same transparent liquid 8 as in Example 1. Preferably, the refractive index of the matching oil 14 is near to the refractive index of the sealant 12 (this is to seal up the open end of the light source unit) and to the refractive index of the optical waveguide 1.

In this Example, the matching oil 14 is merely infiltrated into the interface between the light source unit and the optical waveguide 1. In addition, the sides of the matching oil not facing the light source unit and the optical waveguide 1 may be surrounded by a solid wall, such as a glass container or the like, to thereby protect the matching oil from outside air and prevent it from being oxidized or vaporized. With that, the life of the oil may be prolonged. Further, the transparent liquid 8 filled in the light source unit may be integrated with the matching oil 14 so that the end of the optical waveguide 1 is integrated with the open end of the light source unit. With that, the life of the oil may also be prolonged.

In this Example, used is the light source unit filled with the transparent liquid 8. In place of this, the light source unit of a glass material as in Example 5 may also be used in this Example to attain the same effect as herein.

Figure 18:
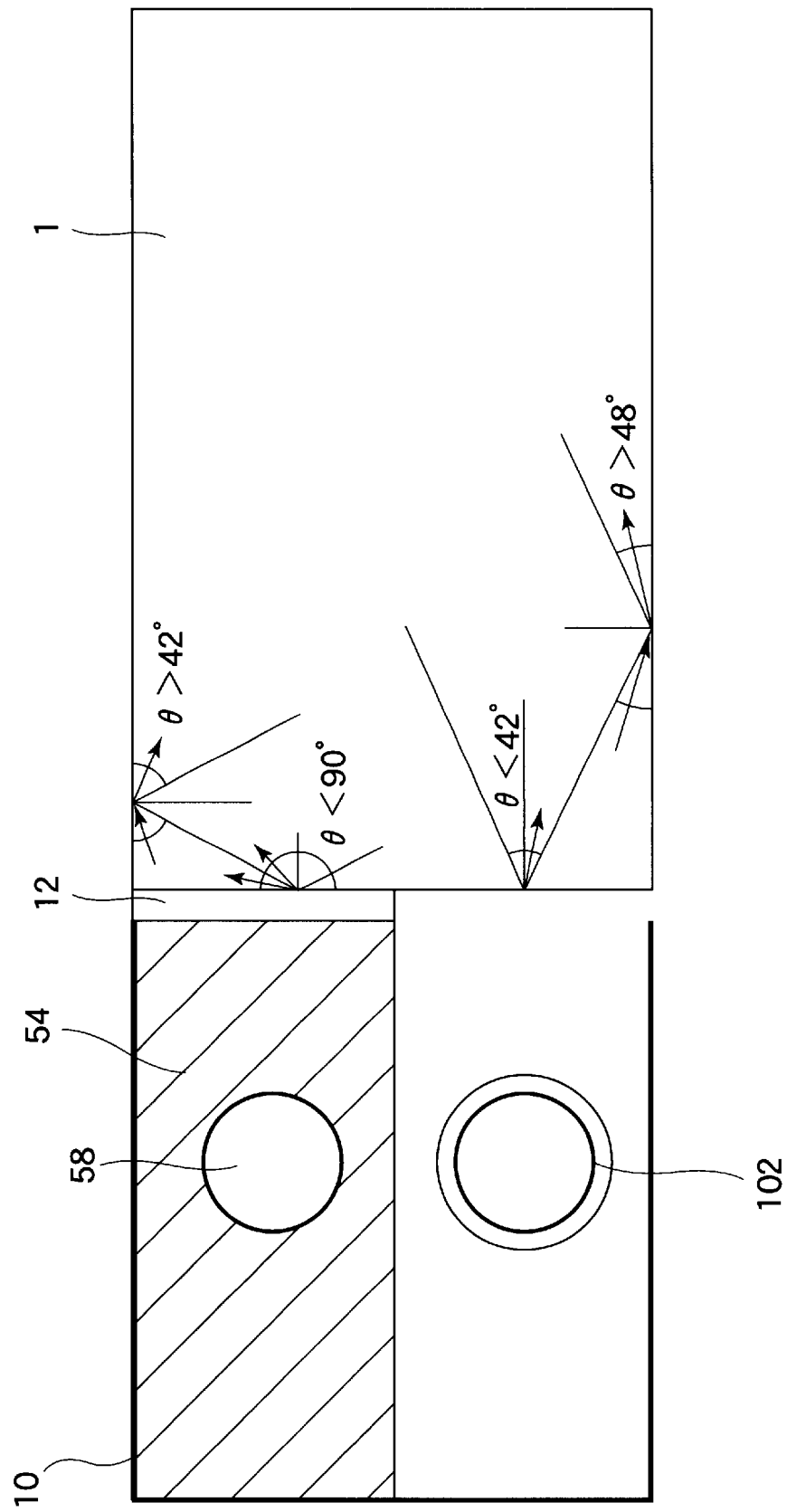
FIG. 18 is to explain the effect of Example 7 of the third embodiment of the invention.

FIG. 18 is to explain the effect of this Example. This shows a virtual backlight unit with the light source unit of this Example in the upper site and with a conventional light source unit in the lower site. As in FIG. 18, the light having reached the light-emitting surface of the optical waveguide at an incident angle of at least 42 degrees undergoes total reflection on the surface. However, the light from the conventional light source unit that has entered the optical waveguide 1 (its refractive index is around 1.5) through its end runs inside the optical waveguide 1 while undergoing total reflection on the light-emitting surface of the optical waveguide 1, but the light is limited to only that capable of reaching the light-emitting surface of the optical waveguide 1 at an incident angle of around 48 degrees or more. On the other hand, in this Example, even the light that has reached the light-emitting surface of the optical waveguide 1 at an incident angle of 42 degrees can pass through the optical waveguide. Therefore, in this Example, the optical waveguide accepts the light existing within a solid angle range broader by 1.31 times than that in the conventional structure. Accordingly, the increase in the luminance of the backlight unit of this Example by about 1.31 times that of the conventional backlight unit is expected.

Example 8 of the Third Embodiment

An outline of the constitution of the backlight unit of this Example is described with reference to FIG. 19. In this Example, heat radiation fins 52 are provided on the outer surface of the casing 6 in the structure of Example 7. The effect of the heat radiation fins 52 is the same as in Example 4, and its description is omitted herein.

Example 9 of the Third Embodiment

An outline of the constitution of the backlight unit of this Example is described with reference to FIG. 20. In this Example, through-holes are formed through the optical waveguide 1 at its one end, and the inner surface of the through-holes is coated with a phosphor. In addition, a reflector 10 is formed on the outer surface of the optical waveguide 1 at its end. Accordingly, in this Example, one end of the optical waveguide 1 is modified to form cold-cathode tubes 56, 58 through it, in place the glass member 54 used in Example 5. Having this constitution, backlight units of high reliability can be realized.

Example 10 of the Third Embodiment

An outline of the constitution of the backlight unit of this Example is described with reference to FIG. 21. The backlight unit of this Example is a direct-light-type backlight unit of which the structure is similar to that of FIG. 43 but differs from it in that a plurality of cold-cathode tubes 102a to 102d are disposed in the space surrounded by the reflector 10 and its open end and that the space is filled with a transparent liquid 8 with the cold-cathode tubes being embedded in the liquid. Above the open end of the reflector 10, disposed is a light-diffusing device such as a diffuser, a prism array, a lens array or the like (not shown); and a polarizer and a liquid crystal are disposed further over it to realize a liquid crystal display.

In this Example, since the thickness of the glass tubes 136 of the cold-cathode tubes 102a to 102d is optically negligible, the efficiency of light emission through the glass tubes 136 can be about 5 times that in the conventional structure. Even when any light enters the glass tubes 136 of the cold-cathode tubes 102a to 102d, it can still go straight ahead so far as it does not meet the phosphor 138. In short, in the conventional light source unit, the size of the cold-cathode tubes is defined by the outer diameter of the glass tubes 136; but in this Example, the inner diameter of the cold-cathode tubes 102a to 102d corresponds to the substantial size of the cold-cathode tubes 102a to 102d, and the size of the cold-cathode tubes 102a to 102d that are light-shielding objects can be substantially reduced.

In addition, since the space surrounded by the reflector 10 and its open end is filled with the transparent liquid 8, and since the inner diameter of the cold-cathode tubes 102a to 102d can be therefore reduced not detracting from their light emission efficiency, the size of the cold-cathode tubes can be further reduced. Moreover, since the liquid cools the reflector 10, it protects the reflector 10 from being deteriorated by heat. Accordingly, the life of the reflector 10 is prolonged. Not only it but also the life of the entire backlight unit and even the life of the liquid crystal display comprising the unit can be prolonged.

In the Examples of this embodiment mentioned hereinabove, concretely demonstrated are light source units with one or two cold-cathode tubes therein for sidelight-type backlight units, to which, however, the invention is not whatsoever limited. Needless-to-say, even light source units with three or more cold-cathode tubes therein surely display the functions and the effects described in the above-mentioned Examples.

In this embodiment of the invention described hereinabove, the light emitted through the glass tubes of the cold-cathode tubes does not reflect on the outer surface of the glass tubes. Accordingly, the light source unit of this embodiment ensures light emission efficiency higher by about 5 times than that of conventional light source units. In this embodiment of the invention, the light reflected on the reflector and also the light emitted by the neighboring cold-cathode tubes all go straight ahead, not interfered with by the glass tubes. Accordingly, in this embodiment, the size of the light source unit can be determined on the basis of the inner diameter of the cold-cathode tubes in the unit, though it is determined by the outer diameter of the cold-cathode tubes in conventional backlight units. Therefore, in the invention, the size of the light source unit can be substantially reduced.

In addition, owing to the coolant effect of the liquid filled in the unit, the vapor pressure of mercury in the cold-cathode tubes that absorbs UV rays and visible rays does not increase even when the tubes are down-sized. Therefore, the invention realizes increased light emission efficiency of the unit. Moreover, since the cold-cathode tubes that are optical obstacles or light-shielding objects can be down-sized herein, the invention realizes efficiency-increased, wall-thinned and weight-reduced light source units, backlight units and liquid crystal displays. Further, since the reflector used herein is prevented from being deteriorated and since the other members not resistant to heat are all cooled by the liquid serving also as a coolant, the invention is effective for prolonging light source units, backlight units and liquid crystal displays.

Next described is the backlight unit for liquid crystal displays and others of the fourth embodiment of the invention with reference to FIG. 22A through FIG. 26B. This embodiment is to provide a backlight unit with cold-cathode tubes having increased light emission efficiency.

The problem with the prior art 4 mentioned above is caused by the reason that the phosphor powder is not kept in airtight contact with the wall (glass) of the discharge tubes. To solve the problem, some measures mentioned below are taken in this embodiment.

First, a transparent material with fluorescence centers introduced thereinto is used for the wall of discharge tubes.

Next, the cold-cathode tubes are formed to have a tubular structure. This is in order that the fluorescence centers introduced into the wall material act as impurities to compensate for the reduction of the mechanical strength of the wall material.

Further, mercury is used for the UV source for discharge tubes. Mercury has the highest U emission efficiency, and is much used for UV sources. Alternatively, Xe or Ne is used for the UV source for discharge tubes. Discharge tubes comprising it release few harmful substances, as compared with those comprising mercury, and the cost for discarding them can be reduced.

Further, any of hard glass, quartz and metal halides that are almost transparent to the luminescent line of mercury, 254 nm, is used for the wall of cold-cathode tubes. This is for enriching the UV rays that reach the fluorescence centers in the wall made of it. For the fluorescence centers to be introduced into the wall, used is a metal atom. For the fluorescent centers, also used is a mixture of a substance that absorbs UV rays and emits rays in a blue zone, and a substance that absorbs blue rays and emits visible rays in other wavelength ranges.

The wall is formed to have a multi-layered structure composed of a plurality of wall layers, in which each wall layer shall have at least one type of fluorescence centers introduced thereinto. In this, the layer nearer to a UV ray source shall have a blue-emitting substance introduced thereinto. In this, the concentration of each fluorescence center is so controlled that every light emission is unified for each color. Accordingly, the emission balance of three primary colors is improved to facilitate white balance. Every fluorescence center content is so defined that it is inversely proportional to the quantum yield of each fluorescence center. In tubular discharge tubes, the number of the fluorescence centers is increased in the part corresponding to the dark UV emission part at their ends to thereby moderate the white fluorescence luminance distribution.

Concrete structures of the cold-cathode tubes to be used in the backlight unit of this embodiment are described with reference to their examples.

The combinations of the matrix material for the tubes and the substance to be introduced thereinto that are illustrated in the following description are some illustrative examples, to which, however, the invention is not whatsoever limited. Needless-to-say, any other combinations are usable herein for producing cold-cathode tubes, depending on the formulation of sensitizers used and on the color tone of the visible light to be emitted by the tubes. For example, substances transparent to UV rays, such as $CaF_2$, $MgF_2$, LiF, NaF and the like are the most suitable for the matrix material for the tubes; but for the fluorescence centers for conventional cold-cathode tubes, also suitable are glass materials such as quartz and silicon glass that transmit near-UV rays (wavelength: 254 nm). In case where the fluorescence centers are distributed relatively around the surface of the tubes, also usable is hard glass.

In the following Examples, metal atoms (or ions) only are used for the fluorescence centers, which, however, are not limitative. Apart from this, also employable herein for the fluorescence centers is a method of introducing molecules such as CdS (this absorbs blue light and emits orange color), etc., as well as ordinary phosphors, for example, fine crystals of $Y_2O_3$:Eu (the wavelength range of the fluorescence center is for red), $(SrCaBa)_5(PO_4)_3CL$:Eu (the wavelength range of the fluorescence center is for green), $LaPO_4$:Ce,Tb (the wavelength range of the fluorescence center is for blue), etc.

In the following Examples, mercury is used for the UV source. Apart from this, also usable is Xe or Ar gas for the light source.

Example 1 of the Fourth Embodiment

Figure 22A:
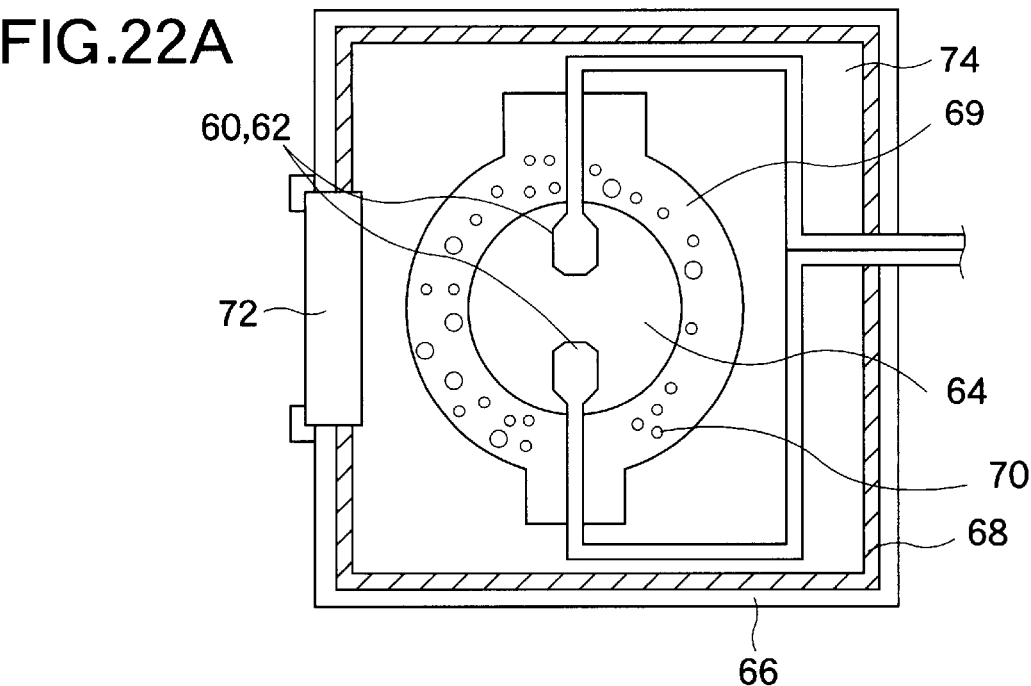
FIG. 22A to FIG. 22C show an outline of the constitution of the light source of Example 1 of the fourth embodiment of the invention.
Figure 22B:
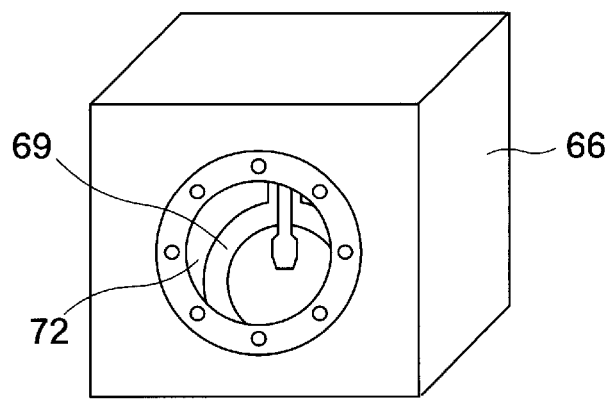
Figure 22C:
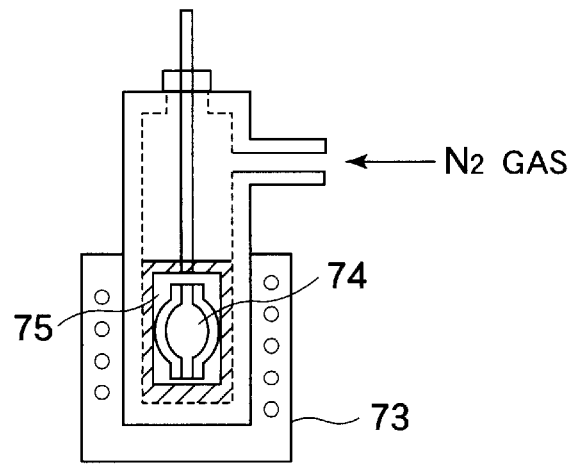

Herein demonstrated is a cold-cathode tubes having a transparent member of a metal halide, with reference to FIG. 22A through FIG. 22C. As in FIG. 22A, a transparent member 69 is disposed in the housing 66 of which the inner surface is coated with a reflective film 68 and which is filled with nitrogen gas or dry air. The transparent member 69 is composed of a pair of polished, semi-spherical sheaths of grown lithium fluoride crystal that are combined and adhered to each other with an optical adhesive with two electrodes 60, 62 facing each other across the center of the member 69.

An inert gas (mixed gas of Ar and Ne) of around 0.1 atmospheres and mercury (Hg) are sealed up in the space 64 inside the spherical sheath. Into the transparent member 69, essentially introduced are F centers 70 (minor M centers are formed through polymerization of the F centers 70). The F centers 70 are introduced into the member 69 according to a coloration method of heating the member 69 in a potassium metal vapor atmosphere.

As in FIG. 22A and FIG. 22B (this is a perspective view showing the outline of the light source unit), a transparent window 72 is formed through the wall of the housing 66, and the emitted light from the transparent member 69 inside the housing 66 is taken outside through the transparent window 72. For the transparent window 72, used is a transparent sheet glass disc of which the diameter is nearly the same as the diameter of the transparent member 69.

FIG. 22C is to show an outline of the method of introducing the F centers 70 into the transparent member 69. As in FIG. 22C, the transparent member 69 is held in a container 75 for crystal introduction, then the container 75 is put into an electric furnace 73, and the electric furnace 73 is heated to have an inner temperature of about 500° C. Next, the region 74 surrounded by the inner surface of the transparent member 69 is filled up with potassium metal vapor. As a result, the metal lithium vapor and the lithium fluoride crystal reach thermal equilibrium therebetween, and the F centers 70 having a predetermined concentration are thus formed. The discharge lamp thus fabricated to have the transparent member 69 therein is housed in the housing 66 to finish the light source unit shown in FIG. 22A and FIG. 22B.

Example 2 of the Fourth Embodiment

Figure 23A:
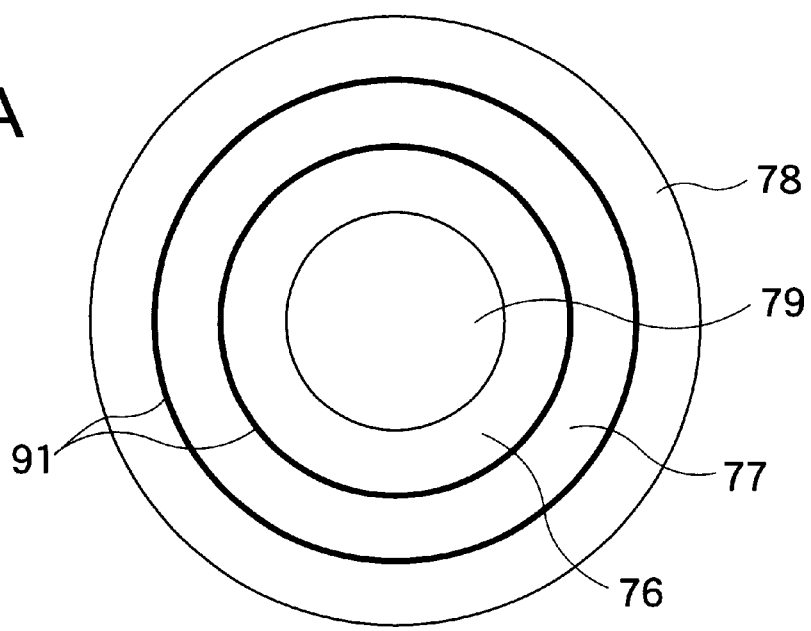
FIG. 23A and FIG. 23B show an outline of the constitution of the light source of Example 2 of the fourth embodiment of the invention.
Figure 23B:
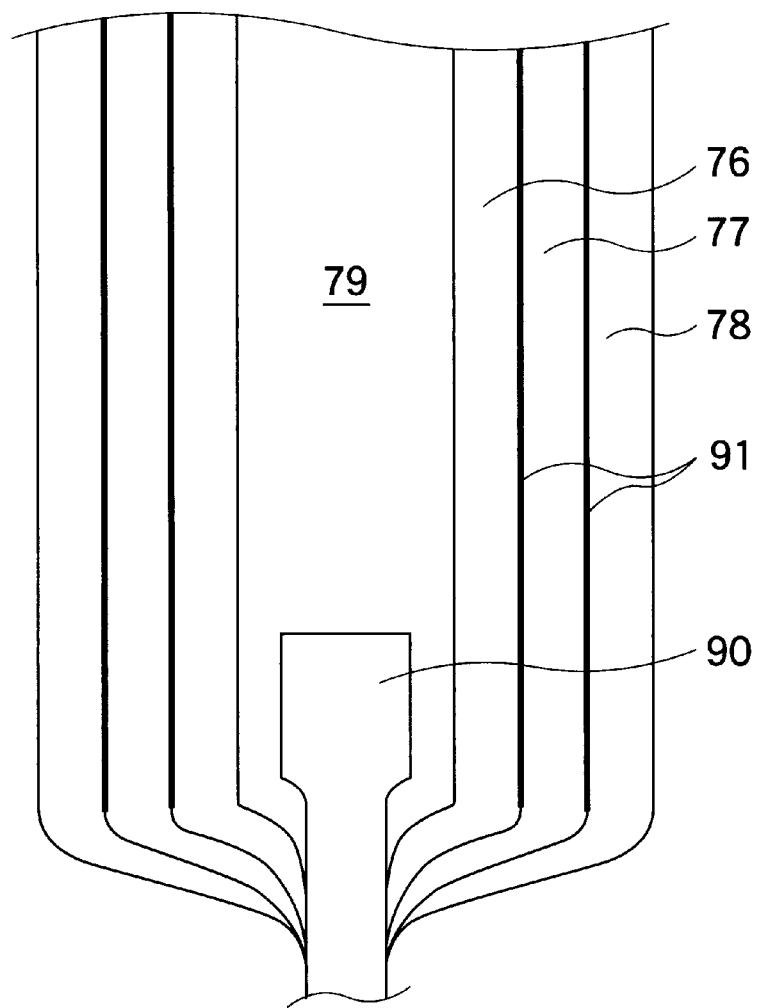

An outline of the constitution of the cold-cathode tube of this Example is described with reference to FIG. 23A and FIG. 23B. FIG. 23A is a cross-sectional view of a discharge tube, cut in the direction perpendicular to the axial direction of the tube. FIG. 23B is a cross-sectional view of the discharge tube, cut in the axial direction of the tube. The wall of the discharge tube is formed by adhering three glass tubes to each other via an optical adhesive layer 91 existing between the neighboring glass tubes. A columnar Ni electrode 90 is fitted into the both ends of the tube along the axial direction of the tube. Regarding the profile and the material of the three glass tubes to form the cold-cathode tube, the outermost glass tube 78 is a silica glass tube having an outer diameter of 3.0 mmφ and a wall thickness of 0.2 mm; the interlayer glass tube 77 is a silica glass tube having an outer diameter of 2.6 mmφ and a wall thickness of 0.2 mm; and the innermost glass tube 76 is a silica glass tube having an outer diameter of 2.2 mmφ and a wall thickness of 0.2 mm. The empty region 79 surrounded by the innermost glass tube 76 is filled with a mixture of Ne gas, Ar gas and mercury gas, and this is sealed up.

Into these glass tubes 76, 77, 78, introduced are metal ions under the condition mentioned below. Into the glass tube 78, introduced is a simple metal of Eu to have an Eu atomic molar concentration of 0.18% therein. Into the glass tube 77, introduced is a simple metal of Tb to have a Tb atomic molar concentration of 0.94% therein. Into the glass tube 76, introduced is a simple metal of Mn to have an Mn atomic molar concentration of 0.19% therein.

The metal introduced into each glass tube coordinates in the site of the Si atom in the glass. Eu in the glass tube acts to emit blue; Tb acts to emit green; and Mn acts to emit red. As a whole, they realize a light source of good color balance. As compared with the case where these three metals are introduced into one and the same glass tube, the three-layered cold-cathode tube of this Example in which the three metals are separately introduced into the three constituent glass layers is advantageous in that the individual fluorescence centers do not undergo energy transportation and ensure increased fluorescence emission efficiency.

Example 3 of the Fourth Embodiment

Figure 24A:
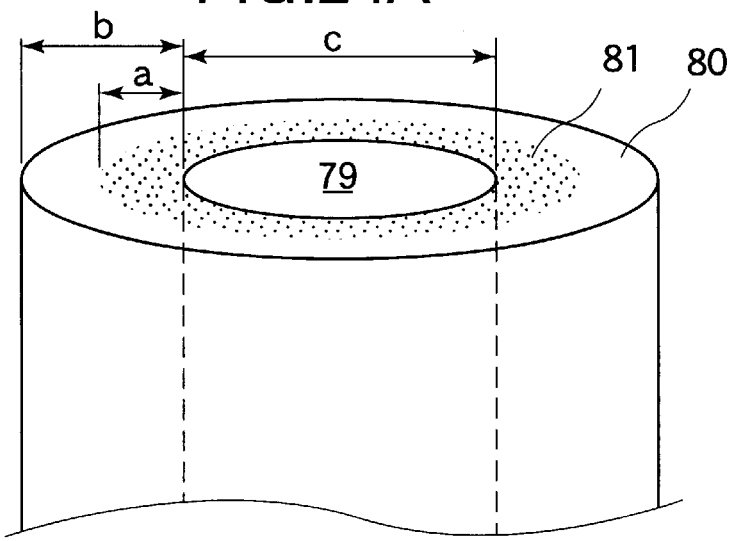
FIG. 24A and FIG. 24B show an outline of the constitution of the light source of Example 3 of the fourth embodiment of the invention.
Figure 24B:
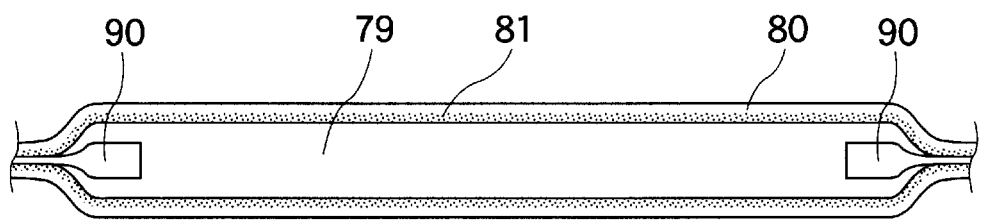

An outline of the constitution of the cold-cathode tube of this Example is described with reference to FIG. 24A and FIG. 24B. FIG. 24A is a perspective view of a discharge tube cut in the direction perpendicular to the axial direction of the tube. FIG. 24B is a cross-sectional view of the discharge tube, cut in the axial direction of the tube. The wall of this discharge tube is a quartz glass tube 80 having a wall thickness, b, of 0.7 mm. The empty region 79 surrounded by the glass tube 80 and having a diameter, c, of 2.0 mm is filled with a mixed gas of Xe and mercury that acts as a UV source, and this is sealed up. Accordingly, in the tube, a luminescent line appears at around a wavelength of 150 nm.

Figure 25:
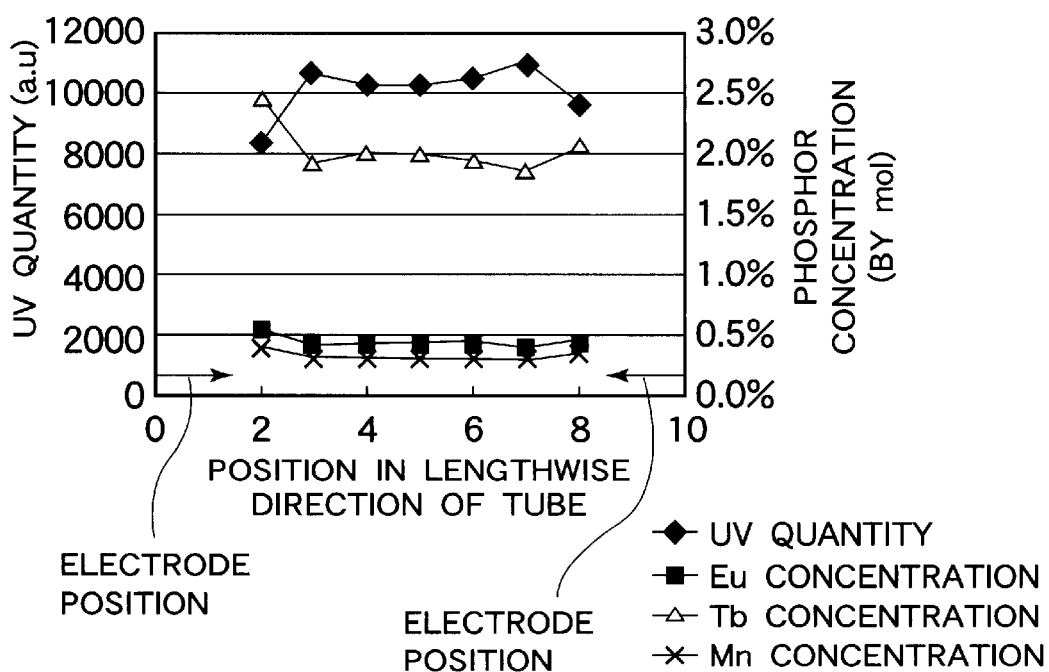
FIG. 25 is a graph showing the metal concentration in Example 3 of the fourth embodiment of the invention.

In this Example, Eu, Tb and Mn atoms are introduced into the quartz glass tube 80 to a depth of the wall for 95% transmission of 185 nm UV ray, or that is, to the wall depth, a, of 0.4 mm from the inner surface of the tube adjacent to the UV source. The atomic concentration distribution of the Eu, Tb and Mn atoms introduced into the quartz glass tube 80 to the depth of 0.4 mm from the inner surface of the tube is described with reference to FIG. 25. In FIG. 25, the horizontal axis indicates the position in the quartz glass tube 80 varying in its lengthwise direction. The left-side vertical axis indicates the UV quantity; and the right-side vertical axis indicates the phosphor concentration.

These metal atoms of Eu, Tb and Mn are introduced into the quartz glass tube 80 in such a controlled manner that their concentration is inversely proportional to the quantity of UV rays generated relative to the lengthwise direction of the quartz glass tube 80 and is inversely proportional to the quantum yield of each metal atom in light emission, as in FIG. 25.

Specifically, the fluorescence centers in this Example are a combination of fluorescence centers to emit R (red) zone light, fluorescence centers to emit G (green) zone light, and fluorescence centers to emit B (blue) zone light; and they are characterized in that, when the quantum yields of these three types of fluorescence centers are designated by $\sigma(R)$, $\sigma(G)$ and $\sigma(B)$, respectively, the product (optical density) of the mean concentration of the fluorescence centers of each type and the depth of the wall of the glass tube into which the fluorescence centers of the type are introduced is proportional to $1/\sigma(R)$, $1/\sigma(G)$ and $1/\sigma(B)$, respectively.

Example 4 of the Fourth Embodiment

Figure 26A:
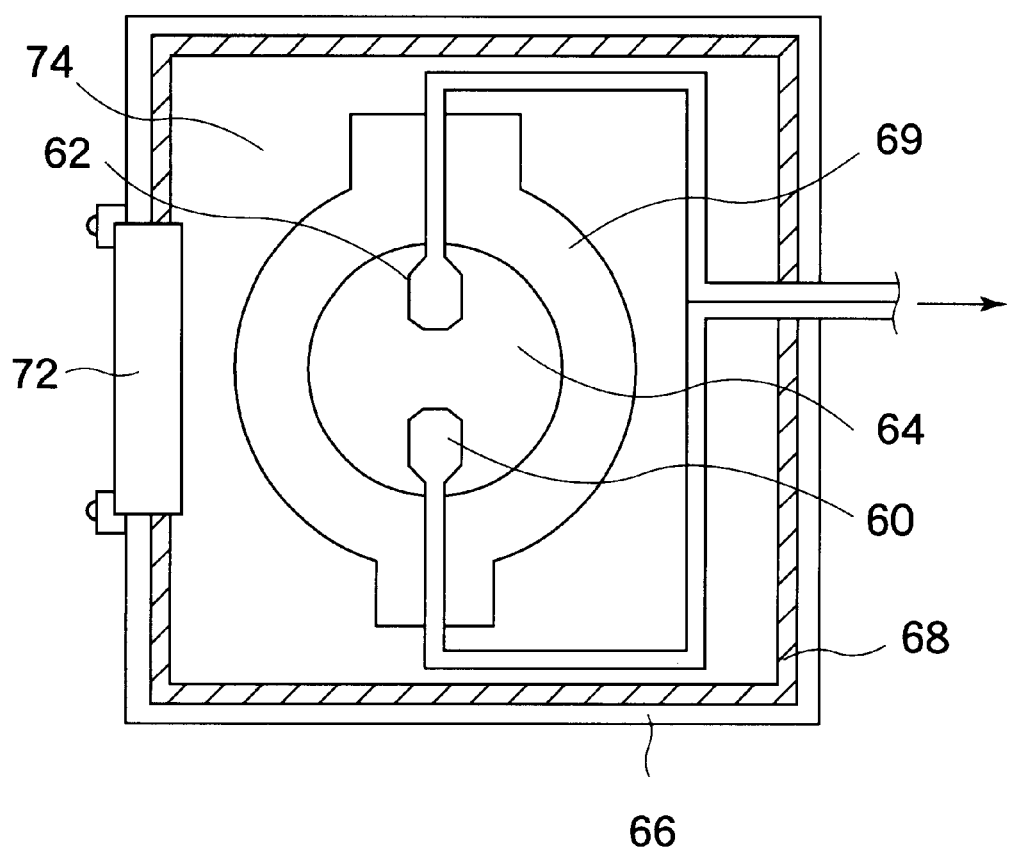
FIG. 26A and FIG. 26B show an outline of the constitution of the light source of Example 4 of the fourth embodiment of the invention.
Figure 26B:
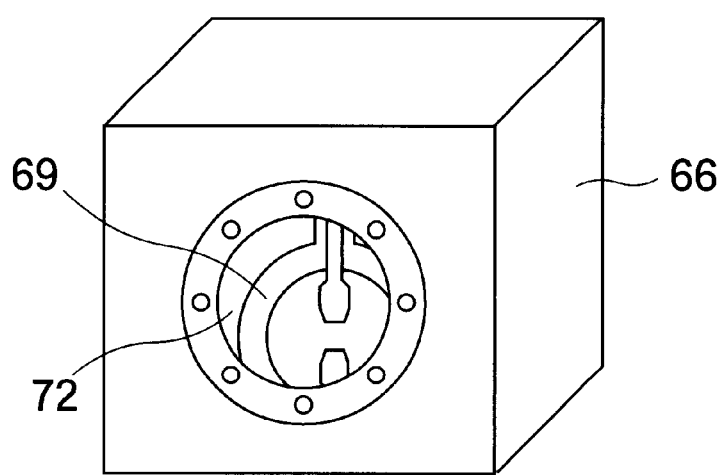

Herein demonstrated is a cold-cathode tubes having a transparent member of a metal halide, with reference to FIG. 26A and FIG. 26B. As in FIG. 26A, a transparent member 69 is disposed in the housing 66 of which the inner surface is coated with a reflective film 68 and which is filled with nitrogen gas or dry air. The transparent member 69 is composed of a pair of polished, semi-spherical sheaths of grown potassium iodide crystal that are combined and adhered to each other with an optical adhesive with two electrodes 60, 62 facing each other across the center of the member 69.

As in FIG. 26A and FIG. 26B (this is a perspective view showing the outline of the cold-cathode tube), a transparent window 72 is formed through the wall of the housing 66, and the emitted light from the transparent member 69 inside the housing 66 is taken outside through the transparent window 72. For the transparent window 72, used is a transparent sheet glass disc of which the diameter is nearly the same as the diameter of the transparent member 69.

The potassium iodide crystal used herein is crystallized with Ga and T1 being therein at a concentration of around $10^{14}$ atoms/cm$^3$ each. In their absorption→fluorescence emission cycle (zone A), these impurities have absorption/fluorescence emission zones at the peak wavelengths shown in Table 3.

TABLE 3

Absorption Zone and Emission Zone for Impurity Metal Atoms Introduced into KI Crystal

| Impurity Atoms Introduced | Peak Wavelength (nm) | |
|---|---|---|
| | Absorption Zone | Fluorescence Emission Zone |
| Ga | 287, 291 | 502, 608 |
| T1 | 283 | 431 |

By controlling the concentration of these atoms to be in the transparent member, cold-cathode tubes for emission of desired color balance can be fabricated.

Of conventional cold-cathode tubes, the inner wall is coated with a phosphor, and the fluorescence centers of the phosphor are powdery polycrystalline particles. In the conventional cold-cathode tubes, therefore, the phosphor is seemingly non-transparent owing to irregular reflection and scattering of light on the surfaces of the fine crystal particles therein. Being different to this conventional case, the fluorescence centers are introduced into the wall of the cold-cathode tube in the light source of this Example. The wall of the cold-cathode tube is colored with the fluorescent centers introduced thereinto, but is transparent. Therefore, as compared with the conventional cold-cathode tubes, the light having again reached the wall of the cold-cathode tube of this Example passes through it or is reflected on it, not being scattered thereon. Accordingly, the light source unit of this Example ensures high emission efficiency. Concretely, the increase in light emission efficiency of the light source unit of this Example may be at most 18%.

Next described is the backlight unit for liquid crystal displays and others of the fifth embodiment of the invention with reference to FIG. 27 through FIG. 36. This embodiment is to provide a backlight unit with cold-cathode tubes having increased light emission efficiency.

In this embodiment, an emission tube for generating UV rays and a member that receives the thus-generated UV rays to emit visible light are disposed in different spaces, and a UV reflector for reflecting the UV rays generated by the UV emission tube is provided, spaced from the UV emission tube. In this, the UV emission tube is spaced from the visible emission tube, and the UV reflector is spaced from the UV emission tube.

Small light absorption, if so, in the emission tube does not increase the tube temperature, therefore facilitating the reduction in the tube size, and, as a result, the light that may reach the emission tube to be scattered by it as well as the light that may be absorbed by the vapor in the emission tube can be reduced, thereby realizing high-luminance backlight units.

In this embodiment, the space surrounded by the UV reflector is extremely large relative to the size of the UV emission tube, and therefore the quantity of the UV rays that re-enter the UV emission tube is reduced. Accordingly, in this, the UV rays from the UV emission tube can be most efficiently directed to the visible light takeout window. The UV emission tube in this embodiment is compared with a conventional UV emission tube with respect to the visible light energy to be taken out of the tube as visible light. The data are shown below.

Comparison between the UV emission tube of this embodiment and a conventional UV emission tube with respect to the visible light energy to be taken out of the tube as visible light:

Prerequisites:

| | |
|---|---|
| UV energy generated in emission tube: | A |
| Luminous efficiency of phosphor: | $\alpha = 0.4$ |
| Ratio of the quantity of light to scatter before phosphor/the quantity of light to scatter after phosphor: | 1/1 |
| Transmittance of phosphor: | $\beta = 0.5$ |
| Transmittance of glass wall of emission tube: | $\gamma = 0.95$ |
| Reflectance of reflector: | $\delta = 0.95$ |
| Transmittance of vapor in tube: | $\eta = 0.85$ |
| Reflectance of UV reflector: | $\sigma = 0.95$ |
| Transmittance of visible light takeout window (in this embodiment only): | $\epsilon = 0.95$ |

Conventional UV emission tube:

(1) phosphor→glass wall of tube→reflector→visible light takeout window:
  $A \cdot \frac{1}{2} \cdot \alpha \cdot \gamma \cdot \delta = 0.181A$, (2) phosphor→vapor in tube→phosphor→glass wall of tube→visible light takeout window:
  $A \cdot \frac{1}{2} \cdot \alpha \cdot \eta \cdot \beta \cdot \gamma + A \cdot (\frac{1}{2})^2 \cdot \alpha \cdot \eta^2 \cdot \beta \cdot \gamma \cdot \delta + A \cdot (\frac{1}{2})^4 \cdot \alpha \cdot \eta^3 \cdot \beta \cdot \gamma + A \cdot (\frac{1}{2})^5 \cdot \alpha \cdot \eta^4 \cdot \beta \cdot \gamma \cdot \delta + \ldots = (0.0807 + 0.0325 + 0.0073 + 0.00294 + \ldots) A = 0.124A$, Accordingly, (1)+(2)=0.305A.

UV emission tube of this embodiment:

vapor in tube→glass wall of tube→phosphor/reflector→visible light takeout window:
  $A \cdot \gamma \cdot \frac{1}{2} \cdot \alpha \cdot (1 + \beta \cdot \delta + (\beta \cdot \delta)^2 + (\beta + \delta)^3 + \ldots) \cdot \epsilon = 0.340A$.

Accordingly, the ratio of visible light energy of the UV emission tube in this embodiment/visible light energy of conventional UV emission tube=0.340A/0.305A=1.12.

This means that the increase in the visible light energy available in the constitution of this embodiment is about 12% (however, the factors of the constituent members used in the estimation made herein are not limited to those mentioned above), or that is, the brightness of the backlight source therein increases by about 12%.

The backlight unit of this embodiment is described with reference to its concrete examples.

Example 1 of the Fifth Embodiment

Figure 27:
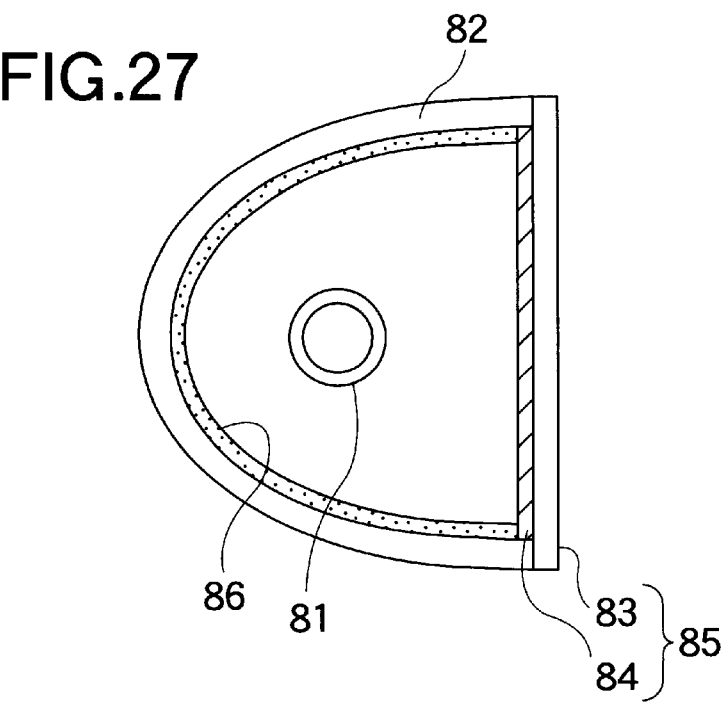
FIG. 27 shows an outline of the constitution of the light source unit of Example 1 of the fifth embodiment of the invention.

An outline of the constitution of the light source unit of this Example is described with reference to FIG. 27. FIG. 27 is a cross-sectional view of the light source unit of this Example, cut in the direction perpendicular to the axial direction of the emission tube in the unit. As in FIG. 27, the UV emission tube 81 with a mixed gas of mercury, Ne and Ar sealed up therein is coated with neither phosphor nor UV absorbent, and it is made of UV-transmitting glass (quartz, hard glass, etc.). For the UV/visible light reflector 82, for example, used is an aluminum (Al) material having a reflectance of at least 90%, and the reflector 82 surrounds the emission tube 81 except a predetermined space around it, as in FIG. 27. If desired, the inner surface of the UV/visible light reflector 82 may be specifically processed for further increasing its reflectance (for example, it maybe coated with a dichroic coat).

In the part not surrounded by the UV/visible light reflector 82, provided is a UV reflector 85. The UV reflector 85 is, for example, a transparent glass substrate 83 (transparent sheet glass, Pyrex, etc.) coated with a UV reflective film 84.

Almost all the UV rays emitted by the UV emission tube 81 enter the visible light emission member, for example, the phosphor 86 provided on the inner surface of the UV/visible light reflector 82. The phosphor 86 contains, for example, $(SrCaBa)_5(PO_4)_3CL:Eu$, $LaPO_4:Ce,Tb$, or $Y_2O_3:Eu$. This receives the UV rays and emits visible light. The visible light thus emitted passes through the UV reflector 85 and goes outside the light source unit.

On the other hand, the UV rays emitted by the UV emission tube 81 directly toward the UV reflector 85 are reflected by the UV reflector 85 to run toward the UV/visible light reflector 82, and enter the phosphor 86 by which they are converted into visible light.

The UV/visible light reflector 82 has a parabolic profile in FIG. 27, but its profile is not limited to the illustrated one. So far as the visible light is reflected on the inner surface of the UV/visible light reflector 82 to go toward the UV reflector 85 and reach it to the highest degree, the UV/visible light reflector 82 may have any desired profile. For example, its cross section may be square or oval.

Example 2 of the Fifth Embodiment

Figure 28:
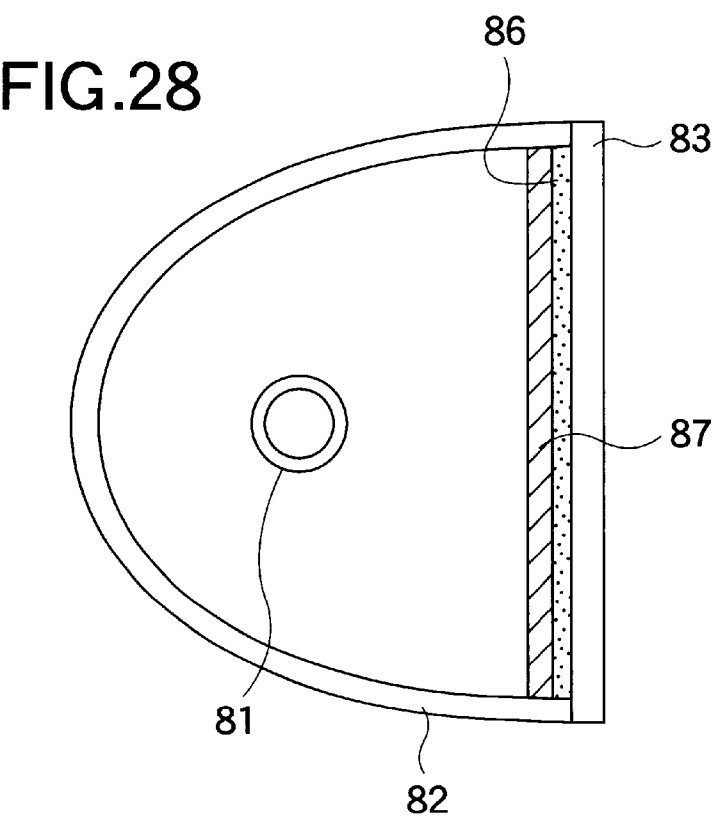
FIG. 28 shows an outline of the constitution of the light source unit of Example 2 of the fifth embodiment of the invention.

An outline of the constitution of the light source unit of this Example is described with reference to FIG. 28. FIG. 28 is a cross-sectional view of the light source unit of this Example, cut in the direction perpendicular to the axial direction of the emission tube in the unit. Like in Example 1, the space around the UV emission tube 81 is surrounded by the UV/visible light reflector 82, and a transparent glass substrate 83 is provided in the region through which the visible light from the light source is taken out of the light source unit. On the surface of the transparent substrate 83 that faces the UV emission tube 81 is coated with a visible light emitter, for example with a phosphor 86. The transparent substrate 83, when coated with nothing, may absorb UV rays, for example, it may be made of transparent sheet glass or Pyrex.

Almost all the UV rays emitted by the UV emission tube 81 are reflected by the UV/visible light reflector 82 to run toward the phosphor 86, which, after thus having received the UV rays emit visible light. Some UV rays emitted will run toward the phosphor 86 directly from the UV emission tube 81, and these are also converted to visible light by the phosphor 86. In any case, the visible light passes through the transparent substrate 83 and goes outside the light source unit. As the case may be, the surface of the phosphor 86 (that faces the UV transmission tube) may be coated with a visible light reflector 87 (for example, with a dichroic coat capable of reflecting the rays falling within a wavelength range of from 420 to 650 nm). In this case, all the visible light emitted by the phosphor 86, including that running toward the UV emission tube, is taken out of the light source unit.

Example 3 of the Fifth Embodiment

Figure 29A:
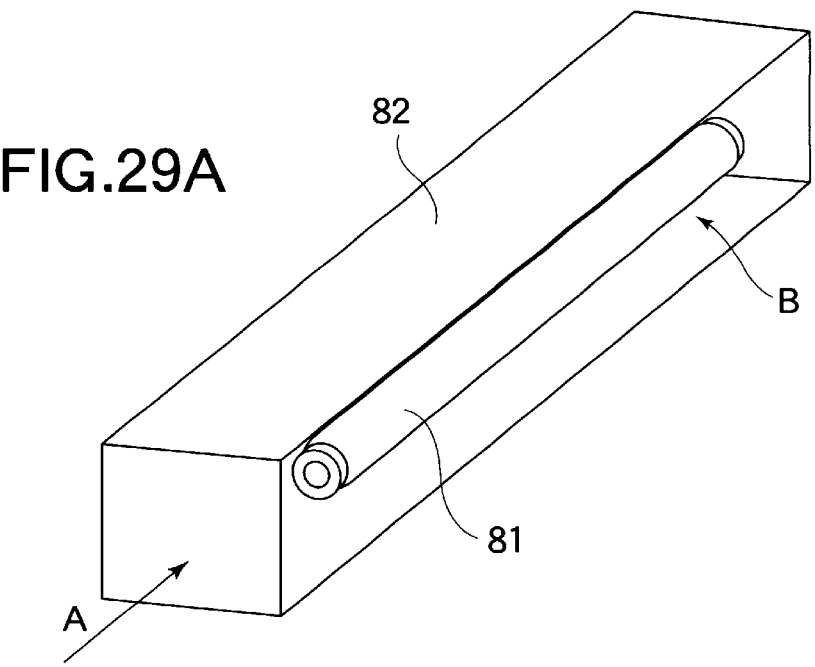
FIG. 29A to FIG. 29C show an outline of the constitution of the light source unit of Example 3 of the fifth embodiment of the invention.
Figure 29B:
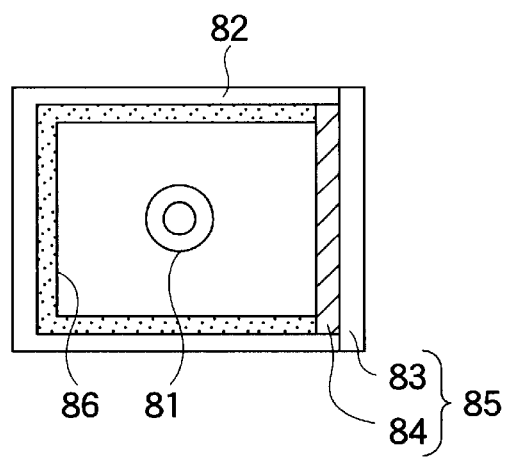
Figure 29C:
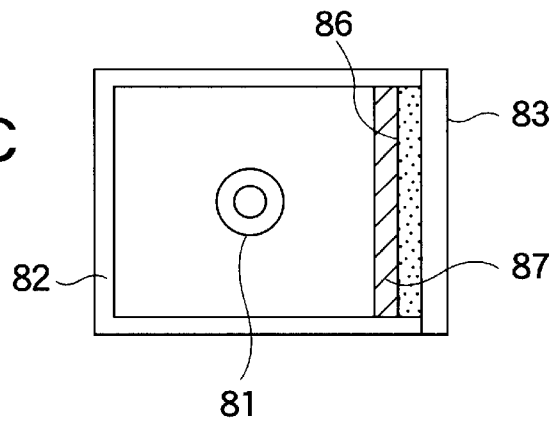

An outline of the constitution of the light source unit of this Example is described with reference to FIG. 29A through FIG. 29C. FIG. 29A is a perspective view of the light source unit of this Example; and FIG. 29B is a cross-sectional view of the light source unit seen in the direction of the arrow A drawn in FIG. 29A. FIG. 29C is a modification of the light source unit, seen in the same direction as in FIG. 29B. As illustrated, the UV emission tube 81 is long cylindrical; and a UV/visible light reflector 82 having a rectangularly U-shaped cross section surrounds the UV emission tube 81, corresponding thereto.

The visible light-emitting side of the light source unit through which the visible light goes outside the unit (see FIG. 29A) extends in the lengthwise direction of the unit, corresponding to the lengthwise direction of the UV emission tube 81. Accordingly, the UV rays emitted by the UV emission tube 81 can be efficiently converted into visible light. The constitution shown in FIG. 29B is the same as that of Example 1 shown in FIG. 27, except that the cross section of the UV/visible light reflector 82 in the former has a rectangularly U-shaped profile.

Similarly, the UV emission tube 81 in FIG. 29C is long cylindrical, and the configuration profile of the phosphor 86 extends long in the lengthwise direction of the unit, corresponding to the tube 82, so that the UV rays from the UV emission tube 81 are efficiently converted into visible light. The constitution shown in FIG. 29C is the same as that of Example 2 shown in FIG. 28, except that the cross section of the UV/visible light reflector 82 in the former has a rectangularly U-shaped profile. Also in this modification, a visible light reflector 87 may be provided on the surface of the phosphor 86 that faces the UV emission tube, like in Example 2.

Example 4 of the Fifth Embodiment

Figure 30A:
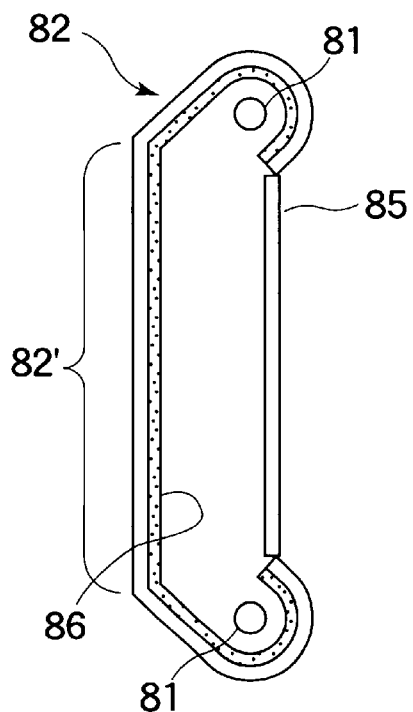
FIG. 30A and FIG. 30B show an outline of the constitution of the light source unit of Example 4 of the fifth embodiment of the invention.
Figure 30B:
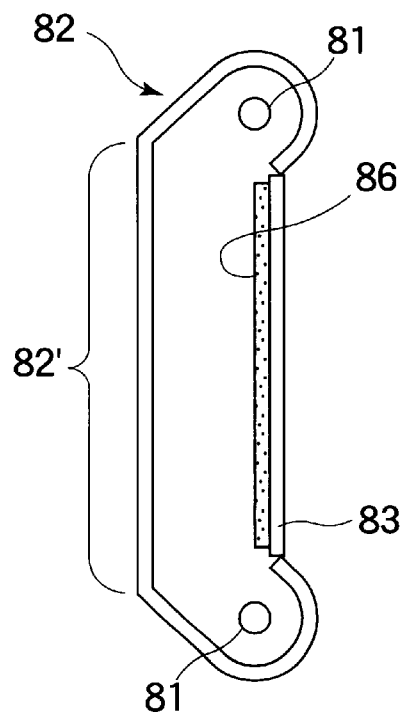

An outline of the constitution of the backlight unit of this Example is described with reference to FIG. 30A and FIG. 30B. FIG. 30A is a cross-sectional view of the light source unit of this Example, cut in the direction perpendicular to the axial direction of the emission tube in the unit. FIG. 30B is a cross-sectional view of a modification of the light source unit, cut in the direction perpendicular to the axial direction of the emission tube in the unit. The UV emission tubes 81 in FIG. 30A and FIG. 30B are spherical. A UV/visible light reflector 82 is provided to surround the space around the UV emission tubes 81, and this is so inclined that the reflected light running toward it can be efficiently directed to the reflective surface 82'. The angle of inclination is not indiscriminately determined, as depending on the length of the reflective surface 82', and it will be so defined that the quantity of visible light from the reflector 82 can be the largest.

A phosphor 86 is formed at least on the reflective surface 82' in FIG. 30A, but on the transparent glass substrate 83 that faces the reflective surface 82' in FIG. 30B. Also in this Example, a visible light reflector 85 may be provided on the phosphor 86 that faces the UV emission tubes 81.

Example 5 of the Fifth Embodiment

Figure 31:
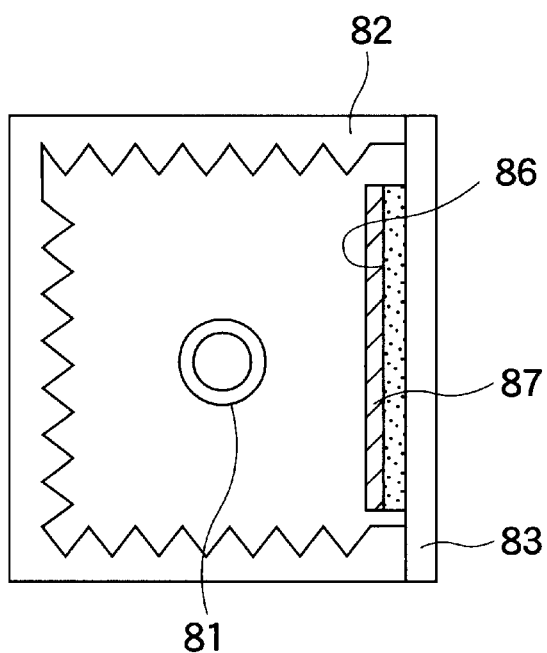
FIG. 31 shows an outline of the constitution of the light source unit of Example 5 of the fifth embodiment of the invention.

An outline of the constitution of the light source unit of this Example is described with reference to FIG. 31. FIG. 31 is a cross-sectional view of the light source unit of this Example, cut in the direction perpendicular to the axial direction of the emission tube in the unit. The light source unit of this Example is characterized in that the inner surface of the wall of the UV/visible light reflector 82 that faces the UV emission tube 81 is corrugated or notched. In other words, the inner surface of the UV/visible light 82 is not planarized.

In the constitution as above, the UV rays emitted can be unified in the space around the UV emission tube 81, and the visible light to be emitted by the phosphor 86 can be thereby unified. Needless-to-say, the inner surface of the UV/visible light reflector 82 in the above-mentioned Examples 1 to 4 may also be modified like in FIG. 31. Also in this Example, the surface of the phosphor 86 that faces the UV emission tube 81 may be coated with a visible light reflector 87.

Example 6 of the Fifth Embodiment

Figure 32A:
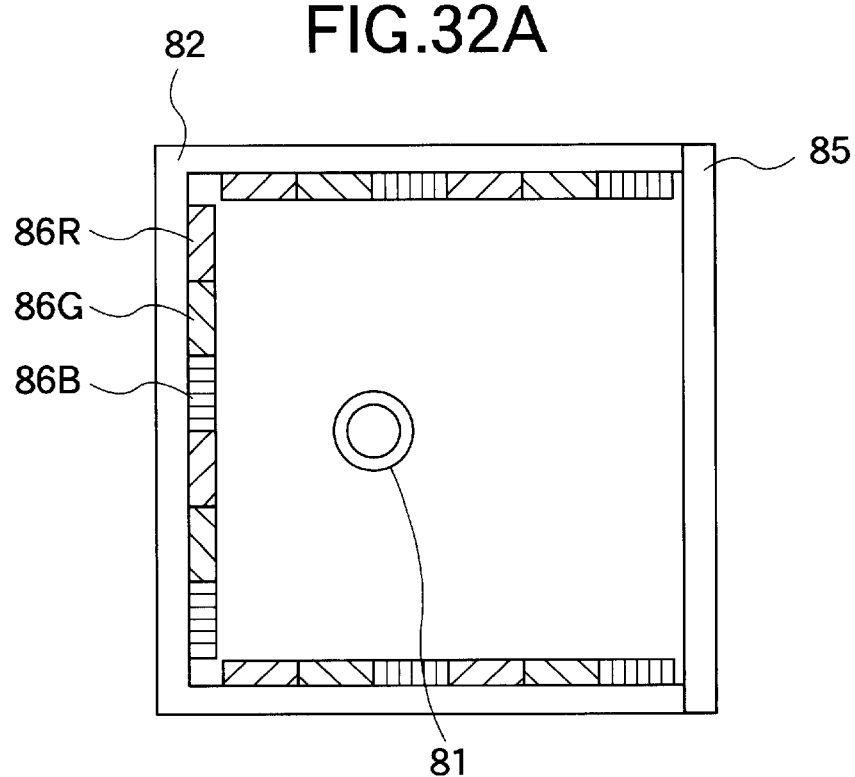
FIG. 32A and FIG. 32B show an outline of the constitution of the light source unit of Example 6 of the fifth embodiment of the invention.
Figure 32B:
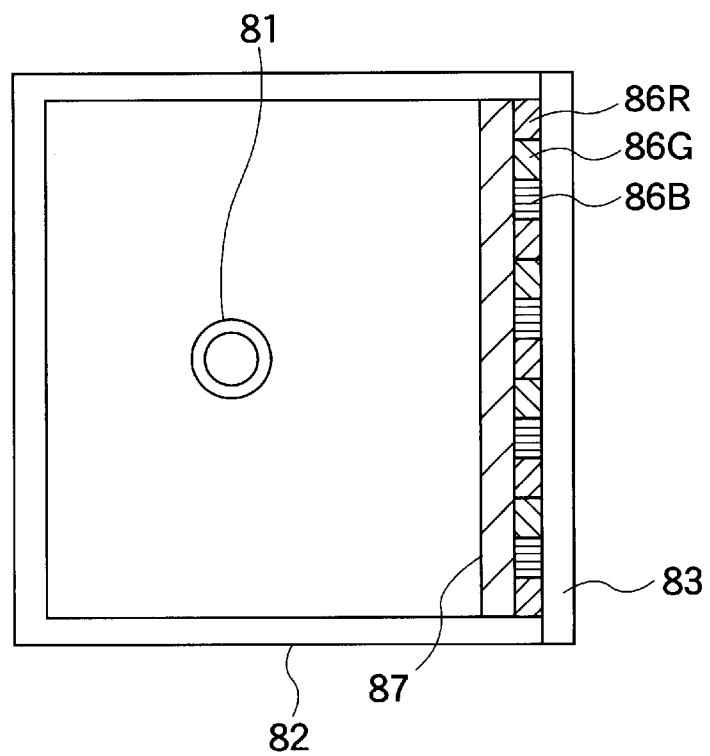

An outline of the constitution of the light source unit of this Example is described with reference to FIG. 32A and FIG. 32B. FIG. 32A and FIG. 32B each are a cross-sectional view of the light source unit of this Example, cut in the axial direction of the emission tube in the unit. The light source unit shown in FIG. 32A is characterized in that layers of red-emitting phosphor 86R, green-emitting phosphor 86G and blue-emitting phosphor 86B are alternately aligned on the inner surface of the UV/visible light reflector 82 therein.

On the other hand, the light source unit shown in FIG. 32B is characterized in that layers of red-emitting phosphor 86R, green-emitting phosphor 86G and blue-emitting phosphor 86B are alternately aligned on the inner surface of a transparent glass substrate 83 (for example, transparent sheet glass, Pyrex, quartz).

For the phosphors 86R, 86G, 86B, the same phosphor materials as those in Example 1 may be used. As not mixed with any other phosphor, each phosphor 86R, 86G, 86B ensures excellent luminous efficiency. The size of the phosphor particles to be used and the thickness of the phosphor layers to be formed shall be determined, taking the possibility of prolonging the life of the phosphors 86R, 86G, 86B into consideration. For white balance, the area ratio of the phosphors 86R, 86G, 86B may be varied. In FIG. 32B, a visible light reflector 87 may be provided on the surfaces of the phosphors 86R, 86G, 86B that face the UV emission tube 81.

In FIG. 32B, the neighboring phosphors 86R, 86G, 86B are in tight contact with each other on the entire surface of the transparent glass substrate, but some of them may be omitted.

In this Example, the phosphors 86R, 86G, 86B are aligned directly as they are, but they may be separately incorporated into UV-transmittable members. For example, quartz or fluorophosphates are used, and the phosphors are separately incorporated into melts of such substances. After the resulting melts are cooled and solidified, the solids are worked into a substrate having a predetermined shape. The technique of incorporating phosphors into UV-transmittable members is applicable to the above-mentioned Examples 1 to 5.

Example 7 of the Fifth Embodiment

Figure 33A:
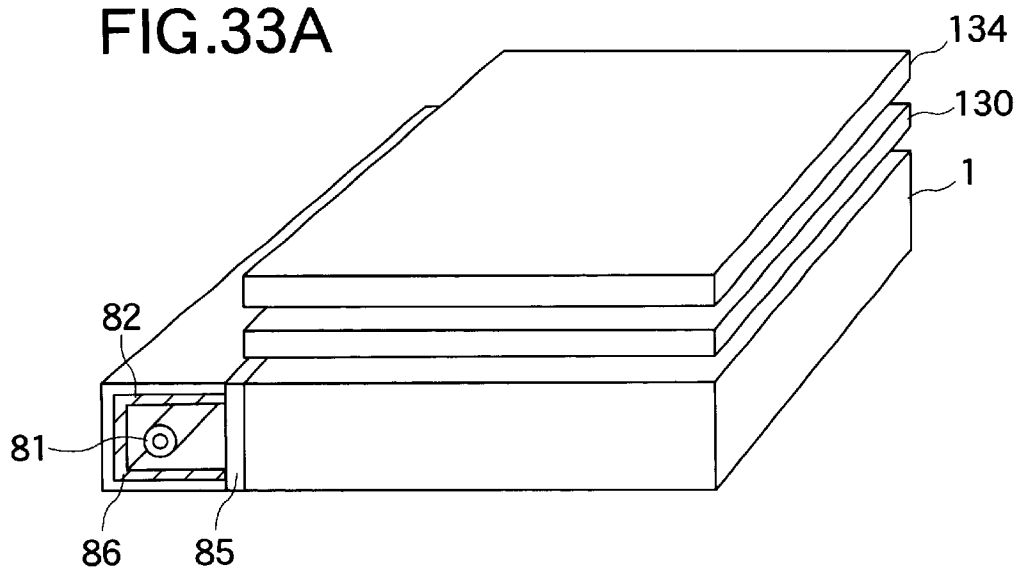
FIG. 33A and FIG. 33B show an outline of the constitution of the backlight unit and the liquid crystal display of Example 7 of the fifth embodiment of the invention.

An outline of the constitution of the backlight unit of this Example and that of a liquid crystal display comprising the unit are described with reference to FIG. 33A and FIG. 33B. This Example is to demonstrate a liquid crystal display in which is used the backlight unit having the light source unit of any of the above-mentioned Examples 1 to 6. FIG. 33A is a perspective view of a liquid crystal display, which comprises a liquid crystal panel 134, an optical sheet 130, and a backlight unit (its optical waveguide 1 and light source unit are essentially shown herein) disposed in that order from its top.

A light source unit is disposed at one end of the optical waveguide 1, horizontally thereto. The visible light emitted in the light source unit passes through the UV reflector 85 and enters the optical waveguide 1 through its one end. In FIG. 33A, the light source unit is disposed only at one end of the optical waveguide 1, but it may be disposed at the both ends thereof.

Figure 33B:
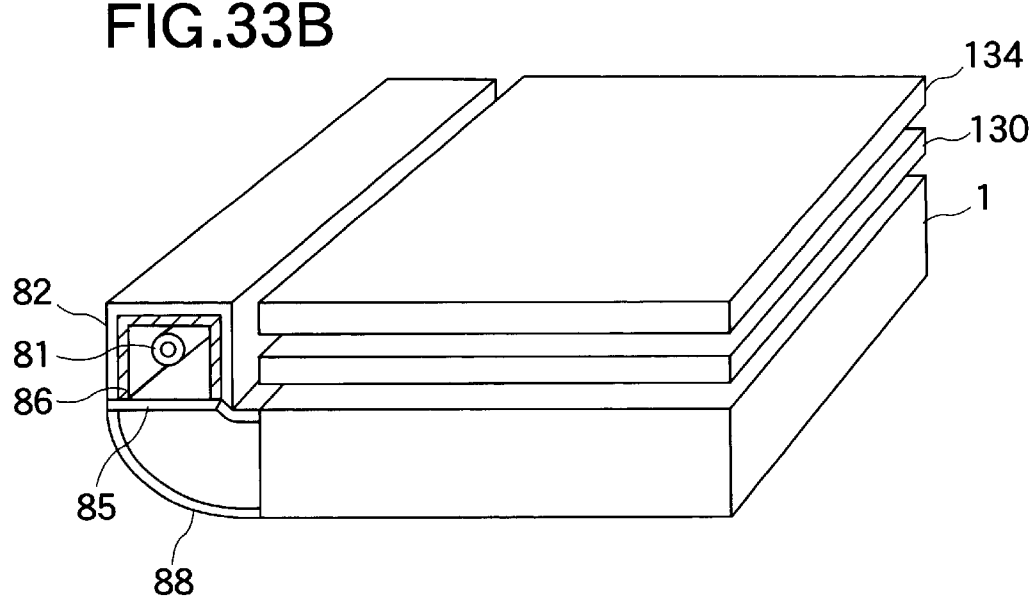

FIG. 33B is also a perspective view of a liquid crystal display, which comprises a liquid crystal panel 134, an optical sheet 130, and a backlight unit (its optical waveguide 1 and light source unit are essentially shown herein) disposed in that order from its top. The liquid crystal display shown in FIG. 33B is characterized in that the light source unit and the optical waveguide 1 are not at the same level, but each one at a different level in the oblique direction relative to the other. The UV reflector 85 of the light source unit is connected with the optical waveguide 1 via a visible ray reflector sleeve 88 provided therebetween, and the visible light having passed through the UV reflector 85 is, without being wasted, led into the optical waveguide 1 after having passed through the visible light reflector sleeve 88.

Example 8 of the Fifth Embodiment

Figure 34:
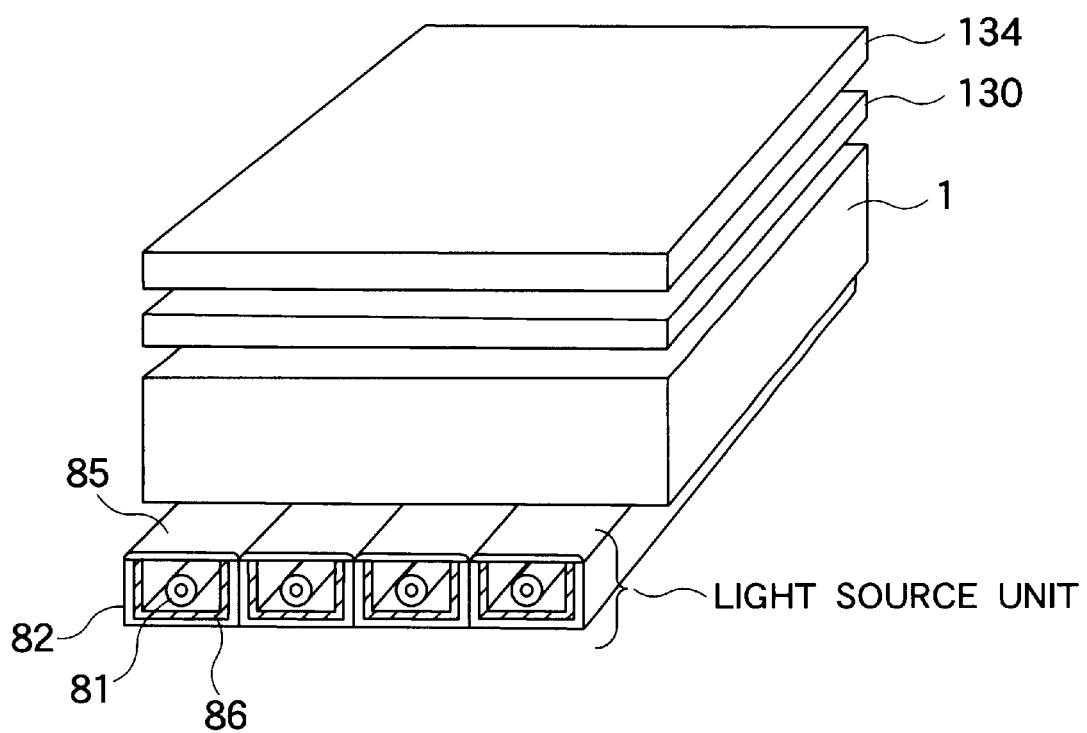
FIG. 34 shows an outline of the constitution of the backlight unit and the liquid crystal display of Example 8 of the fifth embodiment of the invention.

An outline of the constitution of the backlight unit of this Example and that of a liquid crystal display comprising the unit are described with reference to FIG. 34. This Example is to demonstrate a liquid crystal display in which is used the backlight unit having the light source unit of any of the above-mentioned Examples 1 to 6. FIG. 34 is a perspective view of a liquid crystal display, which comprises a liquid crystal panel 134, an optical sheet 130, an optical waveguide 1 and a light source unit disposed in that order from its top.

In this Example, the backlight unit is a direct-light-type unit in which the light source unit is disposed below the optical waveguide 1. In this, a plurality of the light source units of any of Examples 1 to 6 are aligned, with their UV reflectors 85 all facing the optical waveguide 1, to constitute one integrated light source unit. Being so constituted, this realizes a high-efficiency direct-light-type backlight unit.

Example 9 of the Fifth Embodiment

Figure 35A:
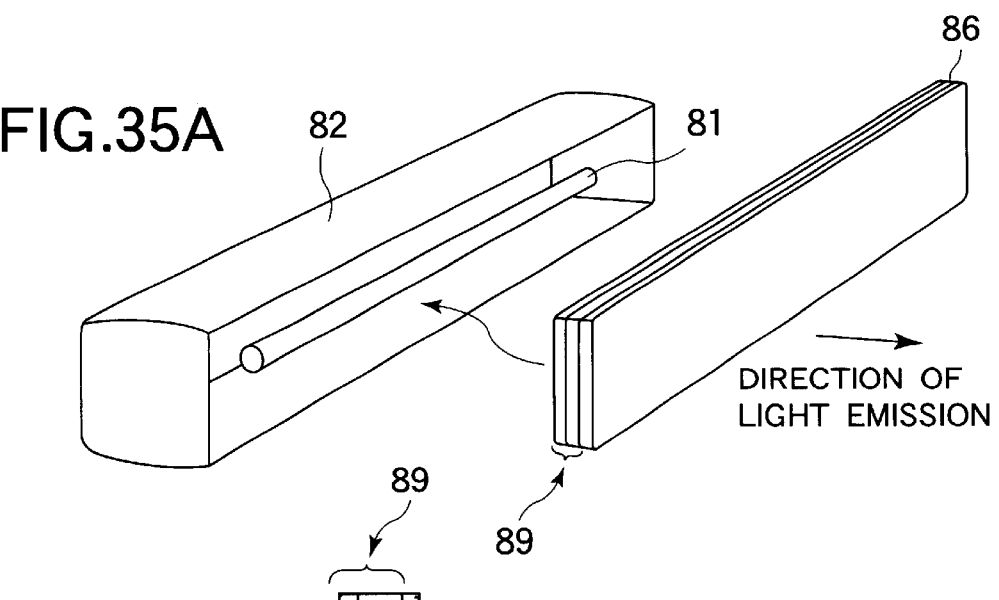
FIG. 35A to FIG. 35D show an outline of the constitution of the light source unit of Example 9 of the fifth embodiment of the invention.

An outline of the constitution of the light source unit of this Example is described with reference to FIG. 35A through FIG. 35D. FIG. 35A is a perspective view of the light source unit of this Example. As in FIG. 35A, a UV fluorescent lamp 81 is disposed inside the UV/visible light reflector 82.

Figure 35B:
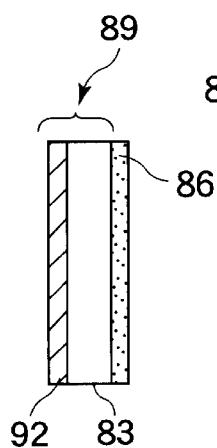

FIG. 35B is a cross-sectional view of the light-emitting side of the unit, cut in the direction perpendicular to the axial direction of the UV fluorescent lamp 81. As in FIG. 35B, the light-emitting side of the unit is in the form of a laminate composed of a visible light-reflective/UV-transmittable member 89 (this reflects visible light and transmits UV rays) and a visible light emitter, for example, a phosphor 86.

Also as in FIG. 35B, the visible light-reflective/UV-transmittable member 89 is formed of a UV-transmittable glass substrate 83 (for example, quartz glass, etc.) of which the light-receiving surface is coated with a dichroic coat 92 that transmits visible light and IR light (its transmittance is, for example, at least 90%). The light-emitting surface of the glass substrate 83 (for example, quartz glass, etc.) is coated with a phosphor 86.

Figure 35C:
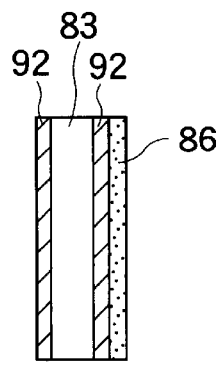

FIG. 35C is a modification of the visible light-reflective/UV-transmittable member 89, seen in the same direction as that for FIG. 35B. In this modification, the dichroic coat 92 is formed on the both surfaces of the glass substrate 83; and the light-emitting surface of the glass substrate 83 is further coated with a phosphor 86 via the underlying dichroic coat 92 therebetween.

The visible light-reflective/UV-transmittable member 89 is disposed to face the UV emission tube 81, as in FIG. 35A. In this structure, the UV rays emitted by the emission tube 81 are, directly or after having been reflected by the UV/visible light reflector 82, reach the visible light-reflective/UV-transmittable member 89. At least 90% of the UV rays thus having reached the member 89 are, without being absorbed/reflected, enter the phosphor 86. With that, the phosphor 86 emits visible light. A part of the thus-emitted visible light runs toward the UV emission tube 81, but is reflected by the dichroic coat 92 formed on the visible ray-reflective/UV-transmittable member 89 and goes back to the light-emitting direction.

Figure 35D:
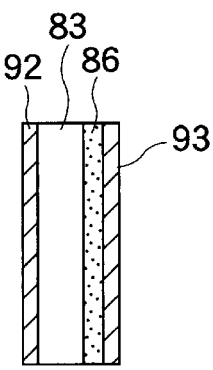

FIG. 35D is another modification of the visible light-reflective/UV-transmittable member 89, seen in the same direction as that for FIG. 35B. This is composed of a dichroic coat 92 capable of transmitting visible light only or transmitting visible light and IR light, a glass substrate 83, a phosphor 86, and a visible light-transmittable/UV-reflective (or absorptive) member 93 in that order from the side facing the UV emission tube 81. The visible light-transmittable/UV-reflective (or absorptive) member 93 may be made of, for example, a dichroic coat capable of transmitting light falling within a wavelength range of from 420 to 650 nm and capable of reflecting light of which the wavelength is not longer than 420 nm, or may be made of a glass substrate capable of transmitting at least light falling within a wavelength range of from 420 to 650 nm and capable of reflecting or absorbing light of which the wavelength is not longer than 420 nm (transparent sheet glass, blue sheet glass, BK7 or SF-type optical glass or the like, and it may be further coated with an AR coat).

Apart from the constitution mentioned above, a member of which the refractive index (real number or imaginary number) in the UV zone is far larger than the refractive index (real number or imaginary number) in the visible zone may be used for the visible light-reflective/UV-transmittable member 89.

Needless-to-say, the light source unit of this Example is applicable to the backlight unit and the liquid crystal display of Examples 7 and 8.

Example 10 of the Fifth Embodiment

Figure 36:
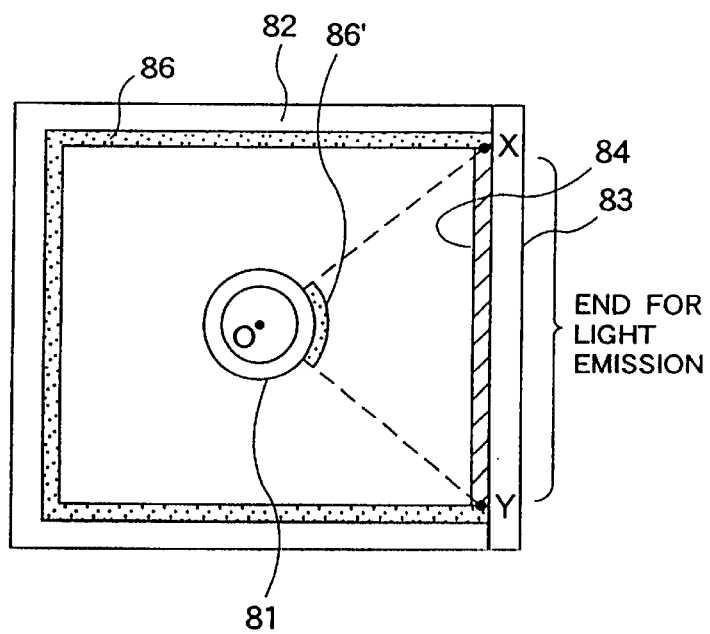
FIG. 36 shows an outline of the constitution of the light source unit of Example 10 of the fifth embodiment of the invention.

An outline of the constitution of the light source unit of this Example is described with reference to FIG. 36. FIG. 36 is a cross-sectional view of the light source unit of this Example, cut in the direction perpendicular to the axial direction of the emission tube in the unit. This Example is characterized in that a part of the outer surface of the UV emitter 81 is coated with a phosphor 86'.

The region to be coated with the phosphor 86' shall fall within the range of the angle formed by connecting the center point O of the UV emitter 81 with the two upper and lower edge points X, Y of the open end through which the visible light emitted is taken outside. Of the UV rays emitted by the UV emitter 81, those falling within the defined range are converted into visible light by the phosphor 86' provided on the outer surface of the UV emitter 81, and most of the thus-converted visible light runs toward the open end and is taken outside through it. Therefore, the visible light takeout efficiency of this constitution is high.

On the other hand, of the UV rays emitted by the UV emitter 81, those not falling within the defined range run toward the UV/visible light reflector 82 that surrounds the open end, and are converted into visible light by the phosphor 86 provided on the reflective surface of the UV/visible light reflector 82. Then, the thus-converted visible light is reflected by the UV/visible light reflector 82, then runs toward the open end and is taken outside. In FIG. 36, the range of the angle X-O-Y is defined, but is not limited to the illustrated area. The region of the UV emitter 81 to be coated with the phosphor 86' may be controlled so as to realize the highest visible light takeout efficiency, depending on the tube size of the UV emitter 81 and the size of the open end and also on the size of the UV/visible light reflector 82.

In FIG. 36, one UV emitter 81 is used. If desired, a plurality of UV emitters may be used. The inner surface of the UV/visible light reflector 82 is not limited to a flat one; and it may be coated with different phosphors 86 for different emission zones.

As described hereinabove, the phosphor area can be enlarged to a satisfactory degree in this embodiment. Therefore, in this, the particle size and the density of the phosphor particles to be used and also the thickness of the phosphor layer to be formed can be optimized to thereby prolong the life of the light source unit and increase the brightness of the unit. In addition, even when the emission tube used is downsized to reduce the overall thickness of the display unit comprising it, the phosphor area can still be kept large. Therefore, this embodiment realizes thin-walled display devices, not detracting from their brightness.

As described in detail hereinabove with reference to its embodiments, the present invention realizes backlight units not involving the problem that the emitted light leaks out of the optical waveguide, even when the space around the cold-cathode tubes in the light source unit for them is filled with a liquid of which the refractive index is nearly the same as that of the glass material that forms the outer wall of the cold-cathode tubes.

In addition, in the invention, the light from the cold-cathode tubes is efficiently reflected toward the optical waveguide. Moreover, the invention realizes backlight units enough for practical use even though the luminous efficiency of the cold-cathode tubes therein is low. Further in the invention, the luminous efficiency of the cold-cathode tubes used is increased.

Sixth Embodiment of the Invention

Figure 46:
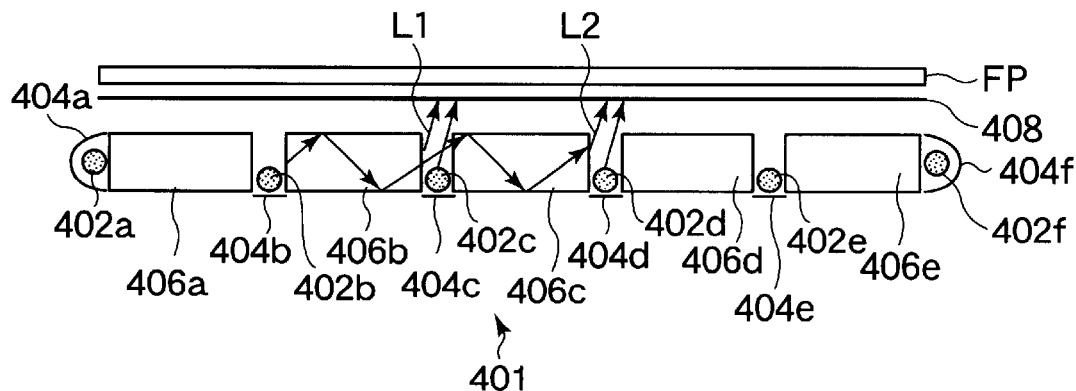
FIG. 46 shows an outline of the basic constitution of the lighting unit of the sixth embodiment of the invention, illustrating the cross-sectional view of the lighting unit disposed adjacent to the surface of the liquid crystal panel FP to be illuminated by it.

The lighting unit of the sixth embodiment of the invention is described with reference to FIG. 46 to FIG. 68. Referring to FIG. 46, first described is the outline of the basic constitution of the lighting unit of this embodiment. FIG. 46 is a cross-sectional view showing the outline of the lighting unit 401 of this embodiment, disposed adjacent to the surface of a flat panel FP such as a liquid crystal panel (hereinafter this is referred to as a liquid crystal panel as a generic term) to be illuminated by it. The lighting unit 401 has a plurality of optical waveguides 406a to 406e that are spaced from each other. On the both sides of each of these optical waveguides 406a to 406e, disposed are a plurality of emission tubes (cold-cathode tubes) 402*a* to 402*f*. The cold-cathode tubes 402*a* to 402*f* are on the side of the back surfaces of the optical waveguides 406*a* to 406*e* that are opposite to the light-emitting surfaces thereof adjacent to the surface of the liquid crystal panel FP to be illuminated by the lighting unit. Below the cold-cathode tubes 402*b* to 402*e* opposite to the liquid crystal panel FP, provided are a plurality of reflectors 404*b* to 404*e* that reflect the light from the cold-cathode tubes 402*b* to 402*e* toward the optical waveguides 406*a* to 406*e* or directly toward the diffuser 408. On one side of each of the optical waveguides 406*a*, 406*e*, disposed are cold-cathode tubes 402*a*, 402*f*, and reflectors 404*a*, 404*f*. The diffuser 408 is disposed between the optical waveguides 406*a* to 406*e* and the liquid crystal panel FP.

The lighting unit 401 of this embodiment having the basic constitution as above may be considered as a backlight structure of a combination of a side light-type unit and a direct-light-type unit, or may be considered as a backlight structure with a plurality of sidelight-type backlight units aligned along the surface of the liquid crystal panel FP. In this basic structure illustrated, the number of emission tubes can be increased more than in a conventional sidelight-type backlight structure, to thereby increase the luminance of the lighting unit.

In this structure, the cold-cathode tubes 402*a* to 402*f* are disposed between the optical waveguides 406*a* to 406*e* and they are on the side of the back surfaces of the optical waveguides 406*a* to 406*e* that are opposite to the light-emitting surfaces thereof. In this, therefore, even if any of the cold-cathode tubes 402*a* to 402*f* are aged, the others can still emit light and the thus-emitted light runs through the optical waveguides 406*a* to 406*e* to compensate for the light quantity insufficiency. For example, between the cold-cathode tubes 402*b*, 402*c*, the optical waveguide 406*b* is disposed. Therefore, most of the light emitted by the cold-cathode tube 402*b* passes through the optical waveguide 406*b* and illuminates the area around the neighboring cold-cathode tube 402*c*. Accordingly, even if the cold-cathode tube 402*c* is aged and the quantity of light from it is lowered, the light from the other cold-cathode tubes 402*a*, 402*b*, 402*d*, 402*e*, etc. can pass through the optical waveguides 406*a* to 406*e* and reaches the area around the cold-cathode tube 402*c*. As compared with conventional direct-light-type backlight structures, therefore, the lighting unit of this embodiment is free from luminance fluctuation.

The lighting unit of this embodiment is described more concretely with reference to the following Examples.

Example 6-1

Figure 47:
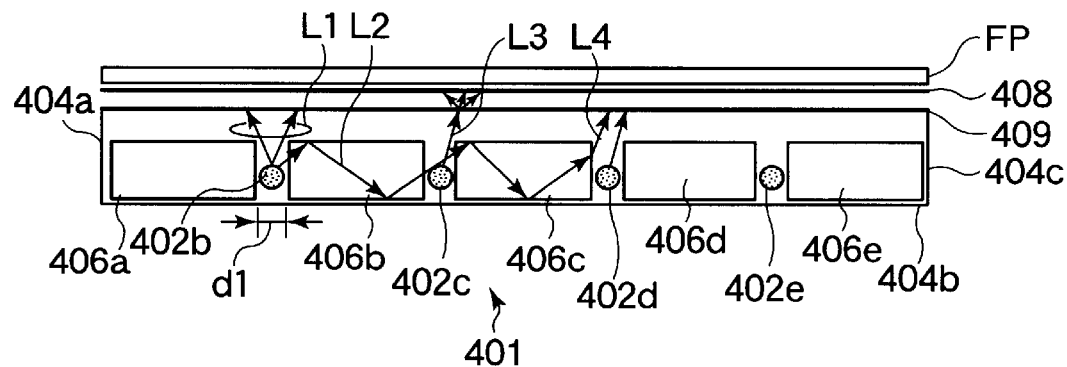
FIG. 47 shows an outline of the lighting unit of Example 6-1 of the sixth embodiment of the invention, illustrating the cross-sectional view of the lighting unit disposed adjacent to the surface of the liquid crystal panel FP to be illuminated by it.

FIG. 47 is referred to for Example 6-1 of this embodiment. FIG. 47 is a cross-sectional view showing the outline of the lighting unit 401 of this Example, in which the lighting unit is disposed adjacent to the surface of the liquid crystal panel FP to be illuminated by it. The lighting unit 401 has a plurality of optical waveguides 406*a* to 406*e* that are spaced from each other. On the both sides of the optical waveguides 406*b*, 406*c*, 406*d*, disposed are cold-cathode tubes 402*b*, 402*c*, 402*d*, 402*e* in that order. The structure of FIG. 47 differs from the basic structure of FIG. 46. In this, cold-cathode tubes 402*a*, 402*f* are not disposed on the outer side of the optical waveguides 406*a*, 406*e*.

Figure 43:
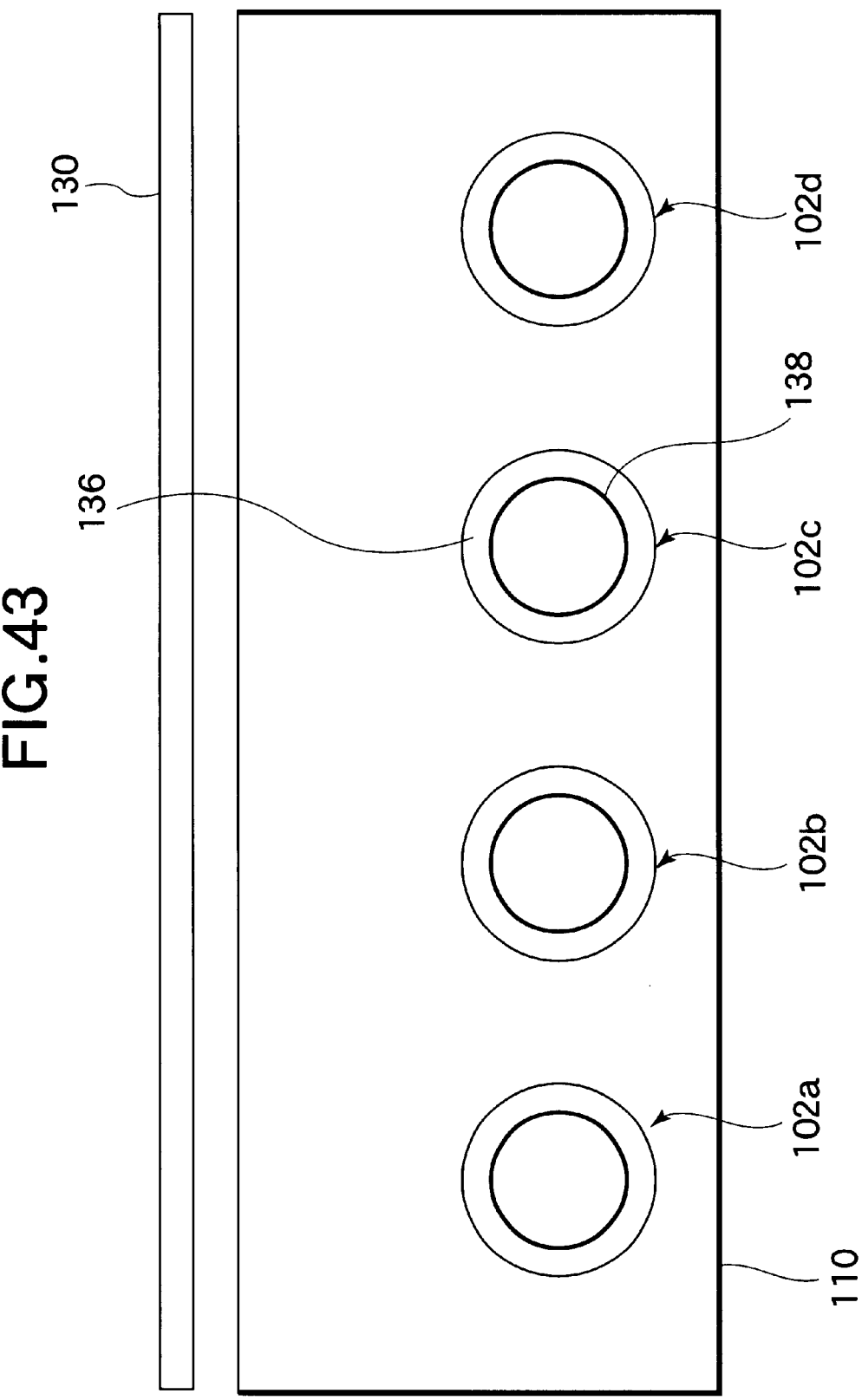
FIG. 43 shows an outline of the constitution of a conventional backlight unit.
Figure 44A:
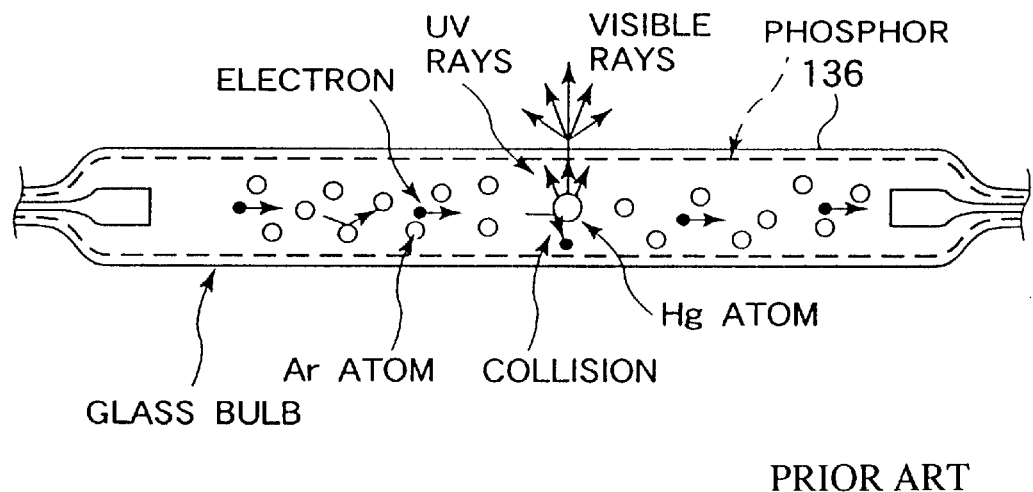
FIG. 44A and FIG. 44B are to explain the problem with the conventional backlight unit.
Figure 44B:
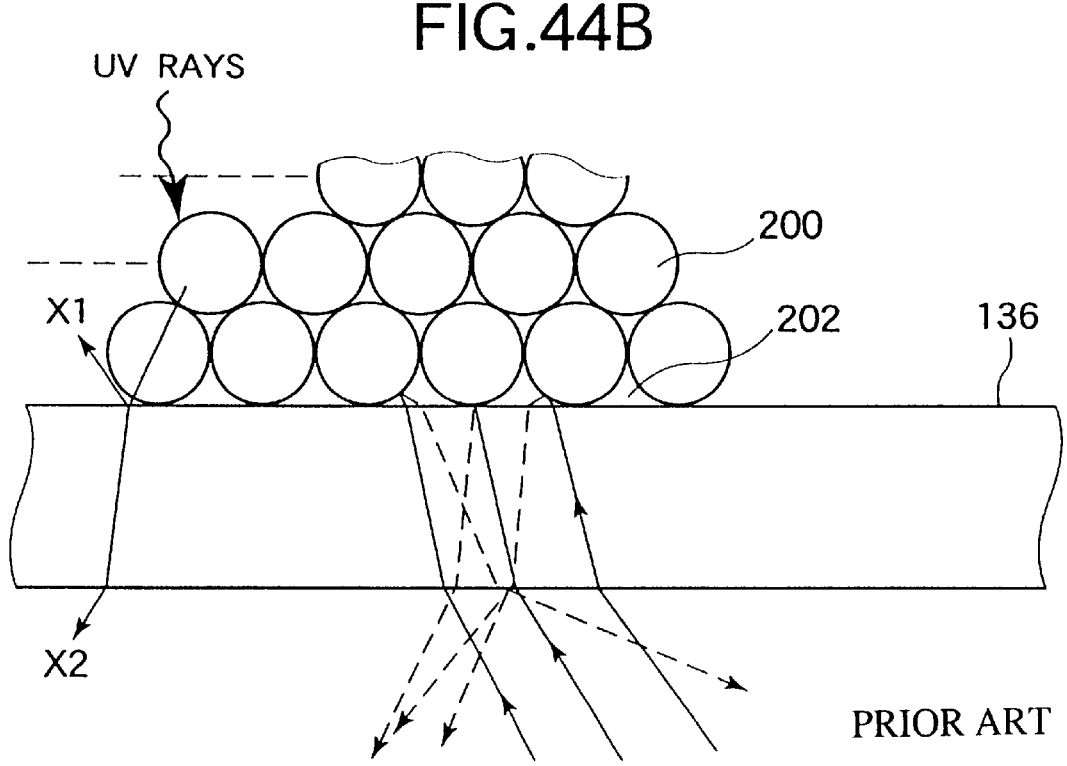
Figure 45:
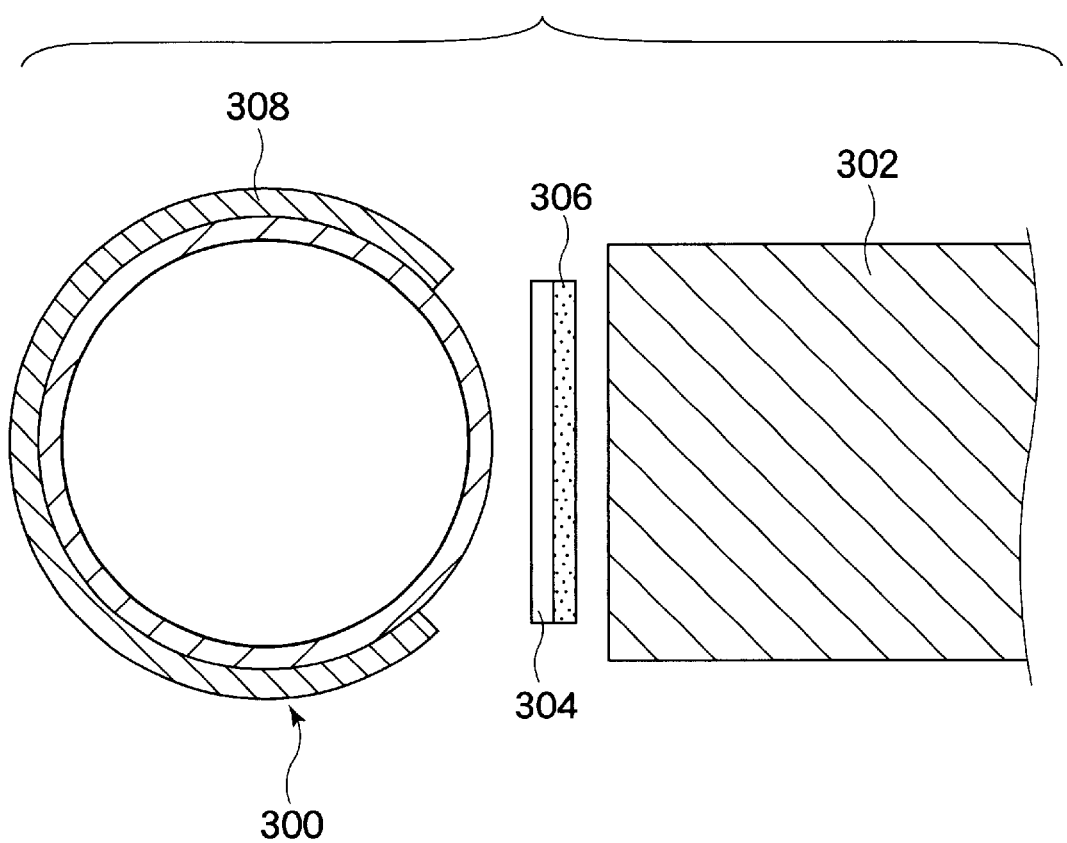
FIG. 45 shows an outline of the constitution of a conventional backlight unit.

The reflector 404 (404*a*, 404*b*, 404*c*, 404*d*, 404*e* and 404*f*) may have the same constitution as that of the reflector 110 in the conventional direct-light-type lighting unit shown in FIG. 43. As in FIG. 47, a reflector 404*a* is disposed adjacent to the left side of the optical waveguide 406*a*; a reflector 404*c* is adjacent to the right side of the optical waveguide 406*e*; and a reflector 404*b* is disposed to entirely cover the lower surface of the lighting unit including the area of the cold-cathode tubes 402*b* to 402*e*. The reflector 404*b* reflects the light from the cold-cathode tubes 402*b* to 402*e* toward the optical waveguides 406*a* to 406*e* or directly toward the diffuser 409. In this Example, two diffusers 408, 409 are disposed in parallel with each other between the liquid crystal panel FP and the optical waveguides 406*a* to 406*e*.

The outer diameter, d, of the cold-cathode tubes 402*b* to 402*e* sandwiched between the optical waveguides 406*a* to 406*e* may be, for example, d=2.6 mm. The optical waveguides 406*a* to 406*e* may be, for example, thin acrylic plates having a size of 5 mm (thickness)×90 mm (width). The distance, d1, between the neighboring plates between which the cold-cathode tube 402 is sandwiched may be, for example, d1=5 mm. The reflectors 404*a* to 404*c* may be made of a reflective plate of which the inner surface that surrounds the optical waveguides 406*a* to 406*e* and the cold-cathode tubes 402*b* to 402*e* is white. The layered two diffusers 408, 409 may be spaced from the optical waveguides 406*a* to 406*e*, for example, by 20 mm.

For example, the light emitted by the cold-cathode tube 402*b* is divided into two components, L1 that runs directly toward the diffusers 408, 409 through the space between the optical waveguides 406*a* and 406*b*, and L2 that enters the optical waveguide 406*b*. The ratio of the quantity of light of the component L1 to that of the component L2 will be determined, depending on the dimensional ratio of the optical waveguides 406*a*, 406*b* to the cold-cathode tube 402*b*. In this Example, the component L1 accounts for about 40% of the emitted light, and the component L2 accounts for the remaining, about 60% thereof, and this enters the optical waveguides 406*a*, 406*b* through their side surfaces.

The component L2 having run through the optical waveguide 406*b* is further divided into two components L3, L4, going further toward the diffusers 408, 409. The component L3 is, after having gone out of the optical waveguide 406*b*, enters the cold-cathode tube 402*c*, on which this is scattered and reflected to run toward the diffusers 408, 409 through the space between the optical waveguides 406*b* and 406*c*. The component 1, 4 is, after having gone out of the optical waveguide 406*c*, directly led toward the diffusers 408, 409, through the space between the optical waveguides 406*c* and 406*d*.

Like the light quantity ratio of L1:L2, the ratio of the component L3 to the component L4 may be determined, depending on the dimensional ratio of the optical waveguides 406 to the cold-cathode tubes 402. In this Example, the component L3 accounts for about 25%, and the component L4 accounts for about 40%. The remaining 35% of the light enters the next optical waveguide 406*d*, and runs in the same manner as before.

In the manner as described, the light emitted by the cold-cathode tube 402*b* reaches the neighboring cold-cathode tubes 402*c* to 402*e* via the optical waveguides 406*a* to 406*e*, and runs toward the diffusers. Accordingly, the light running toward the diffusers through the space between the optical waveguides 406*a* to 406*e* is not only the light from the cold-cathode tubes 402*b* to 402*e* themselves disposed in that space but also the light from the neighboring cold-cathode tubes 402*b* to 402*e*.

The light having passed through the space between the optical waveguides 406*a* to 406*e* goes on, while expanding, and enters the diffusers 408, 409. The diffusers 408, 409 thus having received the light scatters it in every direction, while about ½ of the light having reached them is reflected and scattered by them. The reflected and scattered light is further reflected by the reflector 404b via the optical waveguides 406a to 406e and the cold-cathode tubes 402b to 402e, and then again passes through the optical waveguides 406a to 406e and the cold-cathode tubes 402b to 402e to reach the diffusers 408, 409, and a half of the light thus having reached the diffusers 408, 409 is led toward the liquid crystal panel FP. In this case, the distance between the diffusers 408, 409, the diffusing characteristics of the diffusers, the distance between the two diffusers and the reflector 404b, and the distance between the neighboring cold-cathode tubes 402b to 402e are suitably controlled to evade luminance fluctuation in the lighting unit.

However, the characteristics of the cold-cathode tubes 402b to 402e may vary with the lapse of time, and may differ among the individual tubes. Therefore, though not so significant like those in conventional direct-light-type backlight structures, the cold-cathode tubes in the structure of this Example not causing any problem in the initial stage of use will cause a problem of luminance fluctuation after used for long. In this Example, a specific measure is taken to solve this problem. This is described below.

One case where the quantity of light from a certain cold-cathode tube 402 is lowered to 70% is discussed with respect to the in-plane luminance fluctuation, comparing a backlight to which this Example is applied with an ordinary direct-light-type backlight to which it is not applied. (1) In the ordinary direct-light-type backlight unit, the quantity of light decreases to about 70%, and this light quantity depression is nearly the same as that in the aged cold-cathode tube. (2) In the backlight of this Example, however, the quantity of light decreases to about 88%. This is because, though the light (40%) running from the cold-cathode tubes 402b to 402e directly toward the diffusers 408, 409 decreases to 28%, the quantity of light (60%) from the neighboring cold-cathode tubes 402b to 402e that runs through the optical waveguides 406a to 406e does not vary. Accordingly, in this Example, even when any of the cold-cathode tubes 402b to 402e is aged to emit a lowered quantity of light, its influence on the luminance of the lighting unit could be almost negligible, and, as a result, the lighting unit all the time ensures uniform light emission and has a prolonged life.

Example 6-2

Figure 48:
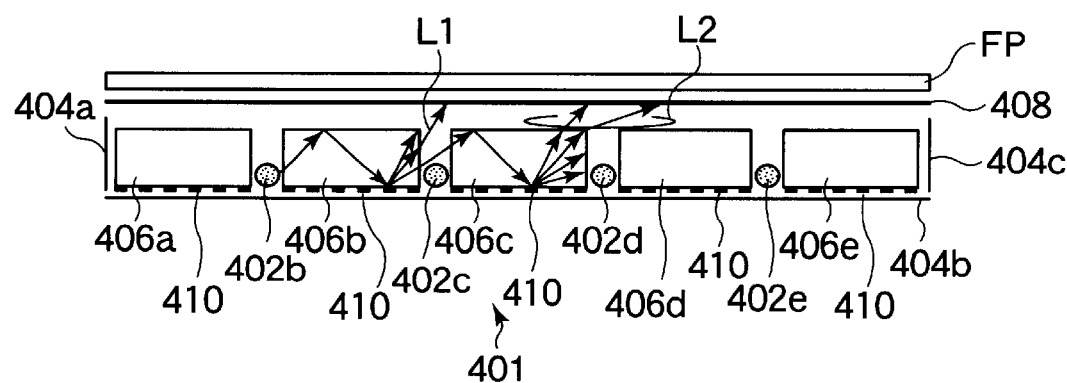
FIG. 48 shows an outline of the lighting unit of Example 6-2 of the sixth embodiment of the invention, illustrating the cross-sectional view of the lighting unit disposed adjacent to the surface of the liquid crystal panel FP to be illuminated by it.

Example 6-2 of this embodiment is described with reference to FIG. 48. FIG. 48 is a cross-sectional view showing the outline of the lighting unit 401 of this Example, in which the lighting unit is disposed adjacent to the surface of the liquid crystal panel FP to be illuminated by it. The lighting unit 401 of this Example is similar to but partly differs from that of Example 6-1, and this is characterized in that a diffusion pattern 410 of a diffusion layer which acts to vary the angle of the light running through the optical waveguides is provided on every back surface of the optical waveguides 406a to 406e, and that, among the diffusers 408 and 409, the diffuser 409 is removed and only the diffuser 408 is provided. The other constituent elements of this Example are the same as those of Example 6-1, and describing them is therefore omitted herein.

The light having been emitted by the cold-cathode tubes 402b to 402e and having entered the optical waveguides 406a to 406e run through them, while being totally reflected inside the optical waveguides 406a to 406e, but the light having entered the diffusion pattern 410 formed on every back surface of the optical waveguides 406a to 406e is diffusively reflected. As a result, about ¼ of the light running through the optical waveguides does not satisfy the total reflection condition, and goes out through the light-emitting surfaces of the optical waveguides 406a to 406e to reach the diffuser 408. This is the same principle as that in a conventional sidelight-type backlight structure.

For example, the light emitted by the cold-cathode tube 402b runs through the optical waveguides 406a to 406e, whereby it can go out in a broad range, like the rays L1, L2. Similarly, the light emitted by the cold-cathode tubes 402b to 402e runs through the optical waveguides 406a to 406e and reaches the diffuser 408 in a broad range. Accordingly, different rays having been emitted by the plurality of cold-cathode tubes 402b to 402e are mixed on a point of the optical waveguides 406a to 406e and go out through it.

Controlling the size and the density of the diffusion pattern 410 will make the optical waveguides 406a to 406e emit almost uniform light through their light-emitting surfaces. Accordingly, in this Example, only one diffuser 408 will be enough for uniform light emission, though the structure of Example 6-1 requires the two diffusers 408, 409. As compared with that in the structure of Example 6-1, the light component that goes out through the light-emitting surfaces of the optical waveguides 406a to 406e to reach the diffuser 408, not so much influenced by the different light-emitting characteristics of the cold-cathode tubes 402b to 402e, increases in the structure of this Example. Therefore, even though only one diffuser 408 is provided herein, the lighting unit of this Example is free from the problem of luminance fluctuation to be caused by the individual difference in the intensity of light emission from the cold-cathode tubes 402b to 402e and by the time-dependent change of light emission from them.

Example 6-3

Figure 49:
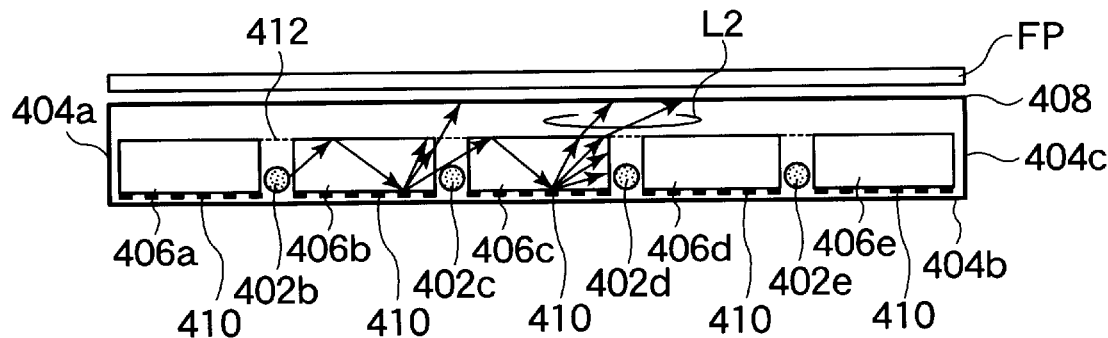
FIG. 49 shows an outline of the lighting unit of Example 6-3 of the sixth embodiment of the invention, illustrating the cross-sectional view of the lighting unit disposed adjacent to the surface of the liquid crystal panel FP to be illuminated by it.
Figure 50:
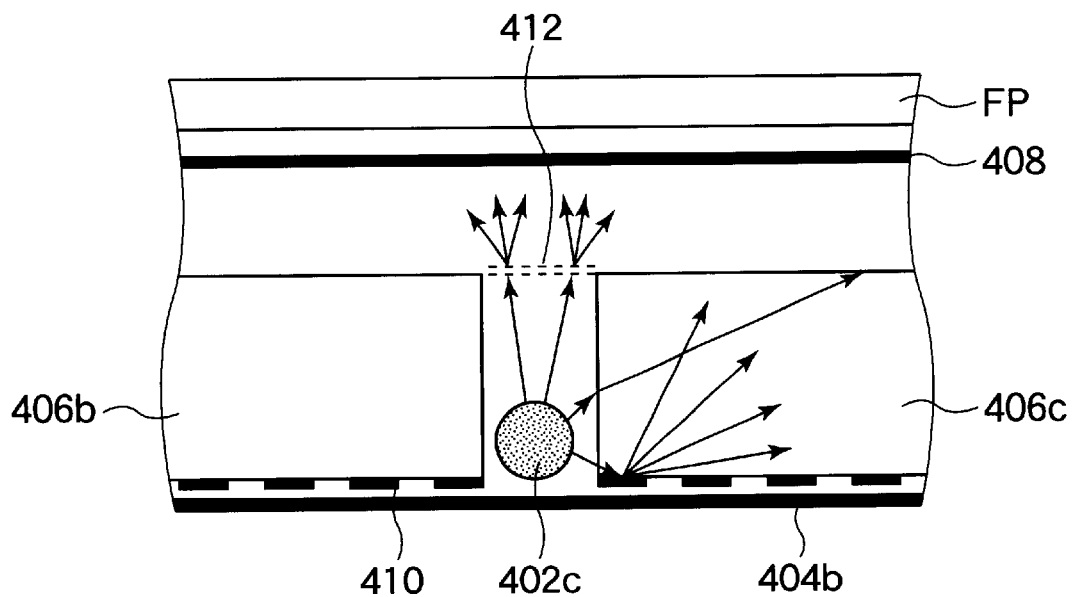
FIG. 50 is a partly enlarged view around the cold-cathode tube 402c in the lighting unit of Example 6-3 of the sixth embodiment of the invention.

Example 6-3 of this embodiment is described with reference to FIG. 49 to FIG. 52. FIG. 49 is a cross-sectional view showing the outline of the lighting unit 401 of this Example, in which the lighting unit is disposed adjacent to the surface of the liquid crystal panel FP to be illuminated by it. FIG. 50 is a partly enlarged view around the cold-cathode tube 402c in this lighting unit. The lighting unit 401 of this Example is similar to but partly differs from that of Example 6-2, and this is characterized in that a diffuser 412 serving as a light-scattering element is disposed in the space sandwiched between the light-emitting surfaces of the neighboring optical waveguides 406a to 406e. The other constituent elements of this Example are the same as those of Example 6-2, and describing them is therefore omitted herein.

In the structure of the above-mentioned Example 6-2, the density of the light emitted by the cold-cathode tubes 402b to 402e to run directly toward the diffuser 408 is larger than that of the light going toward the diffuser 408 through the light-emitting surfaces of the optical waveguides 406a to 406e. In this Example, the diffuser 412 is disposed in the space sandwiched between the light-emitting surfaces of the neighboring optical waveguides 406a to 406e. The diffuser 412 reduces the quantity of light directly running toward the diffuser 408 from the cold-cathode tubes 402b to 402e, to about ½, and the remaining, about ½ of the light is diffused and reflected by the diffuser 412. The thickness of the diffuser 412 is less than about ⅓ of that of the optical waveguides 406a to 406e. Almost all the component of the light reflected by the diffuser 412 enters the optical waveguides 406a to 406e, and a part of it is scattered by the diffusion pattern 410 and goes out through the light-emitting surfaces of the optical waveguides 406a to 406e to reach the diffuser 408. In that manner, the difference between the density of the light to be emitted through the light-emitting surfaces of the optical waveguides 406a to 406e and that of the light to be emitted through the space between the optical waveguides 406a to 406e can be reduced, and, as a result, the influence of the difference in light emission between the cold-cathode tubes 402b to 402e on displays can be further reduced.

In this Example, the diffuser 412 is disposed in the space sandwiched between the light-emitting surfaces of the neighboring optical waveguides 406a to 406e. In place of the diffuser 412, an anisotropic diffuser (anisotropic light-scattering element) of which the light-diffusing ability varies depending on the direction of the light entering it may be disposed in that space. In place of the thin diffuser 412, such an anisotropic light-scattering element can diffuse the direct light from the cold-cathode tubes 402b to 402e to unify it, not interfering with the passage of the light in the space between the optical waveguides 406a to 406e, so far as the light running upward through the space between the side edges of the optical waveguides 406a to 406e could be strongly diffused by it while that running from one side edge of the optical waveguides 406a to 406e toward the other side edge thereof is weekly diffused (if possible, not diffused). Specifically, the anisotropic light-scattering element is so defined that it satisfies the relationship of A<B, in which A indicates the degree of light scattering in the direction parallel to the surface of the display panel and B indicates the degree of light scattering in the direction perpendicular to the surface of the display panel. For example, the anisotropic light-scattering element may be made of a liquid crystal polymer resin or the like that comprises a material of refractive anisotropy dispersively aligned in the matrix of no refractive anisotropy.

Figure 51:
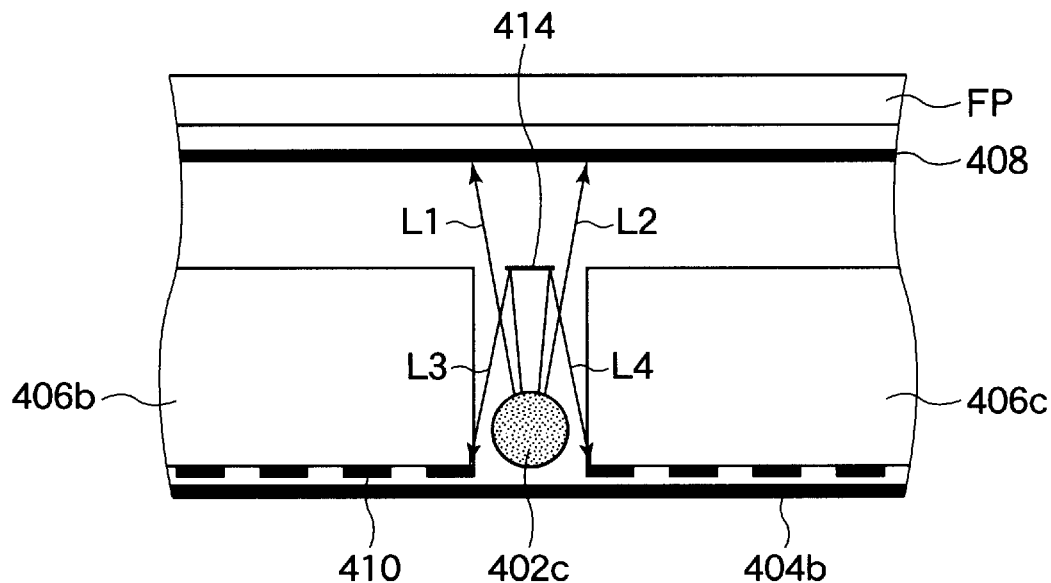
FIG. 51 is a partly enlarged view around the cold-cathode tube 402c in a modification of the lighting unit of Example 6-3 of the sixth embodiment of the invention.

In this Example, the diffuser 412 capable of diffusing and reflecting about ½ of the light having reached it is disposed in the space between the neighboring optical waveguides 406a to 406e so as to reduce the quantity of the light that reaches the diffuser 408 through that space. In place of the diffuser 412, a reflector may be disposed in the space. FIG. 51 shows one example of using a reflector 414 in place of the diffuser 412. In this, the reflector 414 is disposed in the space between the optical waveguides 406a to 406e in such a manner that the reflective surface of the reflector 414 is nearly at the same level as that of the light-emitting surfaces of the optical waveguides 406a to 406e. FIG. 51 is a partly enlarged view around the cold-cathode tube 402c. As illustrated, the reflector 414 is disposed in the space between the optical waveguides 406b, 406c, nearly in the center of the space, and this is nearly at the same level as that of the light-emitting surfaces of the optical waveguides 406b, 406c. A space capable of passing the light L1, L2 therethrough is formed between the reflector 414 and the neighboring optical waveguides 406b, 406c. In that structure, a part of the light, L1, L2 emitted by the cold-cathode tube 402c directly reaches the diffuser 408, while the remaining part thereof, L3, L4 reaches the optical waveguides 406b, 406c.

Figure 52:
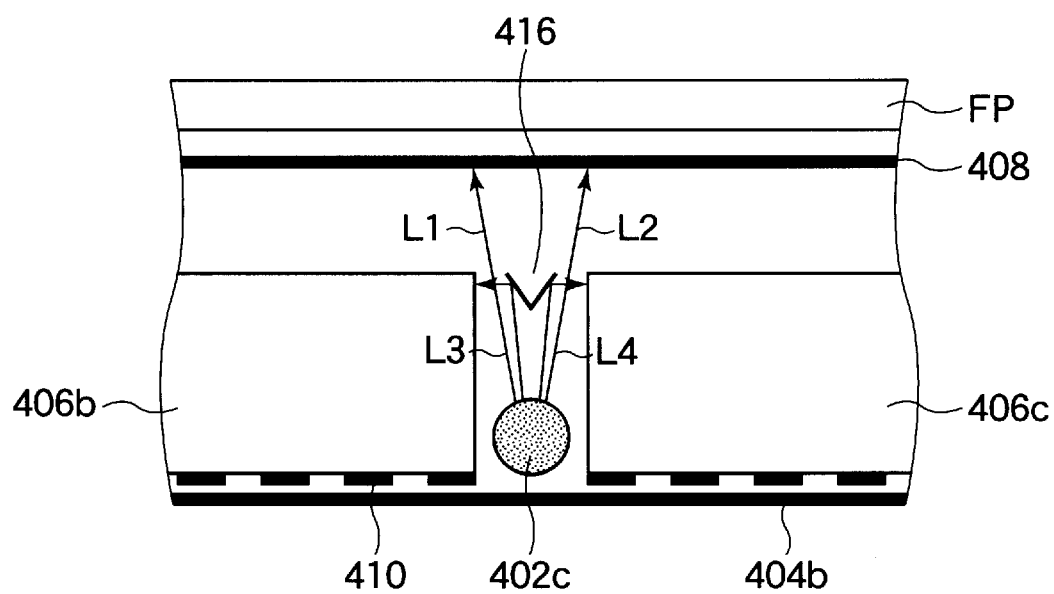
FIG. 52 is a partly enlarged view around the cold-cathode tube 402c in another modification of the lighting unit of Example 6-3 of the sixth embodiment of the invention.

FIG. 52 shows another example of using a V-shaped reflector 416 in place of the diffuser 412. As illustrated, the reflector 416 has a V-shaped reflective surface that faces the cold-cathode tubes 402b to 402e, and this is disposed in the space between the optical waveguides 406a to 406e. FIG. 52 is a partly enlarged view around the cold-cathode tube 402c. The reflector 416 is disposed in the space between the light-emitting surfaces of the optical waveguides 406b, 406c, nearly in the center of the space, and a space capable of passing the light L1, L2 therethrough is formed between the reflector 416 and the neighboring optical waveguides 406b, 406c. In that structure, a part of the light, L1, L2 emitted by the cold-cathode tube 402c directly reaches the diffuser 408, while the remaining part thereof, L3, L4 reaches the optical waveguides 406b, 406c.

In the structures of FIG. 51 and FIG. 52, the difference between the quantity of the light to be emitted through the light-emitting surfaces of the optical waveguides 406a to 406e and that of the light to be emitted through the space between the optical waveguides 406a to 406e can be reduced, and, as a result, the influence of the difference in light emission between the cold-cathode tubes 402a to 402e on displays can be further reduced.

Example 6-4

Figure 53:
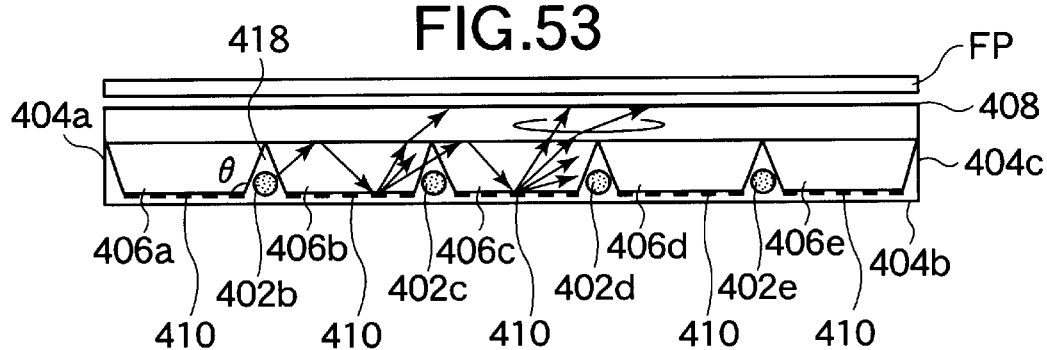
FIG. 53 shows an outline of the lighting unit of Example 6-4 of the sixth embodiment of the invention, illustrating the cross-sectional view of the lighting unit disposed adjacent to the surface of the liquid crystal panel FP to be illuminated by it.
Figure 54:
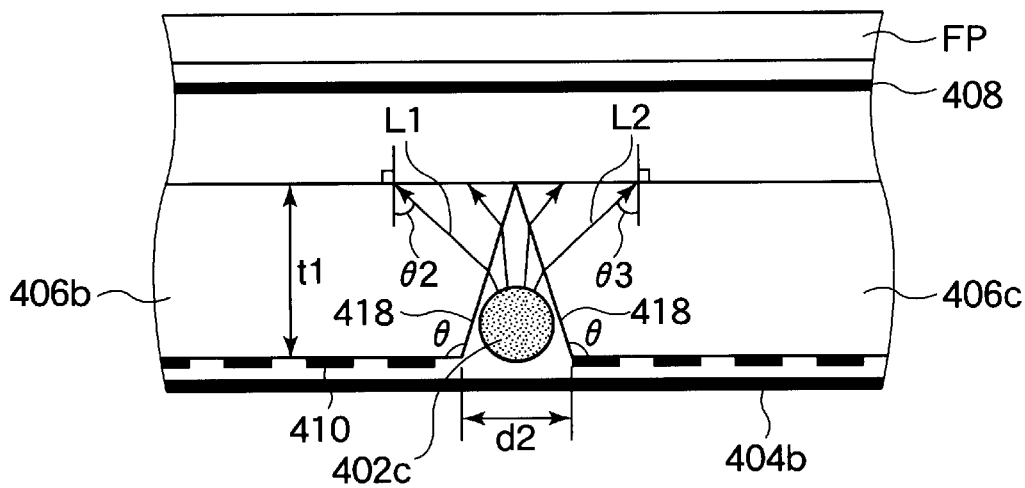
FIG. 54 is a partly enlarged view around the cold-cathode tube 402c in the lighting unit of Example 6-4 of the sixth embodiment of the invention.
Figure 55:
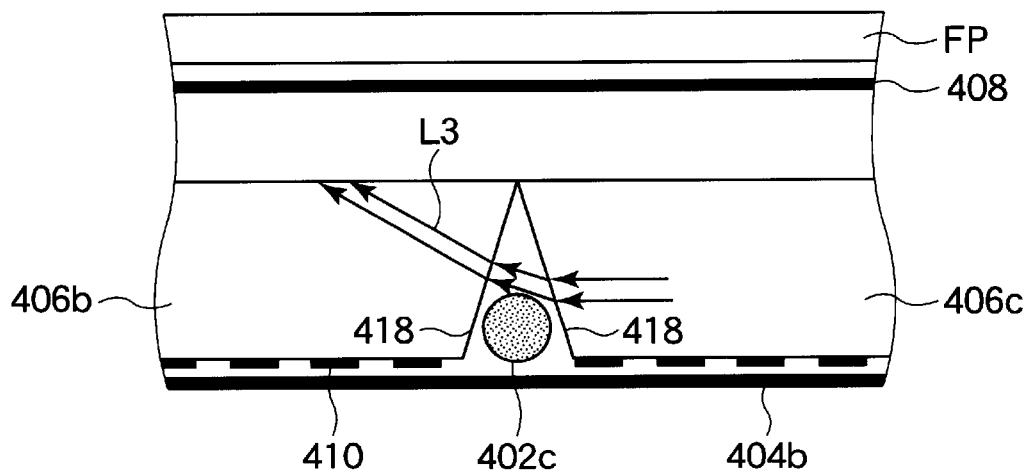
FIG. 55 is a partly enlarged view around the cold-cathode tube 402c in the lighting unit of Example 6-4 of the sixth embodiment of the invention.

Example 6-4 of this embodiment is described with reference to FIG. 53 to FIG. 56. FIG. 53 is across-sectional view showing the outline of the lighting unit 401 of this Example, in which the lighting unit is disposed adjacent to the surface of the liquid crystal panel FP to be illuminated by it. FIG. 54 and FIG. 55 each are a partly enlarged view around the cold-cathode tube 402c in FIG. 53. The lighting unit 401 of this Example is similar to but partly differs from that of Example 6-2, and this is characterized in that the light-entering edge surfaces 418 of the optical waveguides 406a to 406e with the diffusion pattern 410 on their back surfaces are inclined. As in FIG. 53 to FIG. 55, the light-entering surfaces 418 of the optical waveguides 406a to 406e between which the cold-cathode tubes 402b to 402e are sandwiched are so inclined that the distance between the light-emitting surfaces of the neighboring optical waveguides 406a to 406e is smaller than that between the back surfaces thereof. The other constituent elements of this Example are the same as those of Example 6-2, and describing them is therefore omitted herein.

In this Example, the optical waveguides 406a to 406e are made of a polycarbonate plate having a refractive index n of not smaller than 1.41. The polycarbonate plate is a thin plate having a thickness, t1, of about 8 mm, and its cross section is trapezoidal, having a width of the light-emitting surface of 90 mm and a width of the back surface of 86.6 mm. The light-entering edge surfaces 418 of the optical waveguides 406a to 406e are so inclined that they meet the back surfaces of the optical waveguides 406a to 406e (on which the diffusion pattern 410 is formed) at an angle, θ, of 102°. The distance, d2, between the back surfaces (on which the diffusion pattern 410 is formed) of the neighboring optical waveguides 406a to 406e is about 3.4 mm; and the thickness, t1, of the optical waveguides 406a to 406e is about 8 mm. Therefore, the neighboring optical waveguides 406a to 406e are kept in contact with each other at the edges of their light-emitting surfaces.

In Examples 6-1 to 6-3, a part of the light running through the space between the optical waveguides 406a to 406e directly enters the diffuser 408. In the constitution of this Example, however, no light running through that space directly enters the diffuser 408, but all the light running through the space enters the optical waveguides 406a to 406e. For example, as in FIG. 54, the angle, θ, formed by the light-entering surface 418 and the back surface (on which the diffusion pattern 410 is formed) is 102° (=90°+12°). The light, L1, L2 emitted by the cold-cathode tube 402c will directly enter the diffuser 408 in Examples 6-1 to 6-3. In this, however, the light, L1, L2 enters the optical waveguides 406b, 406c at an incident angle θ2, θ3 of at least 51°, and the incident light satisfies the total reflection condition of the polycarbonate having a refractive index, n, of at least 1.59. Therefore, the optical waveguides in this Example can be dealt with in the same manner as that for conventional optical waveguides. In this Example, the optical waveguides 406a to 406e capable of emitting uniform light exist on the entire side below the diffuser 408. Therefore, the lighting unit of this Example realizes illumination of extremely high uniformity.

As in FIG. 55, much of the light L3 having gone out of the optical waveguide 406c to enter the optical waveguide 460b is refracted in the direction in which it avoids the cold-cathode tube 402c. Therefore, the light L3 emitted by the cold-cathode tube 402c can be guided far away through the optical waveguide 402c, and the lighting unit of this Example is free from the problem of luminance fluctuation to be caused by the individual difference in the intensity of light emission from the cold-cathode tubes 402b to 402e and by the time-dependent change of light emission from them.

Figure 56:
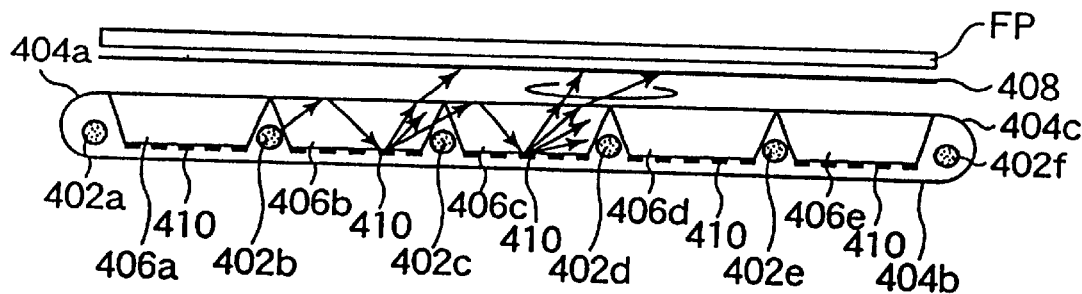
FIG. 56 shows an outline of a modification of the lighting unit of Example 6-4 of the sixth embodiment of the invention, illustrating the cross-sectional view of the modified lighting unit disposed adjacent to the surface of the liquid crystal panel FP to be illuminated by it.

FIG. 56 shows a modification of the lighting unit of this Example, in which cold-cathode tubes 402a, 402f equipped with C-shaped reflectors 404a, 404c, like in a sidelight-type backlight unit, are disposed outside the two side optical waveguides 406a, 406e, respectively. This modification also enjoys the advantages of this Example. Needless-to-say, the constitution of this modification of FIG. 56, having the cold-cathode tubes 402a, 402f equipped with C-shaped reflectors 404a, 404c, may apply to the other Examples of this embodiment.

Example 6-5

Figure 57:
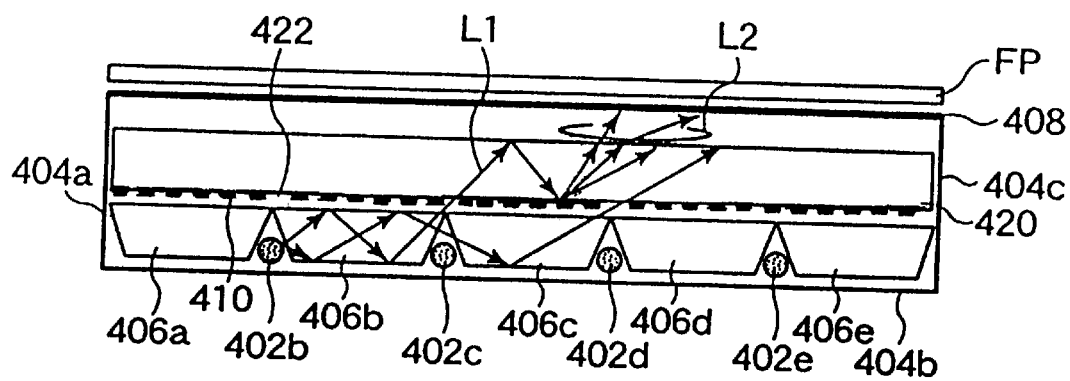
FIG. 57 shows an outline of the lighting unit of Example 6-5 of the sixth embodiment of the invention, illustrating the cross-sectional view of the lighting unit disposed adjacent to the surface of the liquid crystal panel FP to be illuminated by it.

Example 6-5 of this embodiment is described with reference to FIG. 57. FIG. 57 is across-sectional view showing the outline of the lighting unit 401 of this Example, in which the lighting unit is disposed adjacent to the surface of the liquid crystal panel FP to be illuminated by it. The lighting unit 401 of this Example is similar to but partly differs from that of Example 6-4, and this is characterized in that a diffusion pattern 410 is provided not on the back surfaces of the optical waveguides 406a to 406e of the lighting unit 401 but on the back surface of a second optical waveguide 420 disposed between the optical waveguides 406a to 406e and the diffuser 408, and that a photo-bonding resin layer 422 is provided between the optical waveguides 406a to 406e and the second optical waveguide 420. The other constituent elements of this Example are the same as those of Example 6-4, and describing them is therefore omitted herein.

The second optical waveguide 420 has the same constitution as that of a diffusion pattern-coated optical waveguide in ordinary sidelight-type backlight units. For example, it may be made of a polycarbonate plate of which one surface is coated with a plurality of diffusion patterns 410. The photo-bonding resin layer 422 may be referred to as an optical adhesive layer. Its refractive index, n, is nearly the same as that of polycarbonate, and its light transmittance is high. Via the photo-bonding resin layer 422, the second optical waveguide 420 is stuck on the optical waveguides 406a to 406e.

Of the light having been emitted by the cold-cathode tube 402b to enter and run through the optical waveguides 406a to 406e, for example, the component L1, L2 that has reached the contact surface of the photo-bonding resin layer 422 passes through the layer 422, not being reflected thereon, and enters the second optical waveguide 420. On the other hand, the light running through the optical waveguides 406a to 406e undergoes total reflection not in the area of the photo-bonding resin layer 422, and it does not run out toward the second optical waveguide 420. Therefore, the light runs toward the second optical waveguide 420 at high efficiency via the photo-bonding resin layer 422. The light of these components L1, L2 is guided inside the second optical waveguide 420, while being scattered by the diffusion pattern 410, and thus goes out through the light-emitting surface of the second optical waveguide 420 to reach the diffuser 408. In the constitution of this Example, the cold-cathode tubes 402b to 402e almost completely lose their locality. Therefore, the lighting unit of this Example is free from the problem of luminance fluctuation to be caused by the individual difference in the intensity of light emission from the cold-cathode tubes 402b to 402e and by the time-dependent change of light emission from them.

Example 6-6

Figure 58:
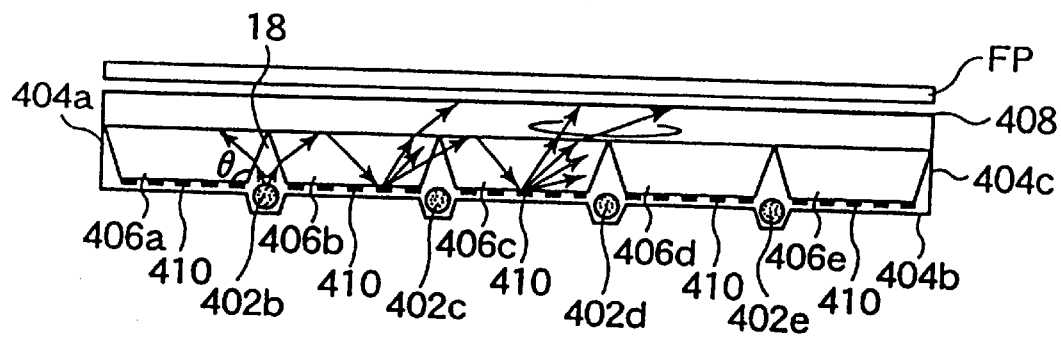
FIG. 58 shows an outline of the lighting unit of Example 6-6 of the sixth embodiment of the invention, illustrating the cross-sectional view of the lighting unit disposed adjacent to the surface of the liquid crystal panel FP to be illuminated by it.
Figure 59:
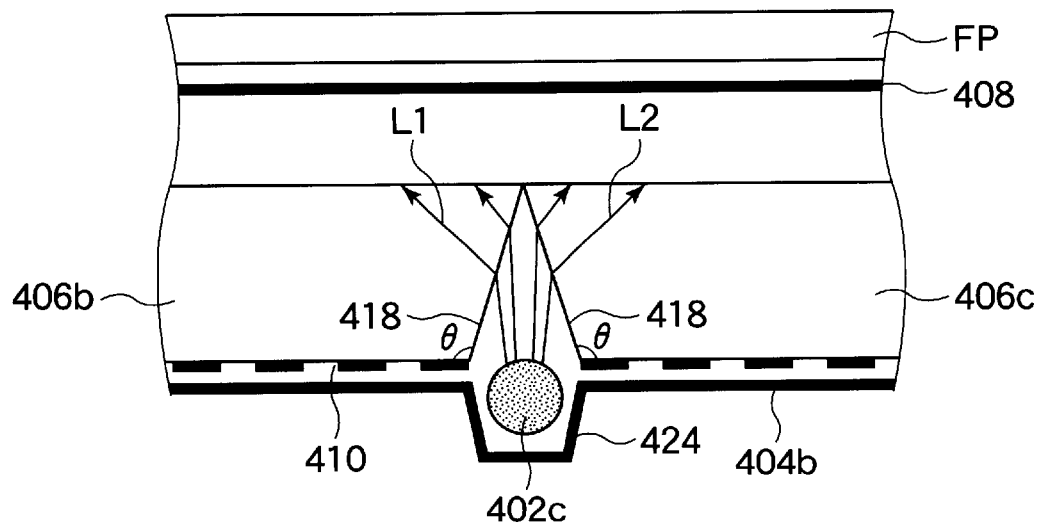
FIG. 59 is a partly enlarged view around the cold-cathode tube 402c in the lighting unit of Example 6-6 of the sixth embodiment of the invention.
Figure 60:
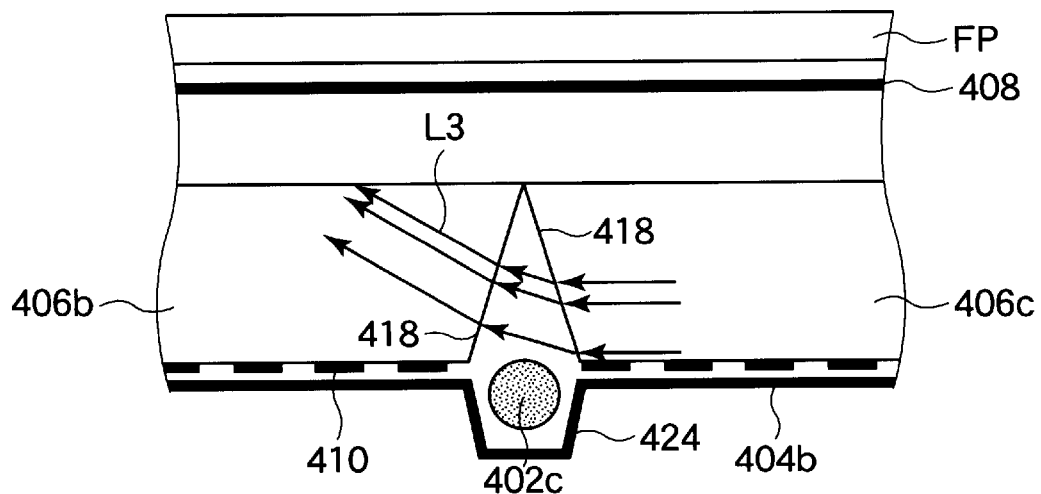
FIG. 60 is a partly enlarged view around the cold-cathode tube 402c in the lighting unit of Example 6-6 of the sixth embodiment of the invention.

Example 6-6 of this embodiment is described with reference to FIG. 58 to FIG. 64. FIG. 58 is a cross-sectional view showing the outline of the lighting unit 401 of this Example, in which the lighting unit is disposed adjacent to the surface of the liquid crystal panel FP to be illuminated by it. FIG. 59 and FIG. 60 each are a partly enlarged view around the cold-cathode tube 402c of FIG. 58. The lighting unit 401 of this Example is similar to but partly differs from that of Example 6-4, and this is characterized in that the reflector 404b is so modified as to have recesses 424 below the cold-cathode tubes 402b to 402e. In this, the cold-cathode tubes 402b to 402e are housed in these recesses 424. In the other Examples, the center axis of the cold-cathode tubes 402b to 402e is nearer to the back surfaces of the optical waveguides 406a to 406e than to the light-emitting surfaces thereof. In this Example, the center axis of the tubes is far from the back surfaces of the optical waveguides 406a to 406e, relative to the light-emitting surfaces thereof. The other constituent elements of this Example are the same as those of Example 6-4, and describing them is therefore omitted herein.

In this Example, the cold-cathode tubes 402b to 402e are housed in the recesses 424, and the light emitted by them runs through the optical waveguides 406a to 406e, like L1 to L3 as in FIG. 59 and FIG. 60. The light L1 to L3 running in the space between the optical waveguides 406a to 406e is free from the interference, including reflection, refraction and absorption by the cold-cathode tubes 402b to 402e. In this structure, therefore, the loss of light L1 to L3 guided to remoter optical waveguides 406a to 406e can be reduced.

Figure 61:
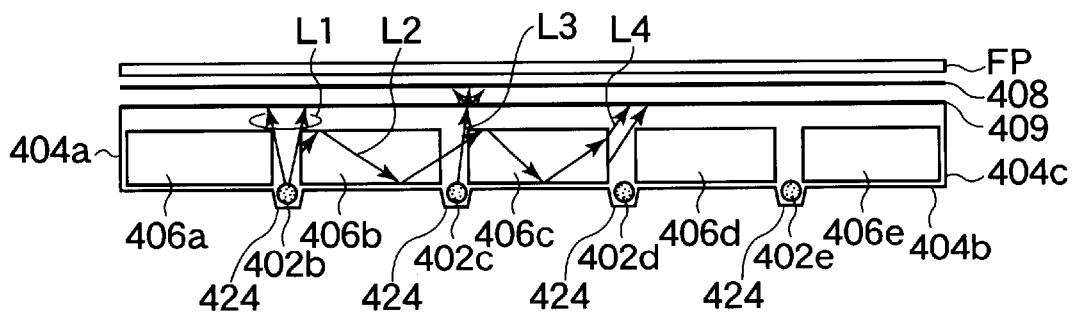
FIG. 61 shows an outline of a modification of the lighting unit of Example 6-6 of the sixth embodiment of the invention, illustrating the cross-sectional view of the modified lighting unit disposed adjacent to the surface of the liquid crystal panel FP to be illuminated by it.

The recesses 424 that characterize the constitution of this Example may apply also to the above-mentioned Examples 6-1 to 6-5 and even to the other Examples of the other embodiments of the invention that will be mentioned hereinunder. For example, the lighting unit 401 of FIG. 61 is a modification of the lighting unit 401 of FIG. 47 for Example 6-1. This is characterized in that the reflector 404b is so modified as to have the recesses 424 below the cold-cathode tubes 402b to 402e. In this, the cold-cathode tubes 402b to 402e are housed in the recesses 424.

Figure 62:
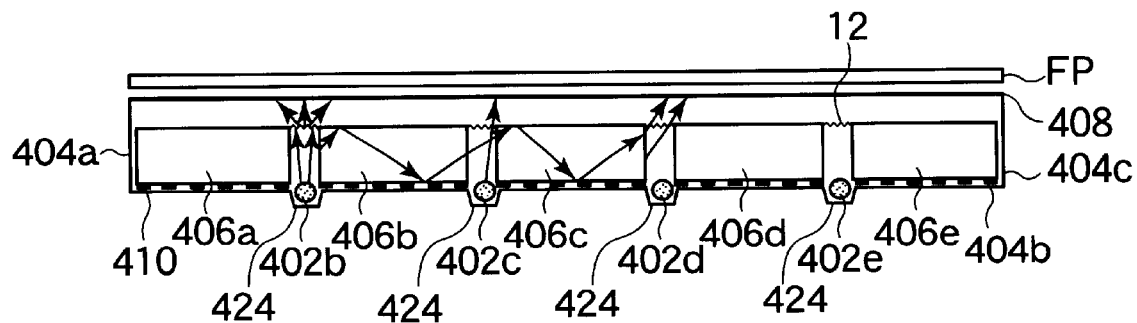
FIG. 62 shows an outline of another modification of the lighting unit of Example 6-6 of the sixth embodiment of the invention, illustrating the cross-sectional view of the modified lighting unit disposed adjacent to the surface of the liquid crystal panel FP to be illuminated by it.
Figure 63:
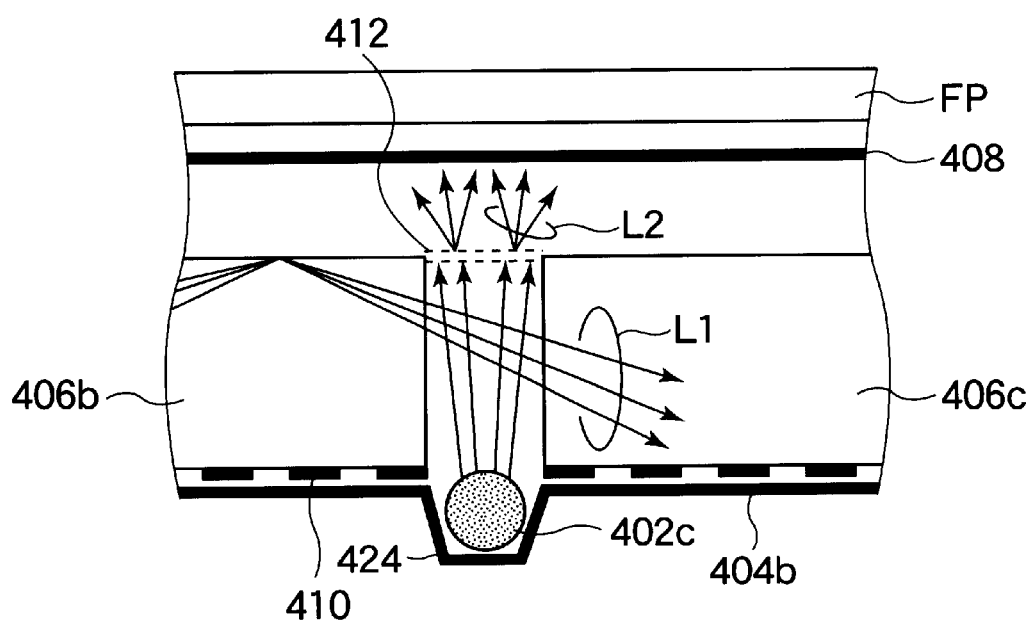
FIG. 63 is a partly enlarged view around the cold-cathode tube 402c in the lighting unit of FIG. 62.

Also having recesses 424, FIG. 62 is a modification of the lighting unit 401 of FIG. 49 for Example 6-3. In this, the light L1 running through the optical waveguide 406b toward the optical waveguide 406c is not disturbed by the cold-cathode tube 402c and by the diffuser 412c, as in FIG. 63. In that manner, the light L1 running through the optical waveguides 406a to 406e is well guided toward the neighboring ones. Accordingly, the light emitted by the cold-cathode tubes 402*b* to 402*e* can be guided to remoter optical waveguides 406*a* to 406*e,* and the lighting unit of this modification is free from the problem of luminance fluctuation to be caused by the time-dependent change of light emission from the cold-cathode tubes 402*b* to 402*e.*

Figure 64:
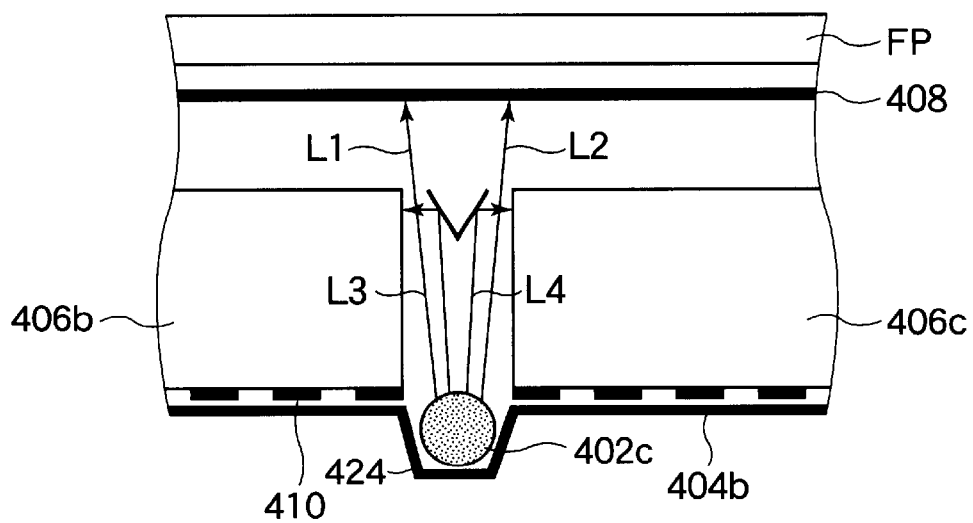
FIG. 64 is a partly enlarged view around the cold-cathode tube 402c in still another modification of the lighting unit of Example 6-6 of the sixth embodiment of the invention.

Having recesses 424, FIG. 64 is a modification of the lighting unit 401 of FIG. 52 for Example 6-3.

In the manner as above, the reflector 404*b* can be readily modified to have recesses 424 for housing the cold-cathode tubes 402*b* to 402*e* therein. In the modifications, the light running through the space between the optical waveguides 406*a* to 406*e* is absorbed little by the cold-cathode tubes 402*b* to 402*e*. The modifications therefore realize different types of lighting units in which the loss of light L1 to L3 guided to remoter areas are reduced.

Example 6-7

Figure 65:
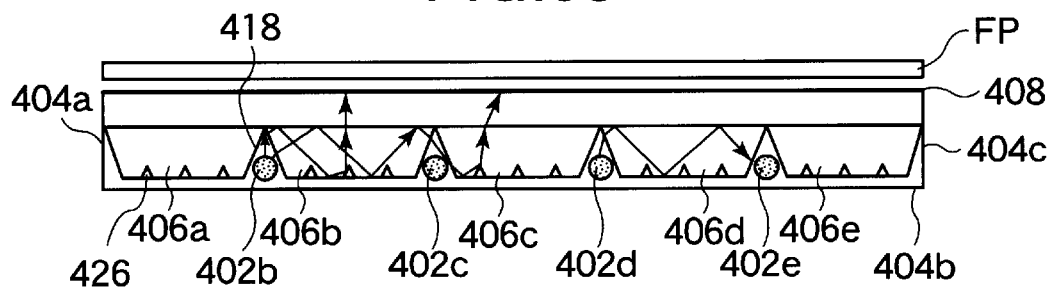
FIG. 65 shows an outline of the lighting unit of Example 6-7 of the sixth embodiment of the invention, illustrating the cross-sectional view of the lighting unit disposed adjacent to the surface of the liquid crystal panel FP to be illuminated by it.
Figure 66A:
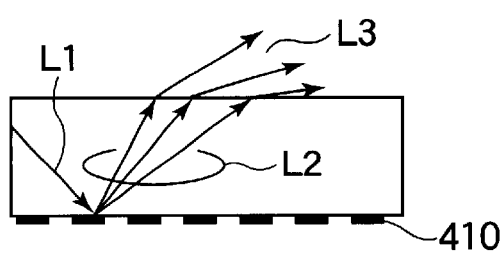
FIG. 66A and FIG. 66B are views showing different light diffusions in the lighting unit 401 of Example 6-7 of the sixth embodiment of the invention, concretely explaining the difference in the emitted light diffusion between the case having a diffusion pattern 410 (FIG. 66A) and the case having triangular recesses 426 (FIG. 66B)

Example 6-7 of this embodiment is described with reference to FIG. 65, FIG. 66A and FIG. 66B. FIG. 65 is a cross-sectional view showing the outline of the lighting unit 401 of this Example, in which the lighting unit is disposed adjacent to the surface of the liquid crystal panel FP to be illuminated by it. The lighting unit 401 of this Example is similar to but partly differs from that of Example 6-4 shown in FIG. 53, and this is characterized in that the back surfaces of the optical waveguides 406*a* to 406*e* are not provided with the diffusion pattern 410 but are specifically worked to have a plurality of sharp recesses 426 each having a triangular cross section. The cross section of the triangular recesses 426 is an isosceles triangle of which the top angle is 70°. The back surfaces of the optical waveguides 406*a* to 406*e* are so worked as to have the triangular recesses 426 at a pitch of 1 mm, and the a real ratio of the recesses 426 is 20%. The other constituent elements of this Example are the same as those of Example 6-4, and describing them is therefore omitted herein.

The triangular recesses 426 formed in the back surfaces of the optical waveguides 406*a* to 406*e* in this Example all functions as a diffusion element that varies the angle of the light running through the optical waveguides, like the diffusion pattern 410 in Example 6-4. In this, however, the inclined surfaces of the triangular recesses act to diffuse light. Therefore, the light diffusion mode in this Example differs from that in Example 6-4 in which is formed the diffusion pattern 410. The difference in the light diffusion mode between them is described with reference to FIG. 66A and FIG. 66B. FIG. 66A shows the running mode of the scattered light in the optical waveguides 406*a* to 406*e* in the constitution of Example 6-4 (only the optical waveguide 406*c* is shown). A component L1 of the light running through the optical waveguide 406*c* reaches one dot of the dot-like diffusion pattern 410, and this is scattered thereon into a bundle L2 of a plurality of differently scattered rays, and further runs through the optical waveguide 406*c*. The range of the angle of the light bundle L2 scattered on the dot of the diffusion pattern 410 is within a predetermined one that varies depending on the incident angle of the light having reached the dot. Therefore, the light L3 that does not satisfy the total reflection condition but goes out through the light-emitting surface of the optical waveguide 406*c* toward the diffuser 408 covers the majority of the component that may slightly overstep the total reflection condition. Accordingly, the majority of the light L3 that goes out of the optical waveguide 406*c* shall be nearly parallel with the light-emitting surface of the optical waveguide 406*c*.

Figure 66B:
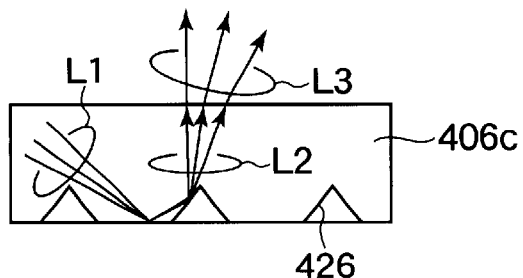

FIG. 66B shows the running mode of the scattered light in the optical waveguides 406*a* to 406*e* in the constitution of this Example (only the optical waveguide 406*c* is shown). While being guided through the optical waveguide 406*c,* the light bundle L1 is reflected once on the back surface of the optical waveguide 406*c,* and reaches the inclined surface of the triangular recess 426, and it is then reflected on the inclined surface in the direction nearly perpendicular to the light-emitting surface of the optical waveguide 406*c* to give a bundle of scattered rays L2. The scattered light bundle L2 then goes out of the optical waveguide 406*c* to give a bundle of scattered rays L3 running in the direction nearly perpendicular to the light-emitting surface of the optical waveguide 406*c* to reach the diffuser 408.

In the manner as above, the component of the light that goes out through the light-emitting surfaces of the optical waveguides 406*a* to 406*e* in the oblique direction is large in the constitution in which the diffusion pattern 410 is disposed on the back surfaces of the optical waveguides 406*a* to 406*e;* while the component of the light that goes out in the direction of the normal line to the surface of the substrate is large in the constitution of this Example in which the triangular recesses 426 are formed in the back surfaces of the optical waveguides 406*a* to 406*e.* In the constitution of this Example, therefore, when the disposition density of the triangular recesses 426 in the back surfaces of the optical waveguides 406*a* to 406*e* is distributed, it is easy to produce light uniformly going out of the optical waveguides 406*a* to 406*e* through their entire surfaces. In addition, in the constitution in which the diffusion pattern 410 is formed, an optical path-changing device is needed for changing the running direction of the light that runs obliquely so that the light can run toward the surface of the panel to be illuminated by the lighting unit; while in the constitution of this Example in which the triangular recesses 426 are formed, such an optical path-changing device is not needed since the light going out of the optical waveguides 406*a* to 406*e* runs all the time toward the surface of the panel. Accordingly, in the constitution of this Example, the diffusion capability of the diffuser 408 may be low, and the lighting unit 401 of this Example realizes high efficiency at low production costs. Needless-to-say, the triangular recesses 426 formed in this Example may apply also to the back surfaces of the optical waveguides 406*a* to 406*e* in the other Examples of this embodiment to produce the same results.

Example 6-8

Figure 67:
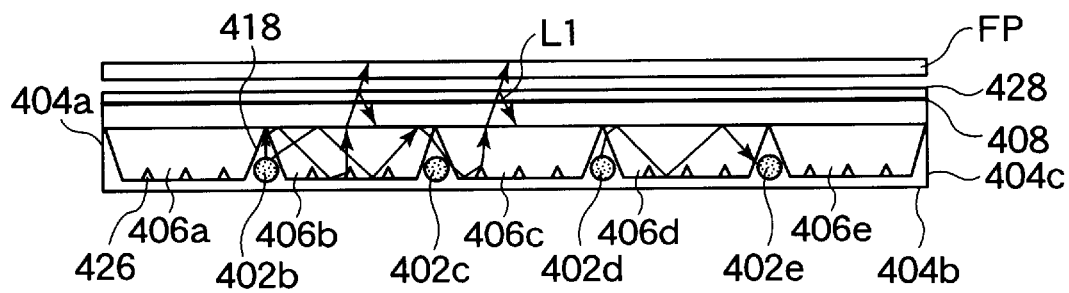
FIG. 67 shows an outline of the lighting unit of Example 6-8 of the sixth embodiment of the invention, illustrating the cross-sectional view of the lighting unit disposed adjacent to the surface of the liquid crystal panel FP to be illuminated by it.

Example 6-8 of this embodiment is described with reference to FIG. 67. FIG. 67 is a cross-sectional view showing the outline of the lighting unit 401 of this Example, in which the lighting unit is disposed adjacent to the surface of the liquid crystal panel FP to be illuminated by it. The lighting unit 401 of this Example is similar to but partly differs from that of Example 6-7 illustrated in FIG. 65, and this is characterized in that a reflective polarizer 428 which acts as a reflection-type, optical path-changing element is disposed between the diffuser 408 of the lighting unit 401 and the surface of the liquid crystal display panel FP to be illuminated by the lighting unit. The other constituent elements of this Example are the same as those of Example 6-7, and describing them is therefore omitted herein.

The reflective polarizer 428 has the function of selectively transmitting the light having been linearly polarized through it in a predetermined polarized direction but reflecting the light having been polarized in the other polarized direction. For the reflective polarizer 428, for example, usable is 3M's DBEF or the like. In this Example, the transmission polarization axis of the reflective polarizer 428 corresponds to that of the liquid crystal panel FP which faces the reflective polarizer 428. The diffusion capability of the diffuser 408 in this Example is lower than that of the diffuser 408 in Example 6-7.

The light L3 of which the majority runs in the direction nearly perpendicular to the light-emitting surfaces of the optical waveguides 406a to 406e, as in FIG. 66B illustrating the constitution of Example 6-7, is scattered by the diffuser 408 of relatively low diffusion capability, and then reaches the reflective polarizer 428. The reflective polarizer 428 is so defined that its transmission polarization axis is parallel to the light source, and it reflects the component of the light having been polarized in the direction that differs from the direction of that axis. The reflected light L1 runs toward the diffuser 408, then runs through the optical waveguides 406a to 406e, and is reflected by the reflectors 404a to 404c, and this again reaches the reflective polarizer 428. Thus having run in this route, the reflected light L1 is disordered for its polarization, and becomes almost non-polarized light. Accordingly, after a few times of reflection and polarization cycles on and through the reflective polarizer 428, almost all the light emitted by the cold-cathode tubes is polarized into linear polarized light to pass through the reflective polarizer 428. As so mentioned hereinabove, since the transmission polarization axis of the reflective polarizer 428 corresponds to that of the liquid crystal panel FP which faces the reflective polarizer 428, almost all the light from the reflective polarizer 428 contributes to image display.

About a half of the light having reached the reflective polarizer 428 is reflected by it. Therefore, even though the light from the optical waveguides 406a to 406e is not uniform, the component of the light first having passed through the reflective polarizer 428 and the component of the light once reflected and then passing through it cancel the luminance fluctuation. Accordingly, the luminance fluctuation in the lighting unit of this Example is reduced.

Even if the diffuser 408 in the constitution of this Example could not completely solve the luminance fluctuation, the lighting unit ensures satisfactorily uniform illumination. Therefore, the diffusion capability of the diffuser 408 in this Example may be lower than that of the diffuser in Example 6-7. The combination of the diffuser 408 of low diffusion capability and the reflective polarizer 428 in this Example realizes high-efficiency backlight units.

Examples 6-9

Figure 68:
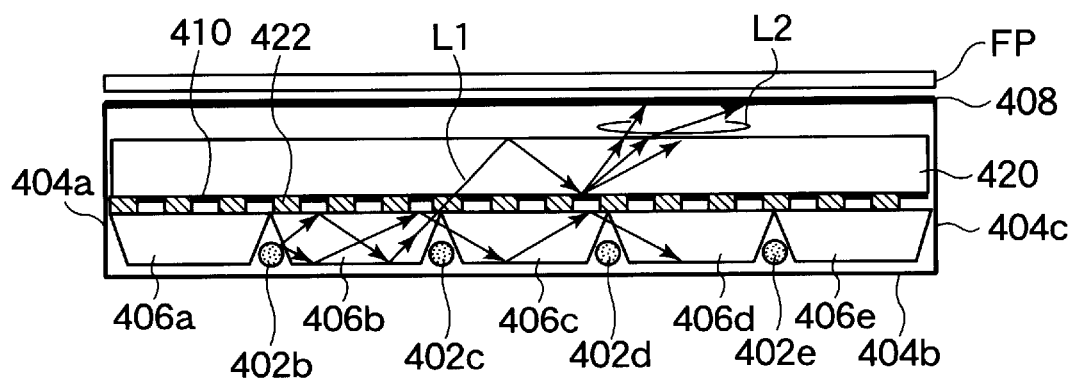
FIG. 68 shows an outline of the lighting unit of Example 6-9 of the sixth embodiment of the invention, illustrating the cross-sectional view of the lighting unit disposed adjacent to the surface of the liquid crystal panel FP to be illuminated by it.

Example 6 -9 of this embodiment is described with reference to FIG. 68. FIG. 68 is a cross-sectional view showing the outline of the lighting unit 401 of this Example, in which the lighting unit is disposed adjacent to the surface of the liquid crystal panel FP to be illuminated by it. The lighting unit 401 of this Example is similar to but partly differs from that of Example 6-5 illustrated in FIG. 57, and this is characterized in that a plurality of photo-bonding resin layers 422 are disposed on the back surface of the second optical waveguide 420 in the area thereof not coated with the plurality of diffusion pattern dots 410 having a predetermined density. The other constituent elements of this Example are the same as those of Example 6-5, and describing them is therefore omitted herein.

The light emitted by the cold-cathode tubes 402b to 402e reaches the optical waveguides 406a to 406e and runs through them. However, the light L1 having reached the light-emitting surfaces of the optical waveguides 406a to 406e that are in contact with the photo-bonding resin layers 422 enter the second optical waveguide 420, not reflected on the interface between the light-emitting surfaces of the optical waveguides and the photo-bonding resin layer 422. The light running through the optical waveguides 406a to 406e does not go out of the optical waveguides 406a to 406e, but selectively goes out of them through the area of the photo-bonding resin layers 422, and, therefore, it efficiently enters the second optical waveguide 420. Running through the second optical waveguide 420, the light L1 reaches the diffusion pattern 410, and then goes out of the second optical waveguide 420 to be the light L2, and this reaches the diffuser 408. In the constitution of this Example, the cold-cathode tubes 402b to 402e almost completely lose their locality. Therefore, the lighting unit of this Example is free from the problem of luminance fluctuation to be caused by the individual difference in the intensity of light emission from the cold-cathode tubes 402b to 402e and by the time-dependent change of light emission from them.

As described with reference to its specific Examples, the lighting unit of this embodiment of the invention, in which a plurality of cold-cathode tubes are disposed below the panel to be illuminated by them, is free from the problem of luminance fluctuation to be caused by the individual difference in the intensity of light emission from the cold-cathode tubes and by the time-dependent change of light emission from them aged. Accordingly, this embodiment of the invention realizes high-power lighting units for uniform illumination.

Seventh Embodiment of the Invention

The lighting unit of the seventh embodiment of the invention is described with reference to FIG. 69 to FIG. 77. This embodiment is for the backlight structure for displays, and, in particular, it relates to the structure of optical waveguides in sidelight-type backlight units that illuminate liquid crystal panels from their back surface.

Transparent plastic substrates such as acrylic plates and the like are used for optical waveguides for conventional sidelight-type backlight units. The plastic substrates include parallel-plate substrates having a uniform thickness and wedged substrates of which the thickness nearer to light source (emission tube) is larger than that remoter from it.

Parallel-plate substrates, if used for optical waveguides, must be thick in order that the optical waveguides can receive the light from light source at high-level light-utilization efficiency. On the otherhand, however, the substrates must be thin for thin, lightweight and low-cost liquid crystal display panels. Accordingly, the tradeoff for the thickness reduction is inevitable in parallel-plate substrates. In this respect, parallel-plate substrates for optical waveguides are problematic in that they could not satisfy all the requirements of high efficiency, weight reduction and cost reduction.

On the other hand, wedged substrates for optical waveguides require a highly-accurate taper angle for their wedge form, because the light running through the optical waveguides will gradually leak outside not undergoing total reflection. Therefore, reducing the production costs for wedged substrates is impossible, and one problem with them is that wedged substrates are unfavorable to large-sized backlight units. The object of this embodiment of the invention is to provide a small-sized and lightweight lighting unit that realizes high-level light-utilization efficiency and can be produced at low costs.

The optical waveguide in the lighting unit of this embodiment is made of a parallel-plate substrate as a whole, but is characterized in that the area around the light-entering surface SO of the side edge of the optical waveguide that receives the light emitted by a light source is inclined. The inclined part is made of a material of which the refractive index is the same as that of the parallel-plate substrate.

The inclined part has an inclined surface that ascends from the surface of the parallel-plate substrate (this is the light-emitting surface of the optical waveguide or the back surface opposite to it) toward the light-entering surface SO of the optical waveguide. The angle between the inclined surface and the surface of the parallel-plate substrate (this is hereinafter referred to as an angle of inclination) is so defined that the light having entered the inclined part through the light-entering surface SO can undergo total reflection on the inclined surface and thereafter can also undergo total reflection in the area of the parallel-plate substrate.

The length of the inclined surface in the cross section cut along the plane perpendicular to both the inclined surface and the surface of the parallel-plate substrate (this is hereinafter referred to as a length of inclination) is so defined that the incident light having passed through the light-entering surface SO does not hit the inclined surface twice or more.

With the inclined part provided at the edges of the optical waveguide, the open area of the reflector that surrounds the light source, or that is, the area of the light-entering surface SO of the optical waveguide can be enlarged and the light-utilization efficiency of the lighting unit can be thereby enhanced. For the light-utilization efficiency of the same level, the thickness of the parallel-plate substrate of the optical waveguide can be reduced.

The lighting unit of this embodiment is described more concretely with reference to the following Examples.

Example 7-1

Figure 69:
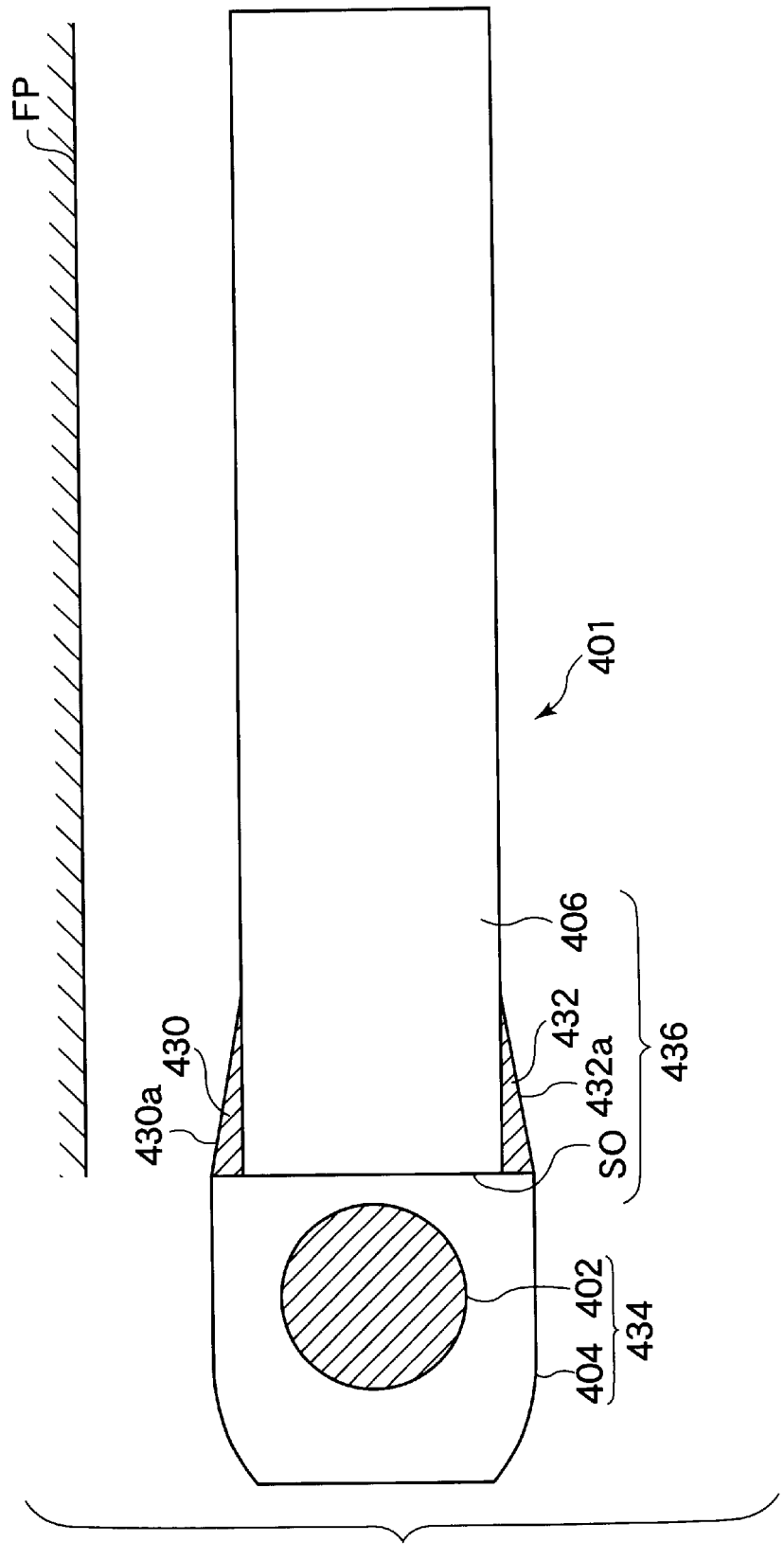
FIG. 69 shows an outline of the lighting unit of Example 7-1 of the seventh embodiment of the invention, illustrating the cross-sectional view of the lighting unit disposed adjacent to the surface of the liquid crystal panel FP to be illuminated by it.
Figure 70:
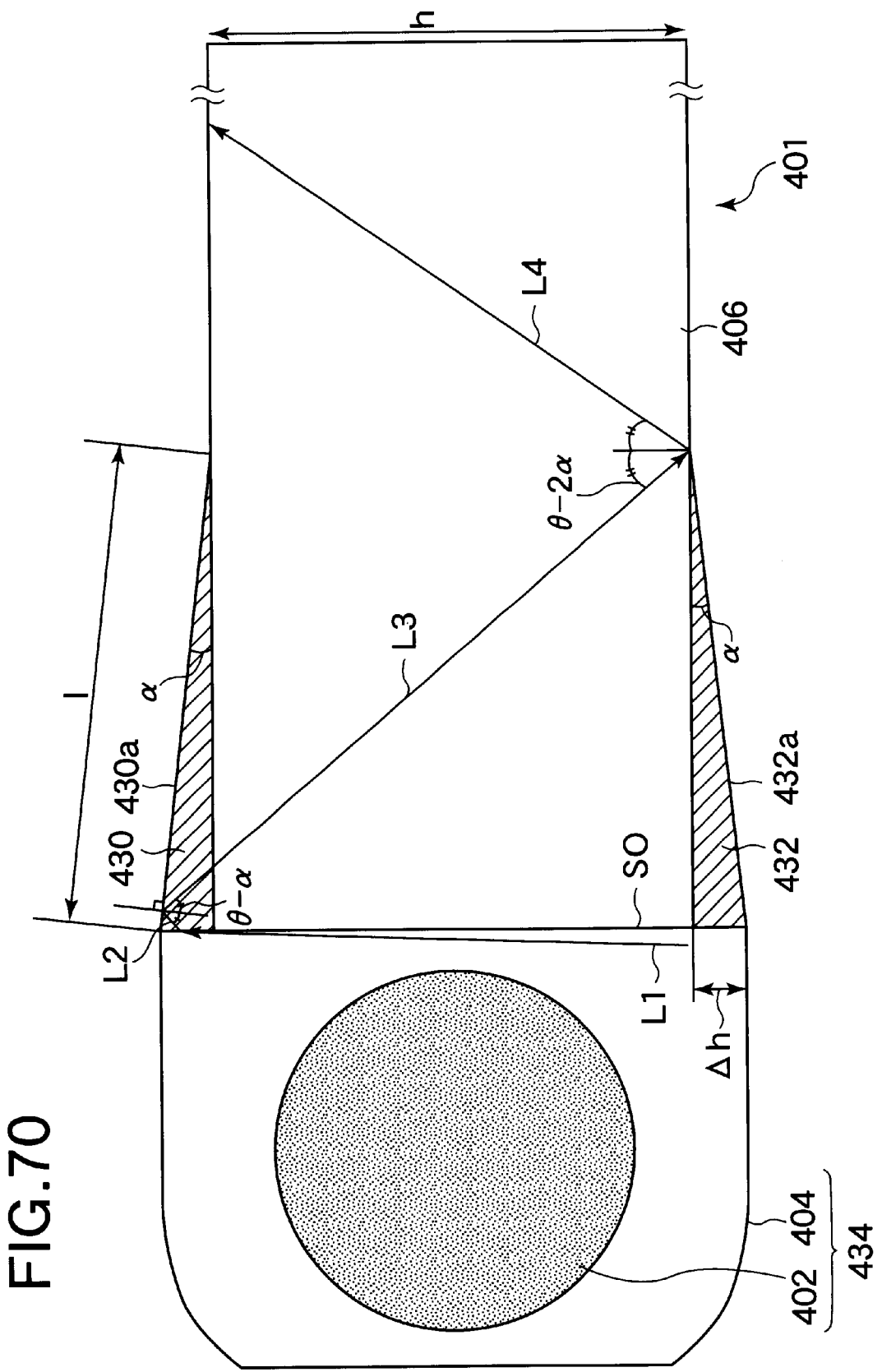
FIG. 70 is a view to show the illumination mode of the lighting unit of Example 7-1 of the seventh embodiment of the invention.

FIG. 69 and FIG. 70 are referred to for Example 7-1 of this embodiment. FIG. 69 is a cross-sectional view showing the outline of the lighting unit 401 of this Example, in which the lighting unit is disposed adjacent to the surface of the liquid crystal panel FP to be illuminated by it. The lighting unit 401 has a light source 434 and an optical waveguide 436. In addition, the lighting unit 401 further has a reflector, a diffuser sheet, etc. However, these are unnecessary for describing this Example. Unless specifically needed, therefore, describing and illustrating them is omitted in the section of this embodiment.

The light source 434 has a cold-cathode tube 402 and a reflector 404. The optical waveguide 436 has a parallel-plate substrate 406 made of a transparent plate such as an acrylic resin plate or the like; and inclined parts 430, 432 provided around the light-entering surface SO at the edge of the parallel-plate substrate 406 that receives the light from the light source 434 through the open end of the reflector 404. The inclined parts 430, 432 are made of the same material of the parallel-plate substrate 406. The parallel-plate substrate 406 is disposed nearly parallel to the surface of the liquid crystal panel FP to be illuminated by the lighting unit. In this embodiment, the surface of the parallel-plate substrate 406 that is nearer to the surface of the liquid crystal panel FP is the light-emitting surface, and the surface thereof that is remoter from it is the back surface.

The inclined part 430 is formed on the light-emitting surface of the parallel-plate substrate 406, and this has an inclined surface 430a that ascends toward the light-entering surface SO. The angle of inclination, α, of the inclined part 430 is so defined that the light having entered the inclined part 430 via the light-entering surface SO undergoes total reflection on the inclined surface 430a and thereafter undergoes total reflection also in the area of the parallel-plate substrate 406. Similarly to this, the inclined part 432 also has an inclined surface 432a at an angle of inclination, α, and this is formed on the back surface of the parallel-plate substrate 406.

The length of inclination, l, of the inclined parts 430, 432 is so defined that the incident light from the light-entering surface SO does not hit the inclined surfaces 430a, 432a twice or more. The light-entering surface SO includes the edge surface of the inclined parts 430, 432 facing the light-entering surface SO, and the edge surface of the parallel-plate substrate 406 also facing the light-entering surface SO. These edge surfaces are nearly in the same plane.

The illumination mode of the lighting unit 401 of this Example is described with reference to FIG. 70. FIG. 70 graphically shows how and in what manner the light from the light source 434 runs through the optical guide 436. First, the light L1 from the light source 434 reaches the light-entering surface SO at an incident angle falling between 0° and 90°. FIG. 70 shows the light L1 incident on the surface SO at the incident angle about 90°. The refractive index of the optical waveguide 436 is represented by n. The incident light L1 is refracted on the light-entering surface SO at an angle of refraction falling between 0° and (90°−θ), depending on the refractive index, n, and the thus-refracted light L2 then runs through the optical waveguide 436. θ indicates the incident angle of the refracted light L2 having reached the inclined surface 430a or the inclined surface 432a, when the angle of inclination, α=0. In FIG. 70, the optical path length of Light L2 is almost 0.

The refractive index of air, n0=1.0. The Snell's law and the total reflection condition apply to the light-entering surface SO.

Accordingly, $$n \cdot \sin(90°-\theta) = n0 \cdot \sin(90°) = 1.$$

Therefore, $$(90°-\theta) = \sin^{-1}(1/n) \tag{1}$$

The angle of inclination, α, of the inclined parts 430, 432 is so defined that the light L2 having entered the optical waveguide 436 undergoes total reflection on any of the inclined surface 430a or the inclined surface 432a, and thereafter further undergoes total reflection in the area of the parallel-plate substrate 406. For example, the light L3 having undergone total reflection on the inclined surface 430a does not reach the opposite inclined surface 432a but reaches the back surface of the parallel-plate substrate 406, and thereafter this runs through the parallel-plate substrate 406 while repeatedly undergoing total reflection therein. Similarly, the light totally reflected on the inclined surface 432a does not reach the opposite inclined surface 430a but reached the back surface of the parallel-plate substrate 406, and thereafter this runs through the parallel-plate substrate 406 while repeatedly undergoing total reflection therein.

The length of inclination, l, of the inclined parts 430, 432 is so defined that all the incident light having entered the optical waveguide through the light-entering surface SO and having undergone total reflection on one inclined surface 430a (432a) does not hit the other inclined surface 432a (430a).

For attaining the best result in this Example, it is desirable that the angle of inclination, α, of the inclined parts 430, 432 is larger and that the length of inclination, l, thereof is shorter. In practice, therefore, the parameters are defined so as to satisfy the relational formulae mentioned below. A case where the refracted light L2 reaches the inclined part 430 as in FIG. 70 is referred to by way of example.

In this, h indicates the thickness of the parallel part of the parallel-plate substrate 406;

n indicates the refractive index of the optical waveguide;

Δh indicates the height of the inclined part 430 standing on the parallel-plate substrate 406 at its light-entering surface SO;

Δ=n·Δh (=optical distance).

When the light L1 is refracted on the light-entering surface SO at an angle of refraction, (90°−θ) and the thus-refracted light L2 reaches the inclined surface 430a of which the angle of inclination is α, then the incident angle of the refracted light L2 to the inclined surface 430a is represented by θ−α. The total reflected light L3 reflected on the inclined surface 430a reaches the back surface of the parallel-plate substrate 406 at an incident angle, θ−2α. Accordingly, in order that the light L2 having entered the optical waveguide 436 undergoes total reflection on the inclined surface 430a and then further undergoes total reflection also in the area of the parallel-plate substrate 406, the angle of inclination, α, of the inclined part 430 must satisfy the formula (2) mentioned below. Based on the Snell's law and the total reflection condition, $$n \cdot \sin(\theta - 2\alpha) \geq n0 \cdot \sin(90°) = 1.$$

Accordingly, $$n \cdot \sin(\theta - 2\alpha) \geq 1 \qquad (2).$$

On the other hand, in order that the incident light having passed through the light-entering surface SO does not hit the inclined surface 430a, 432a twice or more, the length of inclination, l, of the inclined part 430, 432 must satisfy the formula (3) mentioned below. Referring to FIG. 70, $$(n \cdot h + \Delta) \cdot \tan(\theta) = n \cdot l \cdot \cos(\alpha).$$

Accordingly, $$(h + \Delta h) \cdot \tan(\theta) = l \cdot \cos(\alpha) \qquad (3).$$

Further referring to FIG. 70, $$n \cdot l \cdot \sin(\alpha) = \Delta.$$

Accordingly, $$l \cdot \sin(\alpha) = \Delta h \qquad (4).$$

From the formula (1), $$n \cdot \cos(\theta - \alpha) = 1 \qquad (5).$$

In this Example, the optical waveguide 434 is made of acrylic resin. The acrylic resin has a refractive index, n=1.49. Accordingly, from the formula (1), θ=47.84°. This value of θ is introduced into the formula (2), and the angle of inclination, α=5.680.

The thickness of the parallel part of the parallel-plate substrate 406, h=10 mm; the height of the inclined part 430 standing on the parallel-plate substrate 406 at its light-entering surface So, Δh=0.6 mm; and these values are introduced into the formula (3) to obtain the length of inclination, l. This is as follows:

$$l = (10+0.6) \cdot \tan(47.84°)/\cos(5.68°) = 11.76 \text{ mm}.$$

As compared with a case of using a conventional parallel-plate optical waveguide having a thickness of 10 mm, the width of the open end of the reflector 404 can be increased by 1.2 mm (=2·Δh) in this Example. Accordingly, in this Example, the quantity of light that may be led into the optical waveguide 436 can be increased by 8%, as compared with the conventional case. Therefore, in this, the reflector 404 can be spaced more from the cold-cathode tube 402, and the light emitted by the cold-cathode tube 402 toward the reflector 404 can be more readily led to the optical waveguide 436. In this Example illustrated, the parallel-plate substrate 406 and the inclined parts 430, 432 are made separately. However, the invention is not limited to this illustration. The parallel-plate substrate 406 and the inclined parts 430, 432 may be bonded together via an adhesive therebetween, all having nearly the same refractive index; or they may be integrated into a monolithic structure.

Example 7-2

Figure 71:
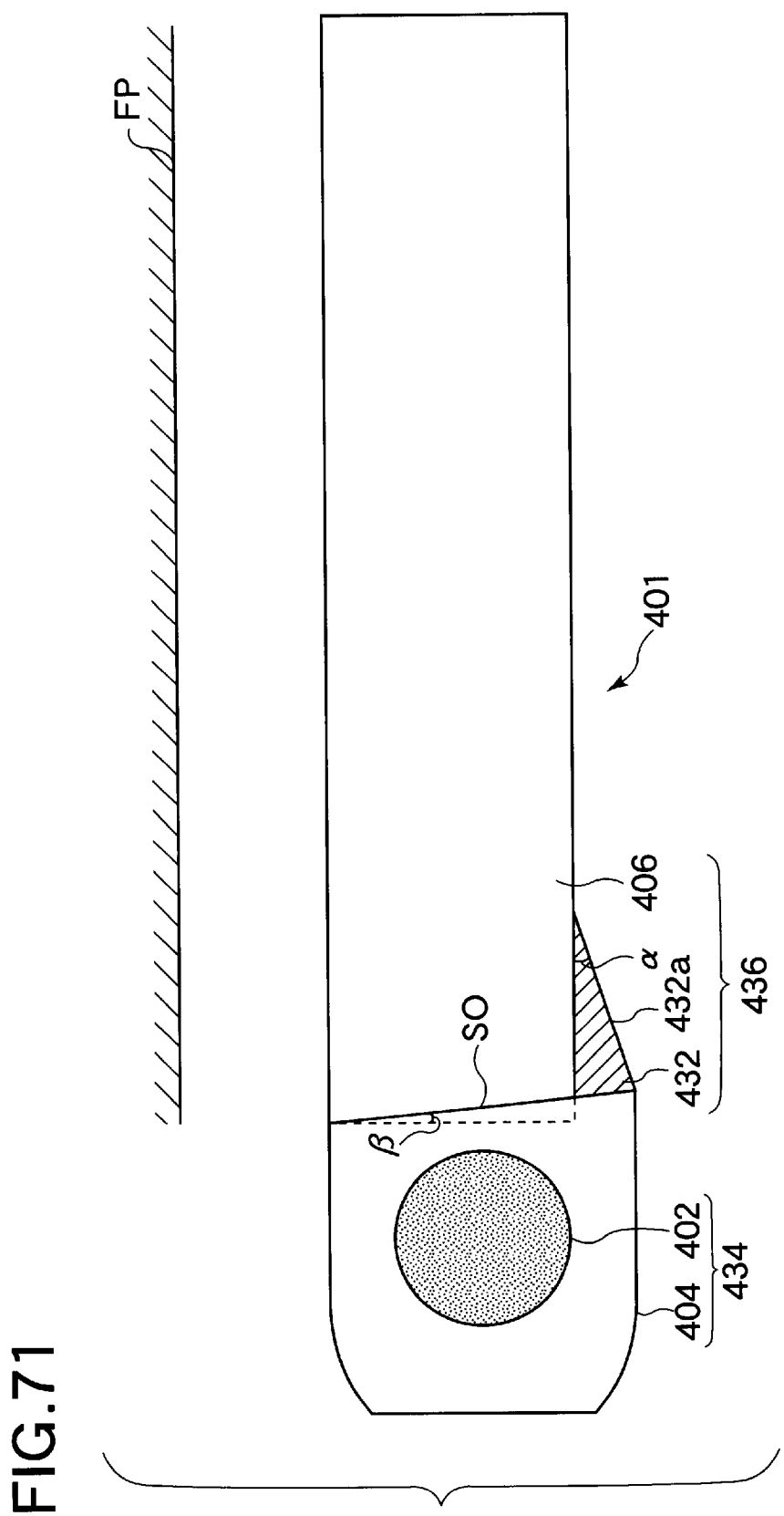
FIG. 71 shows an outline of the lighting unit of Example 7-2 of the seventh embodiment of the invention, illustrating the cross-sectional view of the lighting unit disposed adjacent to the surface of the liquid crystal panel FP to be illuminated by it.

Example 7-2 of this embodiment is described with reference to FIG. 71 and FIG. 72. FIG. 71 is a cross-sectional view showing the outline of the lighting unit 401 of this Example, in which the lighting unit is disposed adjacent to the surface of the liquid crystal panel FP to be illuminated by it. In this, the same constituent elements as those in Example 7-1 are designated by the same reference numerals, and describing them is omitted herein. The lighting unit 401 of this Example is similar to but partly differs from that of Example 7-1, and this is characterized by having only the inclined part 432, not having the inclined part 430. In this, the inclined part 432 stands on the back surface (this is the inclined part-standing surface) of the parallel-plate substrate 406, extending from the light-entering surface SO of the substrate 406.

This Example is further characterized in that the light-entering surface SO is so worked that the inclined part-standing surface and the light-entering surface SO of the parallel-plate substrate 406 meet at an obtuse angle. The angle formed by the perpendicular line dropped from the light-emitting surface of the parallel-plate substrate 406 toward the back surface thereof, and the light-entering surface SO thereof is referred to as an angle of inclination, β. Contrary to the illustration, the inclined part 432 may be omitted to form a structure having the inclined part 430 only. Needless-to-say, this structure ensures the same effect as that of the structure illustrated. Also in the non-illustrated structure, the light-entering surface SO of the parallel-plate substrate 406 is so worked that it meets the light-emitting surface (this is the inclined part-standing surface) thereof at an obtuse angle. Anyhow, this Example is characterized in that the inclined part stands on either one of the light-emitting surface or the back surface of the parallel-plate substrate 406, extending from the light-entering surface SO of the substrate 406.

Figure 72:
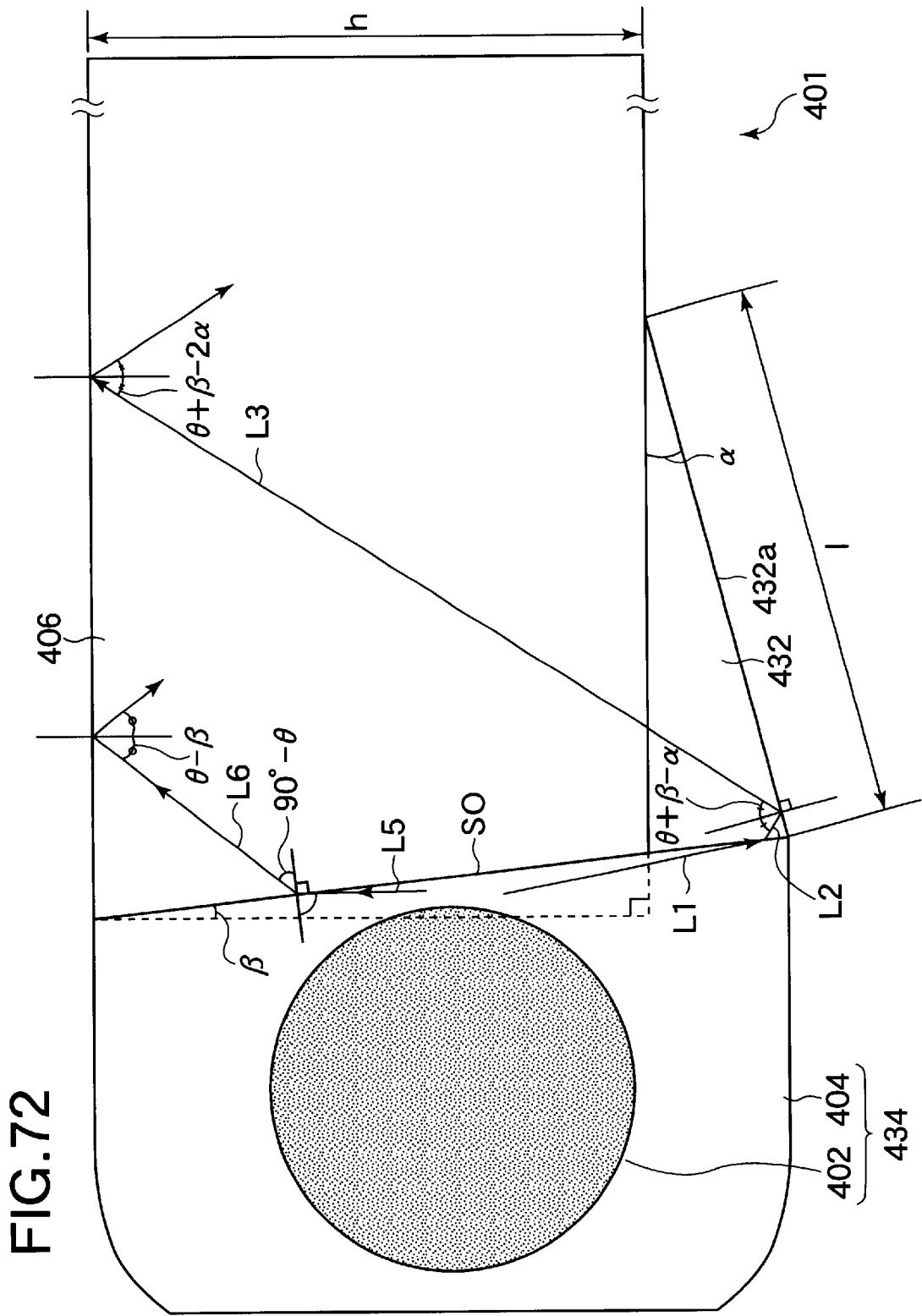
FIG. 72 is a view to show the illumination mode of the lighting unit of Example 7-2 of the seventh embodiment of the invention.

Next described is the illumination mode of the lighting unit 401 of this Example with reference to FIG. 72. FIG. 72 shows how and in what manner the light from the light source 434 runs through the optical waveguide 436. A majority of the light, L5, having entered the optical waveguide 436 runs toward the surface not provided the inclined part 432 thereon. The angle of inclination, β, is so defined that all the light L5 could be the light L6 that undergoes total reflection on the light-emitting surface and the back surface of the parallel-plate substrate 406. The length of inclination, l, is so defined that the light L5, which runs through the optical waveguide while undergoing total reflection, does not hit the inclined part 432.

A part of the light, L1, having entered the optical waveguide through its light-entering surface SO runs toward the inclined part 432, as illustrated. The angle of inclination, α, is so defined that the light L1 undergoes total reflection on the inclined surface 432a, and, after having been thus totally reflected thereon, further undergoes total reflection also on the light-emitting surface and the back surface of the parallel-plate substrate 406. The light L2 thus having undergone total reflection on the inclined surface 432a of the inclined part 432 gives the light L3, and the light L3 thereafter runs through the optical waveguide while repeatedly undergoing total reflection on the light-emitting surface and the back surface of the parallel-plate substrate 406.

For attaining the best result in this Example, it is desirable that the angle of inclination, β, and the angle of inclination, α, are both larger, and that the length of inclination, l, is shorter. In practice, therefore, the parameters are defined so as to satisfy the relational formulae mentioned below. A case where the refracted light L2 reaches the inclined part 432 as in FIG. 72 is referred to by way of example.

First, the incident light L1 from the light source 434 reaches the light-entering surface SO at an incident angle falling between β and (90°+β). The refractive index of the optical waveguide 436 is represented by n. The incident light L1 is refracted on the light-entering surface SO at an angle of refraction falling between β and (90°+β−θ), depending on the refractive index, n, of the optical waveguide 436, and the thus-refracted light L2 then runs through the optical waveguide 436. θ indicates the incident angle of the refracted light L2 having reached the inclined surface 432a, when the angle of inclination, α=0. Accordingly, when the light L1 is refracted on the light-entering surface SO at an angle of refraction, (90°+β−θ) and the thus-refracted light L2 reaches the inclined surface 432a having an angle of inclination, α, then the incident angle of the refracted light L2 to the inclined surface 432a is represented by θ+β−α. The light L3 having undergone total reflection on the inclined surface 432a then hits the light-emitting surface of he parallel-plate substrate 406 at an incident angle, θ+β−2α. Accordingly, in order that the light L2 having entered the optical waveguide through its light-entering surface SO undergoes total reflection on the inclined surface 432a and then further undergoes total reflection also on the light-emitting surface and the back surface of the parallel-plate substrate 406, the angle of inclination, α, of the inclined part 432 must satisfy the formula (6) mentioned below, based on the Snell's law and the total reflection condition.

$$n \cdot \sin(\theta+\beta-2\alpha) \geq 1 \qquad (6).$$

On the other hand, in order that the light L6 running toward the light-emitting surface of the parallel-plate substrate 406 not having the inclined part 432 thereon undergoes total reflection on the light-emitting surface and the back surface of the parallel-plate substrate 406, the angle of inclination, β, must satisfy the formula (7) mentioned below, based on the Snell's law and the total reflection condition.

$$n \cdot \sin(\theta-\beta) \geq 1 \qquad (7).$$

Also based on the Snell's law and the total reflection condition on the light-entering surface SO, $$n \cdot \sin(90-\theta) = 1.$$

Accordingly, $$n \cdot \cos(\theta) = 1 \qquad (8).$$

Still on the other hand, in order that the reflected light from the light having run toward the light-emitting surface of the parallel-plate substrate 406 not having the inclined part 432 thereon does not again enter the inclined part 432 and that the incident light from the light-entering surface SO does not hit the inclined surface 432a twice or more, the length of inclination, l, of the inclined part 432 must satisfy the formula (9) mentioned below. For this, referred to is FIG. 72.

$$l \cong h \cdot \tan(\theta+\beta) - h \cdot \tan(\beta) \qquad (9).$$

When the length of the light-entering surface SO is represented by LSO, $$LSO \cong h/\cos(\beta) + l \cdot \tan(\alpha) \qquad (10).$$

Like in Example 7-1, the optical waveguide 436 is made of an acrylic resin plate (n=1.49) also in this Example. The thickness of the parallel part of the parallel-plate substrate 406, h=10 mm. From the formula (8), θ=47.84°. Accordingly, from the formula (7), β=5.685°. From the formula (6), the angle of inclination, α=5.685°. From the formulae (9) and (10), the length of inclination l≅12.5 mm; and the length of the light-entering surface SO, LSO≅11.3 mm.

As compared with a case of using a conventional parallel-plate optical waveguide, the width of the open end of the reflector 404 can be increased also in this Example, like in Example 7-1; and the quantity of light that may be led into the optical waveguide 436 can be increased by 9%, as compared with the conventional case. In addition, the reflector 404 can be spaced more from the cold-cathode tube 402 than in the conventional case, to thereby reduce leak current.

In Example 7-1 and Example 7-2, the inclined surfaces 430a, 432a are flat. Not limited thereto, the inclined surfaces may be curved or may be polyhedral. However, in order that all the light having entered the optical waveguide 436 runs through it, while repeatedly undergoing total reflection in the remoter area of the parallel-plate substrate not having the inclined parts 430, 432 thereon, any light that enters the optical waveguide through its light-entering surface SO must satisfy the defined condition for the incident angle. Specifically, the angle of inclination must not be larger than the defined angle, α, anywhere in the inclined surfaces 430a, 432a.

In Examples 7-1 and 7-2, the structure of the inclined parts 430, 432 is so defined that all the light having entered the optical waveguide does not hit the inclined parts twice or more. If desired, however, their structure may be so defined that all the light does not hit the inclined parts three times or more, by prolonging the length of inclination, l. In this case, when the inclined surfaces 430a, 432a are flat, the length of inclination, l, could be up to about 200% of the length thereof in the above-mentioned Examples.

In addition, the structure may be so defined that the light does not hit the inclined parts K times or more, by further prolonging the length of inclination, l. The method for defining the structure in such cases may be the same as that for defining the structure in which the light does not hit the inclined parts three times or more. For example, when the inclined surfaces 430a, 432a are flat, the angle of inclination, φ, to be varied will be about (1/K) times the angle of inclination, α, in Examples 7-1 and 7-2; and the length of inclination, f, to be varied will be about K times the length of inclination, l, in Examples 7-1 and 7-2. Accordingly, φ·f≅α·l.

Example 7-3

Figure 73:
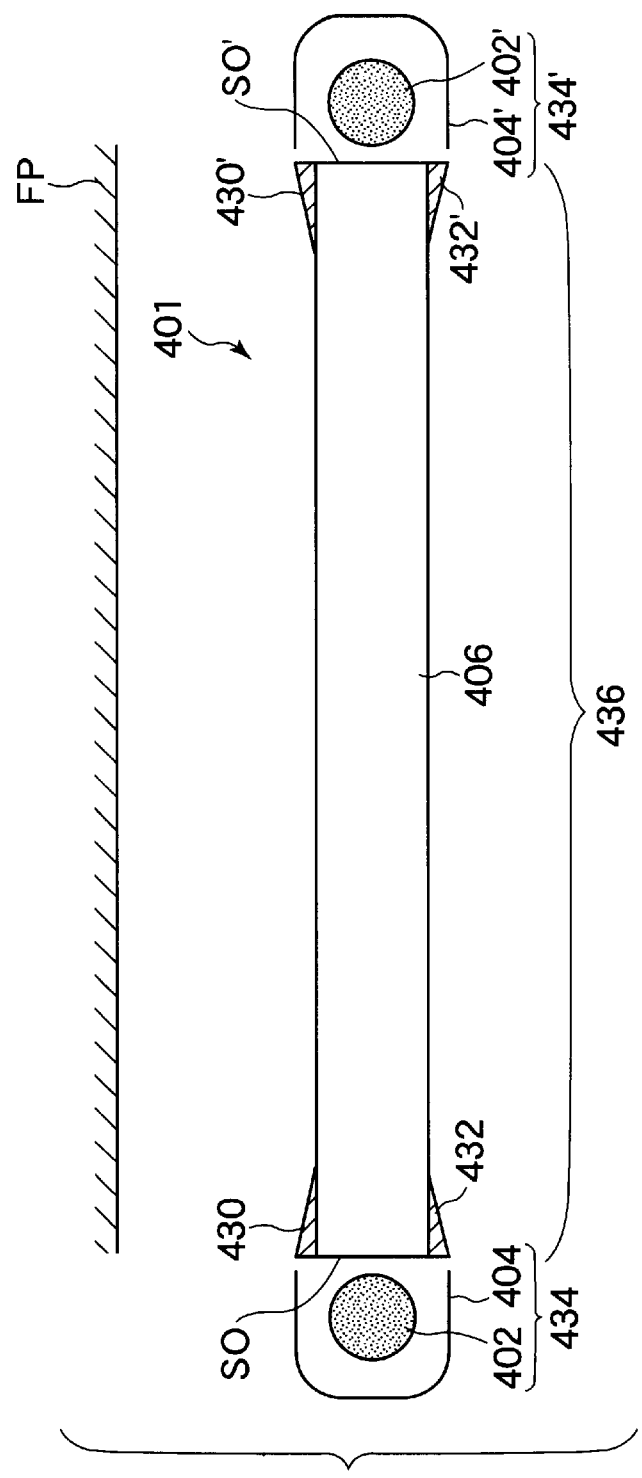
FIG. 73 shows an outline of the lighting unit of Example 7-3 of the seventh embodiment of the invention, illustrating the cross-sectional view of the lighting unit disposed adjacent to the surface of the liquid crystal panel FP to be illuminated by it.

Example 7-3 of this embodiment is described with reference to FIG. 73. FIG. 73 is a cross-sectional view showing the outline of the lighting unit 401 of this Example, in which the lighting unit is disposed adjacent to the surface of the liquid crystal panel FP to be illuminated by it. In this, the same constituent elements as those in Examples 7-1 and 7-2 are designated by the same reference numerals, and describing them is omitted herein. The lighting unit 401 of this Example is similar to but partly differs from that of Example 7-1, and this is characterized in that the inclined parts 430,432 as in Example 7-1 are disposed at the both ends of the parallel-plate substrate 406 of transparent acrylic resin. The both edges of the parallel-plate substrate 406 form light-entering surfaces SO, SO', and light sources 434, 434' are disposed to face the two light-entering surfaces SO, SO'. That is, the light-entering surface SO on the left side in the drawing has the inclined parts 430, 432 and is equipped with the light source 434; and the light-entering surface SO' on the right side therein has the inclined parts 430', 432' and is equipped with the light source 434'.

The light emitted by the light source 434 enters the optical waveguide 436 through the light-entering surface SO, then its optical path is specifically controlled by the inclined part 430, and the thus-controlled light further runs through the parallel-plate substrate 406 while undergoing total reflection therein. On the light-emitting surface (or the back surface) of the parallel-plate substrate 406 and on the light-emitting surface (or the back surface) of the inclined surface 430a, diffusion dots or a reflection element, or a refraction element (all not shown) are provided via which the light from the optical waveguide 436 is led toward the liquid crystal panel FP. The light emitted by the light source 434 at one end of the optical waveguide 436 runs through the parallel-plate substrate 406 to reach the other end of the optical waveguide 436. Since the inclined parts 430', 432' are so constituted that they are open in the light-running direction, the light having reached the other end of the optical waveguide 436 reaches the light-entering surface SO', while undergoing total reflection; and a part of it is reflected on the light-entering surface SO' while the remaining major part thereof enters the light source 434', and is then reflected and scattered by the reflector 404' and the cold-cathode tube 402', and thereafter again enters the optical waveguide 436 though the light-entering surface SO'. The optical action of the inclined parts 430', 432' on the re-entered light is the same as that of the inclined parts 430', 432' on the light emitted by the light source 434', and the re-entered light further runs through the optical waveguide 436 in the opposite direction, while also undergoing total reflection therein.

Example 7-4 and Its Modification

Figure 74:
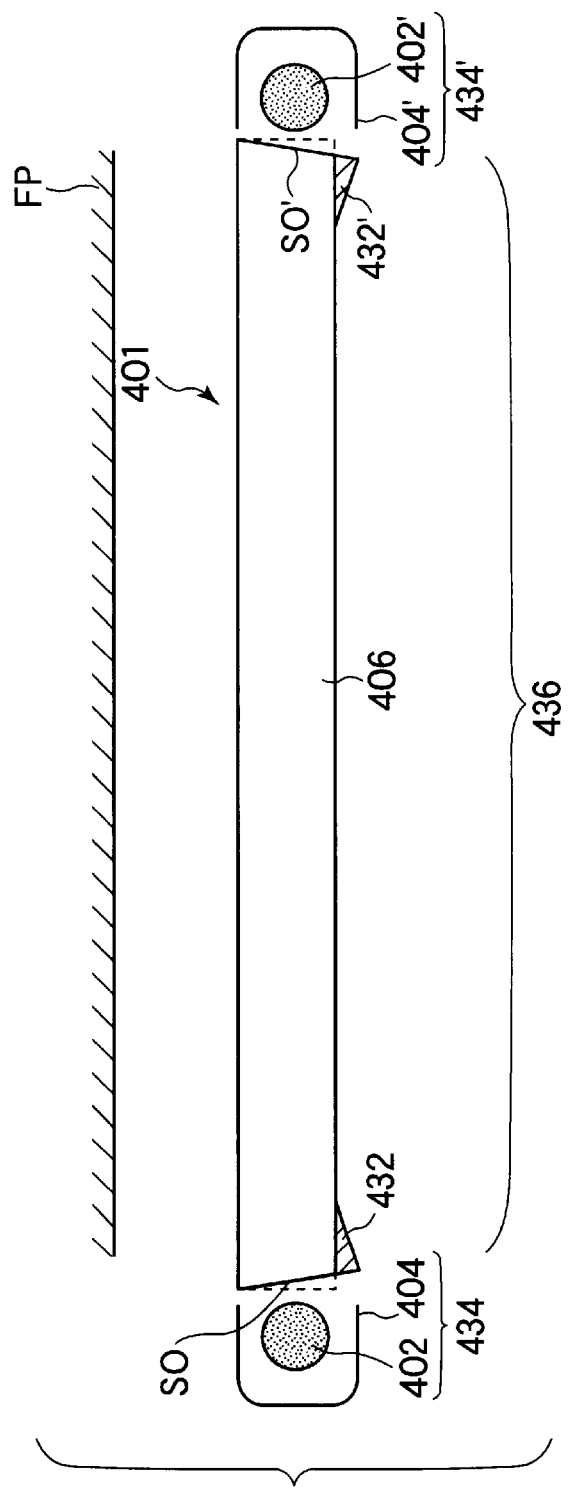
FIG. 74 shows an outline of the lighting unit of Example 7-4 of the seventh embodiment of the invention, illustrating the cross-sectional view of the lighting unit disposed adjacent to the surface of the liquid crystal panel FP to be illuminated by it.

Example 7-4 of this embodiment is described with reference to FIG. 74. FIG. 74 is a cross-sectional view showing the outline of the lighting unit 401 of this Example, in which the lighting unit is disposed adjacent to the surface of the liquid crystal panel FP to be illuminated by it. In this, the same constituent elements as those in Examples 7-1 to 7-3 are designated by the same reference numerals, and describing them is omitted herein. The lighting unit 401 of this Example is similar to but partly differs from that of Example 7-2, and this is characterized in that the inclined part 430 (or 432) as in Example 7-2 is disposed at the both ends of the parallel-plate substrate 406 of transparent acrylic resin. In this, the both edges of the parallel-plate substrate 406 form light-entering surfaces SO, SO', and light sources 434, 434' are disposed to face the two light-entering surfaces SO, SO', like in Example 7-3. Concretely, the inclined part 432 stands on the back surface of the parallel-plate substrate 406, extending from the light-entering surface SO; and the inclined part 432' stands on the back surface of the parallel-plate substrate 406, extending from the light-entering surface SO'. The illumination mode in this Example is the same as that in Examples 7-2 and 7-3, and describing it is omitted herein.

Figure 75:
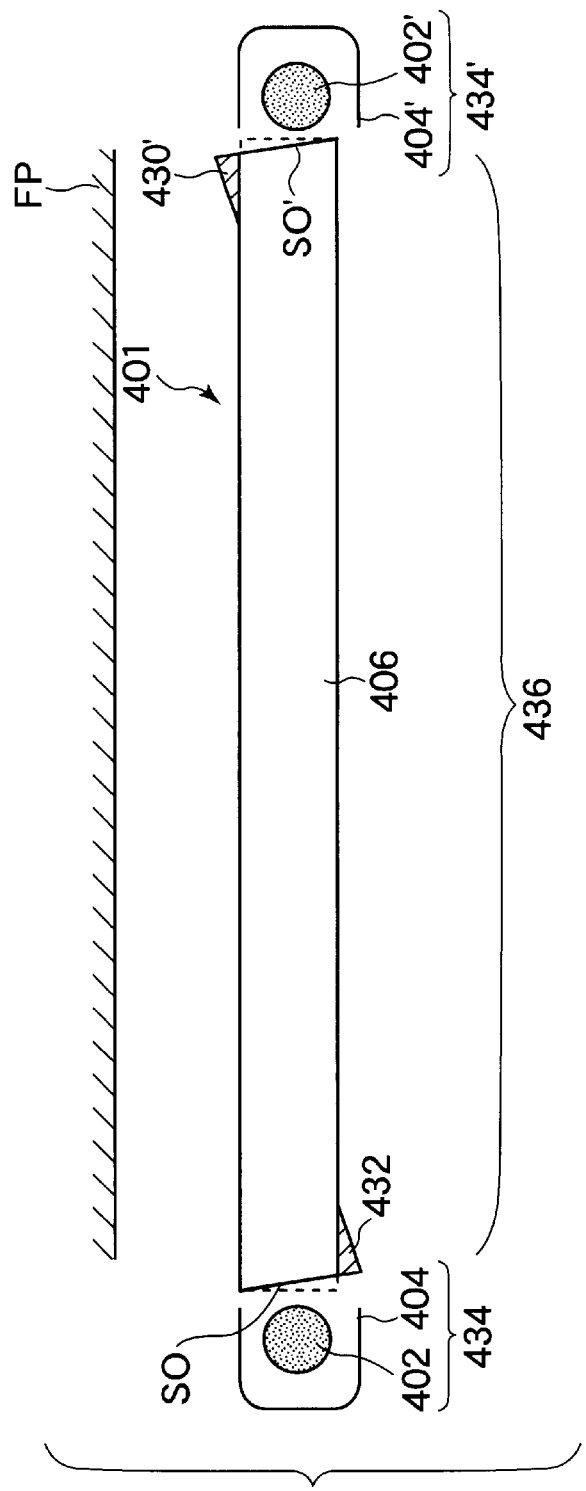
FIG. 75 shows an outline of a modification of the lighting unit of Example 7-4 of the seventh embodiment of the invention, illustrating the cross-sectional view of the modified lighting unit disposed adjacent to the surface of the liquid crystal panel FP to be illuminated by it.

One modification of this Example is described with reference to FIG. 75. As in FIG. 75, the modification of the lighting unit 401 is characterized in that the inclined part 430' stands on the light-emitting surface of the parallel-plate substrate 406, extending from the light-entering surface SO', in place of the inclined part 432' standing on the back surface thereof and extending from the light-entering surface SO' in FIG. 74. This modification ensures the same illumination mode as in Examples 7-2 and 7-3.

Example 7-5 and Its Modification

Figures 76A, 76B, 76C:
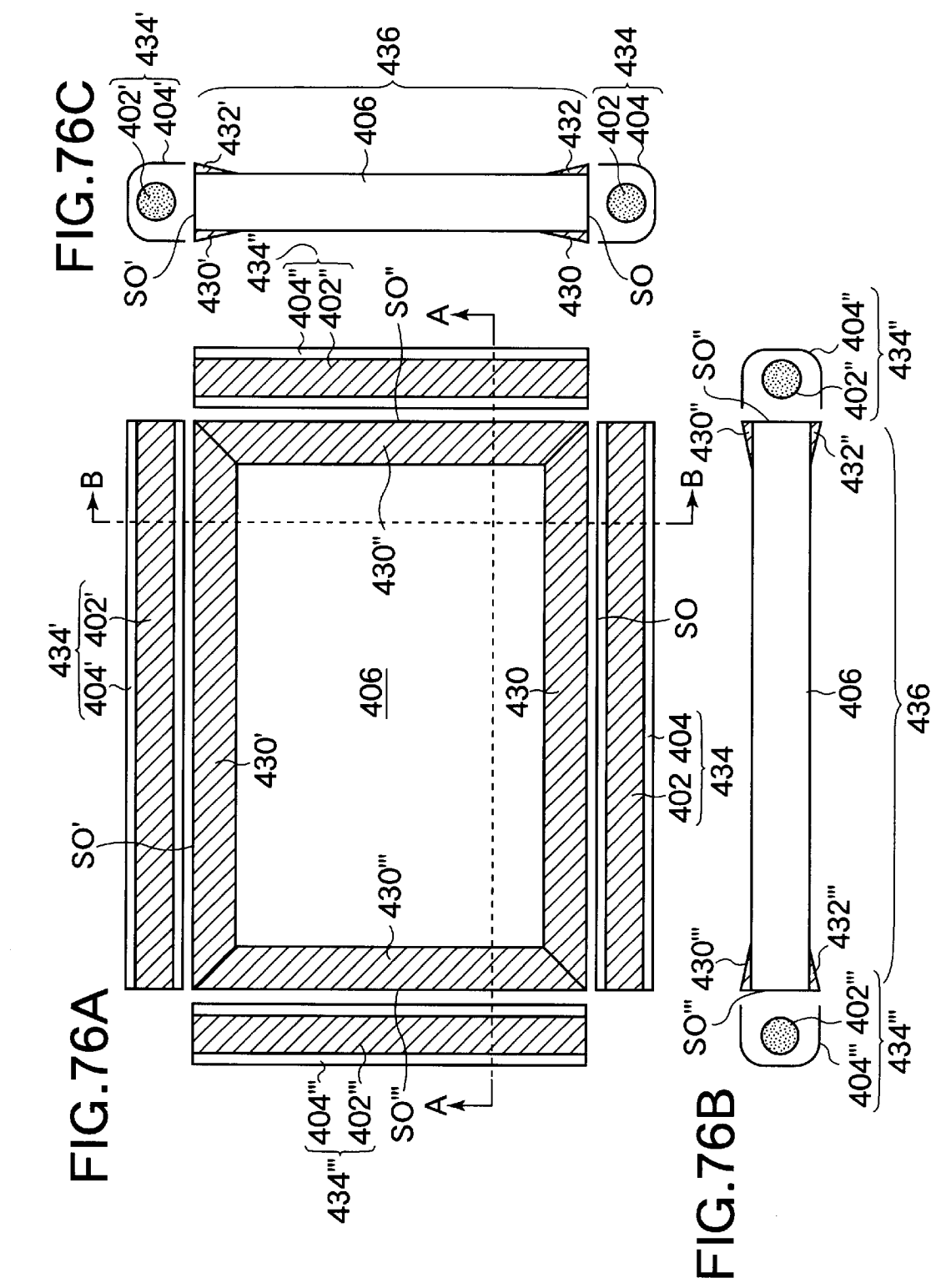

Example 7-5 of this embodiment is described with reference to FIG. 76A to FIG. 76C. FIG. 76A is a plan view of the lighting unit of this Example, showing the optical waveguide 436 seen over the liquid crystal panel FP. FIG. 76B is a cross-sectional view of FIG. 76A, cut along the line A—A; and FIG. 76C is a cross-sectional view thereof, cut along the line B—B. In these, the same constituent elements as those in Examples 7-1 to 7-4 are designated by the same reference numerals, and describing them is omitted herein. The lighting unit of this Example is similar to but partly differs from that of Example 7-3 illustrated in FIG. 73, and this is characterized in that the inclined structure is disposed at all the four edges of the parallel-plate substrate 406, and that four light sources 434, 434', 434", 434'" are disposed to face the four light-entering surfaces SO, SO', SO', SO'", respectively. The illumination mode in this Example is the same as that in Examples 7-1 and 7-4, and describing it is omitted herein.

One modification of this Example is described with reference to FIG. 77A to FIG. 77C. FIG. 77A is a plan view of the lighting unit of this Example, showing the optical waveguide 436 seen over the liquid crystal panel FP. FIG. 77B is a cross-sectional view of FIG. 77A, cut along the line A—A; and FIG. 77C is a cross-sectional view thereof, cut along the line B—B. The lighting unit 401 of this modification is similar to but partly differs from that of Example 7-4 illustrated in FIG. 74, and this is characterized in that the inclined structure is disposed at all the four edges of the parallel-plate substrate 406. In this, the inclined parts 430, 430' standing on the light-emitting surface of the parallel-plate substrate 406 are alternated with the inclined parts 432,432' standing on the back surface thereof, in the peripheral region of the parallel-plate substrate 406. In this constitution, the inclined parts at the four edges of the optical waveguide 436 are prevented from overlapping with each other.

As described in detail with reference to its concrete Examples, the lighting unit of this embodiment ensures increased light-utilization efficiency, since the open area of the reflector therein, or that is, the area of the light-entering surface SO of the optical waveguide therein can be enlarged Therefore, this embodiment of the invention realizes high-luminance lighting units. In addition, it realizes low-cost, lightweight and thin lighting units, since the flat part of the optical waveguide therein can be thinned.

The lighting unit 401 of the above-mentioned sixth and seventh embodiments is favorable for liquid crystal displays having a liquid crystal display panel made of two facing substrates with liquid crystal sealed therebetween, serving as a backlight-type lighting unit that is disposed just below the surface of the liquid crystal display panel to be illuminated by it.

Eighth Embodiment of the Invention

The visible light source (including fluorescent discharge tubes, or fluorescent discharge tubes equipped with reflectors, etc.) to be used in the lighting unit of the eighth embodiment of the invention is described with reference to FIG. 78 to FIG. 85. This embodiment relates to a visible light source in which the UV light generated through discharge emission of mercury or the like is led into a phosphor to give visible light, in particular to cold-cathode tubes favorable as the light source for lighting units for liquid crystal displays.

Figure 78:
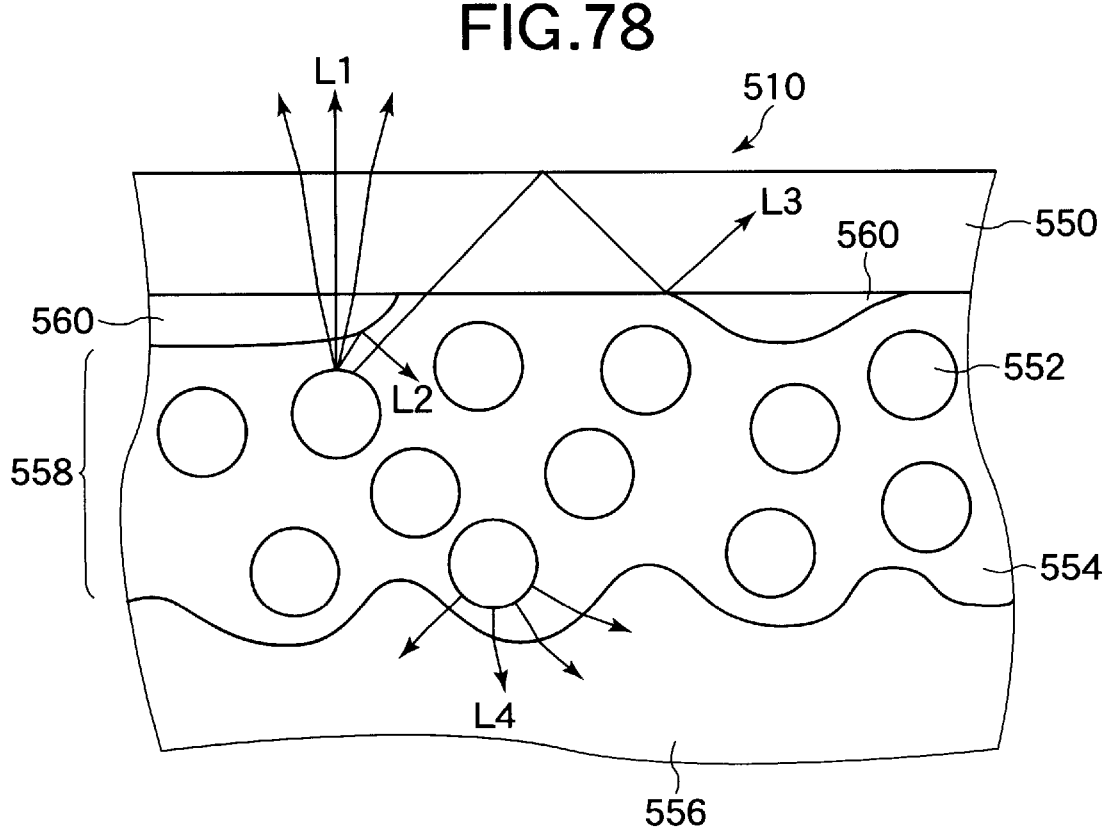
FIG. 78 is an enlarged view showing a part of the cross section around the wall of a conventional cold-cathode tube cut in the direction along with the axial direction of the tube.

For the light source for lighting units for liquid crystal displays, used are cold-cathode tubes for which the inner wall of a glass tube is coated with a phosphor capable of emitting light in the zone of three primary colors. FIG. 78 is an enlarged view showing a part of the cross section around the wall of a cold-cathode tube 510 mounted on conventional backlight units, cut in the direction perpendicular to the axial direction of the tube. In the cold-cathode tube 510 illustrated, a layer of phosphor particles 552 dispersed in a binder 554 is fixed on the inner wall of a glass tube 550 of which the cross section perpendicular to the axis of the tube is in the form of a ring.

The cold-cathode tube 510 shown in FIG. 78 has two problems with respect to the light loss in the phosphor 552 fixed on the inner wall of the glass tube 550. First described is the light L1 that goes out of the glass tube 550. The phosphor layer 558 is nearly parallel to the inner wall of the glass tube 550, and has a flat surface. Between the phosphor layer 558 and the glass tube 550, formed is a space filled with discharge gas or a vacuum space, 560.

When the light L1 passes through the space 560 and the glass tube 550 to go out of the glass tube 550, a part thereof L2 undergoes total reflection on the interface between the phosphor layer 558 and the space 560 and returns to the phosphor layer 558. The light L3 having passed through the region in which the phosphor layer 558 is air tightly bonded to the glass tube 550 also undergoes total reflection on the interface between the inside of the glass tube 550 and the outside thereof. The light having returned to the phosphor layer 558 is absorbed by the phosphor 552, but the returned light amounts to about 20% of the intensity of light emission. Therefore, the amount of light emission to the outside of the glass tube 550 decreases to a non-negligible degree.

Next described is the light L4 from the phosphor 552 toward the discharge gas layer 556 inside the tube. The surface of the phosphor layer 558 that faces the discharge gas layer 556 is roughened, depending on the configuration therearound of the phosphor particles 552 having a diameter of from 3 to 10 $\mu$m or so, or many phosphor particles are exposed out of the surface. Therefore, the surface of the phosphor layer 558 does not produce reflection (especially total reflection) thereon, and the light L4 easily enters the discharge gas layer 556. However, the light L4 having entered the discharge gas layer 556 is partly absorbed by the layer 556, and the quantity of light going out of the glass tube 550 decreases. For these reasons, the conventional cold-cathode tube is problematic in that the quantity of light absorbed inside it is large and is not negligible, and that its luminous efficiency could not be increased. The object of this embodiment of the invention is to provide a discharge emission tube capable of reducing light absorption therein and capable of realizing increased luminous efficiency.

The discharge emission tube of this embodiment is first characterized in that the inner surface of the phosphor layer which faces the discharge gas layer therein is so modified that the emitted light hardly enters the discharge gas layer. Concretely, the surface of the phosphor layer that faces the discharge gas layer is planarized to have a smoothly curved surface roughness of at most $10^{-7}$ m or so. With that, the possibility that the light having been emitted toward the discharge gas layer undergoes total reflection on the interface between the discharge gas layer and the phosphor layer is increased, and, as a result, the absorption of light by the discharge gas layer can be thereby reduced.

The second characteristic is that the outer surface of the phosphor layer which faces the inner wall of the glass tube is so modified that the emitted light easily goes out of the tube. Concretely, the phosphor layer is so processed that the phosphor particles are exposed out of its outer surface which faces the inner wall of the glass tube, whereby the possibility that the light running out of the tube undergoes total reflection on the interface between the phosphor layer and the space or on the outer wall of the glass tube is reduced.

Apart from it, the binder for binding the phosphor particles is so processed that the outer surface of the phosphor layer which faces the inner wall of the glass tube is roughened to have a profile similar to the phosphor particles and their configuration. With that, the possibility that the light running out of the tube undergoes total reflection on the interface between the phosphor layer and the space or on the outer wall of the glass tube is reduced.

The third characteristic is that a phosphor layer is formed on the outer wall of the glass tube. The advantage of the phosphor layer formed on the outer wall of the glass tube is that its surface that receives UV rays is readily planarized and smoothly curved.

The fourth characteristic is that the plane accuracy of the surface of the phosphor layer which faces the discharge gas layer is on the level of the visible light wavelength range. With that, light scattering on the interface between the discharge gas layer and the phosphor layer is reduced, and the light to return from the phosphor layer to the discharge gas layer is reduced.

The fifth characteristic is that the visible light source comprises a phosphor layer and a UV source spaced from each other and that the surface thereof through which the visible light goes out of it is roughened. That is, the visible light source comprising a phosphor layer and a UV source is so constituted that the visible light converted in the phosphor layer is taken out of it through one surface of the phosphor layer and that the surface of the phosphor layer through which the visible light is taken out of it is roughened in accordance with the profile of the phosphor particles.

The sixth characteristic of the visible light source is that the surface of the phosphor layer which faces the UV source therein is planarized. Concretely, the surface of the phosphor layer nearer to the UV source is planarized to have a surface roughness of at most $10^{-7}$ m or so.

The visible light source of this embodiment is described more concretely with reference to the following Examples.

Example 8-1

Figure 79:
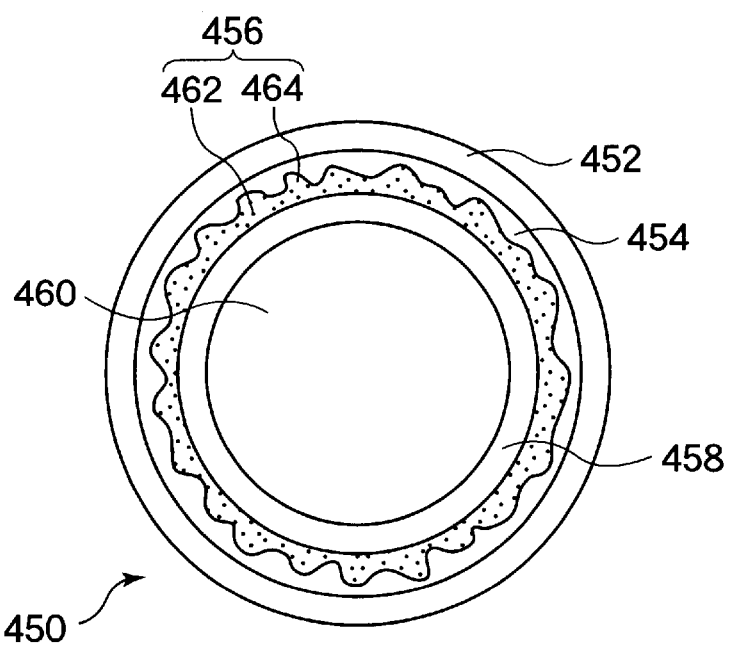
FIG. 79 is a cross-sectional view of the cold-cathode tube of Example 8-1 of the eighth embodiment of the invention, cut in the direction perpendicular to the axial direction of the tube.
Figure 80:
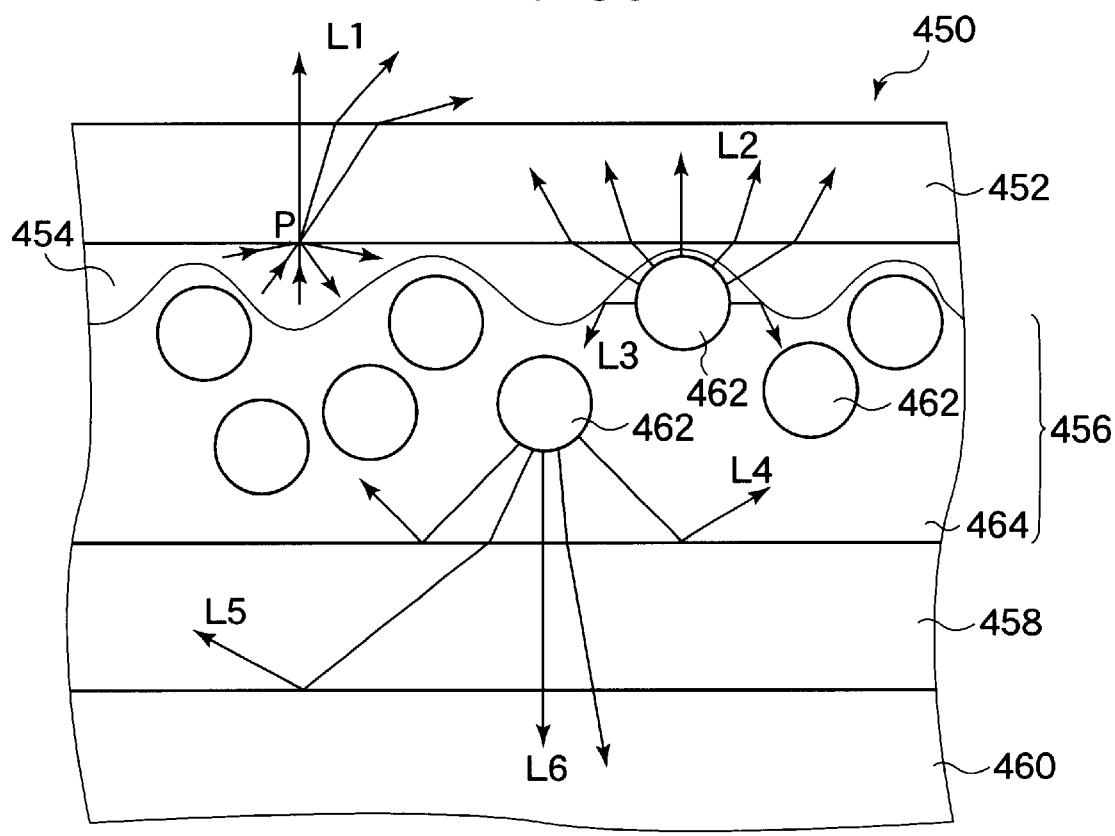
FIG. 80 is an enlarged view showing a part of the cross section around the wall of the cold-cathode tube of Example 8-1 of the eighth embodiment of the invention, cut in the direction along with the axial direction of the tube.

Referring to FIG. 79 and FIG. 80, Example 8-1 of this embodiment is described. FIG. 79 is a cross-sectional view of the cold-cathode tube of Example 8-1, cut in the direction perpendicular to the axial direction of the tube. The cold-cathode tube 450 comprises a combination of an outer transparent tube 452 of hard glass having, for example, an outer diameter of 2.8 mm and an inner diameter of 2.6 mm; and an inner transparent tube 458 of quartz having, for example, an outer diameter of 2.4 mm and an inner diameter of 2.0 mm. The outer wall of the inner tube 458 has a phosphor layer 456 formed thereon. The phosphor layer 456 comprises phosphor particles 462 and a binder 464 that carries them dispersed therein. The inner tube 458 surrounds a hollow, which is filled with a discharge gas to form a discharge gas layer 460.

In this embodiment, the phosphor layer 456 adheres to the outer wall of the inner tube 458, and the interface between them is a smoothly curved and planarized plane. Accordingly, the surface of the phosphor layer 456 that faces the discharge gas layer 460 is planarized. On the otherhand, the outer surface of the phosphor layer 456 opposite to the discharge gas layer 460 is not kept in contact with the inner wall surface of the outer tube 452, and the phosphor particles 462 are exposed out of the outer surface of the phosphor layer 456. Therefore, the outer surface of the phosphor layer 456 is roughened, and its surface roughness is nearly to the degree of the radius of the phosphor particles 462 (about 1.5 to 5 $\mu$m) and follows the configuration of the phosphor particles 462.

The phosphor layer 456 in this Example is formed in the manner mentioned below. First prepared is a coating liquid of phosphor. That is, a mixture of phosphor particles 462 in 5% by volume of a binder (water glass) 464 is dispersed in a solvent of 0.6% by weight of ammonium polymethacrylate in water to prepare a coating liquid of phosphor. The coating liquid is applied to a quartz tube (inner tube 458) standing vertically, along its outer wall surface, then the resulting quartz tube is baked, and the phosphor layer 456 formed around it is dried with hot air.

The inner structure of the thus-formed phosphor layer 456 is analyzed. In a conventional case, the binder 464 air tightly fills the space around a large number of nearly spherical phosphor particles 462 to form a dense film. In this Example, however, the binder 464 is not enough to fully fill the space around the phosphor particles 462. Therefore, the fine hillocks in the outer surface of the quartz tube (inner tube 458) act as nuclei for film formation, and the water glass deposits on them to form a film. As a result, the interface between the quartz tube and the film has a dense structure. However, in the area remoter from the surface of the quartz tube, the water glass is not enough for dense film formation, and the space around the phosphor particles 462 is not fully filled with the water glass. Finally, therefore, the surface of the phosphor layer 456 not in contact with the quartz tube is roughened on an order of a few $\mu$m, directly reflecting the outer profile of the phosphor particles 462 and the configuration thereof.

FIG. 80 is a view showing a part of the cross section around the wall of the cold-cathode tube 450, cut in the direction perpendicular to the axial direction of the tube. Referring to FIG. 80, the optical path of the light emitted by the cold-cathode tube 450 is described. A space 454 is formed between the surface of the phosphor layer 456 opposite to the discharge gas layer 460 and the inner wall of the outer tube 452. The light having run through the space 454 and entered the outer tube 452 at a point P of the inner wall thereof is refracted, and the refracted light L1 then further runs inside the outer tube 452 and goes out of it through the outer wall thereof. The refractive index of the outer tube 452 is larger than that of the space 454.

Next described is the light running from the phosphor particles 462 toward the inner wall of the outer tube 452. The surface of the phosphor layer 456 that faces the inner wall of the outer tube 452 is roughened, following the phosphor particles 462 and their configuration, and some phosphor particles 462 (not shown). Accordingly, the light having reached the surface of the phosphor layer 456 just below the inner wall of the outer tube 452 is hardly reflected thereon, and the light L2 easily passes through the outer tube 452. In this region, only a part of the emitted light that is nearly parallel to the inner wall of the outer tube 452, like the light L3, undergoes total reflection on the interface between the surface of the phosphor layer 456 and the space 454, and, therefore, most of the emitted light can be led out of the outer tube 452 at high efficiency.

Next described is the light running toward the discharge gas layer 460. The phosphor layer 456 is nearly parallel to the inner wall of the inner tube 458 and has a smooth surface. Therefore, a part of the light emitted by the phosphor particles 462 undergoes total reflection on the interface between the phosphor layer 456 and the inner tube 458, and returns to the phosphor layer 456. This is the returned light L4. On the other hand, the light having entered the inner tube 458 undergoes total reflection on the interface between the inner tube 458 and the discharge gas layer 460, and returns to the inner tube 458. This is the returned light L5. Accordingly, only apart, L6, of the light emitted by the phosphor particles 462 toward the discharge gas layer 460 enters the discharge gas layer 460.

In this Example, since the inner surface of the phosphor layer 456 that surrounds the inner tube 458 and faces the discharge gas layer 460 is planarized in the manner as described hereinabove, the possibility that the light emitted toward the discharge gas layer 460 undergoes total reflection on the interface between the phosphor layer 456 and the inner tube 458 and also on the interface between the inner tube 458 and the discharge gas layer 460 is increased, and the absorption of light by the discharge gas layer 460 is reduced. In addition, since the phosphor layer 456 is formed to surround the outer wall of the inner tube 458, the surface of the phosphor layer 456 that receives UV rays can be readily planarized.

Moreover, in this Example, some phosphor particles 462 are exposed out of the outer surface of the phosphor layer 456 that faces the inner wall of the outer tube 452, and the outer surface of the phosphor layer 456 is roughened so as to nearly follow the profile of the phosphor particles 462 themselves and their configuration. Therefore, the possibility that the light running toward the outer tube 452 and outside it undergoes total reflection on the interface between the phosphor layer 456 and the space 454, or in the space 454 and on the inner and outer walls of the outer tube 452 is reduced.

In addition, in this Example, the surface of the phosphor layer 456 that faces the discharge gas layer 460 is so planarized that its plane accuracy is on the level of the visible light wavelength range, for example, on the level of surface roughness of at most about $10^{-7}$ m. With that, the light to scatter in the interface between the discharge gas layer 460 and the phosphor layer 456 is reduced and the light to return from the phosphor layer 456 to the discharge gas layer 460 is reduced.

Table 4 below shows the comparison between the cold-cathode tube 450 of this Example and a conventional cold-cathode tube in point of light transmission, absorption and reflection. As is obvious from the data in Table 4, the cold-cathode tube of this Example is superior to the conventional cold-cathode tube with respect to all the parameters of visible light transmittance, absorbance and reflectance.

TABLE 4

Comparison between Cold-Cathode Tube 450 of Example 8-1 and Conventional Cold-Cathode Tube

| | Visible Light Transmittance | Visible Light Absorbance | Visible Light Reflectance |
|---|---|---|---|
| Conventional Cold-Cathode Tube | 14% | 40% | 46% |
| Cold-Cathode Tube 450 of Example 8-1 | 76% | 15% | 9% |

Example 8-2

Figure 81:
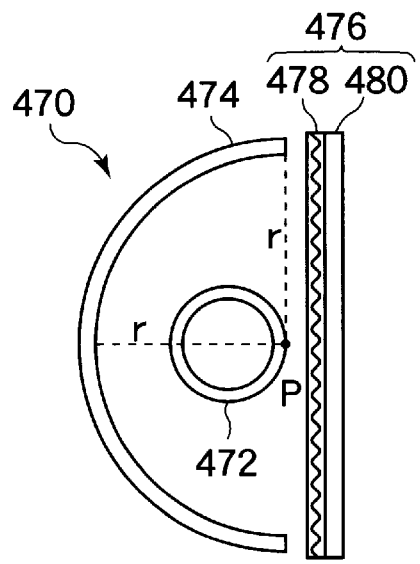
FIG. 81 is a cross-sectional view of the visible light source 470 of Example 8-2 of the eighth embodiment of the invention, cut in the direction perpendicular to the axial direction of the UV source.

Example 8-2 of this embodiment is described with reference to FIG. 81 and FIG. 82. FIG. 81 is a cross-sectional view of the visible light source 470 of Example 8-2, cut in the direction perpendicular to the axial direction of the UV source. For the UV source, used is a mercury discharge tube 472 of which the bulb is a quartz tube. The mercury discharge tube 472 has an outer diameter of 2.6 mm and an inner diameter of 2.0 mm. The mercury discharge tube 472 is covered with a concave mirror 474 of aluminium, except for the region of its open end. For its cross section, the mirror surface of the concave mirror 474 is semicircular, having a radius, r, to its center that corresponds to the point, P, on the outer surface of the mercury discharge tube 472, r=4 mm. To the open end of the concave mirror 474, attached is an emission filter 476 having a substrate of hard glass.

Figure 82:
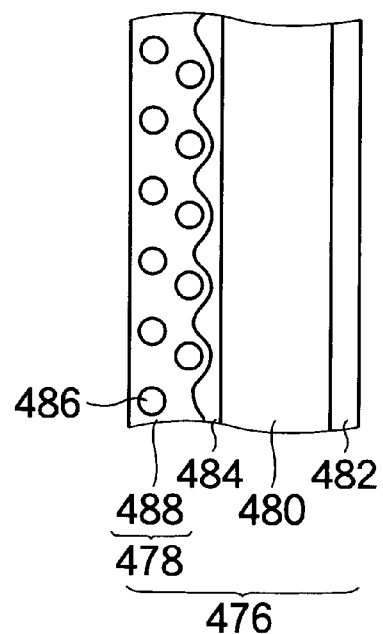
FIG. 82 is an enlarged view showing the details of the constitution of the emission filter 476 disposed adjacent to the visible light source 470 of Example 8-2 of the eighth embodiment of the invention.

FIG. 82 is an enlarged view showing the details of the constitution of the emission filter 476. As in FIG. 82, the surface of the hard glass substrate 480 that faces the mercury discharge tube 472 is coated with a phosphor layer 478, and the opposite surface thereof is coated with an UV reflection film 482.

In the phosphor layer 478, a large number of phosphor particles 486 are fixed by a binder 488. The surface of the phosphor layer 478 that faces the hard glass substrate 480 is roughened, and this is kept in contact with the substrate 480 via the space 484 therebetween. Some phosphor particles (having a diameter of from 3 $\mu$m to 10 $\mu$m) are exposed out to roughen the surface of the phosphor layer 478.

The phosphor layer 478 in this Example is formed in the manner mentioned below. First prepared is a coating liquid of phosphor. Concretely, a mixture of phosphor particles 486 in 35% by volume of a binder (water glass) 488 is dispersed in a solvent of 0.6% by weight of ammonium polymethacrylate in water to prepare a coating liquid of phosphor. On the other hand, a film of a water-repellent substance is formed on the surface of the hard glass substrate 480 to be coated with phosphor. The film-forming substance is a metal fluoride. In this Example, magnesium fluoride is used. According to a pulling method, the coating liquid is applied to the magnesium fluoride-coated surface of the hard glass substrate 480, then the hard glass substrate 480 is baked, and the phosphor film 478 formed thereon is dried with hot air.

The inner structure of the thus-formed phosphor layer 478 is analyzed. The space around the nearly spherical phosphor particles 486 is filled with the binder 488 to form a dense film. As compared with the phosphor layer 456 in Example 8-1, the phosphor layer 478 in this Example contains a larger amount of water glass, and the space around the phosphor particles 486 is fully filled with the water glass to form such a dense film. However, since the surface of the hard glass substrate 480 has a film of a water-repellent substance formed thereon, the coating liquid can not fully wet it, and, as a result, the phosphor layer 478 is formed on the hard glass substrate 480 with some non-contact space therebetween. In the non-contact space between the phosphor layer 478 and the hard glass substrate 480, the surface of the phosphor layer 478 that faces the substrate 480 is roughened, reflecting the outer profile of the phosphor particles 486 themselves and their configuration.

In that manner, this Example differs from Example 8-1. Specifically, in this, the phosphor layer 478 is spaced from the mercury discharge tube 472, and the phosphor layer 478 is so disposed that its roughened surface faces the light emission side. On the other hand, the surface of the phosphor layer 478 that faces the mercury discharge tube 472 is planarized to have a surface roughness of at most about $10^{-7}$ m or so. Accordingly, the constitution of this Example ensures high-efficiency light emission, like that of Example 8-1.

Example 8-3

Figure 83:
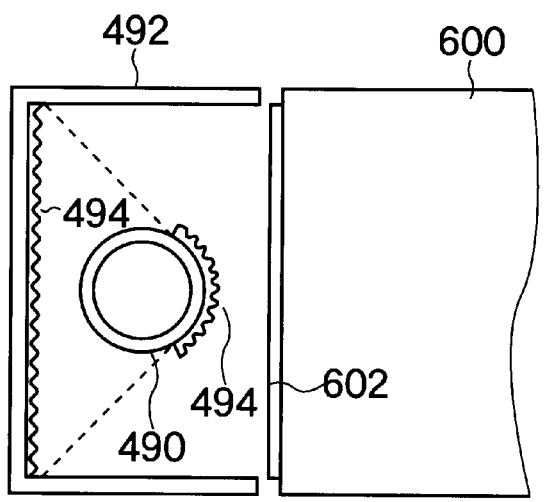
FIG. 83 is a cross-sectional view of the visible light source of Example 8-3 of the eighth embodiment of the invention, cut in the direction perpendicular to the axial direction of the UV source.
Figure 84:
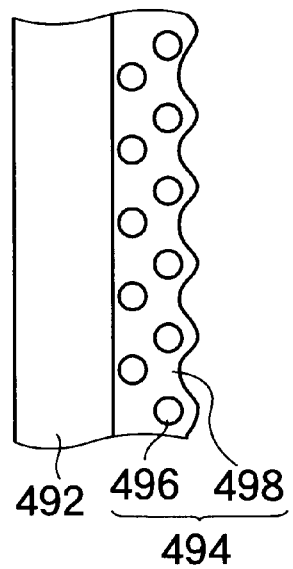
FIG. 84 is an enlarged view showing the details around the phosphor layer 494 attached to the aluminum mirror 492 in Example 8-3 of the eighth embodiment of the invention.
Figure 85:
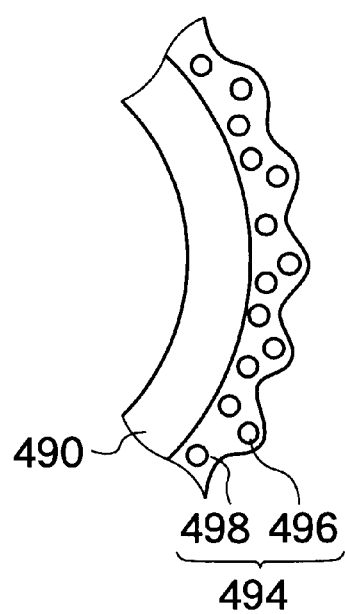
FIG. 85 is an enlarged view showing the details around the phosphor layer 494 attached to the mercury discharge tube 490 in Example 8-3 of the eighth embodiment of the invention.

Example 8 -3 of this embodiment is described with reference to FIG. 83 to FIG. 85. FIG. 83 is a cross-sectional view of the visible light source of this Example, cut in the direction perpendicular to the axial direction of the UV source. For the UV source, used is a mercury discharge tube 490 of which the bulb is a quartz tube, like in Example 8-2. Around the mercury discharge tube 490, disposed is an aluminum mirror 492 having an angular U-shaped cross section. Adjacent to the open end of the aluminum mirror 492, fixed is an optical waveguide 600 via a UV reflection film 602 therebetween. On a part of the inner reflective surface of the aluminum mirror 492 having an angular U-shaped cross section, a phosphor layer 494 is formed opposite to the open end of the aluminum mirror 492. As in FIG. 84, the phosphor layer 494 is air tightly formed on the inner surface of the aluminum mirror 492, and a large number of phosphor particles 496 are fixed by a binder 498 in the phosphor layer 494. The surface of the phosphor layer 494 opposite to the inner surface of the aluminum mirror 492 is roughened to have a surface roughness of from 5 to 10 $\mu$m. The phosphor layer 494 in this Example may be formed in the same manner as in Example 8-1.

A phosphor layer 494 is also formed on a part of the outer surface of the mercury discharge tube 490. The phosphor layer 494 on the outer surface of the mercury discharge tube 490 is formed within the region between the two points at which the tangential lines drawn from the upper and lower corners of the angular U-shaped cross section of the aluminum mirror 492 toward the outer surface of the mercury discharge tube 490 each meet the outer surface of the mercury discharge tube 490. FIG. 85 is an enlarged view showing the details of a part of the phosphor layer 494 formed on the outer surface of the mercury discharge tube 490. As illustrated, the constitution of the phosphor layer 494 formed on the outer surface of the mercury discharge tube 490 is the same as that of the phosphor layer 494 formed on the inner surface of the aluminum mirror 492.

The light from the phosphor layer 494 on the outer surface of the mercury discharge tube 490 does not reach the phosphor layer 494 formed on the inner surface of the aluminum mirror 492. In the constitution of this Example, therefore, the light that may enter the phosphor layer 494 twice or more is reduced, and the visible light loss (this amounts 20% in one re-entrance of light into the phosphor layer) is thereby reduced. Accordingly, the electric power-visible light conversion efficiency in the constitution of this Example is high.

Table 5 below shows a comparison between the visible light source of this Example and a conventional light source in point of the light emission efficiency. As is obvious from the data in Table 5, the visible light source of this Example is superior to the conventional visible light source with respect to the overall efficiency. The principled efficiency in conversion of UV light into visible light is the same in the two, and is therefore neglected herein.

TABLE 5

Comparison between Visible Light Source of Example 8-3 and Conventional Light Source in point of Light Emission Efficiency

| | Light Emission A from Emission Tube (UV emission = 1) | Efficiency B of Light Source Unit (except the emission tube) | Overall Efficiency A × B |
|---|---|---|---|
| Visible Light Source of Example 8-3 | 100% | 63% | 63% |
| Conventional Light Source | 73% | 75% | 54% |

As described in detail hereinabove, the invention realizes high-luminance and long-life light sources ensuring uniform emission, and realizes not only display devices favorable to flat panel displays such as liquid crystal displays, etc. but also lighting devices for the use of the signboard and the like.

What is claimed is:

1. A lighting unit comprising:
   a light source unit having an emitter which has a transparent body with a refractive index n0 containing a light-emitting substance sealed in an empty region inside thereof, a housing that houses the emitter and has reflector formed on an inner surface, and a transparent filler with a refractive index n1 filled in the housing; and
   an optical waveguide made of a transparent substance with a refractive index n2 and having a light-emitting surface;
   wherein the profile of the light-reflecting surface of the reflector satisfies the requirement of:

$|\theta 1 - \theta 2| < \cos^{-1}(1/n2)$, in which θ1 indicates the angle between the normal line nA at a point A on the surface and the tangential line 1 that tangentially connects the point A and the outline of the empty region, and
   θ2 indicates the angle between the line segment m that is parallel to the light-emitting surface and is in the plane formed by the normal line nA and the tangential line 1, and the normal line nA.

2. A lighting unit comprising:
   a light source unit having an emitter which has a transparent body with a refractive index n0 containing a light-emitting substance sealed in an empty region inside thereof, a housing that houses the emitter and has a reflector formed on an inner surface, a transparent filler with a refractive index n1 filled in the housing, and an optical path-changing device disposed in the transparent filler for changing an optical path; and
   an optical waveguide made of a transparent substance with a refractive index n2 and having a light-emitting surface.

3. A lighting unit comprising:
   a light source unit having an emitter which has a transparent body with a refractive index n0 containing a light-emitting substance sealed in an empty region inside thereof, a housing that houses the emitter and has a reflector formed on its inner surface, and a transparent filler with a refractive index n1 filled in the housing;
   an optical waveguide made of a transparent substance with a refractive index n2 and having a light-emitting surface;
   a second reflector formed on the light-emitting surface and having a plurality of open ends;
   a second light source unit, wherein each light source unit is provided at an end of the optical waveguide,
   wherein a distance, w, between the light source units that corresponds to the length of the optical waveguide sandwiched between the light source units and a thickness, d, of the optical waveguide satisfy the requirement of 20×d<w<45×d.

4. The lighting unit as claimed in claim 1, wherein the emitter is a discharge tube; and
   the dielectric loss tangent of the transparent filler is minimized at around the driving frequency of the discharge tube.

5. The lighting unit as claimed in claim 1, wherein the emitter is a discharge tube; and
   the dielectric constant of the transparent filler has a maximum value at around the driving frequency of the discharge tube.

6. The lighting unit as claimed in claim 1, wherein the refractive index n1 of the transparent filler falls between the refractive index n0 of the transparent body that forms the emitter and the refractive index n2 of the optical waveguide.

7. A liquid crystal display with a liquid crystal sandwiched between a pair of two facing substrates, which comprises:
   a lighting unit comprising:
      a light source unit having an emitter which has a transparent body with a refractive index n0 containing a light-emitting substance sealed in an empty region inside thereof, a housing that houses the emitter and has reflector formed on an inner surface, and a transparent filler with a refractive index n1 filled in the housing; and
   an optical waveguide made of a transparent substance with a refractive index n2 and having a light-emitting surface;
   wherein the profile of the light-reflecting surface of the reflector satisfies the requirement of:

$|\theta 1 - \theta 2 < \cos^{-1}(1/n2)$, in which θ1 indicates the angle between the normal line nA at a point A on the surface and the tangential line 1 that tangentially connects the point A and the outline of the empty region, and
   θ2 indicates the angle between the line segment m that is parallel to the light-emitting surface and is in the plane formed by the normal line nA and the tangential line 1, and the normal line nA.

8. A lighting unit comprising:
   a plurality of optical waveguides disposed adjacent to a display panel surface to be illuminated;
   an emission tube disposed between the optical waveguides and nearer to the back surfaces of the optical waveguides than to the light-emitting surfaces thereof that face the display panel surface; and a reflector is disposed between the neighboring optical waveguides in the space between the display surface and the emission tube.

9. A lighting unit comprising:

a plurality of optical waveguides disposed adjacent to a display panel surface to be illuminated; and an emission tube disposed between the optical waveguides and nearer to the back surfaces of the optical waveguides than to the light-emitting surfaces thereof that face the display panel surface;

wherein a light-entering surface of each optical waveguide at an end meets the back surface thereof at an obtuse angle.

10. The lighting unit as claimed in claim 9, wherein each optical waveguide is made of a transparent member having a refractive index, n=1.41 or more; and the obtuse angle is larger than 90° but not larger than 102°.

11. The lighting unit as claimed in claim 9, further comprising a reflector disposed adjacent to the emission tube on the side thereof opposite to the display panel surface.

12. The lighting unit as claimed in claim 9, further comprising a light-scattering element disposed between the neighboring optical waveguides in the space between the display panel surface and the emission tubes.

13. The lighting unit as claimed in claim 12, wherein the light-scattering element is an anisotropic light-scattering element of which the light-diffusing ability varies depending on the direction of an entering light.

14. The lighting unit as claimed in claim 8, further comprising a diffuser disposed on the surface of each optical waveguide.

15. The lighting unit as claimed in claim 14, wherein the diffuser is a diffusion pattern of a plurality of diffusion dots disposed on the back surface of each optical waveguide.

16. The lighting unit as claimed in claim 14, wherein the diffuser is a plurality of recesses each having a triangular cross section, formed on the back surface of each optical waveguide.

17. The lighting unit as claimed in claim 14, further comprising;

a second optical waveguide; and an optical adhesive layer provided between the surfaces of the plurality of optical waveguides and the second optical waveguide.

18. The lighting unit as claimed in claim 17, wherein the diffuser is attached to the second optical waveguide and not to the plurality of optical waveguides.

19. A liquid crystal display comprising a liquid crystal panel with liquid crystal sealed between two facing substrates, and a lighting unit disposed adjacent to the surface of the liquid crystal panel to be illuminated by the unit, wherein the lighting unit comprises:

a plurality of optical waveguides disposed adjacent to a display panel surface to be illuminated;

an emission tube disposed between the optical waveguides and nearer to the back surfaces of the optical waveguides than to the light-emitting surfaces thereof that face the display panel surface; and a reflector is disposed between the neighboring optical waveguides in the space between the display surface and the emission tube.

20. A liquid crystal display comprising a liquid crystal panel with liquid crystal sealed between two facing substrates, and a lighting unit disposed adjacent to the surface of the liquid crystal panel to be illuminated by the unit, wherein the lighting unit comprises:

a plurality of optical waveguides disposed adjacent to a display panel surface to be illuminated; and an emission tube disposed between the optical waveguides and nearer to the back surfaces of the optical waveguides than to the light-emitting surfaces thereof that face the display panel surface;

wherein a light-entering surface of each optical waveguide at an end meets the back surface thereof at an obtuse angle.

21. A liquid crystal display with a liquid crystal sandwiched between a pair of two facing substrates, which comprises:

a lighting unit comprising:

a light source unit having an emitter which has a transparent body with a refractive index n0 containing a light-emitting substance sealed in an empty region inside thereof, a housing that houses the emitter and has a reflector formed on an inner surface, a transparent filler with a refractive index n1 filled in the housing, and an optical path-changing device disposed in the transparent filler for changing an optical path; and an optical waveguide made of a transparent substance with a refractive index n2 and having a light-emitting surface.

22. A liquid crystal display with a liquid crystal sandwiched between a pair of two facing substrates, which comprises:

a lighting unit comprising:

a light source unit having an emitter which has a transparent body with a refractive index n0 containing a light-emitting substance sealed in an empty region inside thereof, a housing that houses the emitter and has a reflector formed on its inner surface, and a transparent filler with a refractive index n1 filled in the housing;

an optical waveguide made of a transparent substance with a refractive index n2 and having a light-emitting surface; and a second reflector formed on the light-emitting surface and having a plurality of open ends;

a second light source unit, wherein each light source unit is provided at an end of the optical waveguide, wherein a distance, w, between the light source units that corresponds to the length of the optical waveguide sandwiched between the light source units and a thickness, d, of the optical waveguide satisfy the requirement of $20 \times d < w < 45 \times d$.

* * * * *

UNITED STATES PATENT AND TRADEMARK OFFICE
CERTIFICATE OF CORRECTION

PATENT NO. : 6,655,810 B2
DATED : December 2, 2003
INVENTOR(S) : Hayashi et al.

It is certified that error appears in the above-identified patent and that said Letters Patent is hereby corrected as shown below:

<u>Column 70,</u>
Line 51, delete "$|\theta 1-\theta 2 < \cos^{-1}(1/n2)$" and insert -- $|\theta 1-\theta 2| < \cos^{-1}(1/n2)$ -- therefore.

Signed and Sealed this

Twentieth Day of April, 2004

JON W. DUDAS
*Acting Director of the United States Patent and Trademark Office*